United States Patent [19]
Titus et al.

[11] Patent Number: 6,018,471
[45] Date of Patent: Jan. 25, 2000

[54] METHODS AND APPARATUS FOR TREATING WASTE

[75] Inventors: Charles H. Titus, Newtown Square, Pa.; Jeffrey E. Surma, Kennewick, Wash.

[73] Assignee: Integrated Environmental Technologies, Carle Place, N.Y.

[21] Appl. No.: 09/039,580

[22] Filed: Mar. 16, 1998

Related U.S. Application Data

[63] Continuation-in-part of application No. 08/693,425, Aug. 7, 1996, Pat. No. 5,847,353, which is a continuation-in-part of application No. 08/621,424, Mar. 25, 1996, Pat. No. 5,811,752, which is a continuation-in-part of application No. 08/622,762, Mar. 25, 1996, Pat. No. 5,756,957, which is a continuation-in-part of application No. 08/492,429, Jun. 19, 1995, Pat. No. 5,798,497, which is a continuation-in-part of application No. 08/382,730, Feb. 2, 1995, Pat. No. 5,666,891.

[51] Int. Cl.[7] .................................................. H02M 7/06
[52] U.S. Cl. .............................................................. 363/126
[58] Field of Search .................................. 363/65, 67, 81, 363/82, 84, 90, 125, 126, 127, 128

[56] References Cited

U.S. PATENT DOCUMENTS

| | | |
|---|---|---|
| 2,927,143 | 3/1960 | Jensen . |
| 3,104,352 | 9/1963 | Tiemann . |
| 3,436,641 | 4/1969 | Biringer . |
| 3,470,444 | 9/1969 | Bixby . |
| 3,767,831 | 10/1973 | Plockinger et al. . |
| 3,779,182 | 12/1973 | Camacho . |
| 3,789,127 | 1/1974 | Bowman . |
| 3,812,620 | 5/1974 | Titus et al. . |
| 3,841,239 | 10/1974 | Nakamura et al. . |
| 3,918,374 | 11/1975 | Yamamoto et al. . |
| 3,995,100 | 11/1976 | Jäeger . |
| 4,099,227 | 7/1978 | Liptak . |
| 4,105,437 | 8/1978 | Liu . |
| 4,110,821 | 8/1978 | Hisano et al. . |
| 4,326,842 | 4/1982 | Adachi et al. . |
| 4,431,612 | 2/1984 | Bell et al. . |
| 4,461,010 | 7/1984 | Titus . |
| 4,466,824 | 8/1984 | Gavin et al. . |
| 4,467,408 | 8/1984 | Matulevich et al. ...................... 363/54 |
| 4,644,877 | 2/1987 | Barton et al. . |
| 4,766,598 | 8/1988 | Titus et al. . |
| 4,802,919 | 2/1989 | Fey . |
| 4,818,836 | 4/1989 | Bebber et al. . |
| 4,895,678 | 1/1990 | Ohtsuka et al. . |
| 4,922,099 | 5/1990 | Masuda et al. . |
| 4,977,493 | 12/1990 | Smith ..................................... 363/126 |
| 5,095,828 | 3/1992 | Holden et al. . |
| 5,134,307 | 7/1992 | Nakano ................................... 307/87 |
| 5,177,304 | 1/1993 | Nagel . |
| 5,240,656 | 8/1993 | Scheeres . |
| 5,280,757 | 1/1994 | Carter et al. . |
| 5,284,503 | 2/1994 | Bitler et al. . |
| 5,298,233 | 3/1994 | Nagel . |
| 5,351,175 | 9/1994 | Blankenship ............................. 363/16 |
| 5,363,826 | 11/1994 | Takoaka . |
| 5,370,724 | 12/1994 | Bitler et al. . |
| 5,375,053 | 12/1994 | Jarvik et al. ........................... 363/126 |
| 5,409,784 | 4/1995 | Bromberg et al. . |
| 5,425,332 | 6/1995 | Rabinovich et al. . |
| 5,437,250 | 8/1995 | Rabinovich et al. . |
| 5,439,498 | 8/1995 | Bitler et al. . |

(List continued on next page.)

*Primary Examiner*—Adolf Deneke Berhane
*Attorney, Agent, or Firm*—Choate, Hall & Stewart

[57] ABSTRACT

Methods and apparatus for treating waste are provided. Waste is converted in an arc plasma-joule heated melter system utilizing one or more arc plasma electrodes and a plurality of joule heating electrodes. The arc plasma electrode(s) can be configured for operation utilizing AC or DC power, or for switching between AC and DC power. The arc plasma electrodes can also be configured for independent arc voltage and arc current control. The joule heating circuits are configured for simultaneous operation with the arcing electrodes, but without detrimental interaction with the arcing electrodes. The systems provide stable, non-leachable products and a gaseous fuel. The gaseous fuel can be utilized in a combustion or non-combustion process to generate electricity.

54 Claims, 65 Drawing Sheets

U.S. PATENT DOCUMENTS

| | | |
|---|---|---|
| 5,451,738 | 9/1995 | Alvi et al. . |
| 5,484,978 | 1/1996 | Hedbert et al. . |
| 5,552,675 | 9/1996 | Lemelson . |
| 5,611,307 | 3/1997 | Watson . |
| 5,666,891 | 9/1997 | Titus et al. ............... 110/250 |
| 5,756,957 | 5/1998 | Titus et al. ............ 219/121.38 |
| 5,798,497 | 8/1998 | Titus et al. ............ 219/121.37 |
| 5,811,752 | 9/1998 | Titus et al. ............ 219/121.37 |
| 5,847,353 | 12/1998 | Titus et al. ............ 219/121.36 |
| 5,920,474 | 7/1999 | Johnson et al. ............ 363/126 |

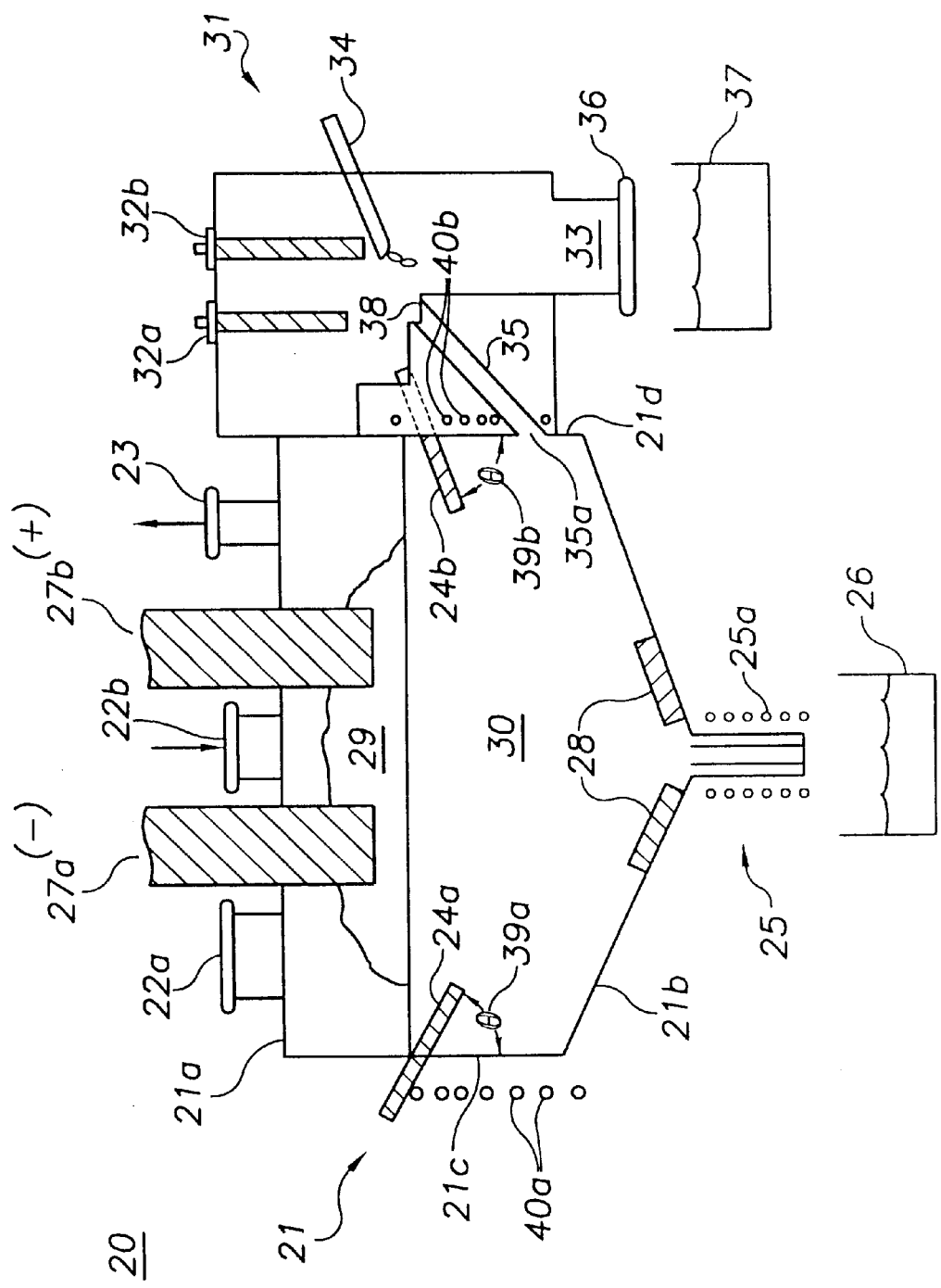

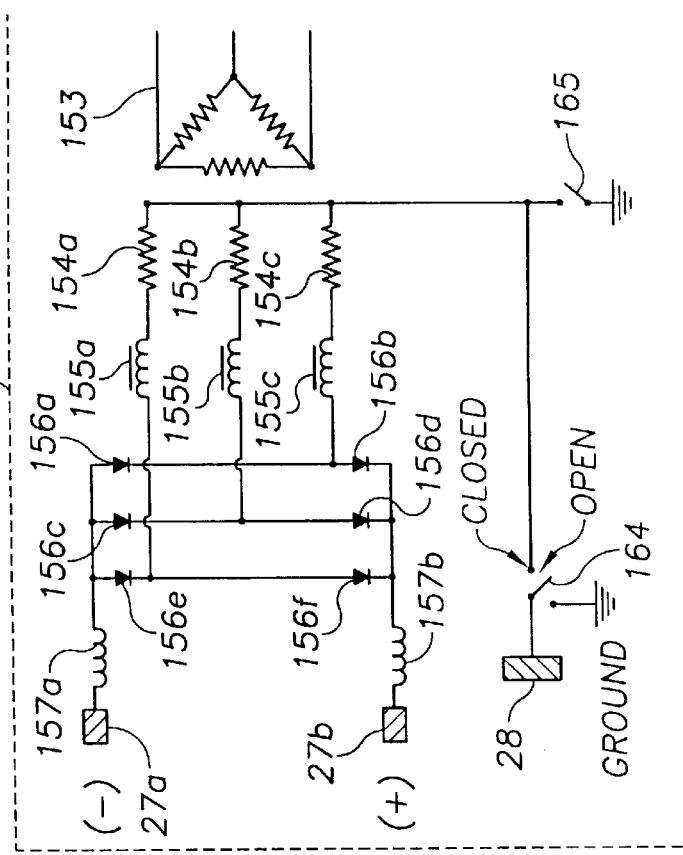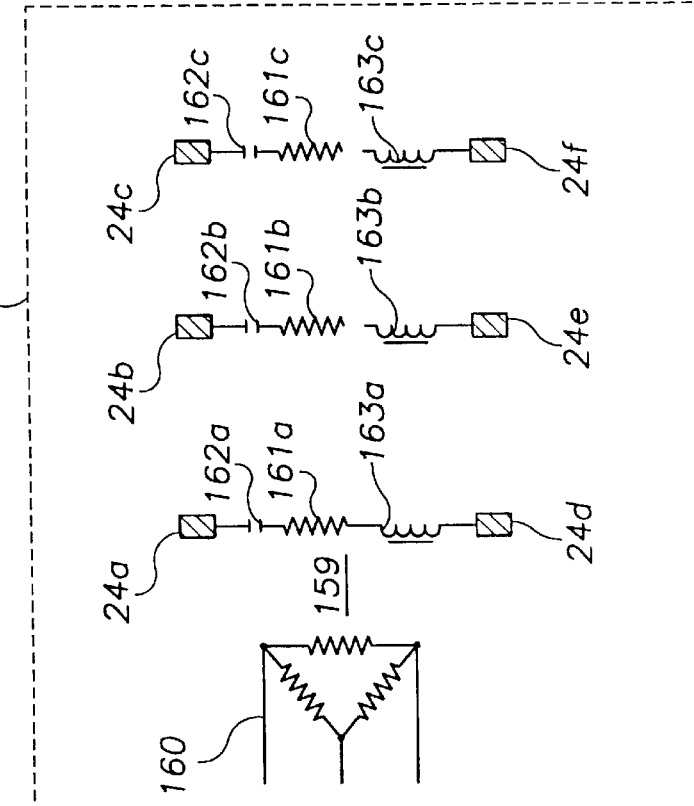

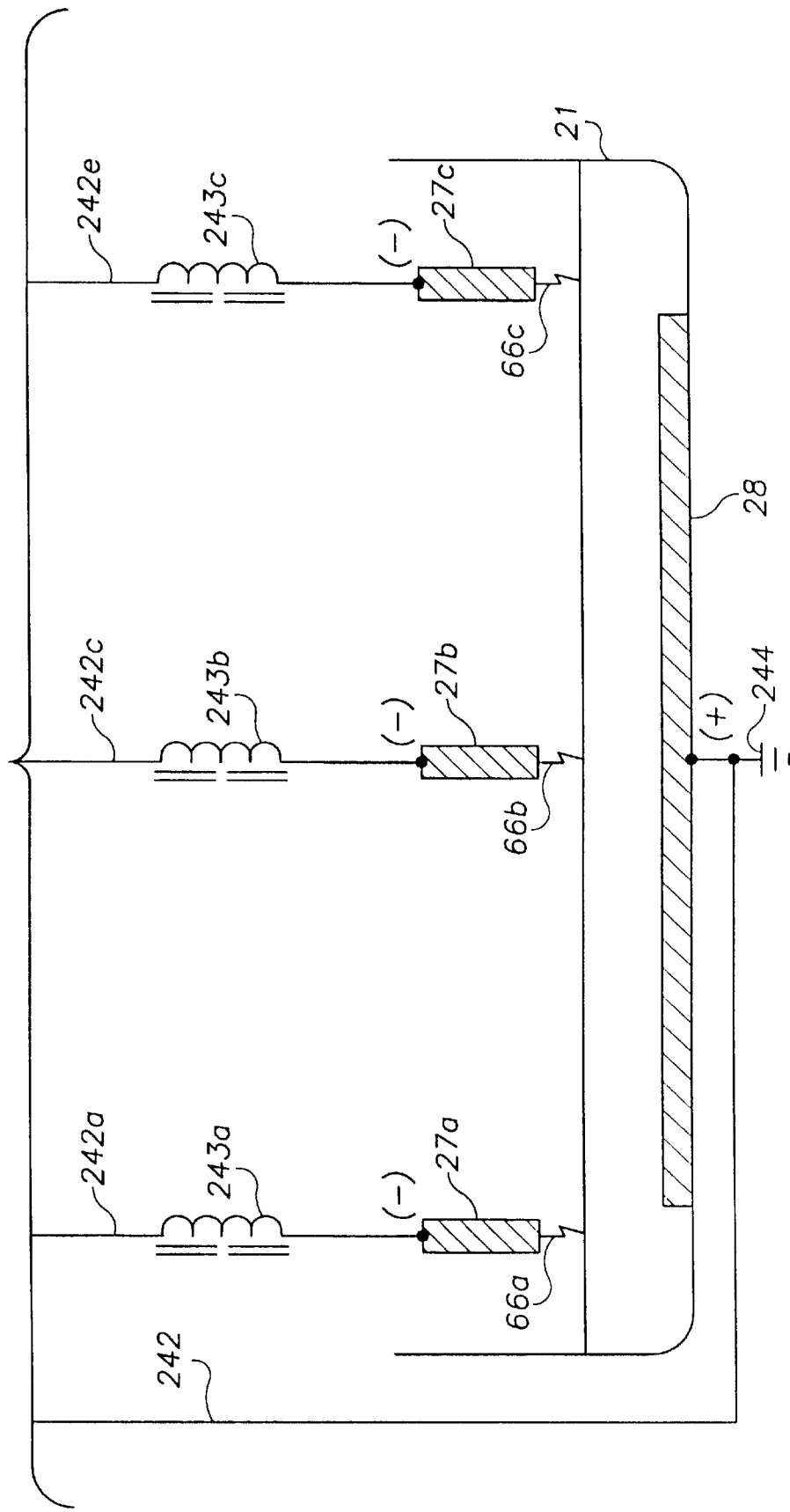

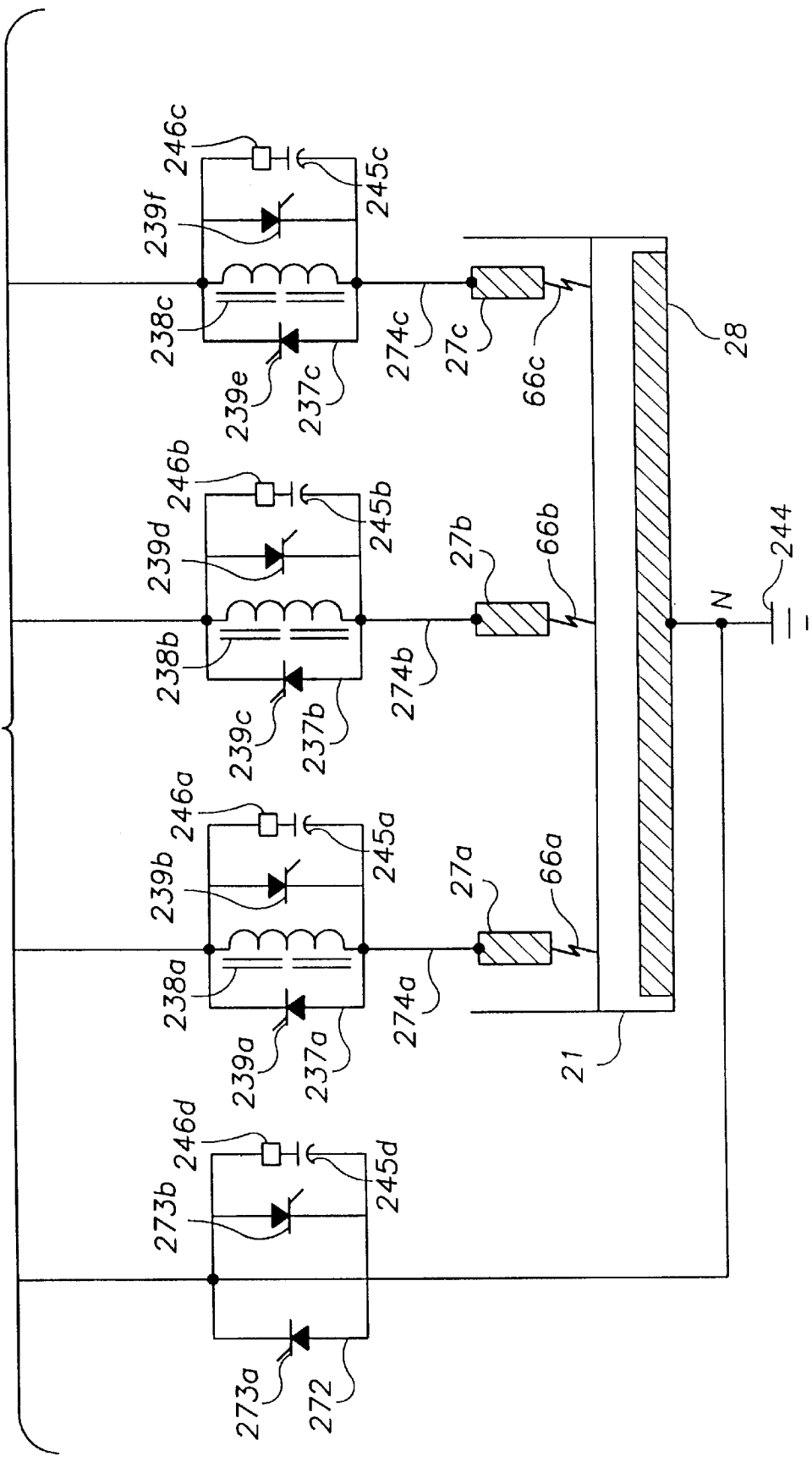

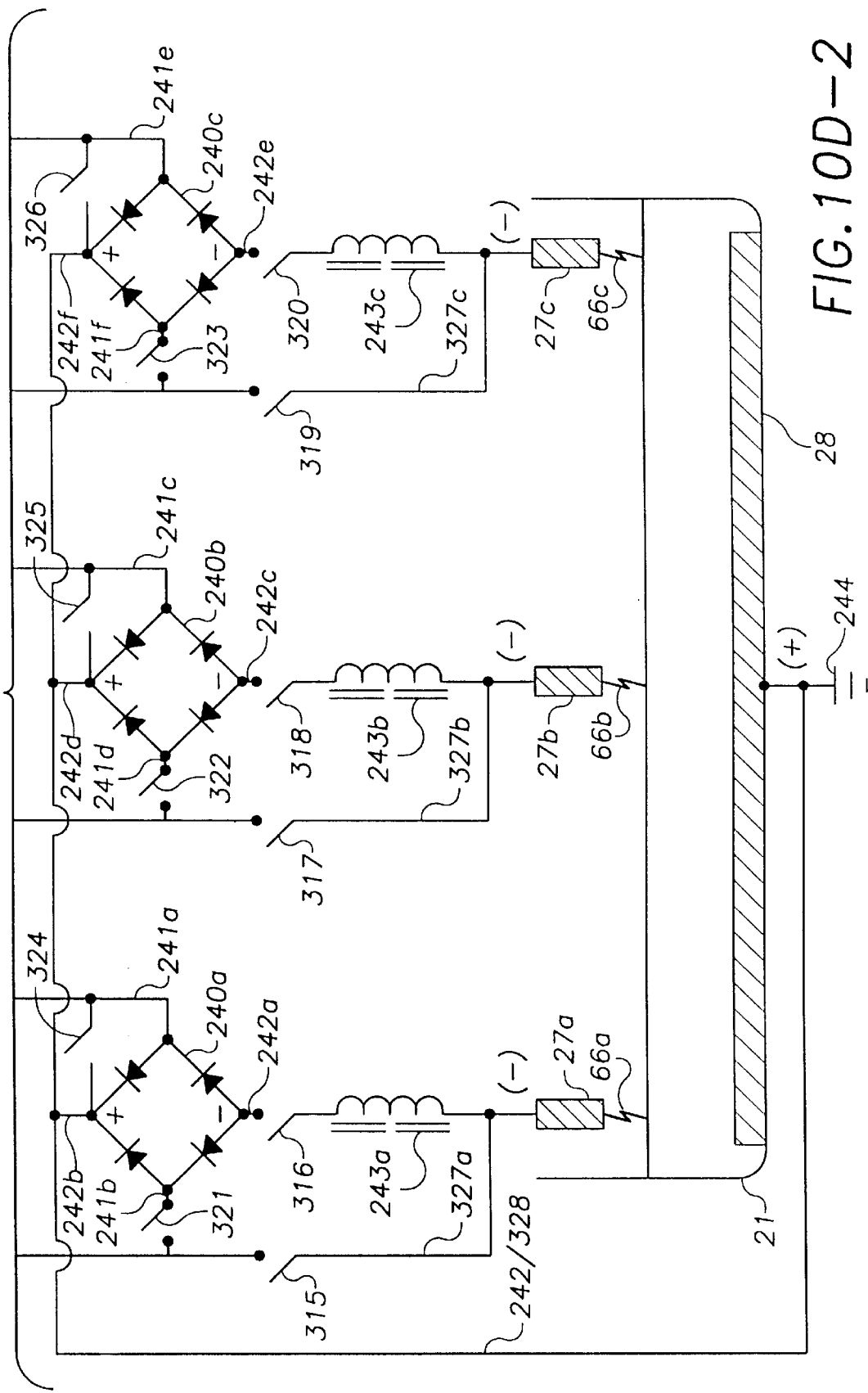

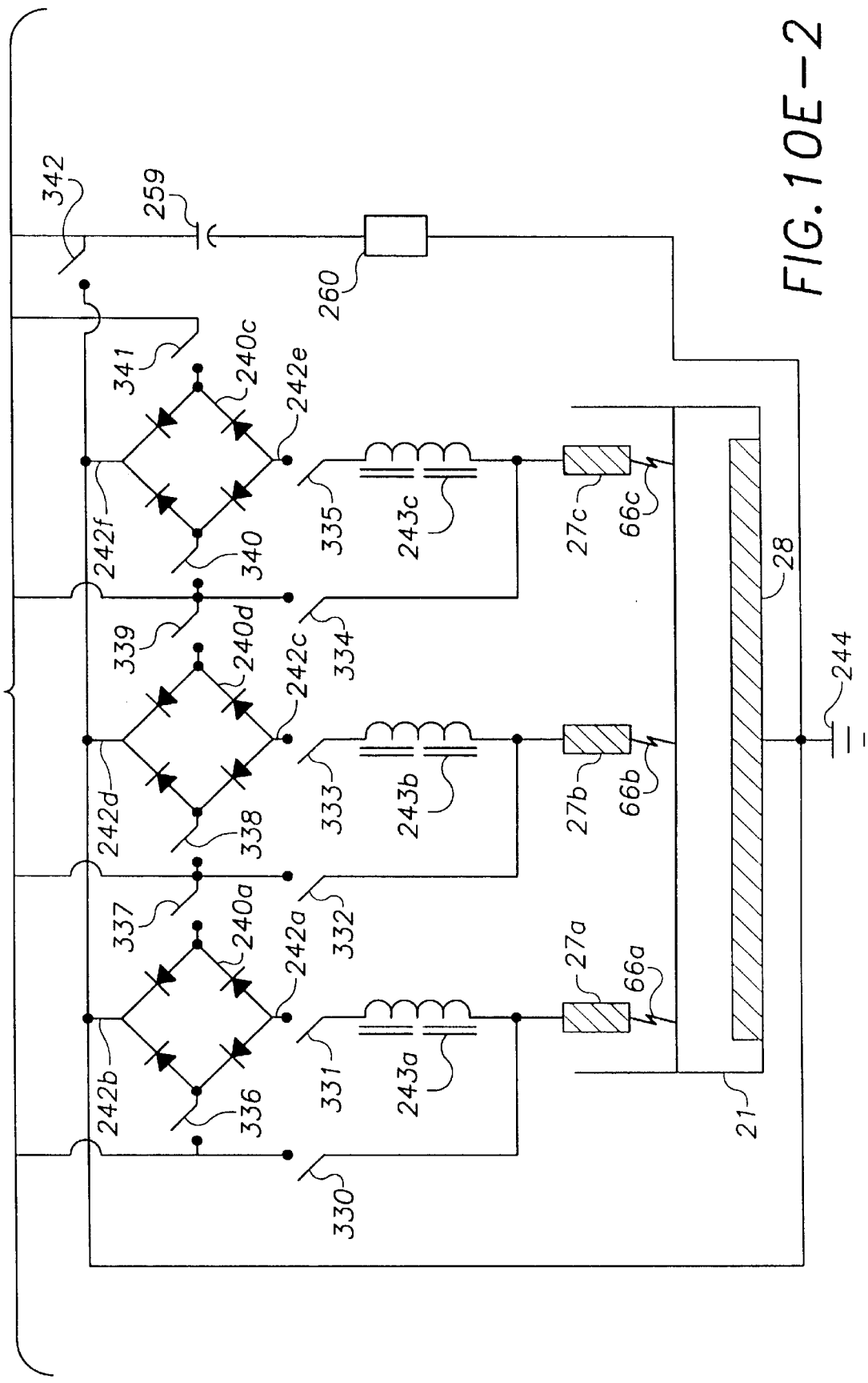

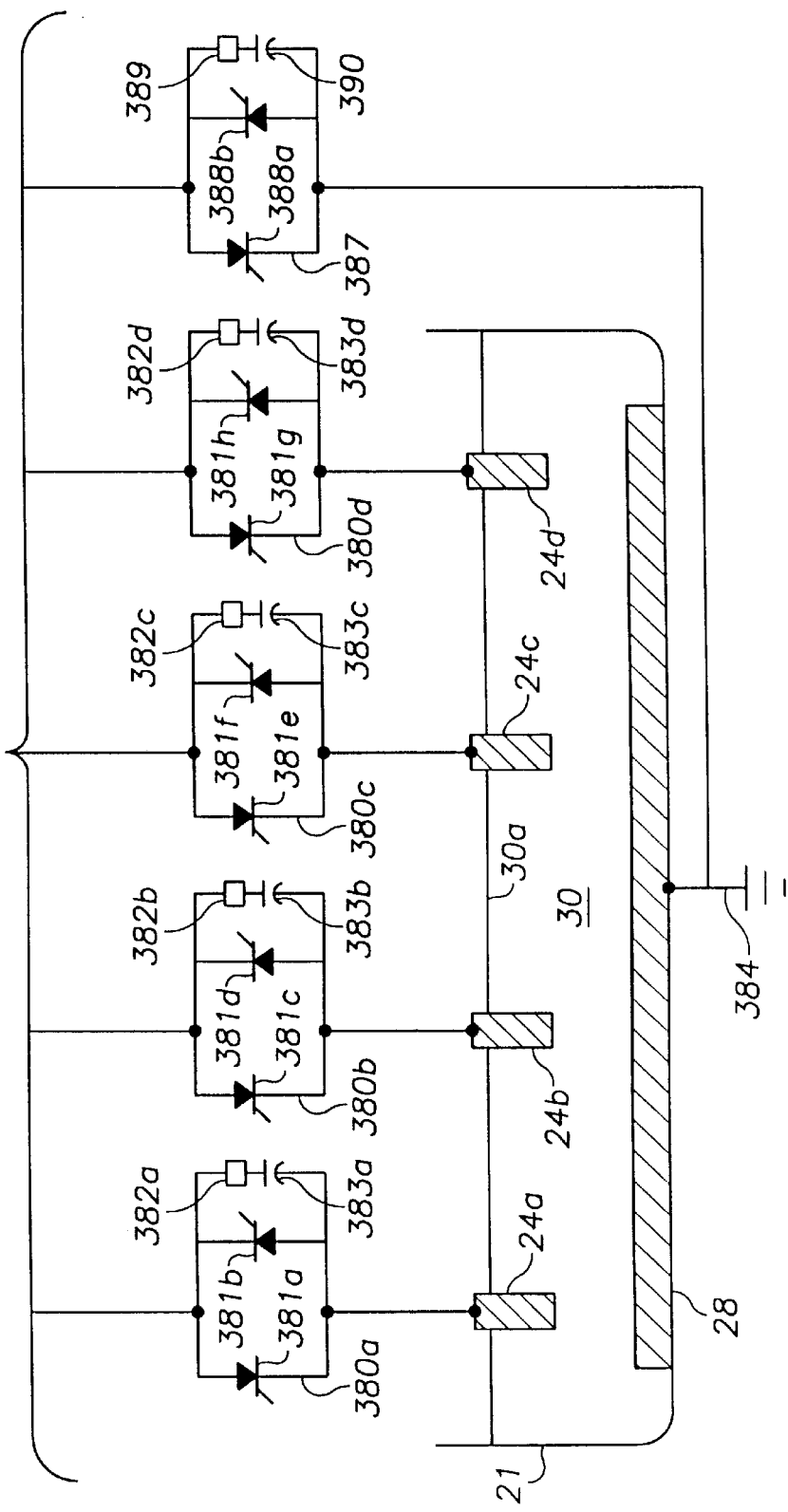

METHODS AND APPARATUS FOR TREATING WASTE

CROSS-REFERENCE TO RELATED APPLICATIONS

This application is a continuation-in-part application of U.S. Ser. No. 08/693,425, filed Aug. 7, 1996, now Pat. No. 5,847,353 which is a continuation-in-part application of U.S. Ser. Nos. 08/621,424 and 08/622,762, both filed Mar. 25, 1996, both now U.S. Pat. No. 5,811,752 and U.S. Pat. No. 5,811,752 respectively and both of which are continuations-in-part applications of U.S. Ser. No. 08/492,429, filed Jun. 19, 1995, now U.S. Pat. No. 5,798,497 and which is a continuation-in-part application of U.S. Ser. No. 08/382,730, filed Feb. 2, 1995, now U.S. Pat. No. 5,666,891; all of which are incorporated herein by reference.

TECHNICAL FIELD

The present invention generally relates to methods and apparatus for the treatment of waste and more particularly to methods and apparatus for the treatment of waste using arc plasma-joule heated melter systems.

BACKGROUND OF THE INVENTION

The disposal of municipal solid waste (MSW) and other waste has become a major issue over the past few decades due to space limitations for landfills and problems associated with siting new incinerators. In addition, increased environmental awareness has resulted in a major concern of many large metropolitan areas and to the country as a whole to ensure that the disposal of solid waste is properly handled. See e.g., U.S.A. EPA, The Solid Waste Dilemma: An Agenda for Action, EPA/530-SW-89-019, Washington, D.C. (1989).

Attempts have been made to reduce the volume and recover the energy content of MSW through incineration and cogeneration. The standard waste-to-energy incinerator will process the solid combustible fraction of the waste stream, produce steam to drive a steam turbine, and as a result of the combustion process produce a waste ash material. Typically, the ash is buried in a municipal landfill. Current trends and recent rulings, however, may require such material to be shipped to landfills permitted for hazardous waste. This will substantially increase ash disposal costs. Moreover, there is increased public concern about gaseous emissions from landfills and the possibility of contamination of groundwater. Another disadvantage associated with incinerator systems is the production of large quantities of gaseous emissions resulting in the need for costly air pollution control systems in an attempt to decrease emission levels to comply with requirements imposed by regulatory agencies.

In order to overcome the shortcomings associated with incinerator systems, attempts have been made in the prior art to utilize arc plasma torches to destroy toxic wastes. The use of arc plasma torches provides an advantage over traditional incinerator or combustion processes under certain operating conditions because the volume of gaseous products formed from the plasma arc torch may be significantly less than the volume produced during typical incineration or combustion, fewer toxic materials are in the gaseous products, and under some circumstances the waste material can be glassified.

For example, U.S. Pat. No. 5,280,757 to Carter et al. discloses the use of a plasma arc torch in a reactor vessel to gasify municipal solid waste. A product having a medium quality gas and a slag with a lower toxic element leachability is produced thereby.

U.S. Pat. No. 4,644,877 to Barton et al. relates to pyrolytic destruction of polychlorinated biphenyls (PCBs) using a plasma arc torch. Waste materials are atomized and ionized by a plasma arc torch and are then cooled and recombined into gas and particulate matter in a reaction chamber. U.S. Pat. No. 4,431,612 to Bell et al. discusses a hollow graphite electrode transfer arc plasma furnace for treatment of hazardous wastes such as PCBs.

A process for remediation of lead-contaminated soil and waste battery material is disclosed in U.S. Pat. No. 5,284,503 to Bitler et al. A vitrified slag is formed from the soil. Combustible gas and volatized lead, which are formed from the waste battery casings, are preferably transferred to and used as a fuel for a conventional smelting furnace.

The systems proposed by Barton et al, Bell et al, Carter et al, and Bitler et al have significant disadvantages. For example, such disadvantages include insufficient heating, mixing and residence time to ensure high quality, nonleachable glass production for a wide range of waste feeds. Additionally, hearth size and feeder design are significantly limited since furnace walls must be relatively close to the arc plasma which is the only heat source. High thermal stress on the walls of the furnace often occurs as a result of the limitation on the hearth size.

Prior art arc plasma furnaces with metal electrodes further may be limited by short electrode lifetime when used at higher DC current. Therefore, to achieve higher power output, the arc potential must be raised by lengthening the arc. This results in radiative thermal losses to the furnace side walls and leads to metal electrode (torch) ineffectiveness. In addition, there are often difficulties associated with prior art transfer arc plasmas in start-up and restarting of such arc plasma systems when cold, nonelectrically conducting material is being processed.

Another disadvantage associated with prior art systems is the inefficient use of combustible gases produced during conversion of waste materials. For example, combustion of gases often does not result in a high conversion rate and is thus inefficient. In addition, the combustion of such gases frequently results in the emission of pollutants such as oxides of nitrogen ($NO_x$) in amounts that render the process environmentally unattractive.

Thus, while such prior art attempts have been useful, there remains a need in the art for a robust, easy to operate waste conversion system which minimizes hazardous gaseous emissions and which maximizes conversion of a wide range of solid waste into useful energy and produces a product stream which is in a safe, stable form for commercial use or which does not require special hazardous waste considerations for disposal.

It would therefore be desirable to provide robust, user friendly and highly flexible methods and apparatus for processing and converting a wide range of waste materials into useful energy and stable products while minimizing hazardous gaseous emissions, thereby overcoming the shortcomings associated with the prior art.

SUMMARY OF THE INVENTION

The present invention provides methods and apparatus for increased conversion of solid waste materials such as municipal and industrial waste to useful energy with greatly reduced air pollution. The present invention additionally provides methods and apparatus for converting a wide range of waste materials to useful commercial products or to safe, stable products which are suitable for disposal. For example, the systems of the present invention are capable of processing municipal solid waste (MSW), industrial waste or other waste forms into stable nonleachable products (e.g. crystalline and noncrystalline products) which are suitable for use commercially or which can be disposed of without risk to the environment. The systems also minimize air emissions and maximize production of a useful gas product for the production of electricity. The present invention further provides compact waste-to-energy processing systems that have the advantage of complete or substantially complete conversion of waste materials into a useful gas and a product stream at a single location.

The methods and apparatus of the present invention for converting waste materials employ combinations of an independently controllable arc plasma or plasmas and a joule heated melter as an integrated system. In a preferred embodiment of the invention, a fully integrated joule heated melter and arc plasma or plasmas are utilized for the conversion of waste materials. The joule heated melter and arc plasma or plasmas are configured for simultaneous operation with a common molten pool without detrimental interaction of the power supplies and with independent control of the power to each of the joule heated melter portion of the system and the arc plasma portion of the system.

As stated above, the products formed from the conversion process of the invention are useful commercial products or stable products suitable for disposal. In addition, the present invention allows the use of fast pyrolysis, thereby providing a high purity gas suitable for use in combustion and non-combustion processes. For example, the gases produced in accordance with the invention can be used to generate electricity using a small, highly efficient gas turbine or internal combustion engine. In some embodiments, the waste conversion units of the invention can be self-powered or can provide a given level of electricity for outside use. This may be accomplished by utilizing an auxiliary fuel, such as natural gas, diesel or some other fuel, in varying amounts in the gas turbine or internal combustion engine.

In alternative embodiments of the invention, environmentally attractive low emission internal combustion engine-generator systems (or gas turbine systems) for waste treatment units are provided to greatly improve efficiency and pollution reduction. This is accomplished by utilizing multi-fuel (e.g. hydrogen-rich gas, natural gas, diesel oil) operation of the spark ignition engine at ultra lean ratios of fuel to air. Ultra lean operation is made possible by the fast flame front characteristic of the hydrogen in the hydrogen-rich gas produced by the waste treatment unit. In addition, very high compression ratios could be used in the internal combustion engine. Variable fuel operation is made possible by control and fuel processing systems that ensure that ultra lean, high compression ratio engine requirements for smooth burn ignition and lack of knock are met under continually varying fuel conditions.

It is expected that the high efficiency, low emission internal combustion engine-generator systems could increase the efficiency of conversion of gaseous fuel to electricity by up to approximately 40% (for example from 30 to 42%). It is also expected that by operating at ultra lean conditions such systems can reduce $NO_x$ emission by factors of more than ten relative to standard internal combustion engine-generator systems. An additional objective of the invention is to provide an option to utilize such systems to reduce carbon monoxide and hydrocarbon emissions by factors of more than ten by using highly robust and simple oxidation catalysts. For example, the invention provides environmentally attractive systems designed to utilize spark ignition internal combustion engines at ultra lean ratios of fuel to air (in the range of about 0.4–0.7 relative to stoichiometric ratios) and at very high compression ratios, e.g. r in the range from about 12 to 15, or for operating turbines at ultra lean ratios of fuel to air so as to significantly reduce levels of $NO_x$ production.

In another embodiment of the invention, the off-gas from the waste conversion unit can be employed in a non-combustion process. This can be accomplished by integrating the waste conversion units with fuel cell systems for the efficient and environmentally favorable production of electrical energy from waste processed in the waste conversion unit. For example, a molten carbonate fuel cell (MCFC) can be used in conjunction with the waste conversion units of the present invention to produce electricity from the waste conversion unit off-gases in a non-combustion process provided that the off-gases are sufficiently clean for use with the fuel cell. This may be desirable for example when composition of the waste is such that the furnace off gas produced by the waste will be compatible with the fuel cell, thereby permitting the DC power output of the fuel cell to be converted to three phase AC power for sale to a utility company or for use in powering the waste conversion unit.

The combination of the arc plasma furnace and the joule heated melter as an integrated system with gas turbine, internal combustion engine or fuel cell generating equipment provides waste treatment and power production facilities which are capable of being deployed in modular units and which can be easily scaled to handle large volumes of municipal solid waste.

The primary processing unit preferably includes a DC or AC electrode arc plasma or plasmas for heating waste material and which also has joule heating capability for the melt pool. In a preferred embodiment, the electrode arc or arcs is a DC electrode arc or arcs with electrodes formed of graphite. The use of a DC or AC arc electrode(s) in combination with the appropriate electrical circuit ensures simultaneous independent control of the arc plasma(s) and the joule heated melter systems. The primary mode of operation of the arc plasma and joule heated melter is pyrolysis (i.e. oxygen starved operation). In a preferred embodiment, the system is operated such that fast pyrolysis occurs, thereby producing a gas with higher purity as compared with other methods of pyrolysis.

Preferably, the arc plasma and joule heated melter components are fully integrated with a common molten pool such that the system is capable of simultaneous independently controllable, i.e. tunable, operation of these components. The arc plasma(s) occurs between a graphite electrode or electrodes and the molten material. It should be appreciated, however, that other metallics elements such as tungsten or the like may be utilized as the electrode material rather than graphite.

The tunable fully integrated systems of the present invention employ electrical and mechanical design features to maximize flexibility and effectiveness. In this manner, high processing rates for vitrification of a large variety of materials into high quality, stable, non-leachable glass and reduced volume requirements due to the integrated system can be expected. The arc plasma(s) provides the necessary radiant surface heating for processing feed material in a highly efficient manner and at significantly higher rates than other technologies. The joule heated melter provides deep volume heating and is capable of maintaining a constant temperature throughout the melt pool with uniform mixing characteristics, thereby resulting in a high quality, homogenous glass product.

Simultaneous independently controllable operation of the arc plasma(s) and joule heated melter is provided by predetermined arc melter configurations and electrical circuits. While not meant to be limiting, the arc plasma preferably is operated by a DC arc or arcs and the joule heated melter is operated by AC power. The DC arc(s) and AC powered joule heated melter arrangement ensures the ability to independently control and operate each component. In alternative embodiments, however, both the arc(s) and the joule heated melter portions can be operated with AC power while maintaining the ability to independently control and operate each component or portion.

The present invention provides DC and AC arc circuits which allow independent arc voltage and current control. These circuits can be designed for operation with one arc electrode or, in the alternative, with a plurality of arc electrodes. These circuits can also be designed for switching between AC and DC, as such power is desired. The present invention also provides joule heating circuits that can be operated simultaneously and independently of the arc plasma or plasmas.

The use of the melter in combination with the arc plasma (s) provides more uniform heating than prior art techniques. In addition, utilizing deep volume heating provided by the joule heated glass melter facilitates ease of operation. It also provides the constant heat source necessary to maintain sufficient electrical conductivity in the waste material for rapid restart of the arc plasma which uses or can use an electrical conduction path through the waste material. Additionally, the fully integrated system allows the furnace walls to be further from the arc plasma(s) since there is an additional heat source provided. The increase in wall distance from the arc plasma increases feed options and reduces thermal stress on the furnace lining. Consequently, thermally sensitive, highly durable, long-life refractory linings can be employed. The present invention further allows the use of electrodes having a long life and a very wide range of arc plasma and joule heater power levels.

The independent control of the arc plasma and the joule heated melter power provides a continuously tunable mix of surface and deep volume heating, which can be optimized for different phases of operation. For example, additional heating may be desired or required for pouring glass or maintaining the glass pool temperature while additional surface heating may be necessary during the initiation of waste feed. In addition, different mixes of surface and volume heating are appropriate for different waste streams. The ratio of surface to deep volume heating may be less for municipal waste, for example, than for industrial waste containing large amounts of metals and high temperature materials. The control of power to each of the arc plasma(s) and joule heated melter portions can be adjusted (manually or automatically) during processing and operation to account for such different phases of operation.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibits substantial volume reduction over prior art vitrification products. The products formed in accordance with the present invention can also be of a crystalline structure or a combination of crystalline and non-crystalline structures. The solidified forms are suitable for disposal without health risks or risks to the environment.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which:

FIGS. 3A and 3B respectively show an AC power system and a DC power system for use with the fully integrated systems of the invention;

DETAILED DESCRIPTION OF THE PREFERRED EMBODIMENTS

Figure 1A:
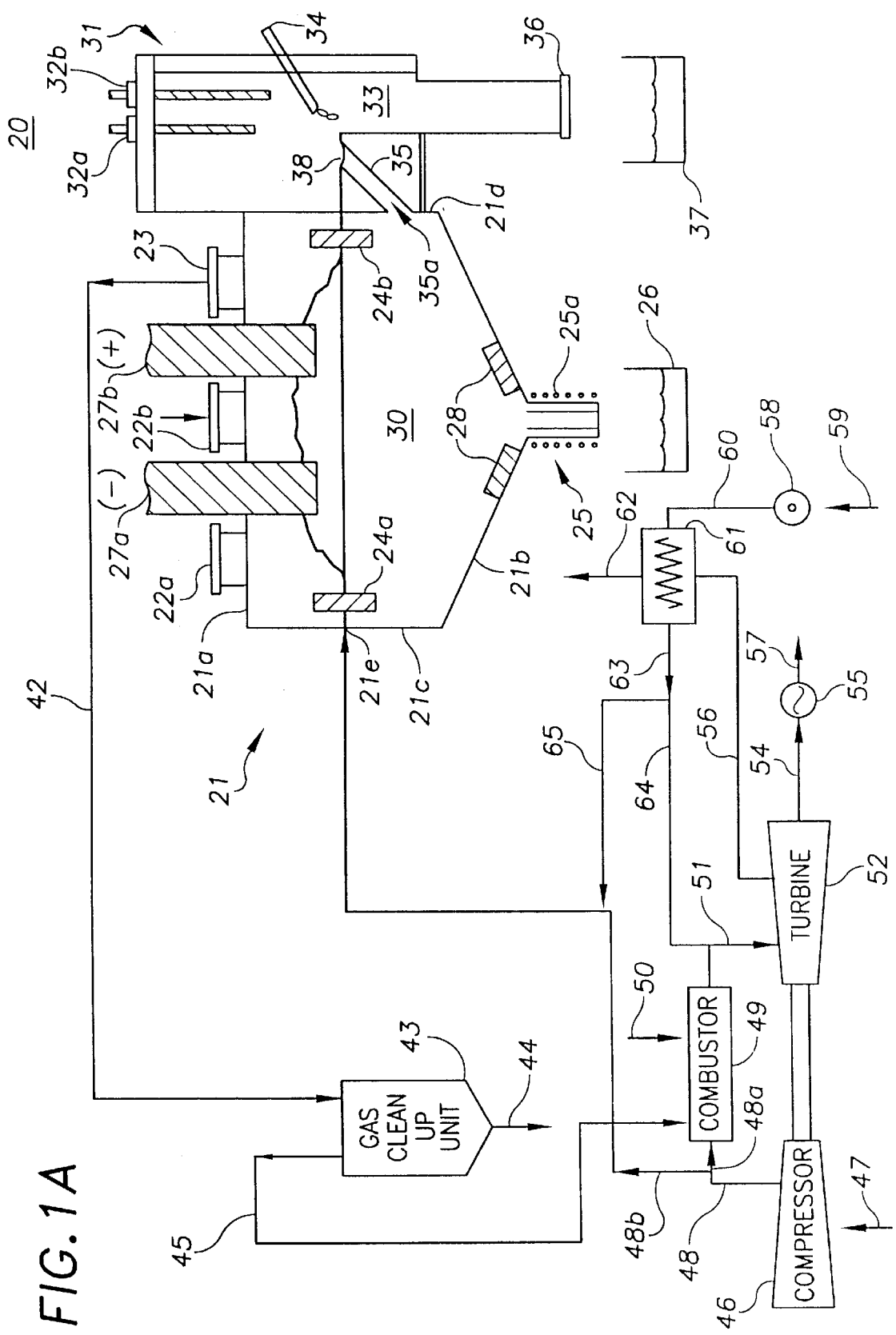
FIG. 1A shows an embodiment of the arc plasma furnace and joule heated melter according to the present invention in which the furnace and melter are formed as a fully integrated system with a common molten bath.

Referring now to FIGS. 1A–1D, several arc plasma-joule heated melters suitable for use in the invention are illustrated. As discussed herein, these embodiments utilize DC or AC arc(s) and AC joule heated electrical systems that are fully integrated and operated simultaneously in a single glass melt, but are isolated electrically from one another through the use of a special power delivery circuits. The arc plasma-melter combinations are thus integrated both thermally and electrically.

The fully integrated plasma-melter systems in accordance with the present invention provide the advantage of having continuously tunable proportions of power between the plasma heating and the glass melter heating such that adjustments can be made during processing. For example, the continuously tunable independent powering is useful when it is desirable to utilize one portion of the system, e.g. the arc plasma or the melter. The continuously tunable independent powering capabilities provide robustness and facilitate ease of operation under changing conditions. The continuously tunable independent powering capabilities additionally improve efficiency and maximize environmental attractiveness by providing additional control over solid waste products, e.g. glass and off-gas generation.

Continuously tunable independent operation of the arc plasma and melter allows the user to select various types of heating. For example, the arc plasma (or plasmas) provides radiative surface heating. Large amounts of plasma power may be used at the initiation of feeding. Somewhat lower, but still substantial amounts of plasma power may be used during continuous feeding. High surface waste temperature heating facilitates high throughput processing as well as fast pyrolysis to produce high quality combustible gas. High surface heating is also needed for processing where the material is difficult to melt or where the material is highly conductive, thereby limiting the effectiveness of joule heating with glass in the absence of arc plasma.

Joule heating with glass melter electrodes provides deep, volumetric heating. This type of heating ensures production of high quality glass by promoting mixing in the entire melt pool. It also provides conductive material for more stable transfer arc operation. Independent use of volumetric heating may also be utilized to maintain the waste in a molten state at low power requirements when there is no feed. Volumetric heating is also important for glass pouring.

Continuously tunable independent powering of plasma heating and glass melter heating facilitates the use of extra volumetric heating for purposes of glass pouring or improved glass production without increasing the adverse effects of only plasma heating such as excessive volatilization of material and thermal stressing of the furnace wall. There may also be less heat loss from one container than from two containers.

In addition to continuously tunable independent powering during processing of a given type of waste stream, the tunable features of the integrated plasma melter units may be used to optimize processing of different types of waste streams. For example, municipal waste streams may generally require lower relative amounts of plasma power than would streams that have high melting temperature materials and larger amounts of metals such as hazardous and industrial wastes composed largely of inorganic substances.

The use of volumetric melter heating also facilitates a greater range of options for plasma electrode configurations. Because volumetric melter heating maintains material in a substantially molten and conductive state, more than one plasma electrode may readily be utilized. This is in part due to the molten material providing the conducting path between the electrodes. It is thus readily possible to continuously tune operation for the use of one or more plasma electrodes. The increased flexibility may be used to optimize production of combustible gas, minimize particulate emission and reduce electrode wear.

Continuously tunable independent powering of the plasma and melter heating systems thus provides a greatly expanded amount of temperature control. Spatial and temporal control of temperature which had not been previously available may be used to improve the practicality and environmental attractiveness of combined arc plasma and melter vitrification systems. There may also be less heat loss from one container than from two containers (e.g. if the arc plasma and joule heating technologies were separately employed).

As discussed herein, the full integration of a joule heated melter with the arc plasma in accordance with the present invention also facilitates the use of an elongated melt chamber with two or more arc plasma electrodes. The molten material is capable of providing a conducting or current path between the two or more arc plasma electrodes. This configuration significantly increases flexibility of waste feed and slag tapping and increases arc plasma electrode life and robustness. The two arc plasma electrode-elongated chamber arrangement is facilitated by the joule heated melter because the joule heated melter is capable of providing the necessary heat to maintain a conducting path between the two arc plasma electrodes during idle furnace periods and also provides uniform heating in the elongated melt chamber.

The embodiments of the invention shown herein include a circuit arrangement which allows passage of the joule heating AC power through the melt using partially submerged electrodes, and which also allows simultaneous operation of a DC arc plasma circuit(s) through the melt between upper movable electrodes or, if desired, between these electrodes and/or a submerged counter electrode. The type of waste and the character of the molten slag will determine the preferred operating mode. In some alternative embodiments, the systems of the present invention can be configured for operation with an AC-AC arrangement, i.e., the arc(s) is operated with an AC power supply(ies) and the joule heated melter is operated with an AC power supply.

The integrated arc plasma-melter systems 20 shown in FIGS. 1A–1D include reaction vessel 21. It should be appreciated that the joule heated melter facilitates production of a high quality pyrolysis gas using the minimum energy input to the process. This situation exists because energy input to the arc does not need to be greater than that required to pyrolyze and melt the material in the arc zone. The molten bath below the unmelted feed material is maintained at a desired temperature using joule heating as opposed to using only an arc plasma furnace. The energy requirements to maintain the slag at the proper temperature are equal to the heat losses from the melter outer surface. This is expected to be very low, i.e. about 20–30 KW/m$^2$ of slag or glass surface area for a properly designed melt chamber. Air/oxygen and/or a combination of air and steam can be added to eliminate char from the melt surface and adjust the redox state of the glass. The joule heated melter provides energy (i.e. hot glass) near the sides of the bath where the gas/steam mixture is introduced. Unit 21 may also include auxiliary heater 31, connected as shown in FIGS. 1A–1D.

Reaction vessel 21 includes top 21a, bottom 21b, and sides 21c and 21d. Bottom 21b may have a generally V-shaped configuration as illustrated in FIGS. 1A–1D. Reaction vessel 21 further includes at least one port or opening 22a for introducing waste material 29 into reaction vessel 21. In a preferred embodiment, reaction vessel 21 includes a plurality of ports or openings 22a and 22b as shown in FIGS. 1A–1D. Ports 22a and 22b may include a flow control valve or the like to control the flow of waste material 29 into vessel 21 and to prevent air from entering vessel 21 therethrough. It is also preferred that such ports 22a and 22b be capable of being controlled such that one or more can be selectively utilized separately or simultaneously with one or another. Ports 22a and 22b may also be used with a feed mechanism such as that shown in FIG. 1K.

Reaction vessel 21 also includes gas port or opening 23 and metal/slag pouring port or opening 25. Opening or gas discharge port 23 may be formed of any conventional material which allows controlled discharge of a combustible gas. For example and while not meant to be limiting, gas discharge from furnace 21 may be controlled by a flow control valve or the like at opening 23. As shown in FIG. 1A, gas discharge port 23 can be positioned at or near top 21a of furnace 21. Gases exiting from port 23 will enter line 42 and will be sent to a scrubber, turbine or the like for further processing. As discussed above, the gases generated in the waste conversion unit may also be utilized in a non-combustion process such as that shown in FIGS. 18–19. An emergency off gas port may also be provided in unit 21 (e.g. near the top of the unit or at a sufficiently high distance on a side of the unit) in the event port 23 becomes inoperable (see e.g., FIGS. 1E and 1G). This may be desirable to prevent pressure from becoming too high in the unit. An air relief device can be provided in the unit to ensure that the pressure within the unit is within proper range.

The primary mode of operation in unit 21 is pyrolysis. However, operation in a partial oxidation mode may be required to assist in the processing of large quantities of combustible or carbonaceous materials.

Heat from the arc(s) and the specific gravity of metals present in waste material results in the formation of three phases or layers in furnace 21: a metal layer, a slag layer and a gaseous layer. Furnace 21 operates in a temperature range of about 1200–2000° C. Depending on the composition of the waste feed, furnace 21 may operate in the range of about 1550–1600° C. The arc plasma generally operates in a temperature range of greater than about 3500° C.

A metal layer (not shown) accumulates by gravimetric separation in the bottom of furnace hearth 21 until a sufficient quantity is collected. Metal is then discharged into a separate container through discharge port 25. Discharge port 25 is constructed in any manner which is capable of controlling the discharge of molten metal material from furnace 21. For example, a flow control valve or equipment may be used to control flow through discharge port 25 to metal collector or container 26. Alternatively, metals discharge port 25 may include heating coils 25a as shown in FIGS. 1A–1D. Metals discharge port 25 may also be constructed as shown in FIG. 1L and heated with a circuit as shown in FIG. 1M.

In particular, port 25 is designed to have a flow control valve or the like such that metal and/or slag may be removed and introduced into metal/slag collector or container 26 at predetermined periods of time during the process. When hazardous waste is being processed, it may be desirable to have collector or container 26 sealably connected to port 25 in a manner such that air and/or gases do not enter or exit the system therethrough.

Waste material entry ports 22a and 22b are positioned such that waste material 29 is fed from a waste feed system through ports 22a and 22b to furnace 21 in a controlled manner. While not to be construed as limiting, ports 22a and 22b may include a flow control valve or the like to monitor the feed rate of waste material 29. The feed system may be any conventional type of feed system which is capable of feeding municipal solid waste or other waste such as hazardous waste, hospital waste, ash from an incinerator or the like to furnace 21 so long as the feed system does not allow air to enter the furnace through the feed system. The feed mechanism illustrated in FIG. 1L may also be used for feeding waste to unit 21.

As also shown in FIG. 1A, furnace 21 may include additional ports such as air or gas entry port 21e. Air or gas entry port 21e includes flow control, such as a flow control valve or the like. Preferably, port 21e is positioned to enter through the furnace wall at a level proximate to slag material 30 as shown in FIG. 1A. In this manner, air 48b (which may contain a predetermined amount of steam 65), can be injected into furnace 21 at a controlled rate and time during the conversion process to control the composition of the gas exiting the furnace. In addition, air and/or steam may be introduced through opening 21e to ensure that any carbon in the feed material has been converted to carbon-containing gases such as CO, $CO_2$, $H_2$, $CH_4$ and the like. This reduces the amount of charring during the process which may result when carbon is not completely converted to carbon-containing gases.

As further illustrated in FIG. 1A, system 20 also includes turbine 52, generator 55, and the necessary equipment required to couple the arc furnace-melter unit thereto. For example, system 20 preferably includes hot gas cleaning equipment 43, waste heat recovery unit 61, and air 47 and water 59 injection systems. While not shown in FIG. 1A, a feed conditioning process for the waste material in feed system may also be utilized prior to being fed to furnace 21. In addition to the units shown in FIG. 1A, it may be desirable to incorporate an off-gas scrubbing process for gases exiting clean-up unit 43 or the gas fired turbine to remove any acid gases therefrom. Preferably, the only gas conditioning required for the gases exiting arc furnace 21 is gas-solid separation in hot gas clean-up unit 43 to minimize the amount of particulates entering turbine 52.

The gases produced in furnace 21 are combustible gases formed as a result of fast pyrolysis. As discussed herein, fast pyrolysis generally results in at least 65% conversion of waste material to a useful gas for combustion. Arc furnace 21 utilized in accordance with the present invention is thus expected to provide a gas containing about: 2% carbon dioxide, 44% carbon monoxide, 43% hydrogen, 2% methane and the balance being light hydrocarbons, depending on the composition of the waste feed. The gas produced in furnace 21 is transported through line 42 to hot gas clean up unit 43 where ash 44 is removed and thus separated from fuel gas 45.

Intake air 47 enters compressor 46 and air 48 exiting compressor 46 may be divided into several delivery streams. For example, air flow 48a can be fed to combustor 49 and air flow 48b may be fed to furnace 21.

Fuel gas 45 enters combustor 49 and combines with air 48a. Hot gases and steam 51 produced in combustor 49 drive turbine 52 which is connected to generator 55 via 54 such that electricity 57 is thereby generated. Turbine 52 may be a high efficient steam-injected gas turbine. Such turbines are commercially available.

Figure 1B:
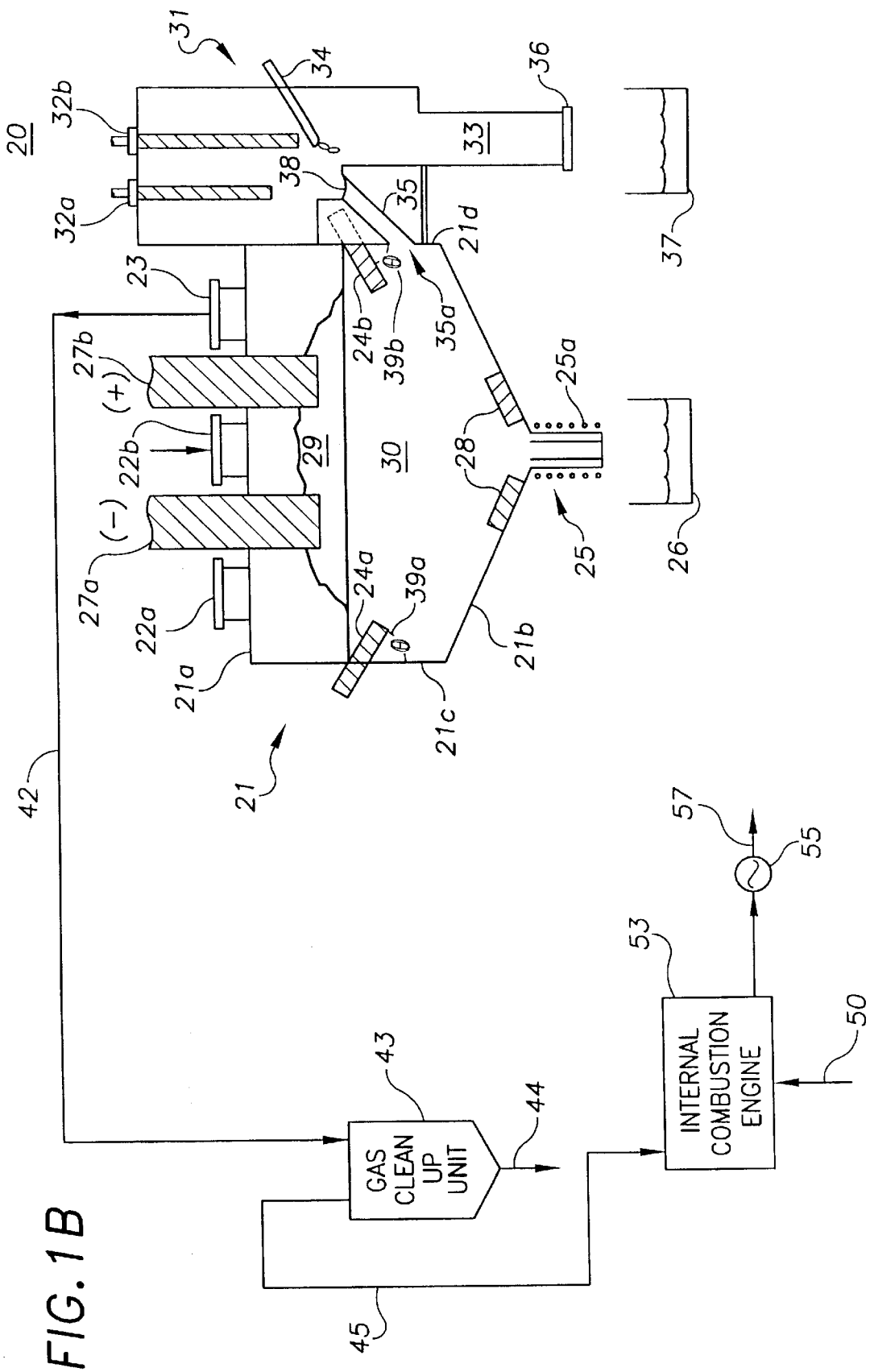
FIG. 1B shows a fully integrated arc plasma furnace and melter in which the melter portion electrodes are positioned at an angle relative to the vertical portion of the arc plasma-melter unit.
Figure 1D:
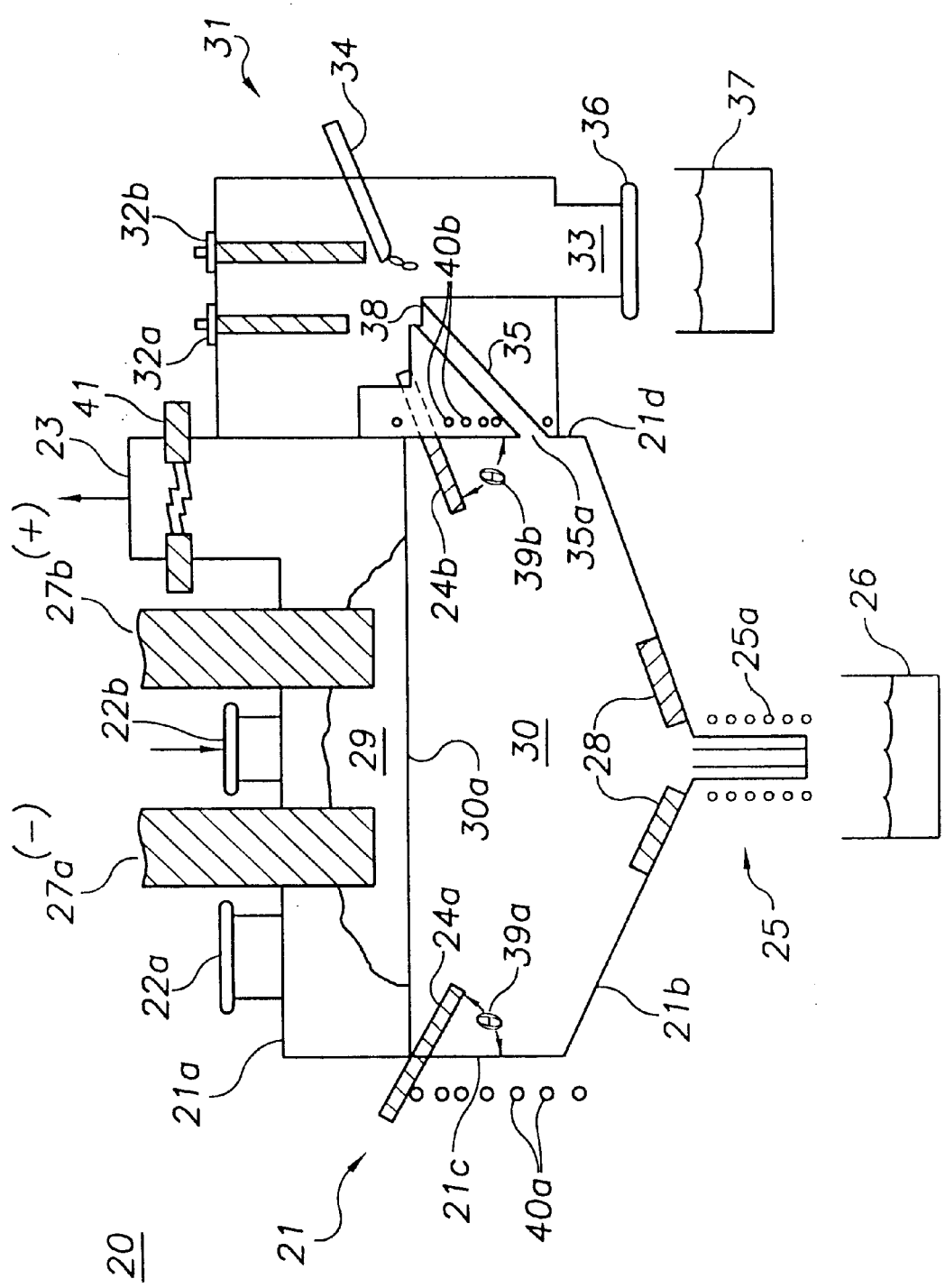
FIG. 1D illustrates the fully integrated system of FIG. 1C having a secondary thermal boost in accordance with an alternative embodiment of the invention.

For self-powered operation, especially during startup, a varying amount of natural gas or other type of fuel 50 may be fed to combustor 49 (or internal combustion engine 53 as shown in FIG. 1B). During operation, fuel gas 45 and auxiliary fuel 50 may be combined in combustor 49.

Water 59 enters system 20 through pump 58 to heat recovery steam system 61, i.e. a heat exchanger where heat from hot turbine exit gas 56 exchanges to flow 60. Exhaust 62 is kept separate from steam 63 in heat recovery steam system 61. Steam 63 may be recycled as steam 64 to turbine 52 and as steam 65 to air flow 48b, as shown in FIG. 1A respectively.

Referring now to FIG. 1B, a process similar to that shown in FIG. 1A is illustrated except that compressor 46, combustor 49 and gas turbine 52 are replaced by an internal combustion engine 53. Internal combustion engine 53 may be easier to utilize and may be more cost efficient than a compressor-gas turbine, especially for small tunable plasma-melter electroconversion units. Air and auxiliary fuel 50 may be fed to internal combustion engine 53 in a predetermined manner based on the composition of fuel gas 45. Preferably, the efficiency of engine 53 provides sufficient electricity for all or substantially all of the electrical power required for the tunable plasma-melter electroconversion unit.

Spark ignition internal combustion engines can be advantageous in that such engines are less expensive for very small units than turbines. To facilitate production of a desired level of electrical power, particularly during startup, an auxiliary power such as hydrogen-rich gas, propane, natural gas or diesel fuel may be used to power the internal combustion engine. The amount of auxiliary fuel may vary depending on the composition of the waste stream, i.e. the heating value of the incoming waste material and the amount of combustible material in the waste material and the power requirements for waste processing.

Chamber 31 includes auxiliary heaters 32a and 32b. Chamber 31 may also include plasma torch 34. Due to differences in specific gravity, metal in metal/slag layer 30 moves toward bottom 21b in vessel 21. Slag in metal/slag layer 30 exits through opening or port 35a into conduit 35. It should be appreciated that conduit 35 may be positioned similar to any of the configurations as shown and described above with reference to conduit 98 shown in FIGS. 2A–2E in copending U.S. Ser. No. 08/492,429. The flow of slag from vessel 21 to the auxiliary heater system 31 can also be controlled by controlling the pressure in melter 21 and auxiliary heater system 31. In particular, the differential pressure may be used to control the flow of slag to heater system 31.

Slag 38 is heated further by or auxiliary heaters 32a and 32b for a time sufficient to provide a homogeneous slag product. Alternatively or in addition to heaters 32a and 32b, the temperature of slag 38 may be maintained by plasma torch 34 in order to enhance flow into the receptacle for certain viscous types of waste. Plasma torch 34 can be positioned to provide additional heat to material in conduit 35.

Slag 38 then passes through slag pouring conduit 33 and port 36, thereby exiting chamber 31 into slag collector or container 37. When hazardous waste is being processed, it may be desirable to have collector or container 37 sealably connected to port 36 in a manner such that air and/or gases do not enter or exit the system therethrough. Port 36 may include a flow control valve or the like to control the discharge of slag 38 from heat system 31. Auxiliary heater system 31 is utilized when it is desirable to decrease the viscosity of the slag in order to maintain the slag level in the melter. The auxiliary heater system also compensates for heat loss as the slag approaches the slag discharge prior to dropping into the slag container.

As also shown in FIG. 1A, DC electrodes 27a and 27b are provided within reaction vessel 21 as shown in FIGS. 1A–1D. Reaction vessel 21 also includes a plurality of AC joule heating electrodes 24a and 24b. As further shown in FIG. 1A, electrodes 24a and 24b may be positioned across from one another on sides 21c and 21d, respectively. In addition, electrodes 24a–24b are positioned so as to be partially submerged in the slag 30 when the process is in use. One or more additional electrodes 28 may be provided as shown in FIGS. 1A–1D.

FIG. 1B illustrates an alternative arrangement for the positioning of electrodes 24a and 24b in accordance with the present invention. The positioning of electrodes 24a and 24b as illustrated in FIG. 1B facilitates replacement of the electrodes. In particular, this type of arrangement allows replacement of electrodes without the necessity of draining the furnace hearth. Draining the furnace hearth is undesirable as it often degrades the lining of the furnace. Accordingly, placing electrodes 24a and 24b at angles 39a and 39b respectively, while simultaneously preventing the escape or release of gas facilitates the replacement of electrodes as needed. While not to be construed as limiting, angles 39a and 39b of electrodes 24a and 24b relative to the respective interior sides of the furnace can be between about 30°–45° to the vertical axis. It may be desirable to utilize metallic electrodes or coated graphite electrodes for the joule heated melter. Electrode(s) 24 may be positioned at any angle (including vertically) so long as they are positioned on an interior face of the furnace cavity. The arc plasma electrode or electrodes are preferably formed of graphite. The portion of the electrode length just above the melt line on of the electrode may be coated to decrease the rate of erosion which may be caused by oxidation and/or the injection of steam.

As further shown in FIG. 1B, AC powered joule heating electrodes 24a and 24b can be inserted through sides 21c and 21d of furnace 21, respectively. The top end of each electrode preferably extends outside the metallic furnace enclosure and may be capped with an electrical connection which will be electrically insulated from the electrically grounded furnace shell. The bottom end of each electrode is immersed beneath the molten bath to a desired depth. By selecting the proper location of the point of entry of the electrode below the surface of the melt, it may minimize the portion of the electrode exposed to the DC arc or radiation from this arc, thereby increasing the life of this electrode.

When it is necessary to replace electrode 24a and/or 24b, the spent electrode is withdrawn from the molten bath. If a new electrode is inserted into the bath without preheating the electrode, the cold electrode may cause the viscosity of the molten bath to increase where the electrode contacts the molten bath, thereby making it difficult to insert this new electrode into the molten bath. Accordingly, it may be desirable to also electrically energize this electrode by using a special electrically isolated, current limited power supply which will safely provide additional heat at the junction of the bath and the electrode to fully permit immersing the new electrode into the bath. In a preferred embodiment, suitable electrical and thermal insulation may also be provided to each electrode so that each electrode will be insulated both thermally and electrically from the metallic furnace enclosure during normal operation.

Figure 1E:
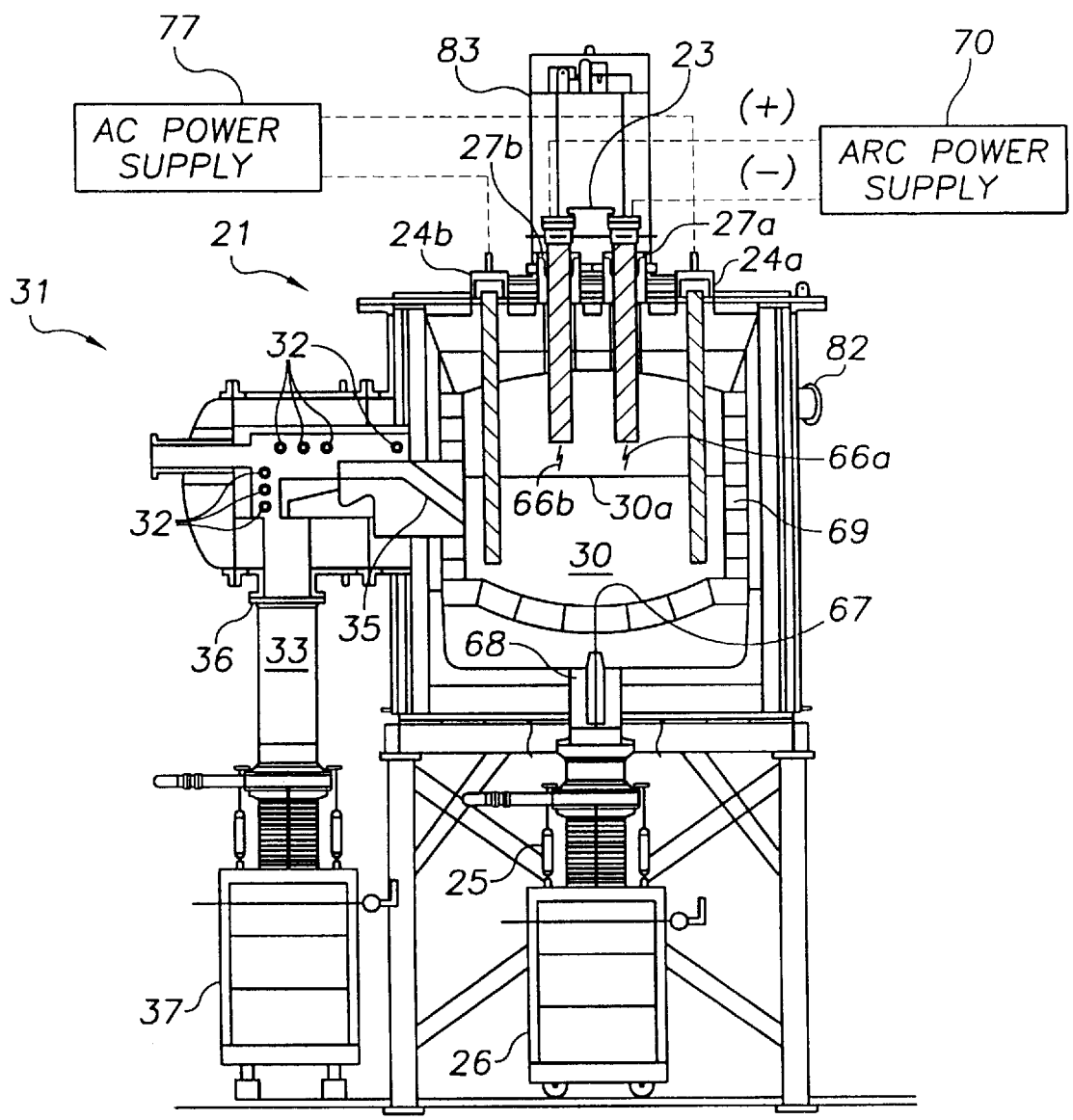
FIGS. 1E–1G show an alternative arrangement for the fully integrated arc plasma-joule heated melter.
Figure 1F:
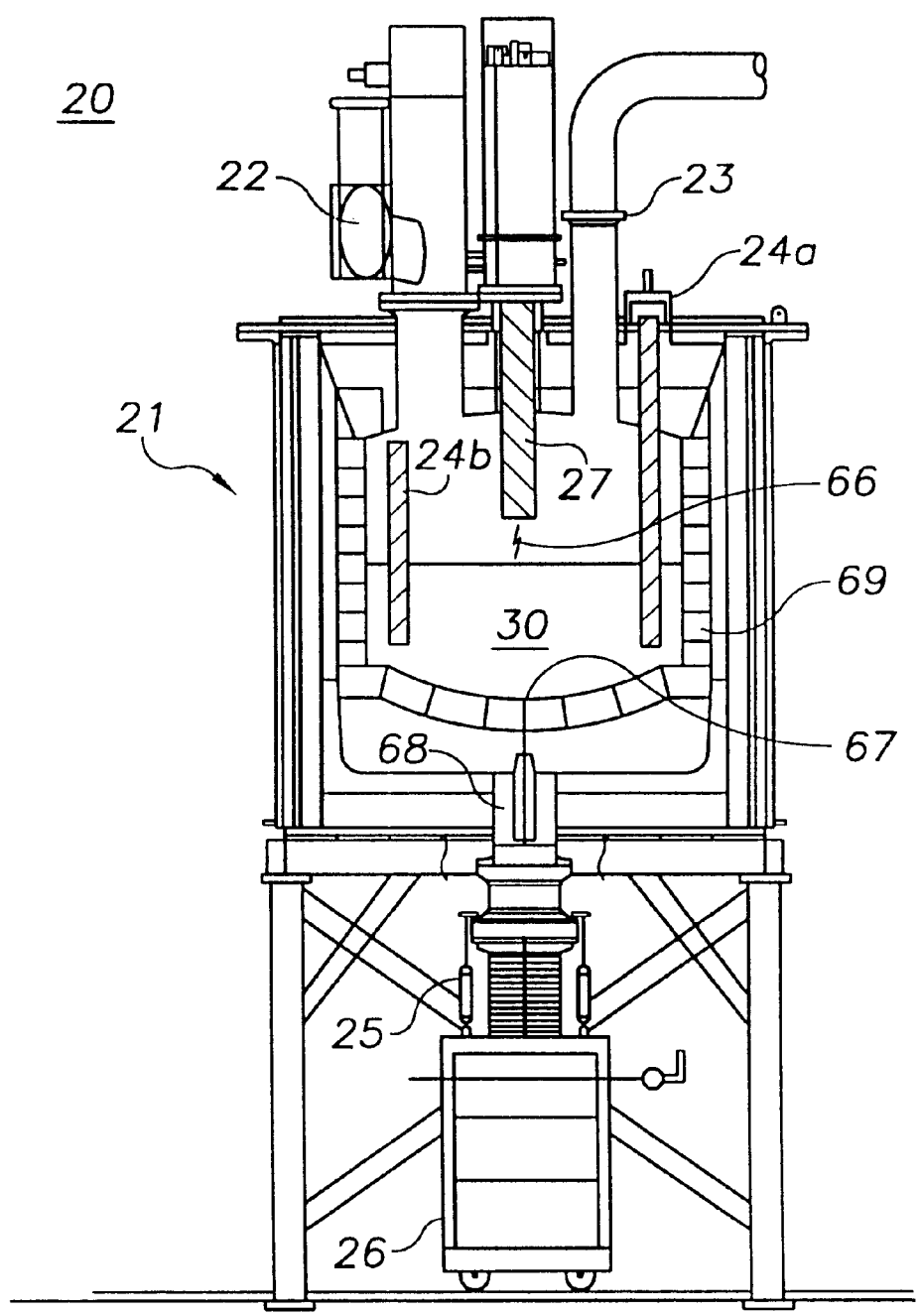
Figure 1G:
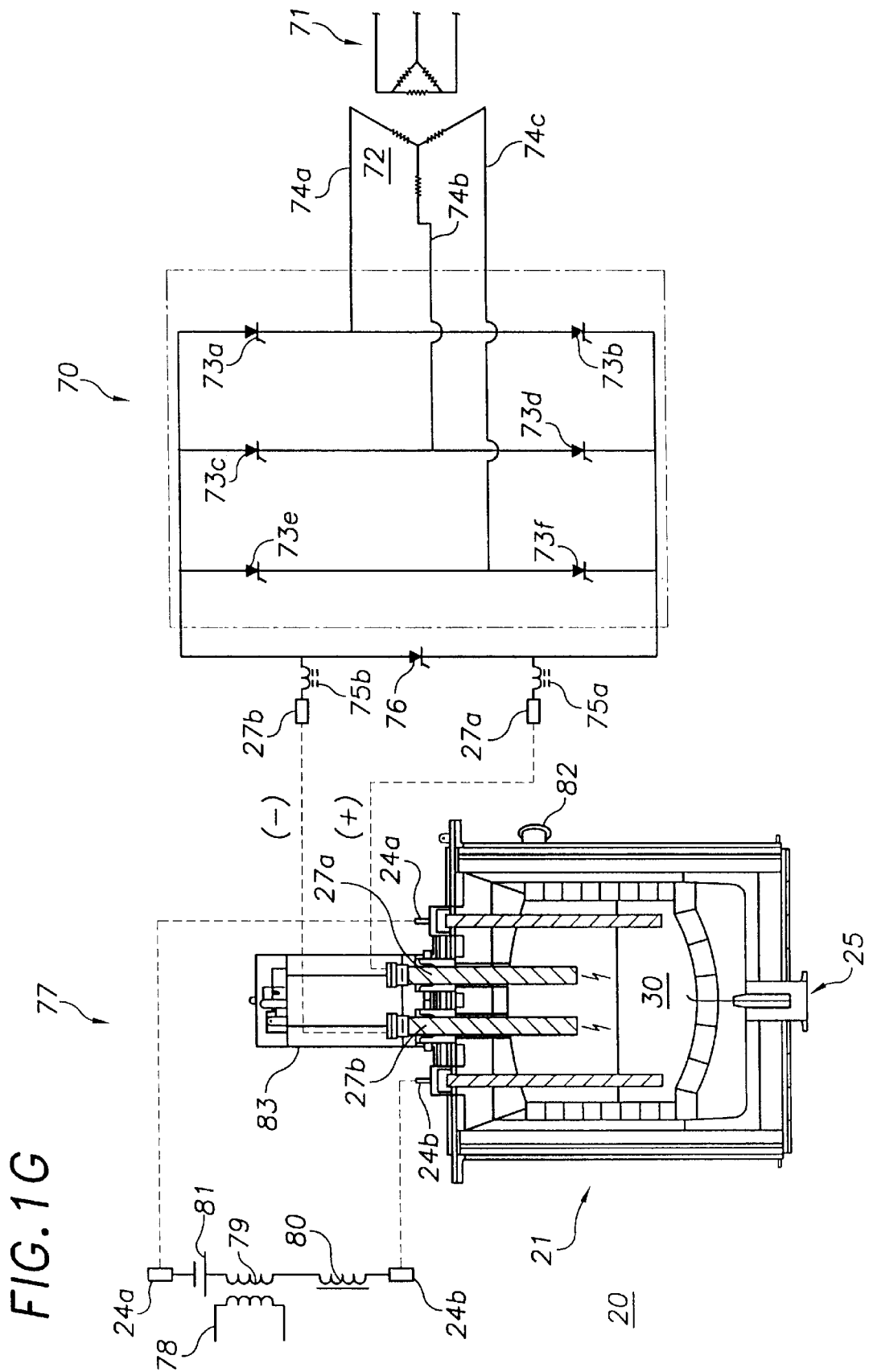

In an alternative embodiment, the partially immersed joule heating electrodes can be replaced by removing the electrode(s) vertically as shown in FIGS. 1E–1G. For example, the joule heating electrodes are positioned vertically and can also be replaced without draining the furnace hearth.

FIG. 1C illustrates another embodiment of the present invention in which magnetic coils 40a and 40b may be utilized for inductive heating and/or mixing to provide additional heating and/or mixing in the melt pool. In order to provide the optimum rate of melting commensurate with the particular waste stream being introduced into the combined arc plasma-melter, additional stirring or mixing beyond that normally produced by the melter portion of the furnace and the arc portion of the furnace may be desirable. This may be accomplished by the addition of strategically placed magnetic coils such as coils 40a and 40b to create greater J×B forces which in turn causes additional mixing and/or heating in the molten bath. Coils 40a and 40b may be positioned within the metal shell of the furnace, but behind the refractory lining of the melt pool. Alternatively, if the furnace shell is fabricated of non-magnetic stainless steel, the coils may be placed on the exterior of the shell. Coils 40a and 40b are connected to an AC power supply source. This enhancement of bath mixing is an example of the type of "tuning" which may increase furnace electrode life and waste throughput.

FIG. 1D illustrates another embodiment of the present invention in which an alternative configuration of the plasma melter process incorporates a secondary thermal boost system 41. This system may be an arc plasma in a chamber to provide additional thermal energy to further crack condensable fractions exiting the primary plasma-melter process. As shown in FIG. 1D for example, secondary thermal boost system 41 may be placed proximate to or within port 23.

Conversion of waste to electrical energy for the plasma melter process depends on maximum conversion of solid and liquid wastes to gaseous product gas. In pyrolysis processes, a portion of the exiting gas may contain condensables that are light to medium weight oils. If the gas exiting the primary plasma-melter chamber is allowed to cool, liquefaction of a portion of the off-gas may result due to the condensables present at furnace temperatures. The secondary plasma off-gas chamber ensures that these oils are converted to noncondensable combustible gases resulting in an enhanced recovery of energy value from the incoming waste materials.

When secondary plasma chamber 41 is positioned as shown in FIG. 1D, the gas exiting the primary furnace chamber does not decrease in temperature before entering the secondary plasma chamber 41 because the two systems are directly coupled. This minimizes the overall energy requirements for the cracking and gasification processes.

Because condensable species exiting the furnace are converted to a combustible gas in the secondary plasma chamber, secondary waste generation is minimized. It should be appreciated that the plasma off-gas chamber may not always be required, but may be independently controlled during the process.

Electrode or electrodes 24a and 24b preferably are positioned in the furnace 21 at a sufficient distance from the walls 21a–21d such that feed material 29 can shield or protect the walls from thermal radiation. This facilitates the use of a wide variety of materials as refractory furnace lining.

It is preferred to use graphite as electrode material rather than metal since graphite electrodes simplify the process and have much higher current capability than those used in a metal torch. In addition, graphite electrodes require less maintenance relative to the frequent tip replacements of the metal torch systems. Due to the anticipated conditions in the furnace plenum involving both partial oxidizing environments and conditions promoting the water-gas reaction:

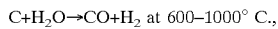
$$C + H_2O \rightarrow CO + H_2 \text{ at } 600–1000° \text{ C.,}$$

there may be unacceptable consumption of graphite without special provisions. Therefore, graphite electrode(s) 27 is preferably coated with a suitable material such as silicon carbide, boron nitride or another protective coating to minimize graphite consumption and prolong useful life. For example, when municipal solid waste containing carbonaceous material is fed to furnace 21, a highly endothermic reaction occurs, which may require additional energy to convert carbonaceous material to fuel gas and noncarbonaceous material to slag.

The conditions within the waste conversion units of the present invention can be continuously monitored (manually or by automated systems) during waste processing such that temperature profiles, current in the molten bath, voltage and the like can be obtained. This ensures that desired processing characteristics of the molten bath and gases exiting the units are satisfied. For example, the composition of gases exiting the waste conversion units can be monitored during processing using devices such as those disclosed in U.S. Pat. No. 5,479,254 (issued Dec. 26, 1995) and U.S. Pat. No. 5,671,045 (issued Sep. 23, 1997) both by Woskov et al. The entire contents of U.S. Pat. Nos. 5,479,254 and 5,671,045 are incorporated herein by reference. In addition, a thermocouple, an infrared temperature device, a radiometer such as that disclosed in U.S. Pat. No. 5,573,339 (issued Nov. 12, 1996) by Woskov et al. and entitled Active Radiometer for Self-Calibrated Furnace Temperature Measurements or a pyrometer such as that disclosed in WO 97/13128 (International Application No. PCT/US96/15997, published Apr. 10, 1997 and entitled Active Pyrometer for Self-Calibrated Furnace Temperature Measurements) could be inserted into the chamber. The entire contents of U.S. Pat. No. 5,573,339 and WO 97/13128 are incorporated herein by reference. See also, Woskov et al, *New Temperature and Metals Emissions Monitoring Technologies for Furnaces*, Proceedings of the International Symposium on Environmental Technologies, Plasma Systems and Applications, Atlanta, Georgia (Oct. 8–11, 1995), the entire contents of which are hereby incorporated by reference.

Referring now to FIGS. 1E–1G, another alternative embodiment of the present is illustrated. In this embodiment, unit 21 includes two arcing electrodes, 27a and 27b, and two or more joule heating electrodes, 24a and 24b. Preferably, arcing electrodes 27a and 27b are operated with a DC power supply 70 while the partially immersed non-arcing electrodes 24a and 24b are operated with AC power supply 77.

Unit 21 also includes an exhaust port or vessel 23 (which may be insulated to prevent heat loss) and preferably includes an emergency off gas vessel 82 to ensure the maintenance of proper pressure within the chamber. Waste feed may be fed from a feed mechanism and charge port(s) 22 into the unit 21. The feed mechanism may be a gravity-type feed mechanism, and may be constructed such as that shown in FIG. 1K. The unit may also include a plurality of feed mechanisms spaced around the unit in predetermined positions and aligned with the charge ports of the chamber. A non-graphite refractory hearth 69 can be used to line the unit 21. Hearth 21 may be formed from a variety of refractory materials.

Arcing electrodes 27a and 27b are used to generate arcs 66a and 66b, respectively, and decompose at least a portion of waste fed into unit 21. The waste forms a gaseous layer and a molten bath. Due to differences in specific gravity, the molten bath separates into a slag layer and a metal layer(s). The level of melt line 30a can be controlled by removing at least a portion of the slag and/or metal(s) from the unit. For example, molten material such as slag can be removed by discharge conduit 35 to slag container 37 while metals(s) may be removed from the bath by discharge conduit opening 67 and then through discharge conduit 68 to metals container 26. The discharge conduit 68 may be heated utilizing heating coils as discussed hereinabove (see also FIGS. 1L and 1M).

The rate at which molten material (e.g. slag) flows through discharge conduit 35 to auxiliary heating system 31 can be controlled by a flow control valve or the like. In one embodiment, the flow of molten material from unit 21 to the auxiliary heater system 31 can be controlled by controlling the pressure in unit 21 and auxiliary heater system 31. The differential pressure may then be used to control the flow of molten material to heater system 31.

A plurality of auxiliary heaters and/or plasma torch(es) 32 can be employed in auxiliary heating system 31 as discussed in accordance with previous embodiments. Molten material exits the auxiliary heating system 31 through discharge port 36 to slag container 37.

The arcing electrodes in this embodiment are connected to a DC power supply such as 77. Power supply 77 is similar to that shown in FIG. 3A of copending U.S. Ser. Nos. 08/382,730 and 08/492,429 and includes primary winding 71 and secondary windings 72. Thyristors 73a–73f respectively rectify phases 74a–74c. Alternatively, the three phase diode bridge rectifier with saturable reactor control shown in FIG. 3B in copending U.S. Ser. Nos. 08/382,730 and 08/492, 429 can be utilized instead of DC supply 70. In this embodiment, the function of the saturable reactors is to vary the impedance of the AC current path between the transformer and the AC input to the diode rectifier, thereby providing a means to maintain the desired amount of DC current in the arc even though the arc voltage may be varying rather rapidly.

Inductors 75a and 75b are connected as shown in FIG 1G. Inductors 75a and 75b supply transient voltage frequently required to maintain stable arcs 27a and 27b during operation of the unit. "Clamping" diode 76 is connected between (−) and (+) outputs of the bridge rectifier. The function of "clamping" diode 76 is to provide a path for the current from inductors 75a and 75b to flow when the voltage of DC arcs 27a and 27b exceed the open circuit voltage of the rectifier. Alternative arc power arrangements could also be utilized in this embodiment (see e.g., FIGS. 8–10).

The partially immersed non-arcing electrodes 24a and 24b preferably are powered by AC power supply 77. As shown in FIG. 1G, power supply 77 includes primary winding 78 (connected to a conventional source of AC power) and secondary winding 79. AC power supply 77 also includes saturable reactor 80 and capacitor 81.

Figure 2:
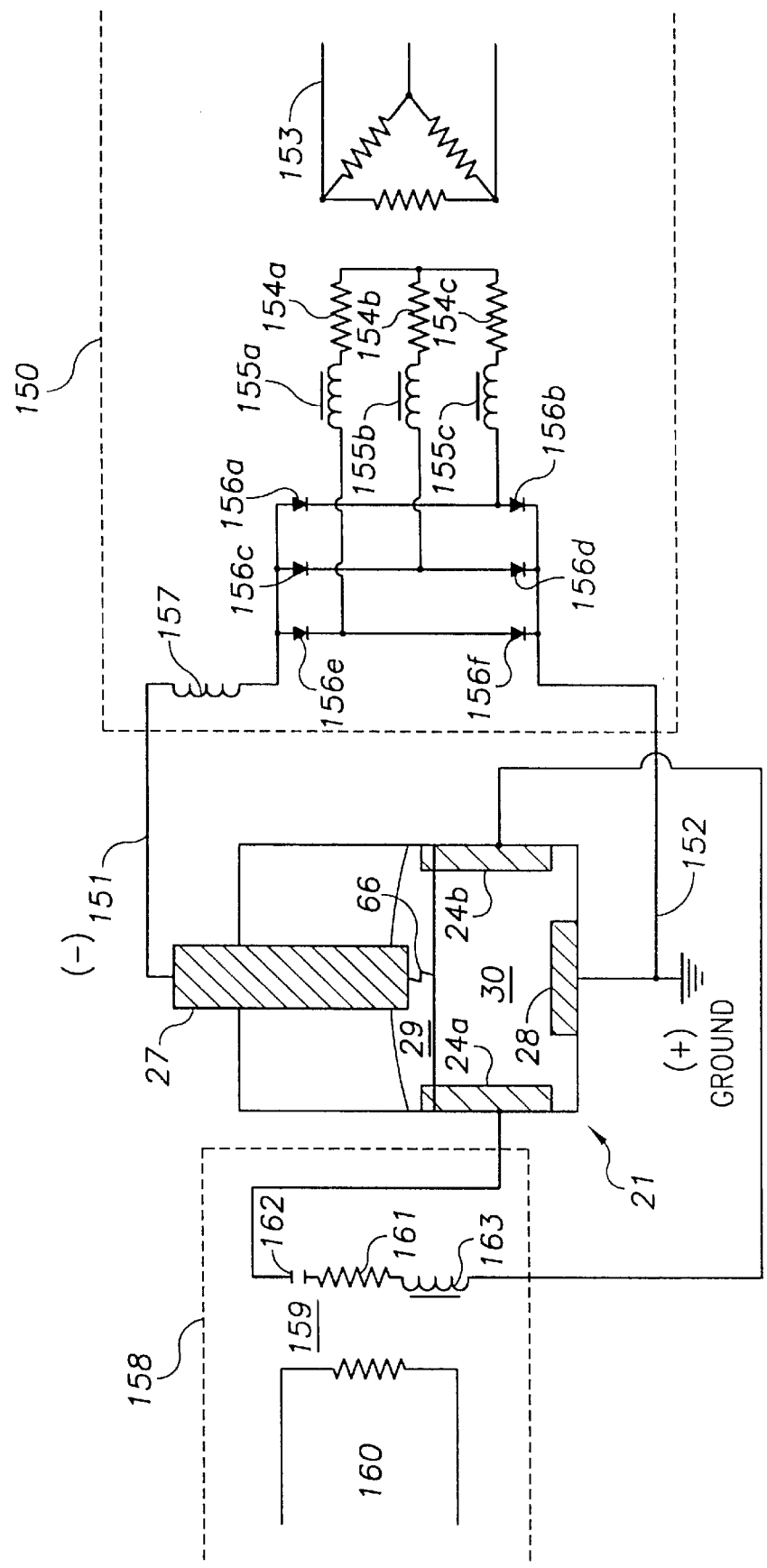
FIG. 2 illustrates a fully integrated arc plasma furnace and joule heated melter system with independently controllable power delivery systems.

As discussed herein in connection with FIG. 2 for example, if DC current passes through the waste material and slag/metal melt pool having partially submerged joule heating AC electrodes connected directly to the terminals of the transformer with no means of blocking the flow of DC current through the windings of the transformer, the core of the transformer saturates. This results in increased current in the primary winding of the AC transformer, causing the transformer to fail in a very short time period. In order to simultaneously operate the arc plasma and the joule heated melter in the vessel, it therefore is necessary to continue to pass AC current through the melt pool for joule heating, while simultaneously blocking DC current flow. Capacitor 81 is utilized to block the DC current and pass AC current. Capacitor(s) 81 preferably is connected in series with each transformer secondary winding 79 in order to balance the current in each of the phases over a wide range of furnace operating conditions.

Figure 1H:
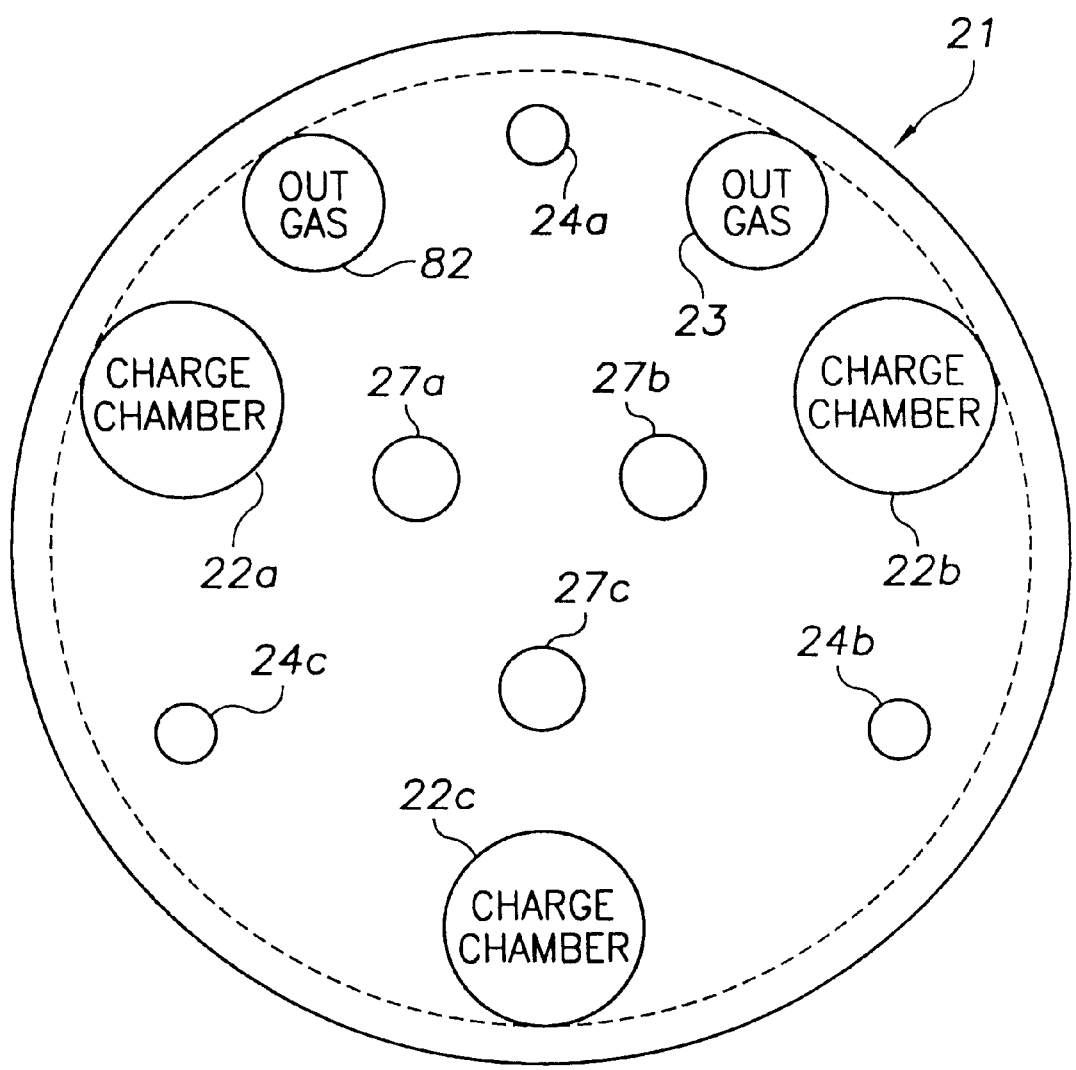
FIGS. 1H–1J show plan views of another alternative arrangement for the fully integrated arc plasma-joule heated melter.
Figure 11:
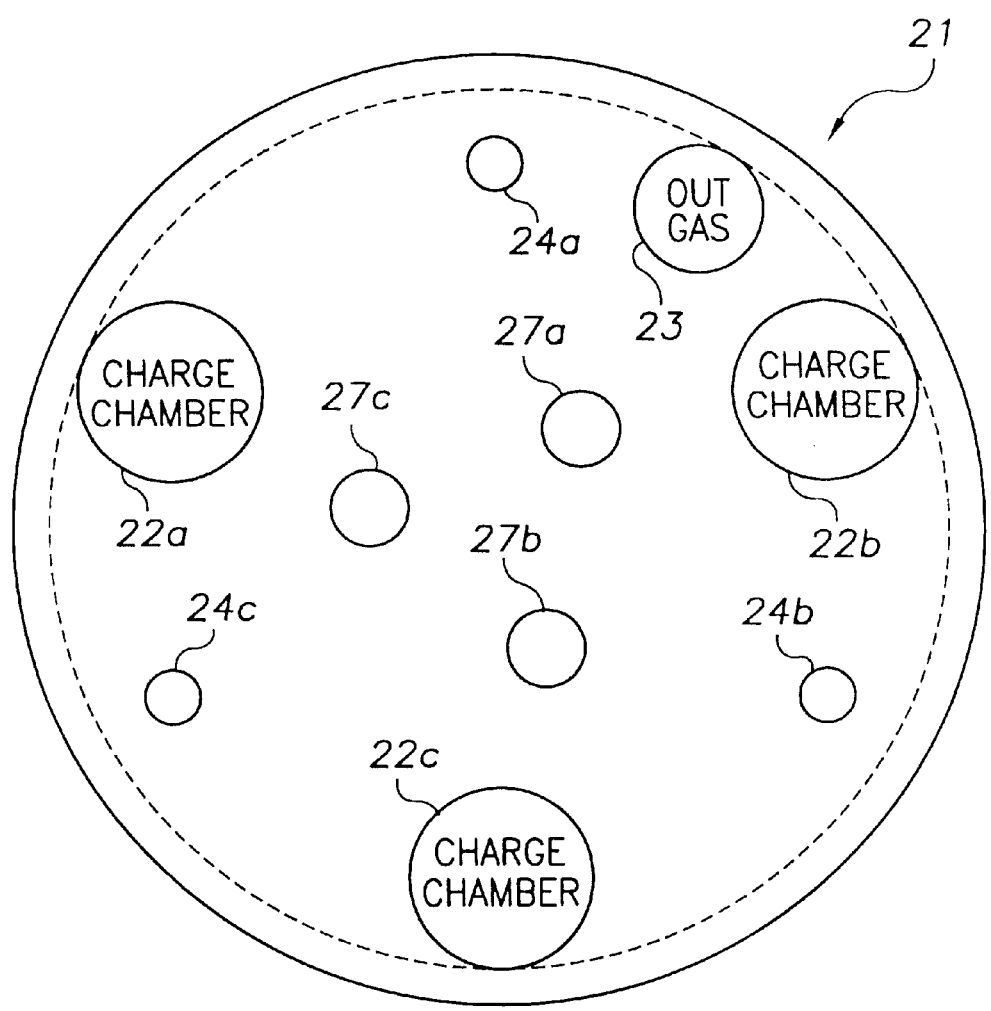
FIGS. 11A–11B illustrate AC joule heating electrical systems for use in systems of the present invention in which there are two joule heating electrodes.
FIGS. 11C–11D illustrate AC joule heating electrical systems for use in systems of the present invention in which there are three joule heating electrodes.
FIGS. 11E–11F illustrate AC joule heating electrical systems for use in systems of the present invention in which there are four joule heating electrodes.
FIGS. 11G–11H illustrate AC joule heating electrical systems for use in systems of the present invention in which there are six joule heating electrodes.
FIG. 11I illustrates another embodiment for providing joule heat in accordance with the present invention.
Figure 1J:
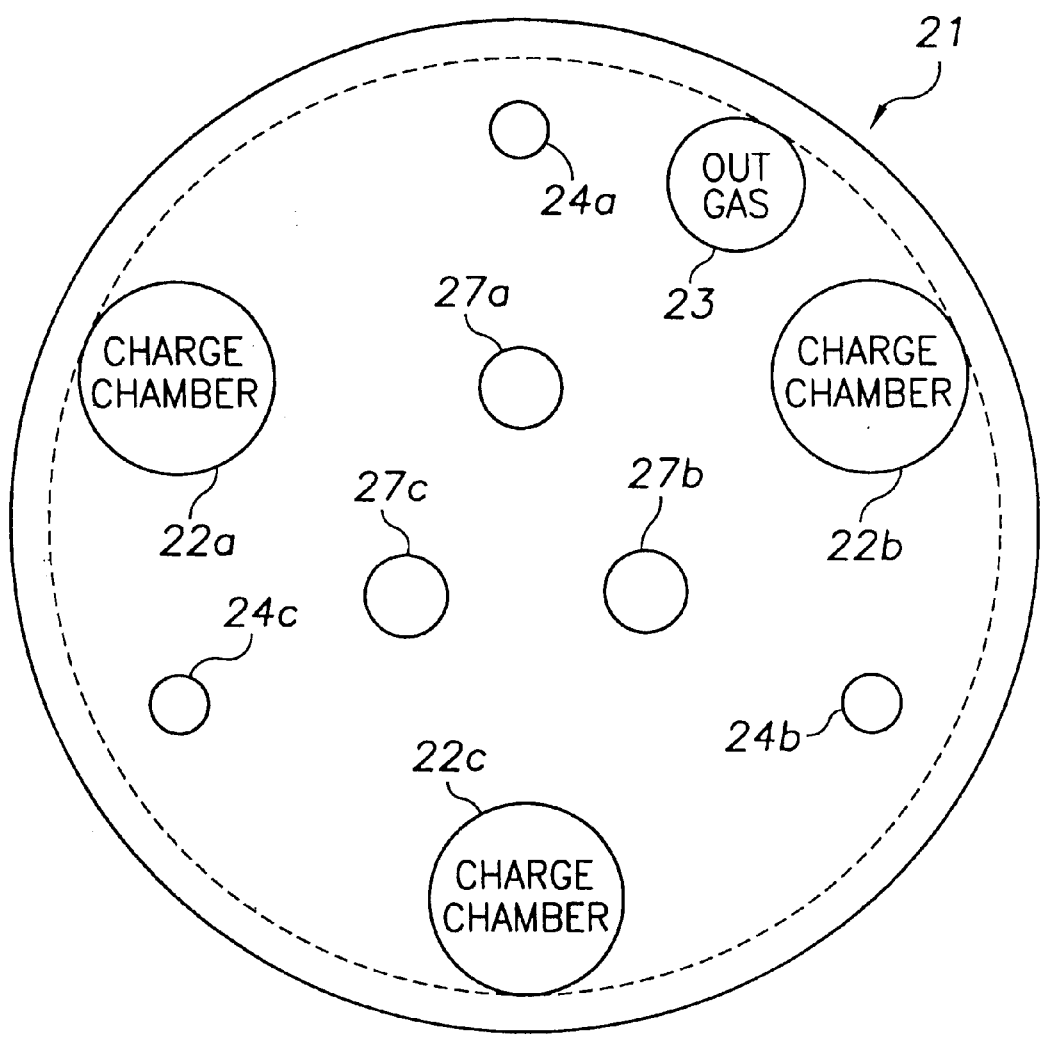

FIGS. 1H–1J illustrate plan views of additional embodiments in which three arcing electrodes and three partially immersed non-arcing electrodes are employed. Furnace 21 shown in FIG. 1H includes three arcing electrodes 27a–27c and three partially immersed non-arcing electrodes 24a–24c. In this embodiment, the arcing and non-arcing electrodes can both be operated with AC power. Power to the arcing electrodes could also be varied to operate with DC power while the partially immersed electrodes are operated with AC power.

In the embodiments shown in FIGS. 1H–1J, three charge chambers 22a–22c are positioned around the furnace 21. While not intending to be limiting, the chambers preferably are positioned substantially equidistant around the furnace.

Figure 1K:
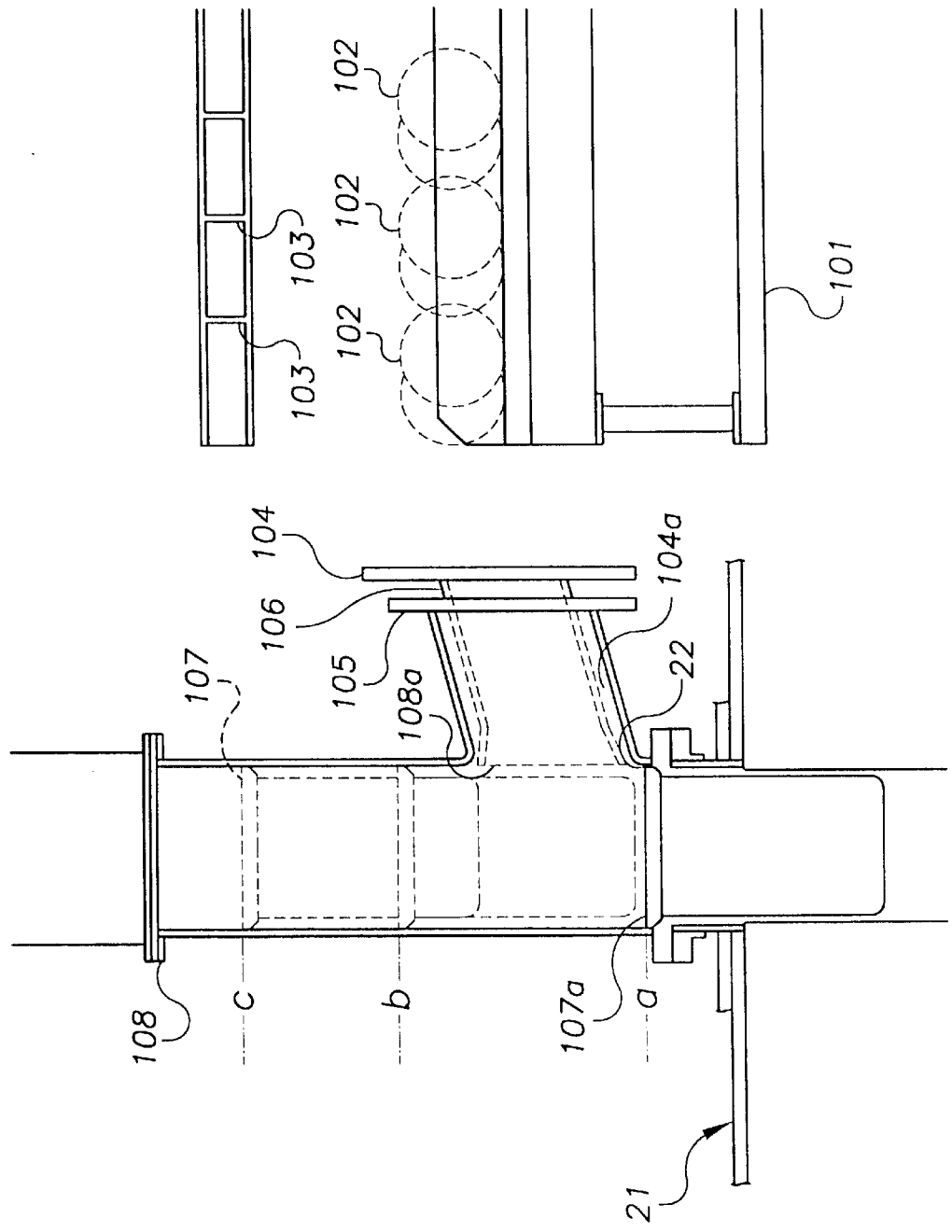
FIG. 1K shows an exemplary feed system for use in the present invention.
Figure 1L:
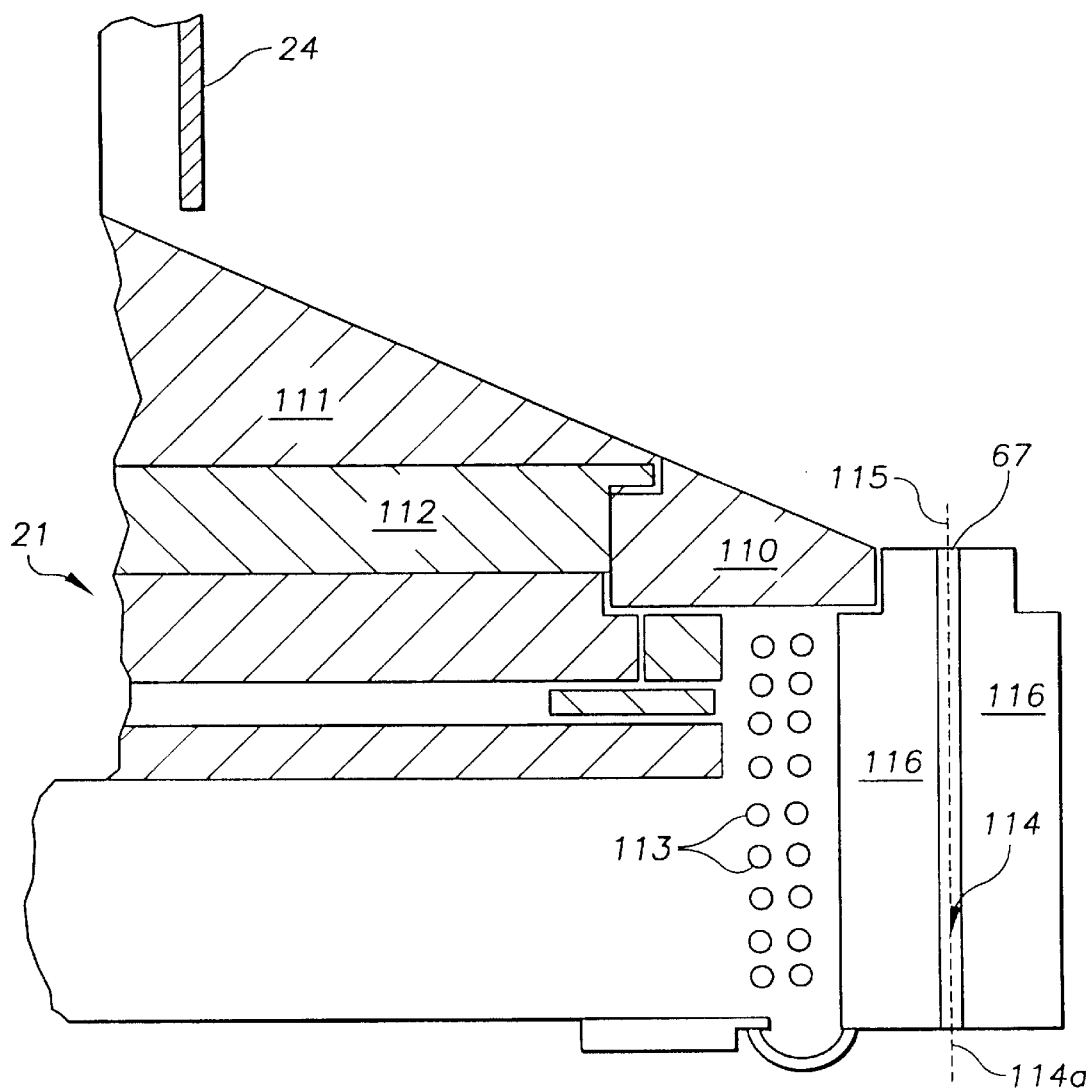
FIG. 1L illustrates an exemplary exit conduit suitable for use with the units of the present invention.

Referring now to FIG. 1K, a feed mechanism 100 suitable for use in introducing waste material to be treated in the arc plasma-joule heated melters of the present invention is shown. Feed mechanism 100 is connected to charge chamber port 22 in an appropriate manner.

Feed mechanism 100 includes a conveyor 101 or the like such as that shown in FIG. 1K. Conveyor 101 is used to transport waste containers or receptacles 102 to the melter units. In preferred embodiments, the movement of waste containers 102 is controlled based on the rate of feed into the melter. For example, infrared detectors 103 or other sensing devices can be employed to control the movement of the waste containers 102 along conveyor 101.

Waste containers 102 pass from the conveyor 101 through the door 104 and the chamber inlet 105 to passageway 104a. Door 104 is adapted for vertical movement such that the door can be raised or lowered. As discussed herein, an inflatable seal 106 can be used to control the amount of air and/or oxygen entering the furnace 21 through the door 104 of the feed mechanism.

A container 107 and plug 107a arrangement is provided within housing device 108. The plug 107a is adapted for vertical movement within the container 107. For example, the plug 107a can be suspended in container 107 such that the top of the plug 107a can be lowered to position a shown in FIG. 1K (during which time the top of the container 107 remains at position b shown in FIG. 1K). The plug can be raised until the top thereof abuts the top of container 107 (shown in FIG. 1K as position b) and then the can and plug can be raised as a unit to position c within housing 108.

As illustrated in FIG. 1K, housing 108 is connected to furnace 21 and to passageway 104a. Housing 108 preferably is removably connected to furnace 21 such that alternative feed mechanisms can be used with the furnace, depending for example on the amount and type of waste being treated. Passageway 104a (together with chamber inlet and door 104) can be formed as an integral part or unit with housing 108. Housing 108 also includes an opening 108a when the container 107 and the plug 107a are raised to position c aligned with passageway 107a for the passage of waste containers 102 therethrough and an opening 108a for the passage of waste containers 102 into furnace 21.

When a waste container 102 approaches door 104 from conveyor 101, the waste container 102 abuts up against door 104, and the door will be raised manually or will raise automatically based on feedback control from a computer controlled system such that the container(s) 102 roll into or are fed into the passageway 104a. Depending on the size of the waste containers relative to the feed mechanism and/or the type of waste, more than one waste container may be fed simultaneously. The door 104 preferably is designed not to raise when the plug 107 is not in the down position (position a in FIG. 1K). This prevents undesirable air from entering the furnace.

Infrared detectors or the like can be used to sense that the container(s) are fully within the passageway 104a. Door 104 then closes and seal 106 is inflated. The feed mechanism is thus closed to the atmosphere and can be nitrogen purged to remove at least a substantial portion of the oxygen in the feed mechanism. Preferably, the nitrogen purge is continued until there is less than about 5% oxygen in the feed mechanism.

The plug or hoist 107a, which has been in the down position (position a in FIG. 1K), is then raised to position b, where it abuts container 107. The container 107 and plug 107a are then raised to position c. The container(s) 102 can be fed by gravity into furnace 21. In some embodiments, it may be desirable to lower plug 107a and/or the container and plug to ensure that the containers do not become lodged during the feed process into the furnace 21.

As described above, a plurality of charge chambers and thus feed mechanisms can be used for a melter in accordance with the present invention. The charge chambers and feed mechanisms can be arranged such that the timing of the feed being introduced into the furnace is predetermined. Preferably, the number of feed mechanisms will correspond to the number of charge chambers. For example, the charge chambers and feed mechanisms can be arranged such that each is timed to open in relation to the others so as to avoid a build up of pressure in the furnace due to excessive feed at a particular time.

The feed mechanism 100 illustrated in FIG. 1K is exemplary. Other devices suitable for introducing waste material into the melters of the present invention can be employed so long as the amount of air and/or oxygen entering therethrough can be controlled.

FIG. 1L shows a sectional view of an embodiment of a portion of a furnace 21 formed in accordance with an embodiment of the invention. As discussed above in connection with various embodiments, metals discharge inlet 67 is formed at or near the bottom of a generally V-shaped configuration of a portion of the furnace hearth. The embodiment shown in FIG. 1L illustrates a freeze-plug arrangement in which the plug 116 is formed of a material that can be heated readily by inductive heat. The portion surrounding the inlet 67 can formed of graphite 110, such as that shown in FIG. 1L. As further shown in FIG. 1L, other portions of the furnace 21 proximate to the V-shaped portion (generally below the bottom of joule heating electrode(s) 24) of the hearth can be formed of high temperature brick 111 and of thermal insulation material 112.

Heating coils 113 are provided for operation of the freeze plug arrangement such that metals can exit discharge port 114a at a desirable time and rate. For example, when the coils 113 are cooled below a certain temperature (coils 113 can be water cooled when it is not desired to remove metals from the furnace), graphite 116 or metal in port 114 serves as a plug, thereby preventing the removal of metals from the furnace. When it is desired to remove metal from the furnace, the coils 113 are inductively heated such that the graphite 116 allows the passage of metals to exit from the furnace through port 114. Nitrogen can then be blown on graphite block 116 when it is desired to freeze the plug.

The discharge of metal from the arc plasma-joule heated melter units of the present invention can be controlled by sampling the molten bath during processing. In addition, or in the alternative, the discharge of metals from the units can be controlled by monitoring the voltage and/or current in the unit. For example, if there is no change in voltage between the joule heating electrodes and the bath, then it may not be necessary to drain metal out of the unit. This can be assessed for each joule heating electrode in a particular unit. On the other hand, if a change in voltage is detected, it may be desirable or necessary to drain metal from the unit. Thus, instrumentation can be provided for monitoring and manually or automatically controlling sensing parameters such as thermal, voltage and current characteristics within the bath. The feedback from such instrumentation can be used to determine when to tap the metal outlet. In addition, loan scales positioned under the metals container and/or slag container (proximate to the discharge from the auxiliary heating system) can also be used to determine conditions for tapping and monitoring conditions within the furnace.

The removal of metals from the unit can also be based in part on visually observing the level of the molten bath in the unit through furnace view ports or the like. If for example, the level of the molten bath continues to rise and slag is removed using the auxiliary heating system discussed above, the level of metals in the unit may rise to a level near the slag exiting conduits to the auxiliary heating system. In these circumstances, it may be desirable to remove metals from the unit to prevent metals from entering the auxiliary heating system.

As discussed above, the arc plasma-joule heated melters in accordance with the present invention preferably include refractory linings. Depending on the material being treated and/or converted, the refractory may be formed of any suitable material capable of handling temperatures in excess of about 1400° C. The refractory may be formed of ceramic or graphite. The refractory may also be formed of high durability refractory materials. It will be appreciated that various durable refractory materials are suitable for use in the invention, depending on the type of material being treated. These materials can also be thermally shock sensitive.

The inductively heated freeze plug arrangement shown in FIG. 1L can be heated for the removal of metal and/or slag from the furnace by available circuits. For example, circuit shown in FIG. 7–124 on page 762 of the *Standard Handbook for Electrical Engineers,* 9th Edition, Knowlton, Ed., McGraw-Hill Book Company, Inc. (©1957), incorporated herein by reference, can be used for heating the freeze plug arrangement in accordance with the present invention.

Several arrangements for the power supplied to the arc plasma-joule heated melters in accordance with the present invention can be utilized. For example, FIG. 2 shows one configuration of an integrated system which involves the use of capacitors 162 and a specific arrangement in the distribution of power. As shown in FIG. 2, a single phase joule heated arc plasma-melter 21 having a single pair of electrodes 27 and 28 for arc 66 is illustrated. In one embodiment, the joule heated portion of melter 21 utilizes AC power supply 158 while the arc portion of melter 21 utilizes DC power supply 150.

The embodiment shown in FIG. 2 utilizes the combination of the DC and AC power systems 150, 158 respectively, supplying power to electrodes in the single vessel or melter tank 21 in which waste material 29 is undergoing treatment by a conversion process, including vitrification. A special circuit is necessary because DC arc current 27, 28 will interact with joule heating AC electrodes 24a, 24b unless special steps are taken to prevent such interaction. As discussed herein, such interaction can cause a failure of the transformers which provide power to the joule heating electrodes. This circuit allows fully independent control of the arc plasma and joule heated melter portions of the system.

DC power supply 150 includes inductor 157, primary winding 153, secondary windings, 154a, 154b and 154c and saturable reactors 155a, 155b and 155c. Primary winding 153 is preferably delta. Saturable reactors 154a, 154b and 154c are connected in series respectively with secondary windings 154a, 154b and 154c. Negative (−) outputs 151 and positive (+) 152 are thus formed by DC power supply 150.

If DC current 150 passes through waste material 29 and slag/metal melt pool 30 having partially submerged joule heating AC electrodes 24a, 24b connected directly to the terminals of transformer 159 with no means of blocking the flow of DC current 150 through the windings of transformer 159, the core of transformer 159 saturates. This results in increased current in primary winding 160 of transformer 159 causing transformer 159 to fail in a very short time period. In order to simultaneously operate the arc plasma and the joule heated melter in vessel 21, it therefore is necessary to continue to pass AC current 158 through melt pool 30 for joule heating, while simultaneously blocking DC current flow 150. Capacitor 162 is utilized to block DC current 150 and pass AC current 158. Capacitor 162 preferably is connected in series with each transformer secondary winding 161 in order to balance the current in each of the phases over a wide range of furnace operating conditions. As further shown in FIG. 2, capacitor 162 is connected to secondary winding 161, which is connected to saturable reactor 163.

Figure 10A:
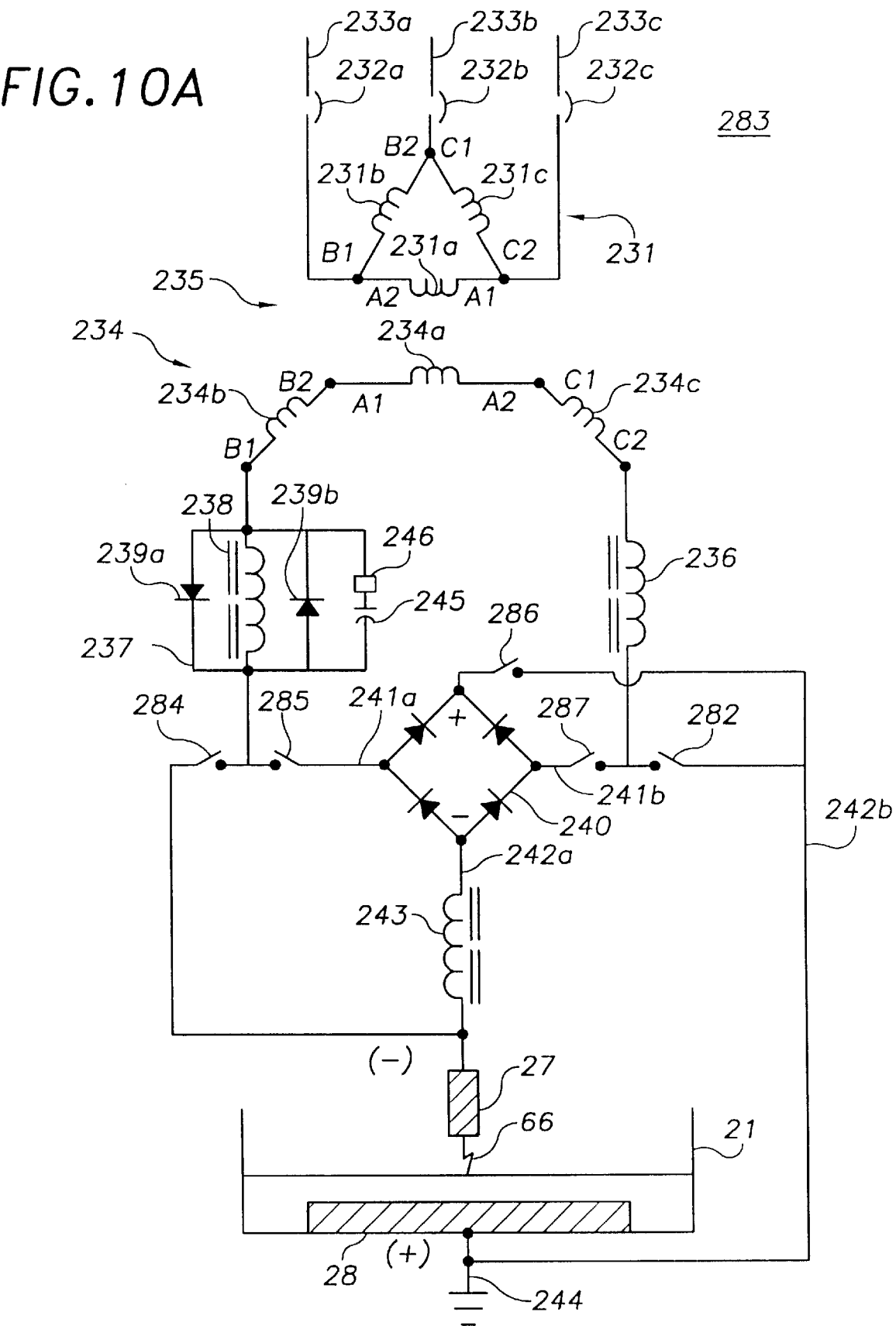
FIG. 10A illustrates an AC or DC arc circuit with independent arc voltage and arc current control for use in systems of the present invention in which there is one arc electrode.
Figure 10B:
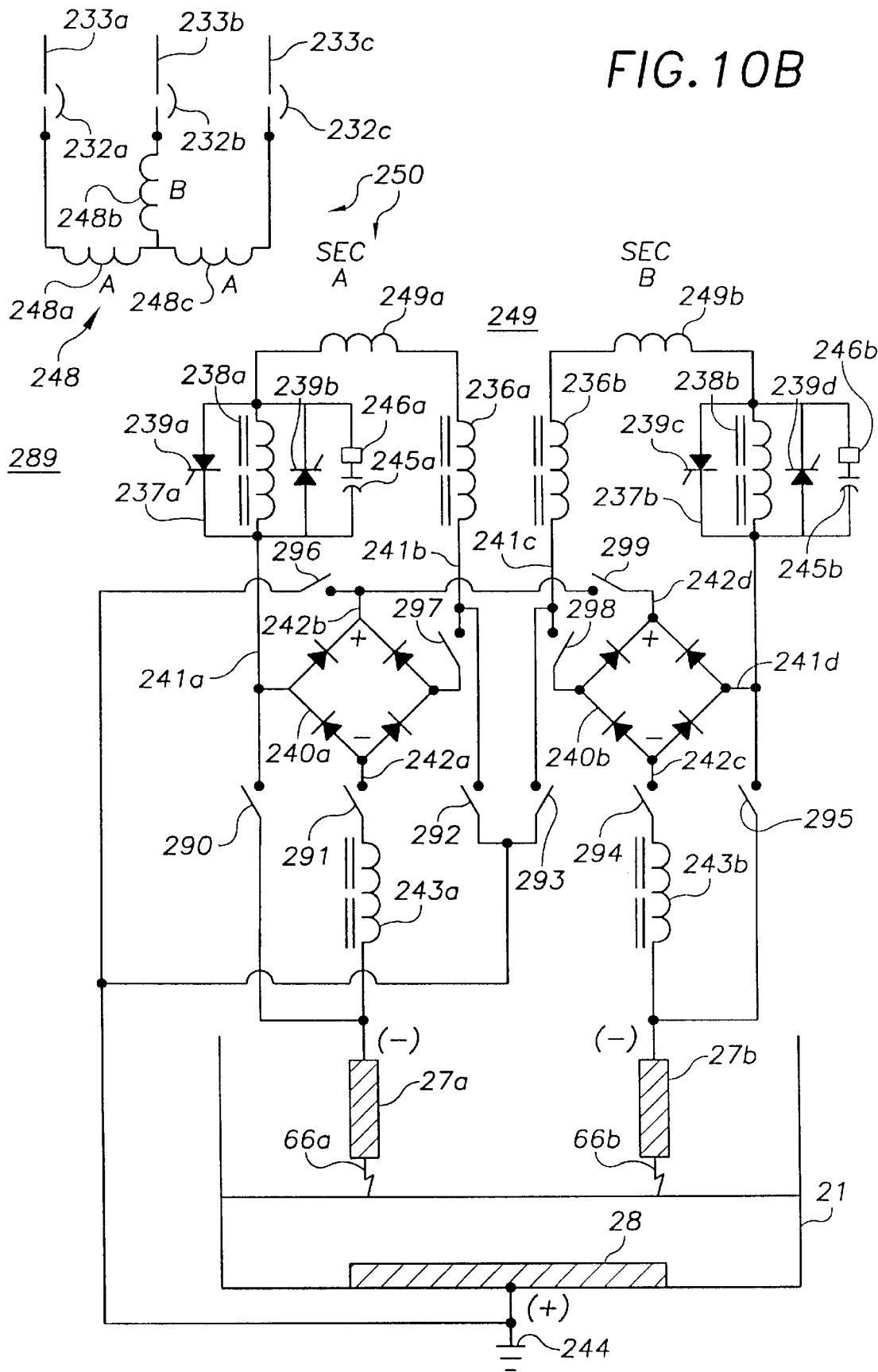
FIGS. 10B–10C illustrate AC or DC arc circuits with independent arc voltage and arc current control for use in systems of the present invention in which there are two arc electrodes.
Figure 10C:
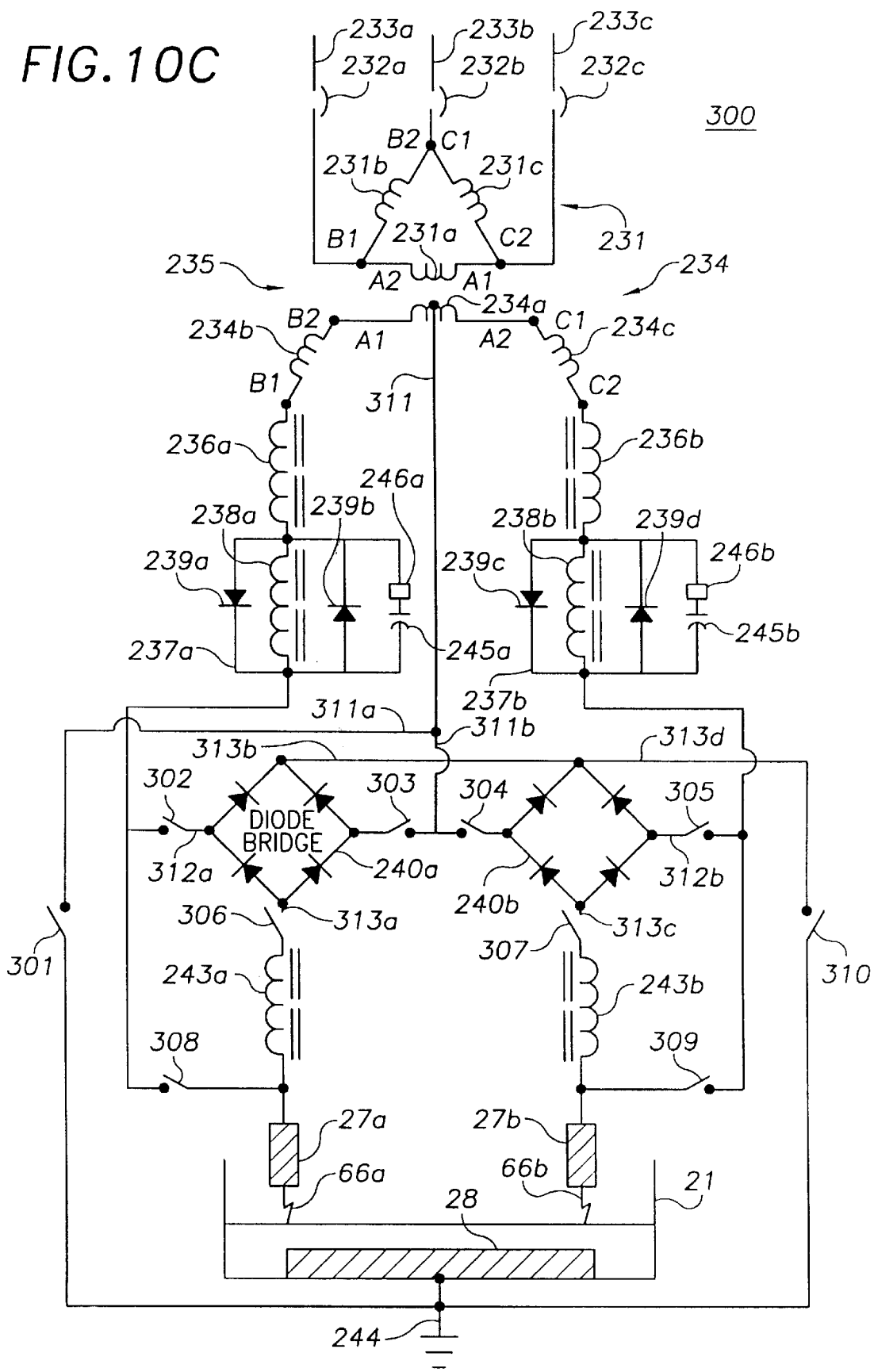
Figures 1, 10D:
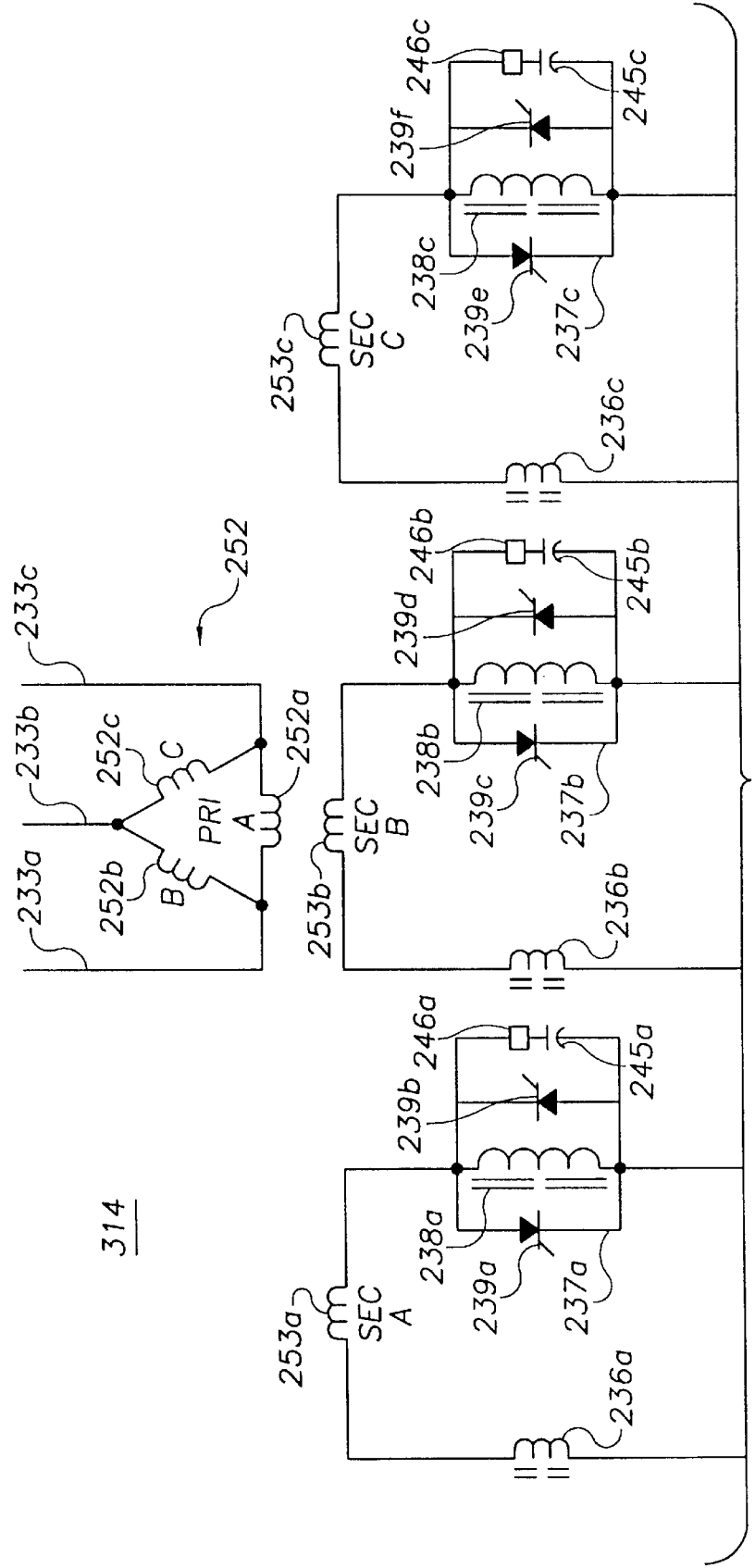
FIGS. 10D–10E illustrate AC or DC arc circuits with independent arc voltage and arc current control for use in systems of the present invention in which there are three arc electrodes.
Figures 1, 10E:
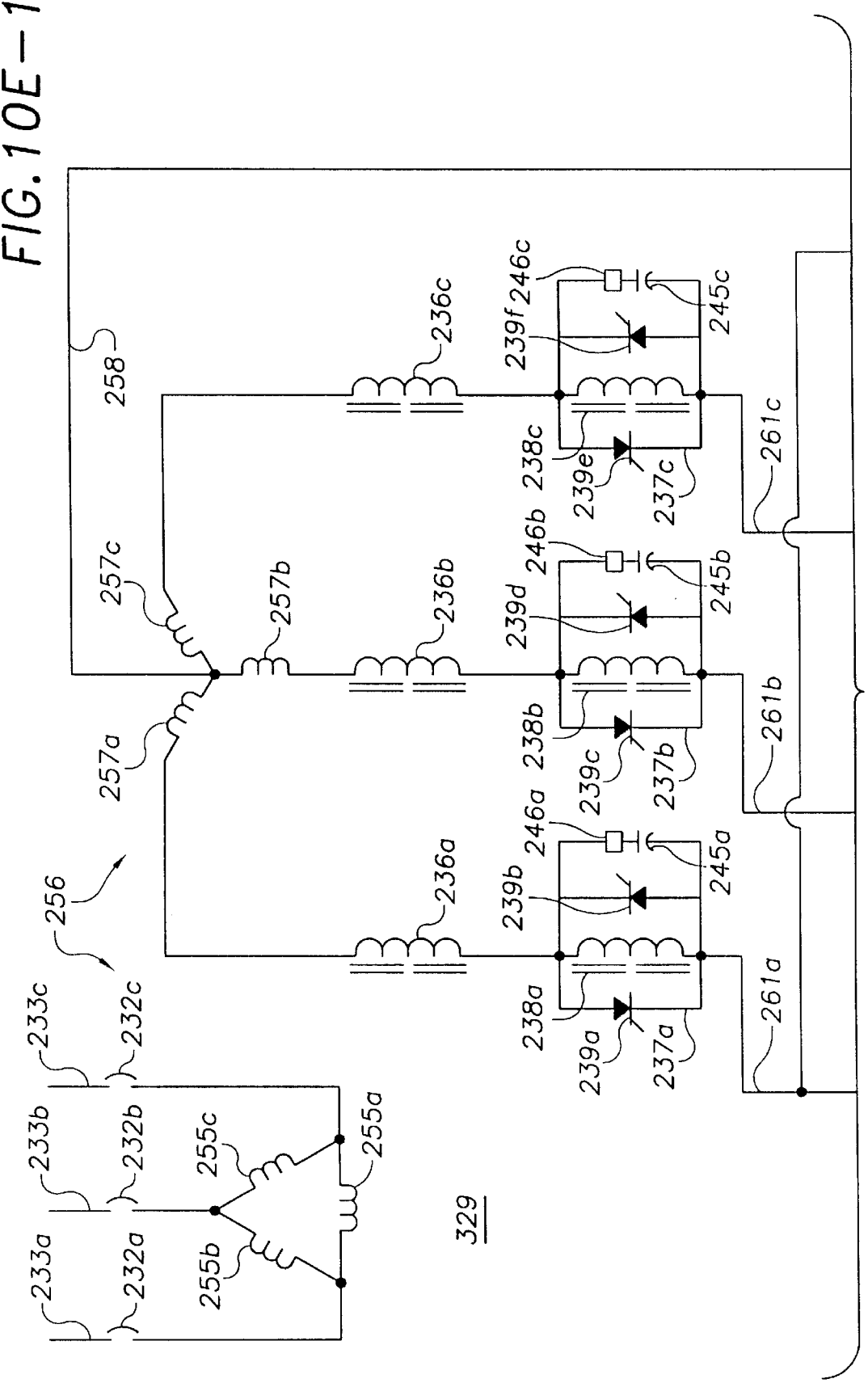
Figures 1, 10F:
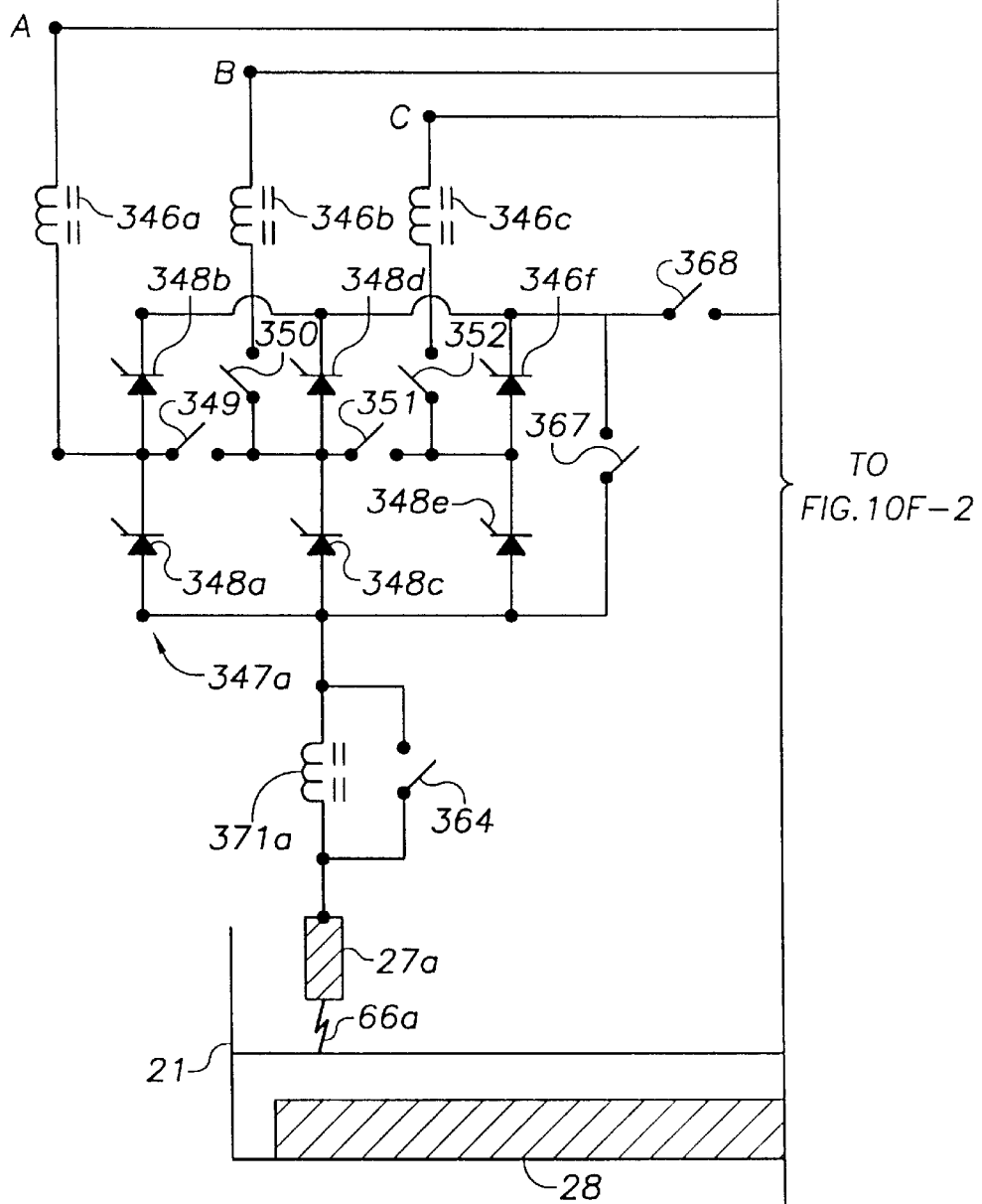
FIG. 10F illustrates an AC or DC arc circuit for use in systems of the present invention in which there are three arc electrodes.
Figures 2, 10F:
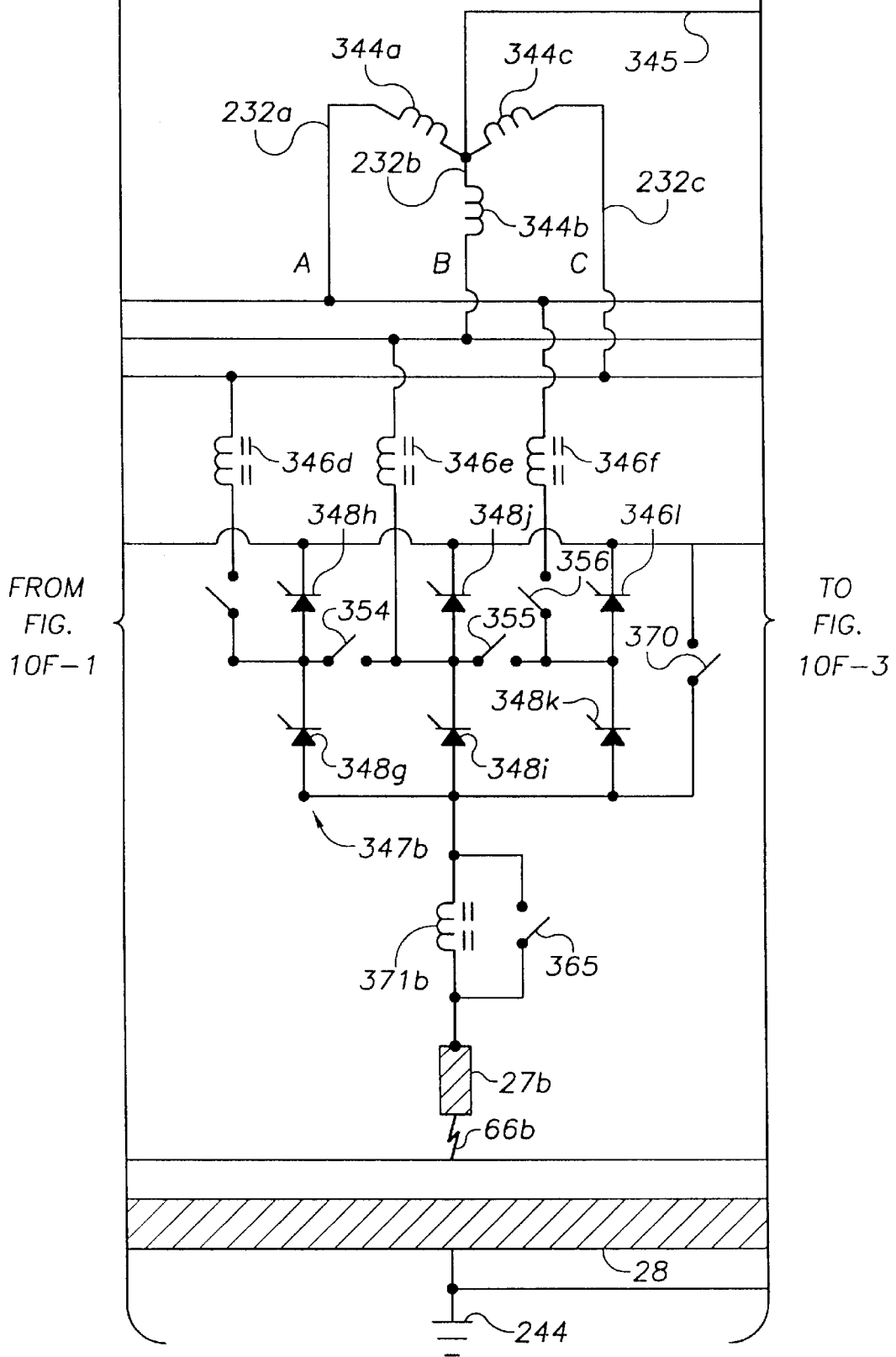
Figures 3, 10F:
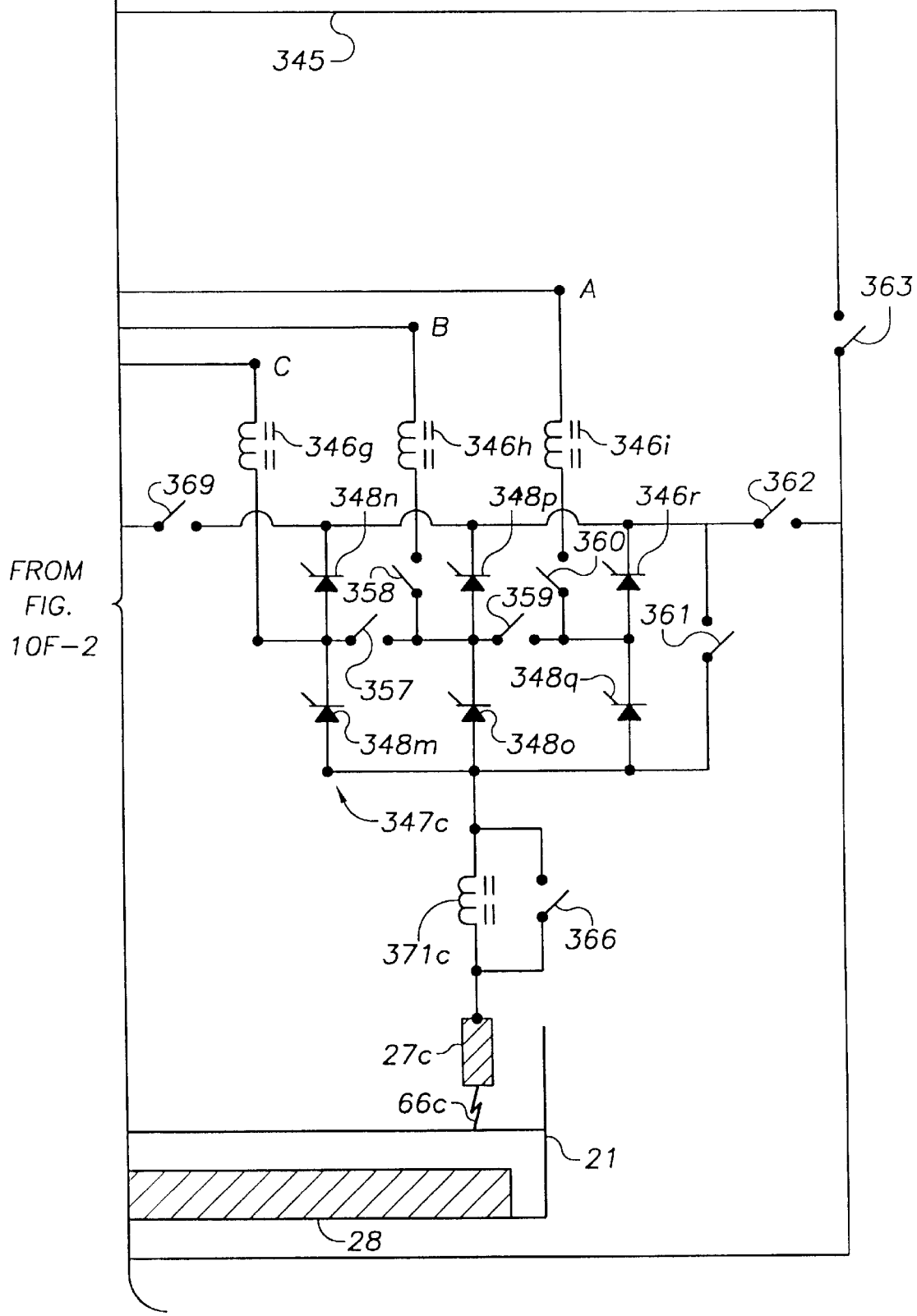

FIGS. 3A and 3B show a circuit arrangement which is suitable for use in the present invention. In particular, three phase AC power supply 158 is illustrated in FIG. 3A while DC power supply 150 is illustrated in FIG. 3B. The circuit includes the inductance of each AC current path in the vessel or melter as reflected through the entire AC power system 158, the non-linear resistance of the current path through the melt pool or molten bath, the electrode interfaces, the power feed cables, and secondary windings 161a, 161b and 161c of transformer 159 and the magnitude of the capacitance of capacitors 162a, 162b and 162c which is connected as a series element in the joule heating furnace circuit. AC power 158 also includes primary winding 160 and saturable reactors 163a, 163b and 163c connected to electrodes 24a–24f. Saturable reactors 163a–163c are connected respectively to secondary windings 161a–161c.

Because the AC current is rarely sinusoidal in a circuit having in series with a non-linear resistor such as the joule heating furnace circuit, it is possible to excite several harmonic frequencies other than 60 Hertz, which are superimposed on the 60 Hertz sine wave supplied by the utility company. In this circuit, it is important to account for the non-linear resistance and to specify the electrical components to achieve adequate damping and therefore stable operation. It is also important that the voltage, current, and capacitance ratings of the capacitor are such that the series resonant frequency of the entire system inductance at the furnace electrodes is such that the lowest value of resistance as seen at these same electrodes when looking into the furnace plus the effective 60 Hertz resistance is equal to or greater than 1.5 and preferably 2 times greater than the $(L/C)^{1/2}$ where L is the total inductance of the power system and C is the capacitance of capacitors 162a, 162b and 162c. The total effective resistance R should be 2 times $(L/C)^{1/2}$, but any resonant rise in current is negligible if this is 1.5 times $(L/C)^{1/2}$.

As shown in FIG. 3B, DC electrical system 150 may have a power transformer with wye or delta connected secondary windings 154a–154c. Primary winding 153 preferably is delta. As also shown in FIG. 3B, the power rectifier is preferably a three-phase full wave rectifier. The rectifier may be a current controlled thyristor rectifier, i.e. a silicon-controlled rectifier in which the anode-cathode current is controlled by a signal applied to a third electrode. Alternatively, the rectifier may be a three-phase full wave diode rectifier with the DC current control to maintain the desired DC current. If a thyristor rectifier is utilized, it is important that a full-rated current floating diode be placed across the thyristor rectifier and ahead of reactors 157a, 157b. In this embodiment, saturable reactors 155a–155c would not be used. It is not necessary to add a DC "floating" or "clamping" diode when using a three-phase diode rectifier since the diodes in the rectifier will suffice.

For a DC arc furnace, it is preferable to use a three-phase full wave diode rectifier with saturable reactor control 155a–155c. Regardless of which type of power supply is used, it is important that an inductor is connected in series with the DC power lead which is not grounded. This reactor is necessary to rapidly supply the energy when the furnace conditions are such that the DC arc voltage suddenly increases. Additional embodiments for supplying power to the arcing electrodes can be utilized in accordance with the present invention (see FIGS. 6–10).

As shown in FIG. 3B, arcing electrode 27a is connected to inductor 157a at the (−) output while arcing electrode 27b is connected to inductor 157b at the (+) output. If the bottom of the inside of the furnace or melter is made of suitable refractory such as ceramic or the like and is a poor electrical conductor when hot, counter electrode 28 may be formed by depressing a portion of the floor of the furnace between joule heating electrodes 24a–24f and then slightly elevating the molten metal drain tube so that a pool of metal remains in this depression in the furnace floor even after the metal is drained. This metal may act as a counter electrode 28 for the AC joule heating circuit and may simultaneously be used as a DC arc circuit electrode.

Metallic furnace bottom electrode 28 may be connected using various configurations such as that shown by the circuit diagrams in FIG. 3B. In any case, it is preferred to have one or more electrodes through the bottom of the furnace or melter. The electrodes may be graphite or metal. It should be noted that the circuits in FIG. 3B and FIG. 5 include switch 164 in series with the electrical connection to electrode 28. The function of these switches is to connect or disconnect the counter electrode to the neutral of the rectifier transformer to permit the DC arc current to transfer or not transfer to the counter electrode. When a switch is "open" for example, there will be an arc from the (+) electrode to the bath and an arc from the bath to the (−) electrode. When a switch is "closed", there will be an arc from the (+) electrode to the bath and current will then flow to the counter electrode. There will also be current from the counter electrode through the bath and then by way of an arc to the (−) electrode if the (+) and (−) electrode currents are not balanced.

Switch 164 is a three position switch, having closed, open and ground positions. Transformer neutral grounding switch 164 will permit several modes of operation. When the furnace or melter is operated in a mode in which the two DC arcs are electrically connected in series through the molten bath, switch 164 will be in the "ground" position and single throw ground switch 165 will be "open". When the furnace or melter is operated in the mode where two DC arc electrodes operate independently, then switch 164 is in the "closed" position and single position switch 165 will be in the "ground" position. The "open" position of switch 164 may be used during system maintenance (or when joule heating is used without arc plasma heating).

If the physical configuration of the furnaces or melters discussed above are suitable for the use of two independently positioned controllable electrodes, then the DC arc electrodes and the AC joule heating electrodes may be operated simultaneously without detrimental electrical interaction. In addition, beneficial interaction for vitrification of various types of waste can be obtained.

Figure 4B:
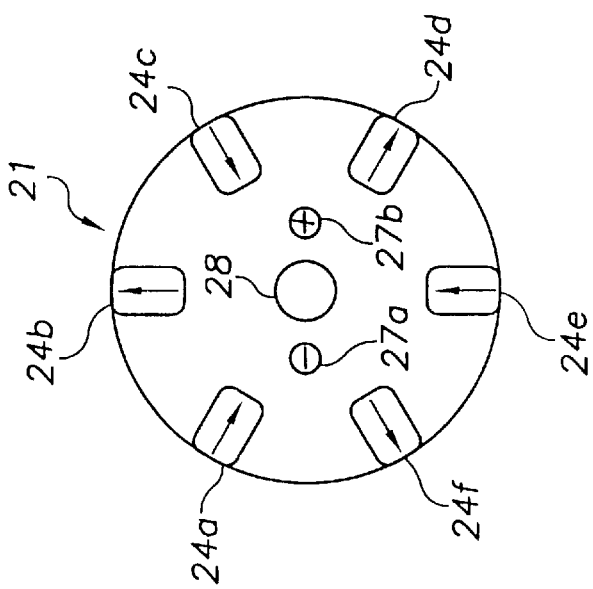
FIGS. 4A–4D show plan views for electrode configurations and geometries for use in accordance with the present invention.
Figure 4A:
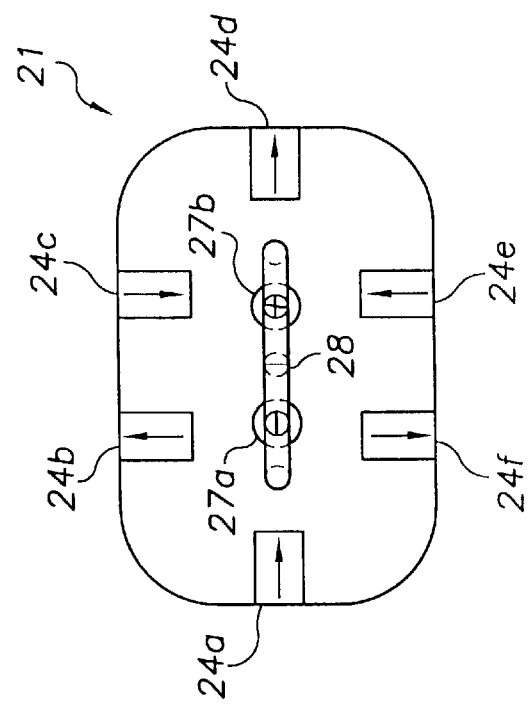
Figure 4D:
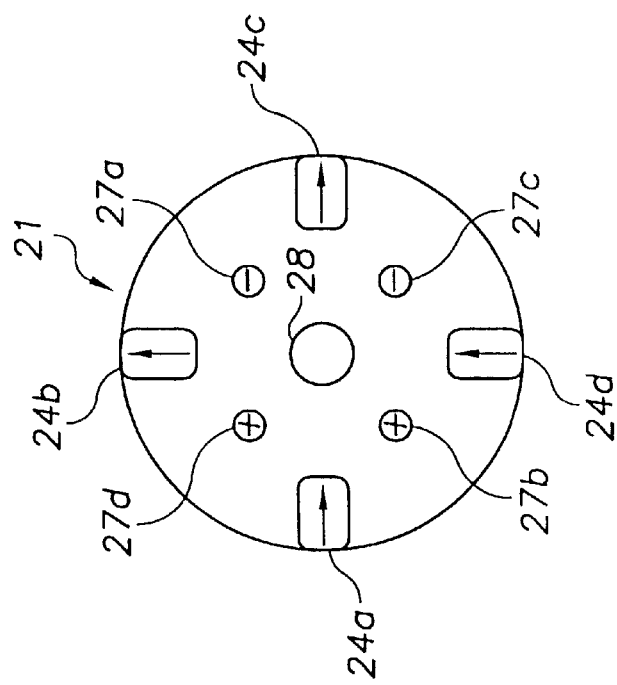
Figure 4C:
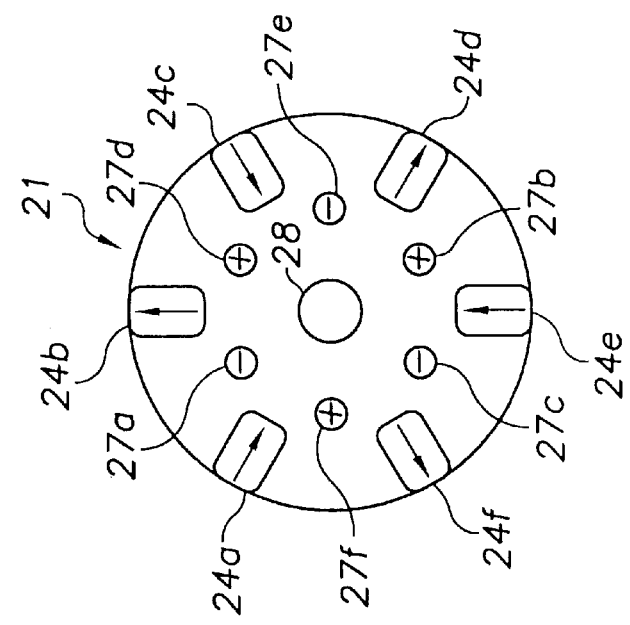

Exemplary plan views for various electrode configurations (and relative direction of current flow) suitable for use in unit 21 are shown in FIGS. 4A–4D. These configurations are suitable for remote control of installations. FIG. 4A shows an elongated furnace construction while FIGS. 4B–4D show round furnace constructions.

Any or all of the joule heating electrodes (24a, 24e or 24c) or (24d, 24b or 24f) can be connected as counter electrode 28 for the DC arc system.

The electrode configuration illustrated in FIG. 4B utilizes one three-phase AC joule heating power supply and one DC rectifier power supply. In an alternative embodiment, shown in FIG. 4C, six joule heating electrodes 24a–24f are employed with six arc electrodes 27a–27f. The configuration shown in FIG. 4C uses one three-phase AC joule heating power supply and three DC rectifier power supplies.

In another embodiment illustrated in FIG. 4D, four joule heating electrodes 24a–24d are utilized with four arc electrodes 27a–27d. In this arrangement, two two-phase Scott T AC power and rectifier supplies are employed.

Figure 5:
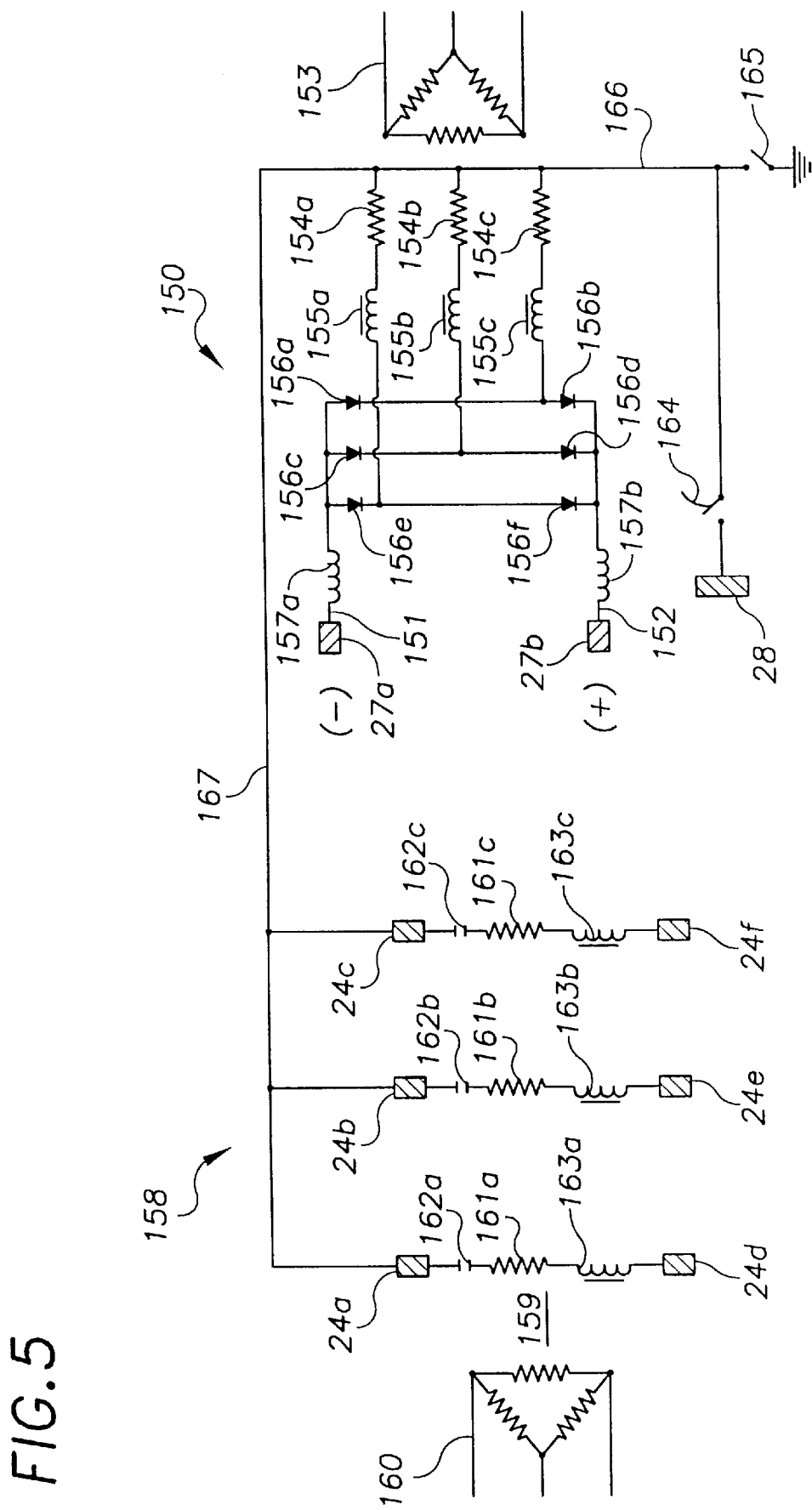
FIG. 5 illustrates a circuit diagram having the ability to use a common transformer secondary winding to supply AC power to the joule heating electrodes and DC power to the arc electrodes without causing undesirable electrical interaction in the common molten bath.
Figure 6:
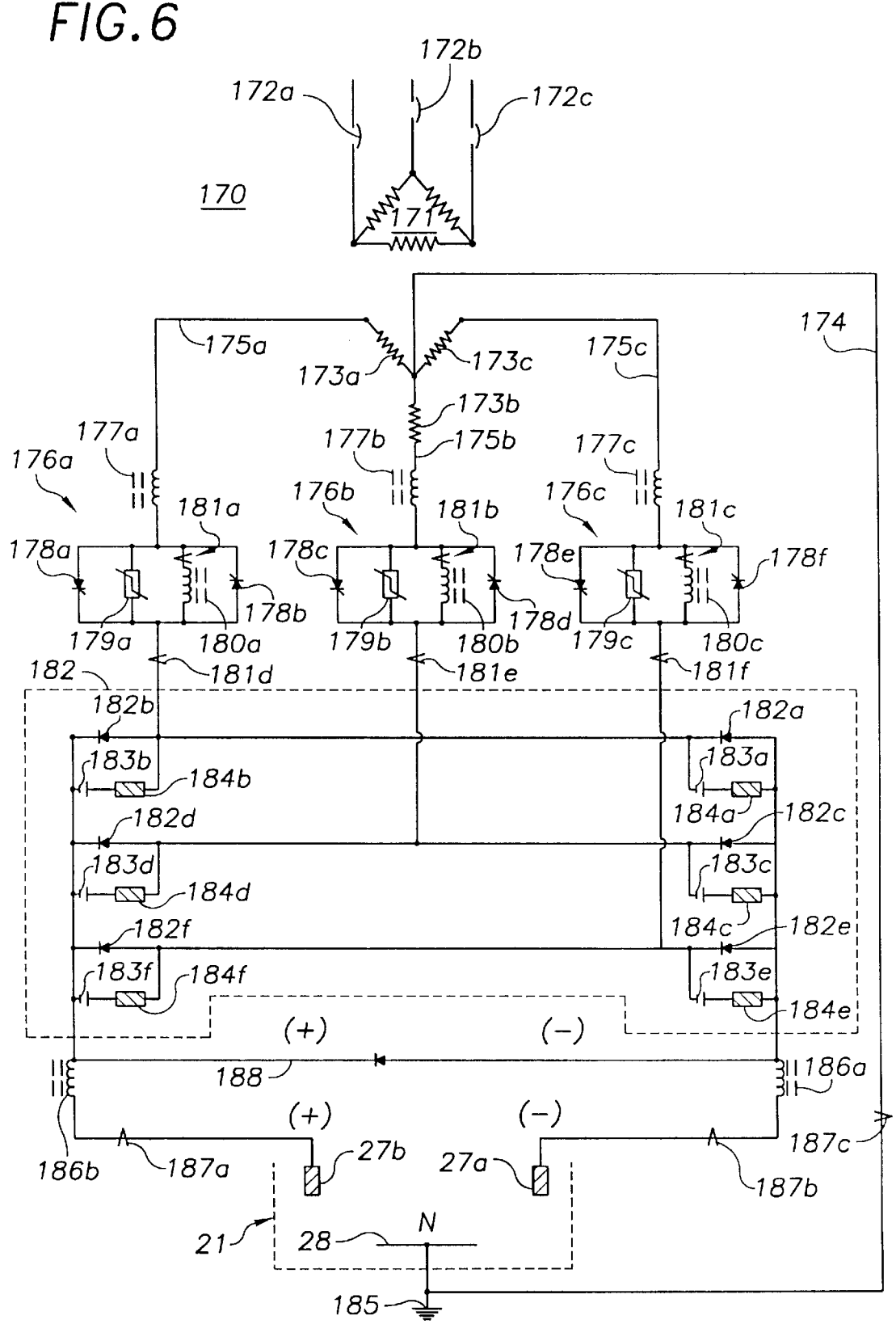
FIG. 6 illustrates an alternative DC arc circuit diagram suitable for use in the present invention.
Figures 1, 7A:
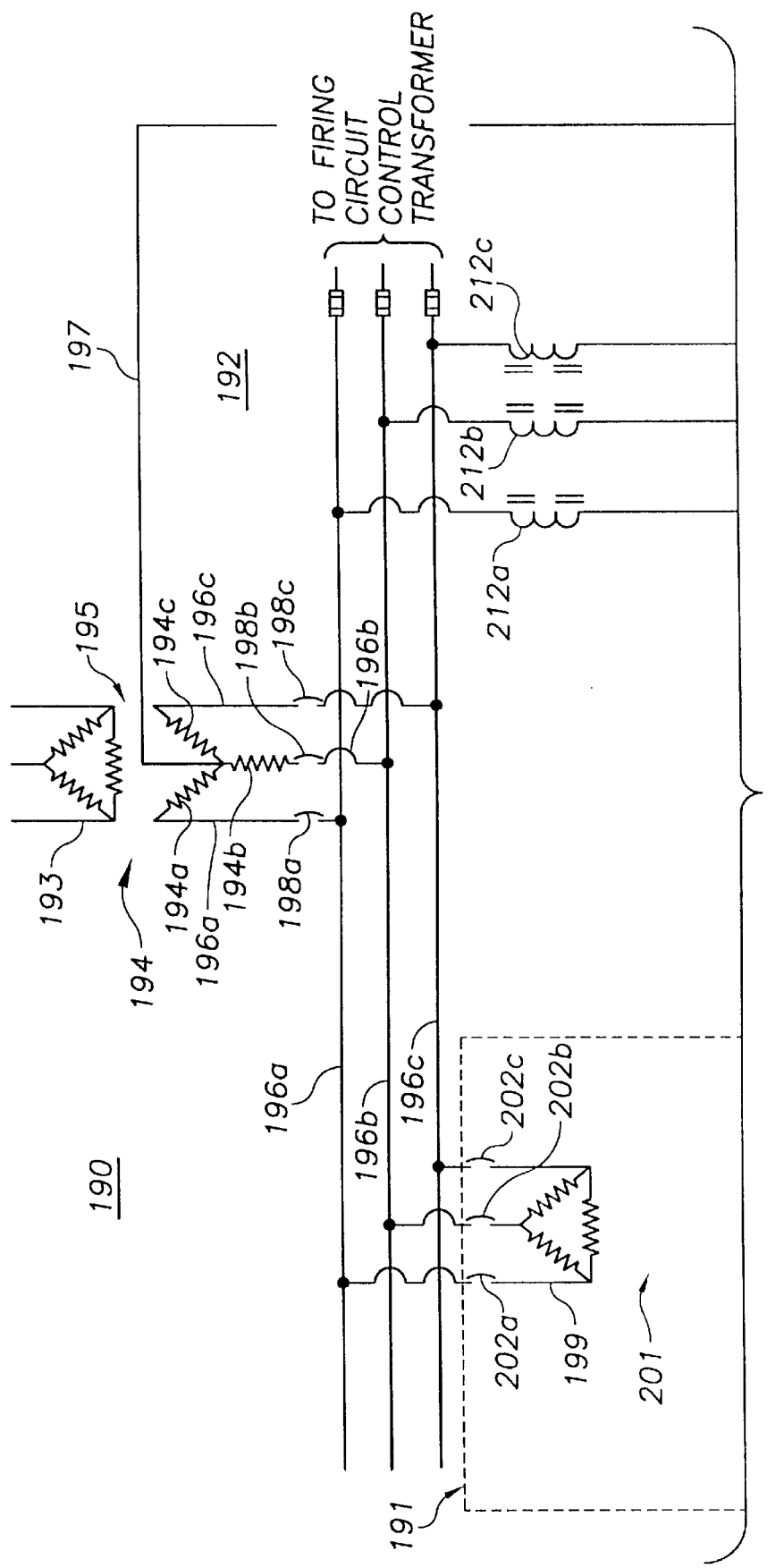
FIGS. 7A and 7B illustrate additional alternative DC arc circuit diagrams suitable for use in the present invention.
Figures 2, 7A:
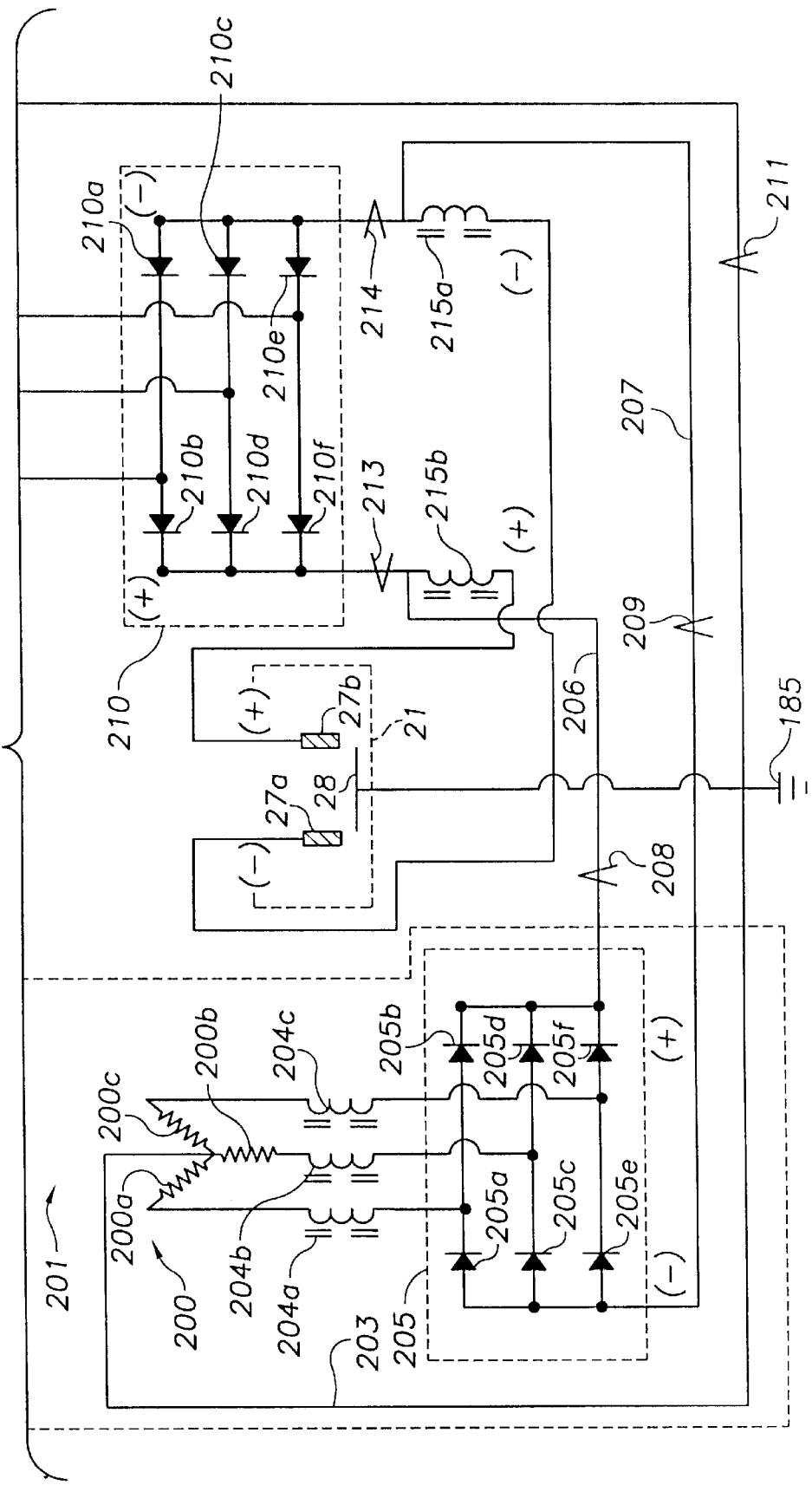

Referring now to FIG. 5, AC power supply system 158 includes primary winding 160, secondary windings 161a–161c connected respectively to saturable reactors 163a–163c (or thyristor switches as shown in FIGS. 6 and 7). Saturable reactors 163a–163c are respectively connected to joule heating electrodes 24e–24f.

DC power supply 150 includes primary winding 153, inductors 157a, 157b and secondary windings 154a–154c connected respectively to saturable reactors 155a–155c. As also shown in FIG. 5, diodes 156a–156f are provided. Inductor 157a is connected to arcing electrode 27a at (−) output 151 and inductor 157b is connected to arcing electrode 27b at (+) output 152.

Depending upon the type of waste material being processed, it may be desirable to connect DC power supply 150 system neutral 166 to AC joule heating electrodes 24a, 24b and 24c, which are the electrodes connected to AC capacitors 162a–162c respectively and which are used to block DC current flow through the secondary windings 161a–161c of the transformer as also shown in FIG. 5. The connection of DC power supply 150 and AC power supply 158 is designated in FIG. 5 as line 167. The reason for using this connection is to provide three additional DC counter electrodes closer to the surface of the melt pool during warm up of the furnace so that neutral DC transfer current 166 can flow and assist in stabilizing the positive (+) and negative (−) DC arcs before the material directly above the counter electrode on the hearth has become sufficiently hot to conduct sufficient DC current to assist in stabilization of the DC arcs.

As discussed above, two or more DC arc plasma electrodes preferably are used to provide one or more arcs to or within the common molten pool. One electrode is in electrical contact with the (+) terminal of one DC inductor and another electrode is in electrical contact with the (−) terminal of another DC inductor.

The mid or neutral terminal of the secondary winding of the rectifier transformer may or may not be electrically connected to a counter electrode which may be at or near the bottom of the molten pool.

If only one of the two DC electrodes is arcing and the other DC electrode is submerged in the molten bath and not arcing, then the submerged electrode could be grounded. However, it is not necessary and may not be desirable to do so.

Because one system employs two graphite electrodes, one electrode (+) and the other (−), then the neutral junction 166 of the three wye connected windings of the three phase transformer may or may not be connected to ground.

Graphite tapping spout 28 and the metal furnace shell of the unit must be grounded for safety reasons. Because the graphite tapping spout is in electrical contact with the molten pool in the bottom of the furnace, this means that if the neutral terminal 166 of the wye connected secondary winding is not connected to the graphite tapping spout 28, then the two arcs are electrically in series. If one of the arcs extinguishes, then both of the arcs will therefore extinguish and this is not desirable. By connecting the neutral point 166 to the graphite tapping spout 28, each arc is effectively independent and can continue to burn notwithstanding that the other arc has extinguished. Radiation from the arc which continues to burn frequently causes the extinguished arc to reignite.

By connecting the three isolated secondary windings as shown in FIG. 3A or FIG. 5 and being certain that phase 24b–24e is physically connected in reverse polarity to phase 24a–24d and phase 24c–24f, then the current paths through the molten path will be such as to cause stirring and mixing of the bath and thereby increase the quantity of waste material that can be processed per hour in a given furnace.

It should also be noted that if two or three independent DC power supplies of the type shown in FIGS. 3B and/or FIG. 5 are used to power four or six graphite arc electrodes, this will provide additional furnace design configuration opportunities when large quantities or physically large waste materials need to be processed. The round furnace designs shown in FIGS. 4B–4D would fulfill this requirement.

Figure 7B:
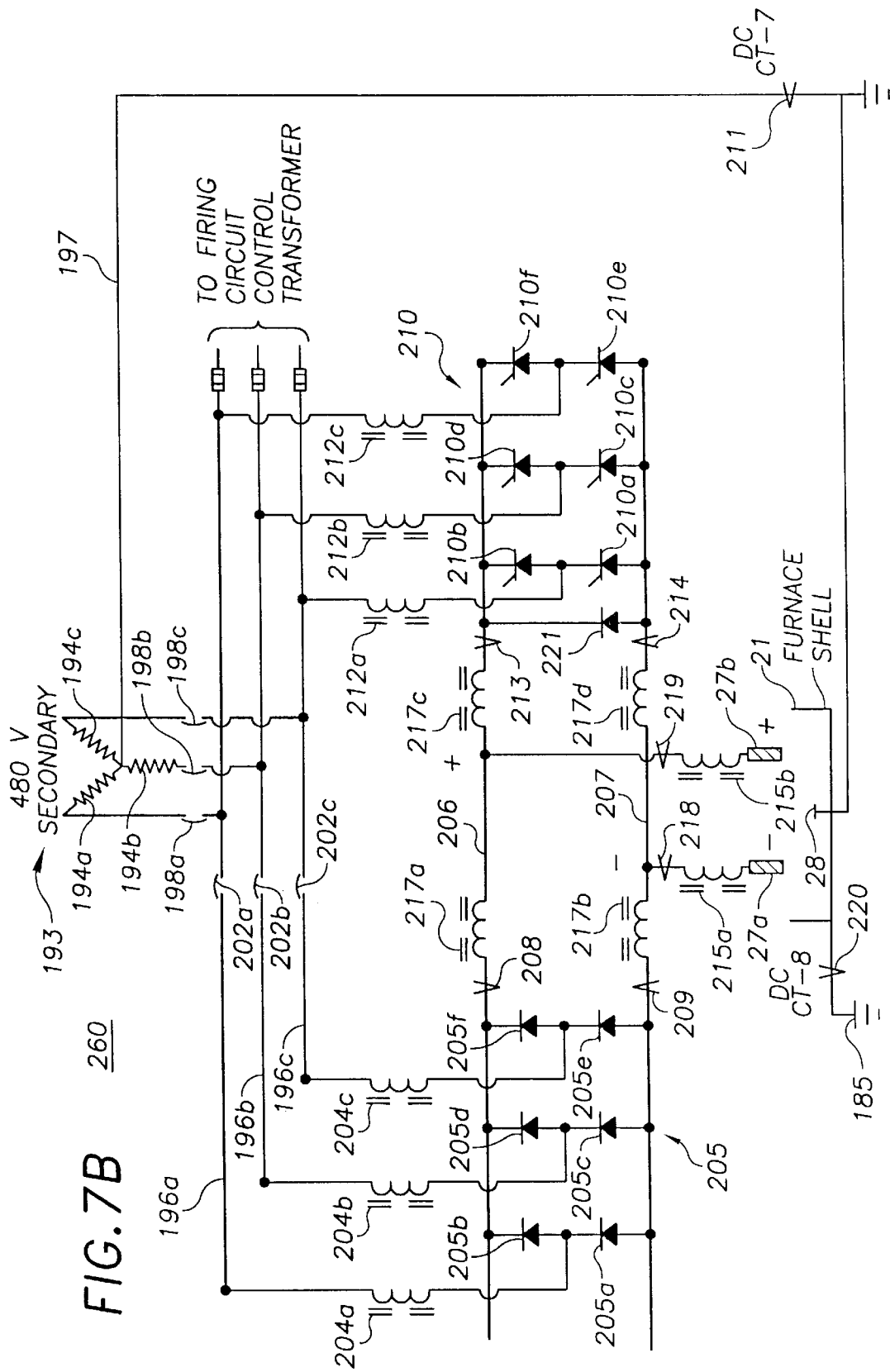

Alternative embodiments for providing DC power of the arcing electrodes in accordance with the invention are shown in FIGS. 6, and 7A–7B. FIG. 6 utilizes a plurality of phase power controllers while FIGS. 7A–7B utilizes a phase controlled thyristor rectifier in combination with a diode rectifier. These circuits may be advantageous over the circuit shown in FIG. 5 because saturable reactors are often larger and more expensive than thyristors. The circuits shown in FIGS. 6 and 7A–7B utilize thyristor switches in combination with AC inductors (such as load limiting reactors (LLR)) to provide the same desirable characteristics as the saturable reactors described hereinabove, e.g. to enhance arc stability in a DC arc furnace.

Circuit 170 shown in FIG. 6 includes primary winding 171 and secondary windings 173a–173c. As shown in FIG. 6, the secondary windings are wye connected with transformer neutral 174 connected thereto. The three phases of power 175a–175c respectively include circuit breakers 172a–172c as shown in FIG. 6 (although circuit breakers 172a–172c could alternatively be positioned between the secondary windings and phase power controllers 176a–176c). Circuit breakers 172a–172c, which could be air circuit breakers, are designed to open the circuit automatically under abnormal conditions.

As also illustrated in FIG. 6, current limiting reactors (CLR) 177a–177c are connected in series with the incoming AC power to the phase power controllers 176a–176c. Alternatively, current limiting reactors 177a–177c could be connected in series after the thyristors 178a–178f, but before diode rectifier 182. Reactors 177a–177c, which may be current limiting reactors, protect the thyristors and diodes in the rectifier so that the thyristors and diodes do not receive abnormal current in the event of misfire.

As further shown in FIG. 6, three phase power controllers 176a, 176b and 176c are provided. Each phase power controller 176a–176c includes a pair of thyristors 178a–178b, 178c–178d and 178e–178f, respectively. Phase power controllers 176a–176c also respectively include metal oxide varistors (MOV) 179a–179c, load limiting reactors (LLR) 180a–180c and current transformers (CT) 181a–181c. Reactors 180a–180c preferably are air gap reactors.

The thyristors 178a–178f can be bypassed by AC inductors 180a–180c, respectively. The function of AC inductors 180a–180c is to provide stability to the arc(s). This can be accomplished by the inductors providing current when the thyristor switches are in a non-conducting mode. Metal oxide varistors (MOV) 179a–179c are connected in parallel with the inductors and thyristors as shown in FIG. 6. Varistors 179a–179c are used to limit or clamp any transient voltages of either polarity to a level which will not damage the thyristors.

Current transformers (CT) 181a–181f are standard AC current transformers. Current transformers 181a–181f ensure that an appropriate level of DC current is flowing between the (+) and (−) DC arc electrodes before the thyristors 178a–178f are "turned on". Current transformers 181a–181f also ensure that if the thyristors are inadvertently "turned on", any resulting current will be rapidly reduced to a preset level of current. This will prevent in the case of a DC power arc extinction, the "full phase on" of the thyristors which may produce an abnormally and undesirably high transient surge of DC current if the arcs through the (+) and (−) electrodes are initiated under such a "full" phased on" condition.

AC inductors 180a–180c (such as for example LLRs) can limit the AC current to a relatively low level of current when the thyristors 178a–178f are not pulsed or otherwise gated. This means that the DC current supplied by the three phase full wave diode rectifier will be of a sufficient level to prevent extinction of the arc(s). When the (−) DC arc electrode 27a and (+) DC arc electrode 27b contact an electrically conductive surface, an arc or arcs may be initiated and sustained with a sufficient current magnitude to maintain a DC arc or arcs prior to firing the thyristor gates. When the thyristor gates are fired, the arc current through the electric arc or arcs will increase to a preset magnitude which is determined by the relative phase angle and/or duration of the pulse gate.

Additionally, the firing of the thyristors results in an increase in the arc current since their respective AC inductors (LLR) will be short circuited during that interval. Because current can pass through inductors 180a–180c prior to being short circuited by thyristors 178a–178f, this means that energy can be stored in inductors 180a–180c. The amount of energy stored in each inductor is $E=1/2Li^2$ where E is the energy in watt seconds, L is the inductance in Henry's and i is the current in amperes.

The energy stored in the inductors can cause current to flow from inductors 180a–180c through the thyristors 178a–178f in a direction which is opposite to the current normally flowing from the power transformers to the diode rectifier (designated by the broker line 182 in FIG. 6) when thyristors 178a–178f are fired. It is therefore desirable to fire thyristors 178a–178f at such a time or phase angle so that the initial current through thyristors 178a–178f will be significantly greater than the magnitude of current flowing out of inductors 180a–180c. If before the thyristor gate is pulsed, the initial current from the inductor is greater than the forward current through the thyristor before gate "turn on" of the thyristor is completed, the thyristor may be momentarily "turned off". On the other hand, if the gate pulse is sufficiently long, then the thyristor will quickly "turn on" again and remain in the "turned on" condition until its normal power frequency "current zero" is reached, at which time it is necessary and desirable to have this thyristor "turned off".

AC current entering diode rectifier 182 is rectified to provide DC current. In particular, phase 175a is rectified by diodes 182a and 182b. Similarly, phase 175b is rectified by diodes 182c and 182d while phase 175c is rectified by diodes 182e and 182f.

As also shown in FIG. 6, capacitors 183a–183f and resistors 184a–184f are respectively connected in parallel with diodes 182a–182f. Capacitors 183a–183f and resistors 184a–184f thus form a plurality of snubber circuits around diodes 182a–182f. Snubber circuits are typically used to limit the effects of rapid voltage changes. As shown in FIG. 6, the snubber circuits are designed to prevent excess voltage flowing in the reverse direction from damaging diodes 182a–182f. Thus, capacitors 183a–183f minimize the transient voltage across the diodes 182a–182f.

The wye connected transformer neutral 174 is connected to ground 185 and is also connected to a counter electrode 28 in the furnace hearth. This further enhances arc stability under a variety of conditions which may otherwise cause arc instability or arc extinction. For example, the counter electrode 28 provides two independent electric arcs with electrodes 27a and 27b. In the event that one of the arcs is extinguished (for example, due to transient energy demands due to waste being treated in the furnace), the other arc will be sustained and will reignite the arc which was extinguished.

Inductors 186a and 186b, which are respectively connected to arcing electrodes 27a and 27b and the outputs of the diode rectifier, provide energy and the necessary transient voltage frequently required to maintain stable arcs during operation of furnace 21.

Current transformers (CT) 181a–181f are standard AC current transformers and current transformers (CT) 187a–187c are DC type current transformers.

Current transformers 181a–181f provide feedback information, preferably to an automatic current control circuit, to maintain essentially a constant preset amount of current under varying arc voltage conditions. Current transformer 187c senses any unequal current between the (−) arc electrode 27a and (+) arc electrode 27b and provides a correct signal to correct any undesirable current unbalance (for example, by adjusting the firing angle of the thyristors and/or by adjusting the arc length of one electrode).

Clamping diode 188, which is connected across the output of diode rectifier 182, is utilized to provide a current path to deliver the energy stored in inductors 186a and 186b during the short time intervals when DC power is not being supplied from rectifier 182.

Referring now to FIG. 7A, an alternative embodiment of a circuit for use with the arcing electrodes is shown. The circuit 190 shown in FIG. 7A, which is designed to accomplish the same objectives as the circuit shown in FIG. 6, includes two different power rectifier circuits 191, 192.

The main rectifier circuit 192 includes main power thyristor rectifier 210 having thyristors 210a–210f. As shown in FIG. 7A, current limiting reactors 212a–212c are respectively connected to phases 196a–196c before thyristor rectifier 210.

Current transformer 213 is connected to (+) output of thyristor rectifier 210 while current transformer 214 is connected to the (−) output of thyristor rectifier 210. Inductors 215a and 215b are respectively connected on the (−) and (+) outputs of thyristor rectifier 210. Inductors 215a and 215b may be DC inductors, such as iron core air gap inductors.

As further shown in FIG. 7A, the outputs of diode rectifier 205 function as a clamping diode for thyristor rectifier 210. As shown for example, the (+) output 206 of diode rectifier 205 is connected to the (+) output of rectifier 210 and the (−) output 207 of diode rectifier 205 is connected to the (−) output of rectifier 210.

Circuit 190 includes a main power transformer 195. Transformer 205 includes primary winding 193 and secondary windings 194. As shown in FIG. 7A, secondary windings 194a–194c are wye connected and include neutral return 197. Neutral return 197 functions like neutral return 174 described in connection with FIG. 6. Circuit breakers 198a–198c are connected respectively to secondary windings 194a–194c for respective phases 196a–196c.

As further shown in FIG. 7A, a portion of the power from main secondary windings 194a–194c is used in start up circuit 191 and a portion is used in the main power circuit 192 (e.g. in main power rectifier or thyristor rectifier 210).

"Start up" rectifier circuit 191 includes transformer 201, which includes primary windings 199 and secondary windings 200. As shown in FIG. 7A, secondary windings 200a–200c are wye connected with a neutral return 203 (which is connected to ground 185 and counter electrode 24). In addition, circuit breakers 202a–202c are respectively connected to phases 196a–196c before primary winding 199. Load limiting reactors (LLR) (such as for example air gap iron core reactors) 204a–204c are connected in series with secondary windings 200a–200c. Start-up circuit 191 also includes a three phase diode rectifier 205. As discussed above, the outputs 206 and 207 of diode rectifier 205 are connected to the outputs of the thyristor rectifier 210. Diode rectifier 205, which includes diodes 205a–205f, has an output current that is sufficient to initiate and maintain a stable arc or arcs.

(−) DC electrode 27a and (+) DC electrode 27b can be placed in contact with an electrically conductive surface, such as a molten pool described hereinabove. Circuit breakers 198a–198c and 202a–202c are closed such that DC current flows from diode rectifier 205 to initiate the arcs in electrodes 27a and 27b. Circuit breakers 198a–198c and 202a–202c may be air circuit breakers (e.g. for low voltage). The magnitude of this DC current is limited by the inductors 204a–204c which deliver AC power to the AC input of diode rectifier 205.

The thyristor rectifier 210 is controlled so that during the above start-up steps, there are no firing pulses delivered to the respective thyristors 210a–210f. This means that thyristor rectifier 210 is not supplying any DC voltage or current to the (−) and (+) electrodes, 27a and 27b, respectively, during start-up.

When firing pulses are delivered to thyristors 210a–210f in thyristor rectifier 210, then this power rectifier may increase its current to a preset level and will maintain this preset level even though the resistance between the (+) and (−) electrodes may vary over a relatively wide range.

During the interval when none of the thyristors are "turned on" or "fired" by their respective gate pulses, the starting diode rectifier 205 maintains a low current arc thereby producing and maintaining a stable DC arc or arcs.

In order to be sure that a large magnitude of transient current is not delivered between (+) to (−) electrodes or (+) to N (counter electrode 28) electrodes or (−) to N (counter electrode 28) electrodes because there was no previous arc or other current path between these electrodes and the control circuit does not recognize this open circuit condition, DC current transformers 208, 209, 213 and 214 sense this condition and cause the following to occur.

The firing pulses of the thyristors are "turned off" until DC current transformers 208 and 209 sense that the anticipated level of current is flowing in a reasonably steady manner between (−) DC electrode 27a and (+) DC electrode 27b. With current transformers 208 and 209 showing that DC current is flowing in (−) DC electrode 27a and (+) DC electrode 27b, then the firing pulses of the thyristors on rectifier 210 "turn on" and automatically increase the DC current to their respective preset current levels.

In the event that the voltage (+) to N (counter electrode 28) electrodes and the (−) to N (counter electrode 28) electrodes are abnormally unequal and if there is no current flowing from the electrode showing the higher voltage, then the electrode showing no current may be automatically lowered until the current and voltage is brought within their normal operating current range.

DC inductors 215a and 215b can store energy and deliver the stored energy rapidly (at a rate much faster than the phase angle control which is possible by the thyristor connected circuit), thereby preventing the arc or arcs from extinguishing. Current transformer 211 is in the transformer neutral circuit. If the currents supplied to the (+) and (−) electrodes are equal, then current transformer 211 current is zero. If theses currents are unequal, then current transformer 211 adjusts the electrode gap until the circuits are equal.

In an alternative embodiment of FIG. 7A, transformer 201 may be eliminated. This can be accomplished utilizing the circuit shown in FIG. 7B. The embodiment illustrated in FIG. 7B can be used to power two arcing electrodes.

In this embodiment, the transformer used to supply a lower AC voltage to the diode rectifier is not needed or desired since the diodes 205a–205f and thyristors 210a–210f provide effective current isolation so long as the maximum open circuit voltage from the diode rectifier does not exceed the maximum open circuit voltage from the thyristor rectifier 210 and also that the DC arc voltage supplied by the diode rectifier 205 is equal to or less than the open circuit DC voltage which could be delivered by the thyristor rectifier 210.

The transformer 195 in FIG. 7B may have a delta primary (not shown) and a wye connected secondary with a neutral. Alternatively, the primary winding may be wye with a neutral and the secondary may be wye with a neutral. In another embodiment, the primary may be wye connected (without a neutral) and the secondary may be wye with a neutral and a tertiary delta.

While it may not be necessary in all cases to provide four DC inductors 217a–217d, it may be desirable to do so, even if an inductor is connected directly in series with each of the arcing electrodes shown as inductors 215a–215b since abnormally large inductors 215a and 215b may otherwise be required.

Current transformers 213, 214, 218 and 219 are carrying a current of any amount greater than zero, then it makes no difference if the DC current in DC current transformer 208 and/or DC current transformer 209 is zero or is greater than zero and it does not matter which direction the current is flowing in DC current transformer 208 and/or DC current transformer 209. DC current transformers 208, 209, 218 and 219 must indicate that current is flowing from the diode rectifier 205 and through both the positive and negative arc electrodes 27a, 27b before the thyristor gate circuit can increase the firing angle of the thyristors 210a–210f to any amount greater than zero. Once the thyristor rectifier 210 is passing DC current through both of the arcing electrodes, then the function of the diode rectifier is to provide a relatively low magnitude of DC current prior to the time when each thyristor fires or "turns on." This produces a much more stable DC arc or arcs. This is particularly important when the waste contains more water or other constituents which quickly demand more energy from the arcs since rapid demand for arc energy can extinguish an arc. If an AC current limited diode rectifier was not connected in parallel with the DC output from the thyristor rectifier then arc extinction is much more likely to occur.

If arc extinction does occur, the DC arc current immediately drops to zero, thereby normally directing the firing circuit to advance from its preset firing angle to a "full on" 180° position which can produce a highly undesirable magnitude of current if the arc should restrike. For example, if the full load DC arc current rating of the system is 1,500 amperes and the arc was preset to operation at 500 amperes, and the arc or arcs suddenly extinguished and the current dropped to zero, then two actions will quickly take place: the electrodes will be automatically directed to move down toward the molten bath, and the firing circuit would normally advance to "full on" 180° conduction angle.

The next thing that will happen is that the arc or arcs will reignite and the DC thyristor current will immediately go to its full short circuit current instead of being limited to its formerly preset value of 500 amperes.

By having the thyristor firing circuit immediately return to its 0° firing angle and to remain at 0° until the current limited diode rectifier reestablished the DC arc or arcs from the electrodes to the molten bath, then and only then will the firing angle increase at a controlled rate until the former 500 ampere arc current limit is reached. This will prevent a recurrence of another abnormal surge of current.

Load limiting reactors 204a–204c (which will be iron core air gap reactors) limit the diode rectifier DC current to a low level which is sufficient to maintain a stable DC arc or arcs while at the same time providing the amount of arc power necessary to melt any residual waste which was not destroyed after the last waste canister was deposited in the furnace, while at the same time limiting the arc energy which may impinge on the furnace lining wall while it is not protected by an almost continuous waste stream. The limited amount of arc energy is obtained by turning off the thyristor firing circuit and using only the low current diode rectified, and then adjusting arc length to destroy any residual waste while at the same time eliminating lining wear.

It should be noted that clamping diode 221 prevents high voltage surges from damaging thyristors 210a–210f. It is not necessary to include a clamping diode for diode rectifier 205 since diodes 205a–205f provide their own surge clamping action.

Current transformer 220 is included in FIG. 7B and not FIG. 7A. This is because the circuit shown in FIG. 7A has an isolating transformer 201 and the circuit shown in FIG. 7B does not include this transformer. Current transformers 209 and 211 are DC current transformers.

The circuits for the arcing electrodes described above allow the joule heating AC power supply to provide near constant melt temperatures throughout the glass tank, thereby minimizing sizing constraints for the arc, i.e. arc power, electrode diameter, and the like. The DC arcs are primarily present in the furnace-melter for feed rate enhancement. This makes this newly configured melter technology more flexible than other available vitrification systems. The arcs supplies the energy in the unmelted overburden of incoming feed, and the joule heated portion of the melter system maintains the hot glass pool to ensure complete dissolution and mixing of the glass mixture as well as longer residence time for waste decomposition.

The circuits shown in FIGS. 8–11 illustrate alternative embodiments for supplying arc power and joule heating power to the arc plasma-joule melters in accordance with the present invention.

As used herein, a silicon controlled rectifier (SCR) or thyristor is a solid state device which can be "turned on" with very low energy gate pulse of short duration. Once an SCR is fired or "turned on", it will continue to conduct current even after the gate firing pulse is "turned off". This current conduction will continue until there is an interruption or current zero in the power circuit on the order of 100 microseconds or more. The thyristor will the remain in the open or "off" position until a firing pulse is reapplied. An SCR or thyristor will not conduct current if the direction of current flow is reversed even though the firing pulse is applied.

As also used herein, an "SCR switch" includes a plurality (e.g. two) of thyristors connected in antiparallel. A snubber circuit that includes a resistor and capacitor connected in series may also be connected in parallel with the SCR switches or static switches of the present invention. The snubber circuit controls transient system voltage across solid state devices (e.g., SCRs). In alternative embodiments, the SCR on any circuit can be replaced with saturable reactors. If saturable reactors is used, a load limiting reactor may be used in parallel with the saturable reactor.

A load limiting reactor (LLR), as used herein, provides a constant inductive reactance so that regardless of the amount of available short circuit current in a particular system, the resulting inductance will be such that a predetermined, relatively low current will flow through the inductance and the circuit when the circuit is completed in series without additional impedance; then the magnitude of AC current that will flow will be equal to the continuous current rating of the inductor. In the arcing circuits, the LLRs, which are connected in parallel with the static or SCR switches (or thyristor switches), provide a sufficient amount of current to keep the arc(s) alive when neither thyristor is firing. This occurs every ½ cycle when the firing angle is retarded or phased back, thereby enhancing arc stability.

A current limiting reactor (CLR), as used herein, is similar in design to a load limiting reactor. The impedance of a current limiting reactor, however, is significantly lower than the impedance of a load limiting reactor. The current limiting reactor also has a significantly larger current carrying capacity or rating than the load limiting reactor. This allows the current limiting reactor to carry all of the current when the thyristors are in the "full on" position. As a result, the solid state devices of the static switches and rectifiers (where employed) are protected notwithstanding most severe operating conditions. The CLRs thus prevent damage to solid state components, e.g. SCR switches and diodes, by keeping current at the appropriate level (i.e. rating of the SCR switch or rectifier). Without the CLR, the system might experience on the order of 20 times rated transformer current. For example and while not intended to be limiting, when the arcing electrode(s) are short circuited so that the impedance between arcing electrode to arcing electrode or arcing electrode to counter electrode becomes substantially zero, then the solid state devices such as the static switches will not be overloaded or damaged.

As further used herein, a DC inductor is used to supply transient voltage frequently required to maintain a stable arc during furnace operation. The construction and design of an air gapped iron core DC inductor is similar to that of an AC inductor, except for sizing constraints.

Referring now to FIGS. 8A–8E, alternative DC arc circuit arrangements are illustrated. The DC arc circuits shown in FIGS. 8A–8E allow for independent arc voltage and current control, since arc voltage is largely controlled by arc length and arc current is independently controlled by SCR phase angle firing.

Figure 8A:
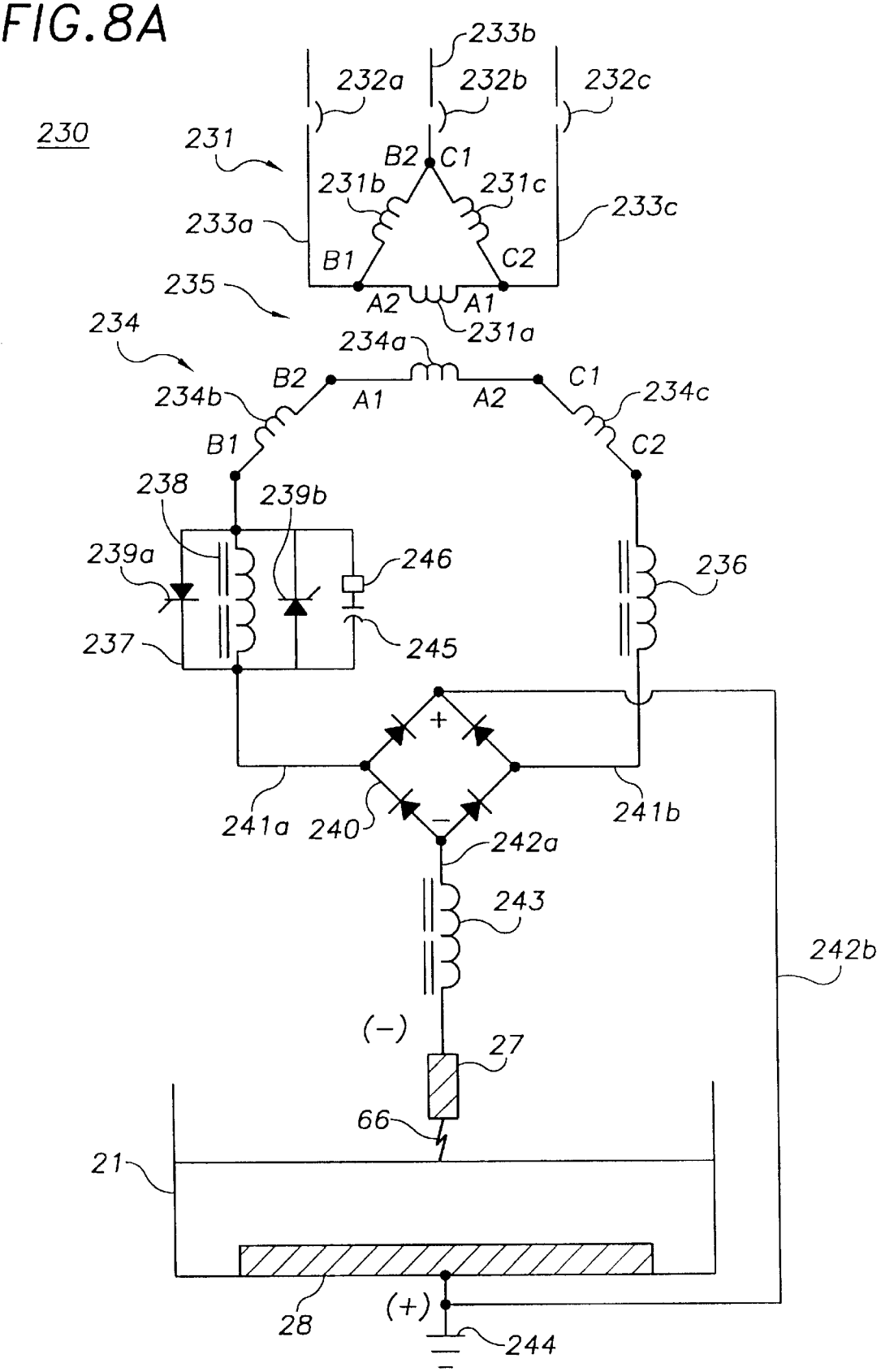
FIG. 8A illustrates a DC arc circuit with independent arc voltage and arc current control for use in systems of the present invention in which there is one arc electrode.

FIG. 8A describes a DC single arc electrode system 230 which is powered by an AC power circuit using either three single phase transformers or one three phase transformer. The primary windings 231 of transformer 235 may be connected either in delta (as shown in FIG. 8A) or in wye with a four wire incoming power circuit (three phases and a neutral wire).

Power from a utility source (not shown) is fed to the three phases 233a, 233b and 233c, which are respectively connected to primary windings 231a, 231b and 231c. Circuit breakers 232a, 232b and 232c for each of the respective phases 233a, 233b and 233c can also be included. The circuit breakers may be air circuit breakers.

Secondary windings 234a, 234b and 234c of transformer 235 are arranged in a "U" connection as shown. The circuit shown in FIG. 8A supplies power to a single phase load while at the same time causing an equal amount of current to flow in each of the phases on both the primary 231 and secondary 234 transformer windings. It is desirable to substantially balance the load current on all three primary windings of the transformer. For example, a utility company may refuse to provide power unless the load current is substantially balanced on all three primary windings of the transformer or if the single phase load is of such small capacity that the unbalanced phase currents are of little concern on the utility power system. Whenever a "U" transformer is used, a delta primary may be used to balance the load on all three phases to provide balanced load current. This allows the same current to flow on each of the three phases on the primary windings because the same relative current flows in each secondary winding of the transformer.

As also shown in FIG. 8A, a silicon controlled rectifier (SCR) switch 237 is connected to one of secondary windings. Switch 237 includes thyristors 239a and 239b. SCR devices are used to prevent the flow of AC or DC current in either direction until a short duration, unidirectional pulse is applied between the gate and the cathode and also when the anode is connected to the positive terminal of the power source and the cathode is connected to the negative source of power by way of an interposed load whose impedance is such that the current flow will not exceed the current rating of the SCR device.

Another characteristic of an SCR or thyristor is that once current starts to flow from anode to cathode through the SCR, this current will continue to flow even after the gate pulse current has stopped and no voltage is applied to the gate.

The flow of current through an SCR can be stopped by interrupting the flow of current by a means external to the SCR. If AC current is flowing through the SCR, it is only necessary to wait for a natural current zero which occurs two times per cycle or to use some other means to stop this flow of current for approximately 0.000050 second.

The load limiting reactor (LLR) 238 (which is connected in parallel with thyristors 239*a* and 239*b* in FIG. 8A) is designed to provide a low current when the SCR switch is deactivated or in the "dead interval" in each half cycle before the SCR is turned on or "fired." Keeping the arc alive during the "dead interval" greatly improves arc stability as well as melting any residual waste particulate which may remain on the surface of the melt at the end of a waste destruction campaign when the SCR is not "turned on".

As discussed above, a snubber circuit which includes resistor 246 and capacitor 245 connected in series may also be connected in parallel with SCR switch 237.

Current limiting reactor 236 is connected to another of the secondary winding terminals as shown in FIG. 8A (e.g. terminal $C_2$). Current limiting reactor (CLR) 236 is designed so that the DC short circuit current is limited to not more than the rated full load current of the silicon controlled rectifier (SCR) switch 237 or the diode bridge rectifier 240, thereby increasing the life of these devices.

Input 241*a* from SCR switch 237 and input 241*b* from CLR 236 are introduced into diode rectifier 240, which rectifies the alternating current to direct current. Output 242*a* from rectifier bridge 240 provides direct current to arcing electrode 27 for arc 66 while output 242*b* from diode rectifier 240 is connected to counter electrode 28 (which is connected to ground 244) in furnace 21. A DC inductor 243 is connected between the output 242*a* of diode bridge rectifier 240 and DC arcing electrode 27.

As discussed above, a saturable reactor may be substituted for the LLR reactor and the SCR switch on practically all DC or AC arc applications in the present invention. It should also be noted that the greater the number of DC arcing or AC arcing electrodes as well as the greater the number of AC joule heating electrodes, the larger the physical furnace size and the greater the amount of waste which can be destroyed per hour.

Figure 8B:
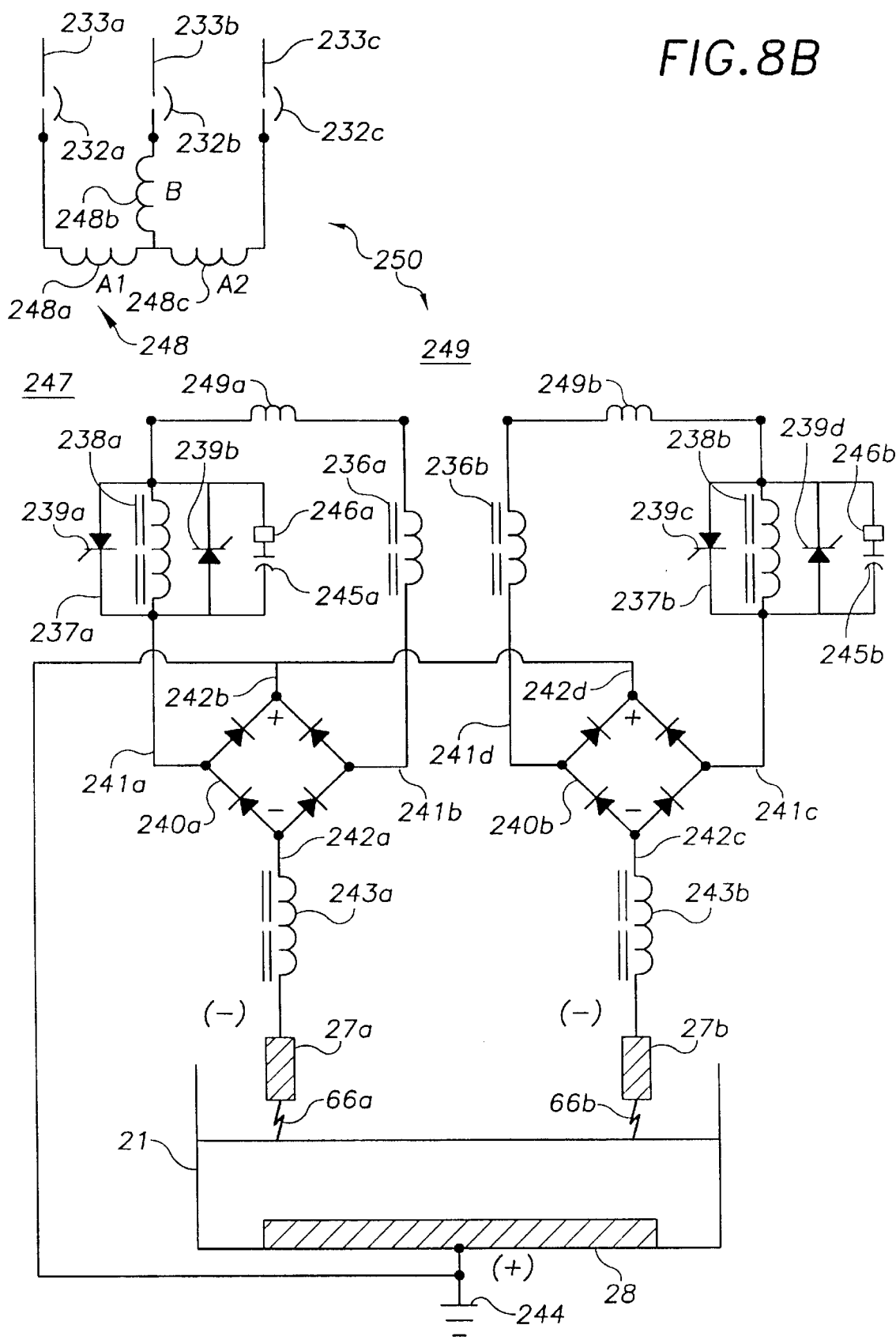
FIG. 8B illustrates a DC arc circuit with independent arc voltage and arc current control for use in systems of the present invention in which there are two arc electrodes.

FIG. 8B shows another DC arc circuit that provides independent arc voltage and current control. The circuit 247 shown in FIG. 8B operates with two arcing electrodes. Circuit 247 employs a Scott-T transformer circuit 250 which converts three phase power to two phase power.

Transformer 250 includes primary windings 248*a*, 248*b* and 248*c* connected respectively to phases 233*a*, 233*b* and 233*c*. Circuit breakers 232*a*, 232*b* and 232*c*, such as air circuit breakers, can also be included as shown in FIG. 8B.

Secondary winding 249*a* and secondary winding 249*b* supply power to two circuits which are arranged similar to the single phase circuit described above in FIG. 8A. Whenever there is more than one arcing electrode and the circuits shown in FIGS. 8B–10F are used, it may be preferred to have the polarities of the arcing electrodes the same (e.g. negative). If polyphase AC power and AC arc electrodes are used (see e.g. FIGS. 9A–9E), then the electrodes will have opposite polarities. If DC power is used, the electrodes can all be (+) or all (−). Alternatively, some of the DC electrodes can be (+) while some are (−).

As shown in FIG. 8B for example, the polarity of electrodes 27*a* and 27*b* preferably are both (−) polarity, thereby causing both arcs to pull toward each other in order to increase the life of the furnace lining.

Preferably, the arcing electrodes are (−) and the counter electrode is (+). If the counter electrode is (−) and the arcing electrodes are (+), more electrode is likely to be consumed. In either case, however, the DC arcs would still pull toward one another.

It is also preferred to position the electrodes equidistant in the furnace. For example, in FIG. 8C where three arcing electrodes are utilized, the electrodes preferably form an equilateral triangle so that all the arcs pull to the center. This minimizes furnace lining erosion, decreases electrode consumption and facilitates the control of radiation to the walls of the furnace.

As also shown in FIG. 8B, silicon controlled rectifier (SCR) switches 237*a* and 237*b* are connected to one end of secondary windings 249*a* and 249*b*, respectively. Switches 237*a* and 237*b* respectively include thyristors 239*a*, 239*b*, 239*c* and 239*d*.

Load limiting reactors (LLR) 238*a* and 238*b* (which are respectively connected in parallel with thyristors 239*a* and 239*b* of switch 237*a* and thyristors 239*c* and 239*d* of switch 237*b* in FIG. 8B) are designed to provide a low current when the SCR switches are deactivated or in the "dead interval" in each half cycle before the SCR is turned on or "fired." As discussed above, keeping the arc alive during the "dead interval" greatly improves arc stability as well as melting any residual waste particulate which may remain on the surface of the melt at the end of a waste destruction campaign when the SCR is "turned off".

As discussed above, snubber circuits including resistors 246*a* and 246*b* and capacitors 245*a* and 245*b* may also be connected in parallel respectively with switches 237*a* and 237*b*.

Current limiting reactors 236*a* and 236*b* are respectively connected to another end of secondary windings 249*a* and 249*b*, respectively, as shown in FIG. 8B. Current limiting reactors (CLR) 236*a* and 236*b* are respectively designed so that the DC short circuit current is limited to not more than rated full load current of the silicon controlled rectifier (SCR) switch 237*a*, 237*b* or the diode bridge rectifier 240*a*, 240*b* thereby increasing the life of these devices.

Input 241*a* from SCR switch 237*a* and input 241*b* from CLR 236*a* are introduced into diode rectifier 240*a*, which rectifies the alternating current to direct current. Similarly, input 241*c* from SCR switch 237*b* and input 241*d* from CLR 236*b* are introduced into diode rectifier 240*b*, which rectifies the alternating current to direct current. Output 242*a* from rectifier bridge 240*a* provides direct current to arcing electrode 27*a* for arc 66*a* while output 242*b* from diode rectifier 240*a* is connected to counter electrode 28 (which is connected to ground 244) in furnace 21. A DC inductor 243*a* is connected between the output 242*a* of diode bridge rectifier 240*a* and DC arcing electrode 27*a*.

Output 242*c* from rectifier bridge 240*b* provides direct current to arcing electrode 27*b* for arc 66*b* while output 242*d* from diode rectifier 240*b* is connected to counter electrode 28 (which is connected to ground 244) in furnace 21. A DC inductor 243*b* is connected between the output 242*c* of diode bridge rectifier 240*b* and DC arcing electrode 27*b*.

Figures 1, 8C:
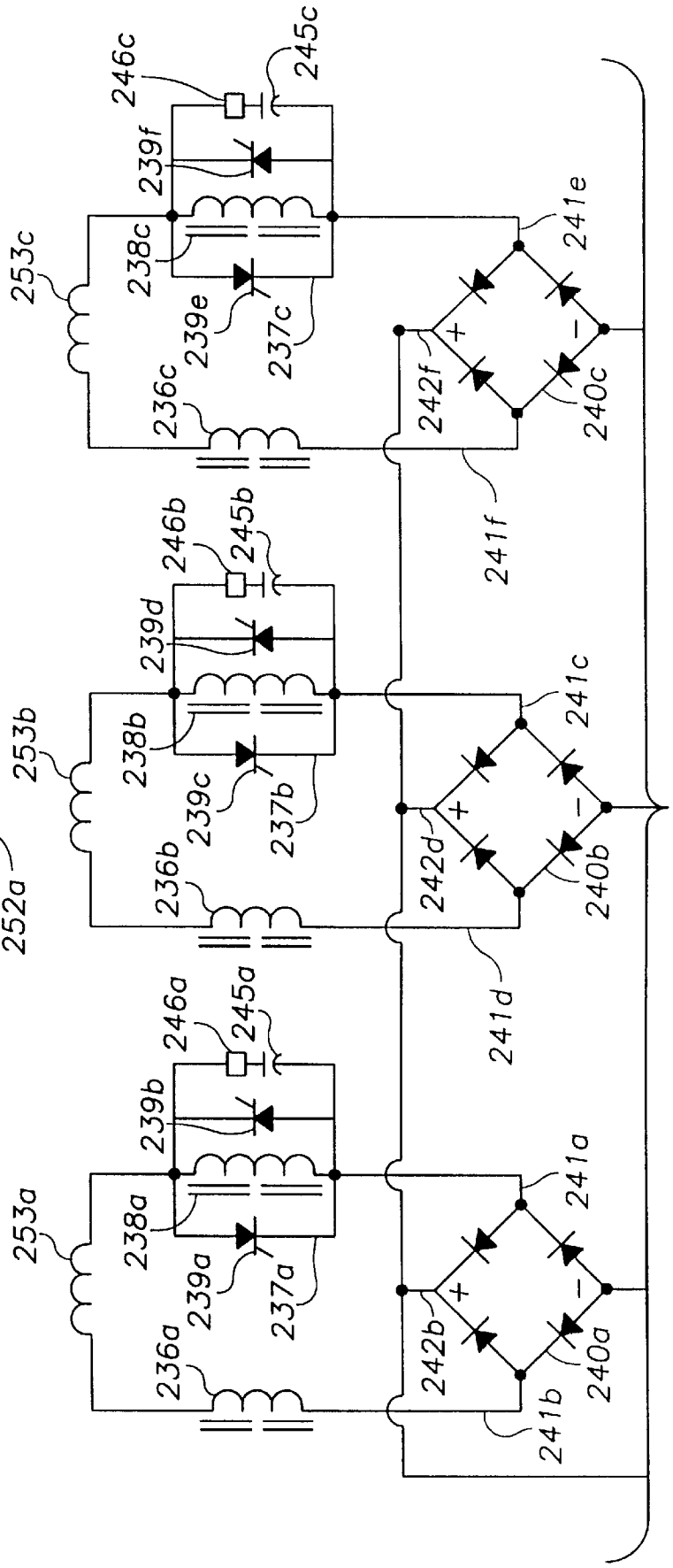
FIGS. 8C–8E illustrate DC arc circuits with independent arc voltage and arc current control for use in systems of the present invention in which there are three arc electrodes.
Figure 8D:
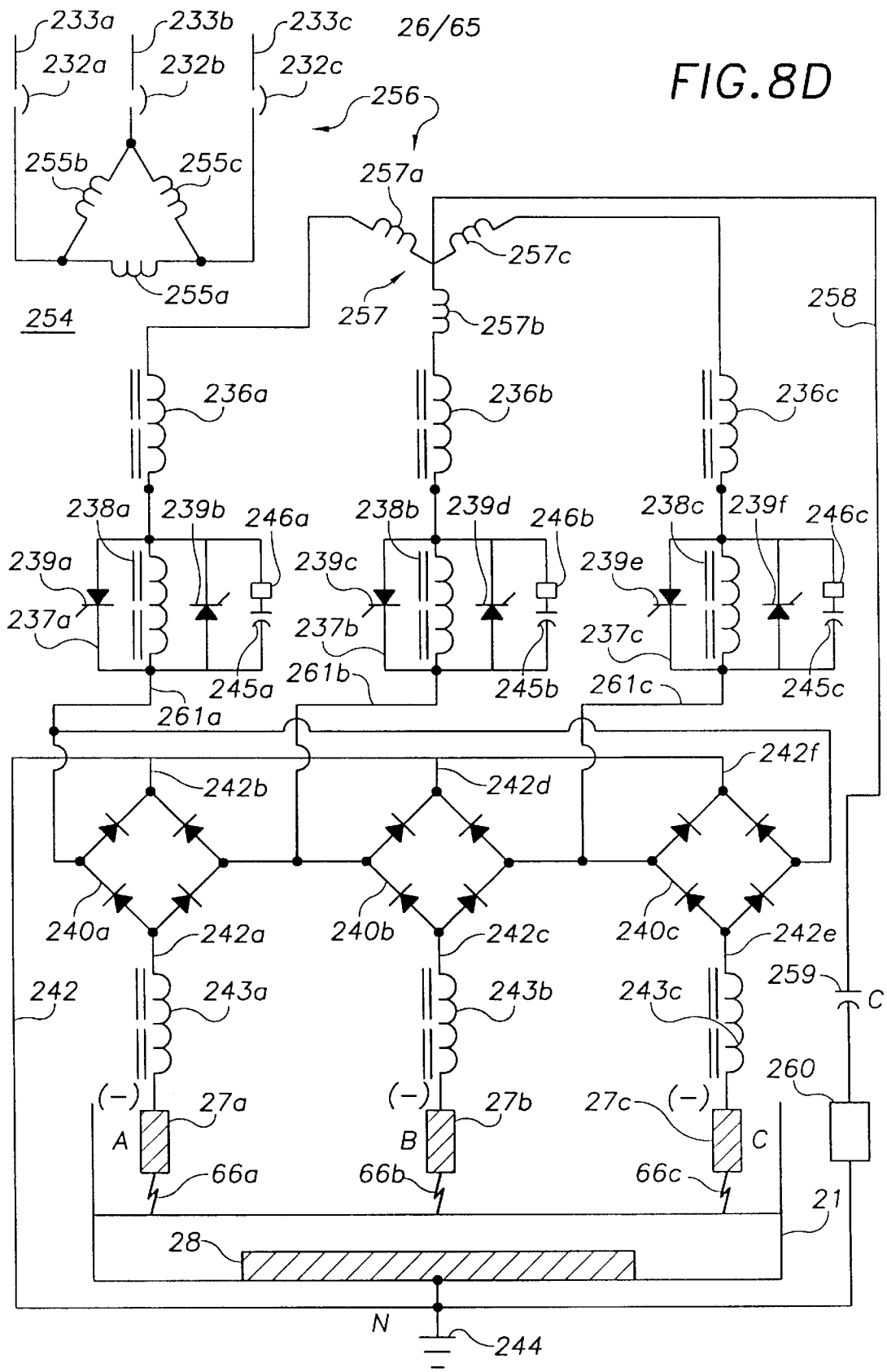
Figure 8E:
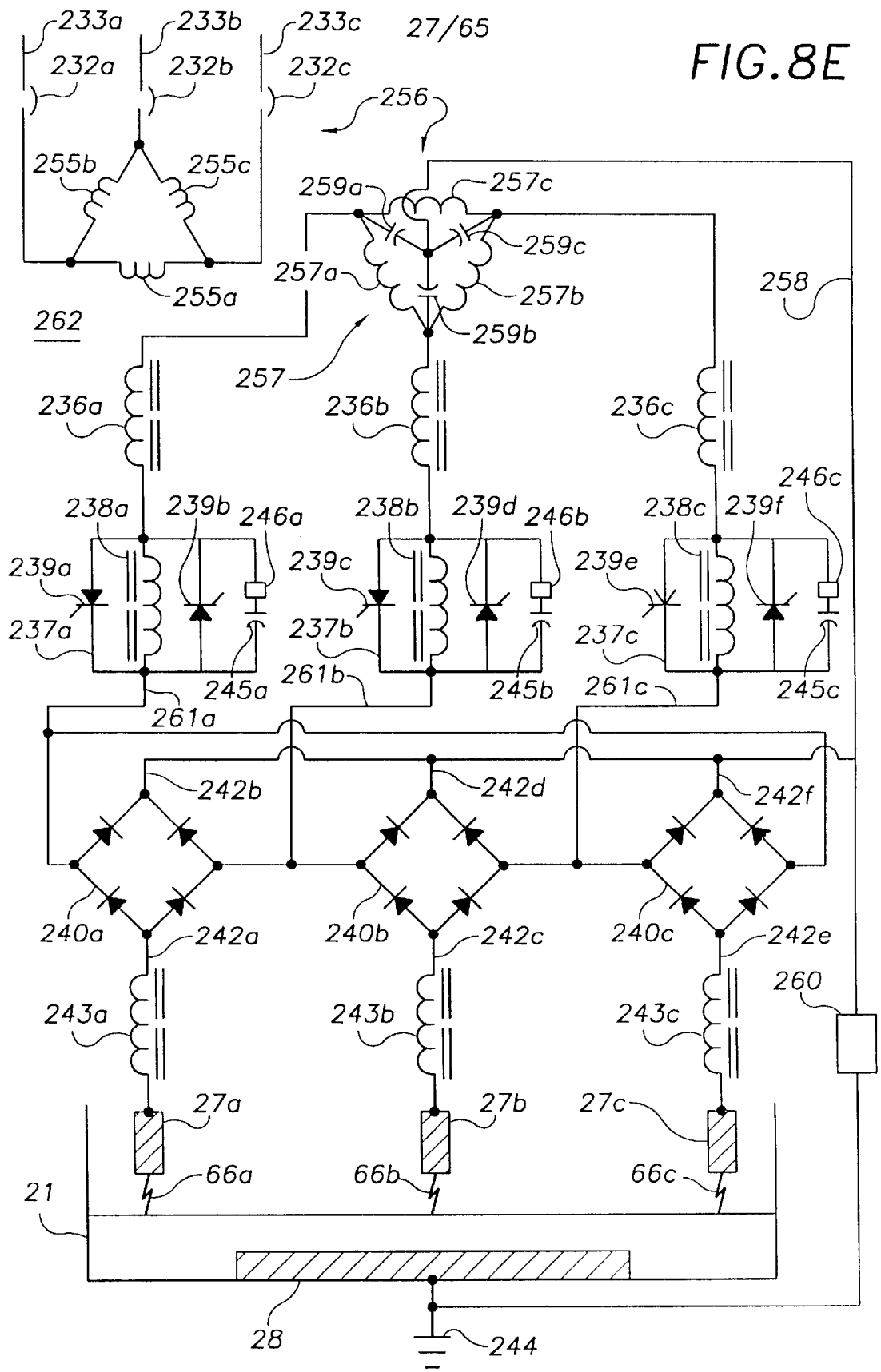

FIGS. 8C–8E each show a different type of secondary transformer connection for powering a DC arc circuit. FIGS. 8C–8E each illustrate a DC arc circuit that provides independent arc voltage and current control with three arcing electrodes.

The circuit 251 shown in FIG. 8C includes three single phase transformers whose primary windings are connected in delta. Primary windings 252a, 252b and 252c are provided respectively for each of phases 233a, 233b and 233c. Each single phase transformer has a single secondary winding 253a, 253b and 253c which in turn is connected to an electrical circuit as described above in connection with FIG. 8A and FIG. 8B.

As also shown in FIG. SC, silicon controlled rectifier (SCR) switches 237a, 237b and 237c are connected to one end of secondary windings 253a, 253b and 253c, respectively. Switches 237a, 237b and 237c respectively include thyristors 239a–239f.

Load limiting reactors (LLR) 238a, 238b and 238c (which are respectively connected in parallel with thyristors 239a and 239b of switch 237a, thyristors 239c and 239d of switch 237b and thyristors 239e and 239f of switch 239c in FIG. 8C) are designed to provide a low current when the SCR switches are deactivated or in the "dead interval" in each half cycle before the SCR is turned on or "fired." As discussed above, keeping the arc alive during the "dead interval" greatly improves arc stability as well as melting any residual waste particulate which may remain on the surface of the melt at the end of a waste destruction campaign.

Current limiting reactors 236a, 236b and 236c are respectively connected to another end of secondary windings 253a, 253b and 253c as shown in FIG. 8C. Current limiting reactors (CLR) 236a, 236b and 236c are designed so that the DC short circuit current is limited to not more than rated full load current of the silicon controlled rectifier (SCR) switches 237a, 237b, 237c or the diode bridge rectifiers 240a, 240b, 240c thereby increasing the life of these devices.

Input 241a from SCR switch 237a and input 241b from CLR 236a are introduced into diode rectifier 240a, which rectifies the alternating current to direct current. Similarly, input 241c from SCR switch 237b and input 241d from CLR 236b are introduced into diode rectifier 240b, which rectifies the alternating current to direct current and input 241e from SCR switch 237c and input 241f from CLR 236c are introduced into diode rectifier 240c, which rectifies the alternating current to direct current.

Output 242a from rectifier bridge 240a provides direct current to arcing electrode 27a for arc 66a while output 242b from diode rectifier 242a is connected to counter electrode 28 (which is connected to ground 244) in furnace 21. A DC inductor 243a is connected between the output 242a of diode bridge rectifier 240a and DC arcing electrode 27a.

Output 242c from rectifier bridge 240b provides direct current to arcing electrode 27b for arc 66b while output 242d from diode rectifier 240b is connected to counter electrode 28 (which is connected to ground 244) in furnace 21. A DC inductor 243b is connected between the output 242c of diode bridge rectifier 240b and DC arcing electrode 27b. Similarly, output 242e from rectifier bridge 240c provides direct current to arcing electrode 27c for arc 66c while output 242f from diode rectifier 240c is connected to counter electrode 28 (which is connected to ground 244) in furnace 21. A DC inductor 243c is connected between the output 242e of diode bridge rectifier 240c and DC arcing electrode 27c. As shown in FIG. 8C, outputs 242b, 242d and 242f can be connected together as bus 242, which is connected to counter electrode 28.

The circuit shown in FIG. 8C can be used when it is desirable to have completely independent control of each DC arc. Three single phase transformers, however, typically are more expensive one three phase transformer of comparable rating.

Referring now to FIG. 8D, circuit 254 employs one three phase transformer 256 with primary windings 255a, 255b and 255c connected in delta for respective phases 233a, 233b and 233c. Circuit breakers 232a, 232b and 232c, such as air circuit breakers, can also be provided as shown in FIG. 8D.

The secondary windings 257a, 257b and 257c are connected in wye with the neutral 258 brought out and connected to ground 244 through a surge capacitor 259 and resistor 260. Surge capacitor 259 is provided to minimize or reduce electrical noise distribution and to limit the magnitude of electrical surges from the incoming high voltage system from damaging the solid state SCR-switches and/or the diode rectifiers.

Load limiting reactors (LLR) 238a, 238b and 238c (which are respectively connected in parallel with thyristors 239a and 239b of switch 237a, thyristors 239c and 239d of switch 237b and thyristors 239e and 239f of switch 237c in FIG. 8D) are designed to provide a low current when the SCR switch is deactivated or in the "dead interval" in each half cycle before the SCR is turned on or "fired." As discussed above, keeping the arc alive during the "dead interval" greatly improves arc stability as well as melting any residual waste particulate which may remain on the surface of the melt at the end of a waste destruction campaign when the SCR's are "turned off".

Current limiting reactors 236a, 236b and 236c are respectively connected to one end of secondary windings 257a, 257b and 257c, respectively, as shown in FIG. 8D. As further shown in FIG. 8D, current limiting reactors 236a, 236b and 236c are respectively connected in series with SCR switches 237a, 237b and 237c (the current limiting reactors are connected in series with some portion of the AC circuit and the load limiting reactors are connected in parallel with the SCR switch).

Current limiting reactors (CLR) 236a, 236b and 236c are designed so that the DC short circuit current is limited to not more than rated full load current of the silicon controlled rectifier (SCR) switches 237a, 237b, 237c or the diode bridge rectifier 240a, 240b, 240c thereby increasing the life of these devices.

Input 261a from SCR switch 237a is introduced into diode rectifier 240a, which rectifies the alternating current to direct current. Similarly, input 261b from SCR switch 237b is introduced into diode rectifier 240b, and input 261c from SCR switch 237c is introduced into diode rectifier 240c.

Output 242a from rectifier bridge 240a provides direct current to arcing electrode 27a for arc 66a while output 242b from diode rectifier 240a is connected to counter electrode 28 (which is connected to ground 244) in furnace 21. A DC inductor 243a is connected between the output 242a of diode bridge rectifier 240a and DC arcing electrode 27a. Output 242c from rectifier bridge 240b provides direct current to arcing electrode 27b for arc 66b while output 242d from diode rectifier 240b is connected to counter electrode 28 (which is connected to ground 244) in furnace 21. A DC inductor 243b is connected between the output 242c of diode bridge rectifier 240b and DC arcing electrode 27b. Output 242e from rectifier bridge 240c provides direct current to arcing electrode 27c for arc 66c while output 242f from diode rectifier 240c is connected to counter electrode 28 (which is connected to ground 244) in furnace 21. A DC inductor 243c is connected between the output 242e of diode bridge rectifier 240c and DC arcing electrode 27c. As shown in FIG. 8D, outputs 242b, 242d and 242f can be connected together as bus 242, which is connected to counter electrode 28.

The circuit shown in FIG. 8D on the load side of the SCR switches can provide about 73% more DC voltage open circuit voltage between arcing electrodes 27a to 27b, 27b to 27c and 27c to 27a than between electrodes 27a to 28, 27b to 28 and 27c to 28. This can enhance arc stability relative to FIG. 8A and FIG. 8B.

The circuit 262 shown in FIG. 8E is similar to circuit 254 shown in FIG. 8D. The circuit 262 shown in FIG. 8E, however, includes secondary windings 257a, 257b and 257c of the transformer 256 connected in delta rather than in wye. In addition, three surge capacitors 259a, 259b and 259c are connected in wye as shown in FIG. 8E in order to provide comparable surge protection for the static switches and/or the diodes. Resistor 260 is also provided as in FIG. 8D to suppress electrical noise.

When a larger furnace is required than that which three electrodes can handle, then the circuit of FIG. 8B can be combined as necessary, thereby providing DC arc power for a multitude of arcing electrodes, for example four arcing electrodes. In some situations, it may be desirable to design a larger furnace that utilizes six arcing electrodes. Power for the six electrodes can be provided by combining two systems such as shown in FIG. 8C systems, or two systems such as shown in FIG. 8D, or in some cases by one combining a system like that shown in FIG. 8C with that shown in FIG. 8D.

In circumstances where four or six electrodes are used, the electrodes from two separate systems can be interspersed with independent arc current control while still providing a balanced load on each utility phase, thereby permitting a reduction of power in one system relative to its associated system. This interspersing of electrodes will, in a general way, distribute the heat from all electrodes in a more uniform manner inside the furnace.

FIGS. 9A–9E illustrate alternative embodiments for providing AC power to the arcing electrodes in accordance with the present invention. The embodiments shown in FIGS. 9A–9E utilize alternating current (AC) rather than direct current (DC) as discussed hereinabove. AC power can be utilized for both the arcing and joule heating electrodes without detrimental interaction with one another since they can be effectively decoupled and will not damage either transformer.

Figure 9A:
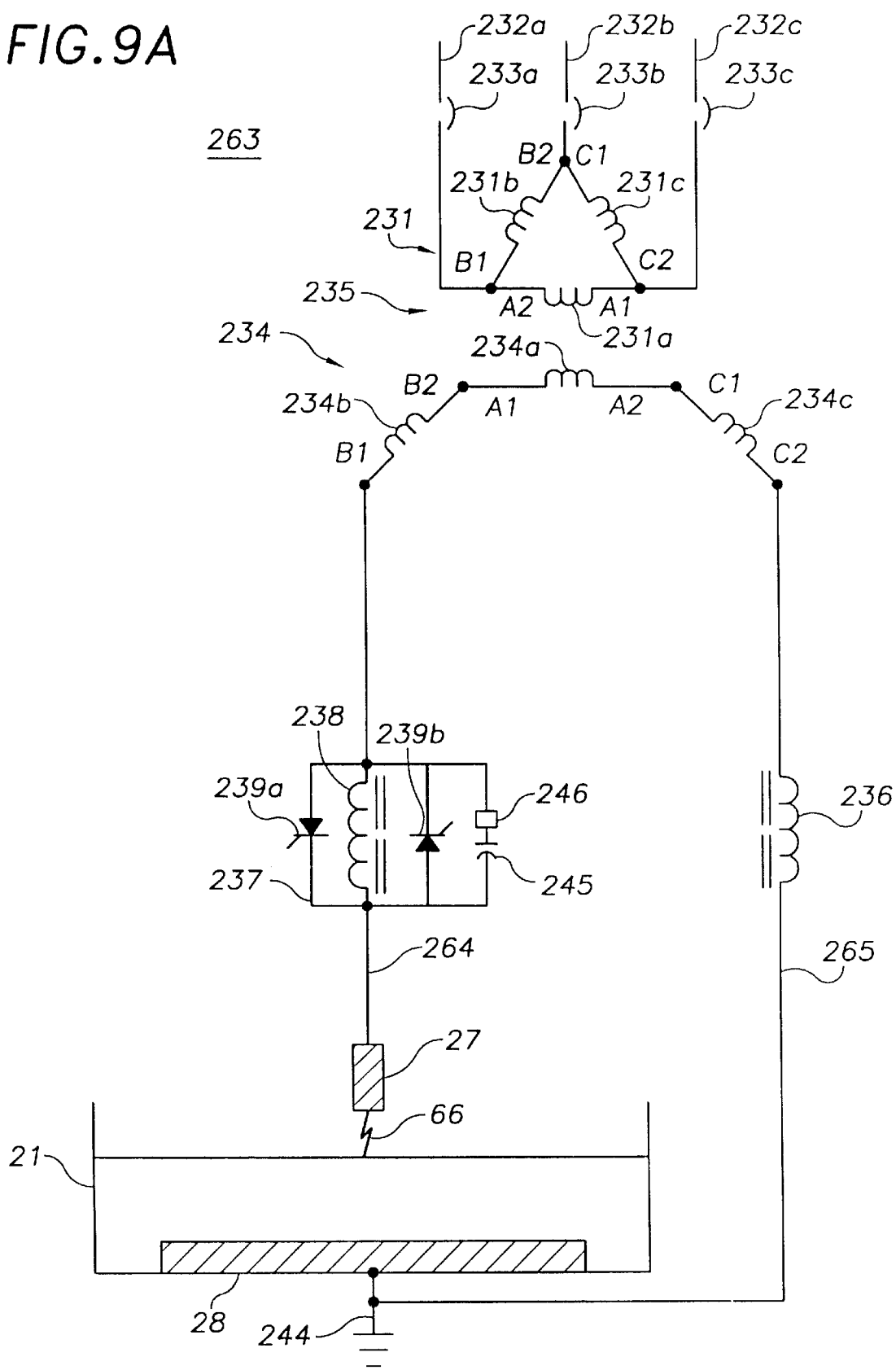
FIG. 9A illustrates an AC arc circuit with independent arc voltage and arc current control for use in systems of the present invention in which there is one arc electrode.

Referring now to FIG. 9A, an AC arc circuit 263 that provides independent arc voltage and arc current control is illustrated. Circuit 263 includes one arcing electrode 27 for arc 66.

The power source for the AC arc uses power from "U" secondary windings 234a, 234b and 234c of transformer 235 as discussed above with the DC arc circuit of FIG. 8A. Primary windings 231a, 231b and 231c of transformer 235 are provided for phases 233a, 233b and 233c, respectively. Circuit breakers 232a, 232b and 232c, such as air circuit breakers, can also be provided.

SCR switch 237 is connected to one of the secondary windings and includes thyristors 239a and 239b. Load limiting reactor (LLR) 238 is connected in parallel with thyristors 239a and 239b of switch 237. A snubber circuit can also be provided as shown and as discussed hereinabove. Electrode 27 is connected to switch 237 and power output 264 from switch 237 provides alternating current to electrode 27.

Current limiting reactor (CLR) 236 is connected in series to another terminal of the secondary windings (e.g. $C_2$ in FIG. 9A) such that current limiting reactor 236 and current 265 from CLR 236 are is connected to counter electrode 28 (which is connected to ground 244) in furnace 21. Switch 237, reactor 238 and reactor 236 are similar in design to those shown in FIG. 8A, but the ratings of switch 237, reactor 238 and reactor 236 may be different. The embodiment shown in FIG. 9A does not utilize a diode rectifier or a direct current inductor (DCI) since the arc is being powered by alternating current. The circuit will function in the same manner if CLR 236 is connected between terminal $B_1$, and SCR switch 237. In this case terminal $C_2$ would be connected to the counter electrode and ground.

Figure 9B:
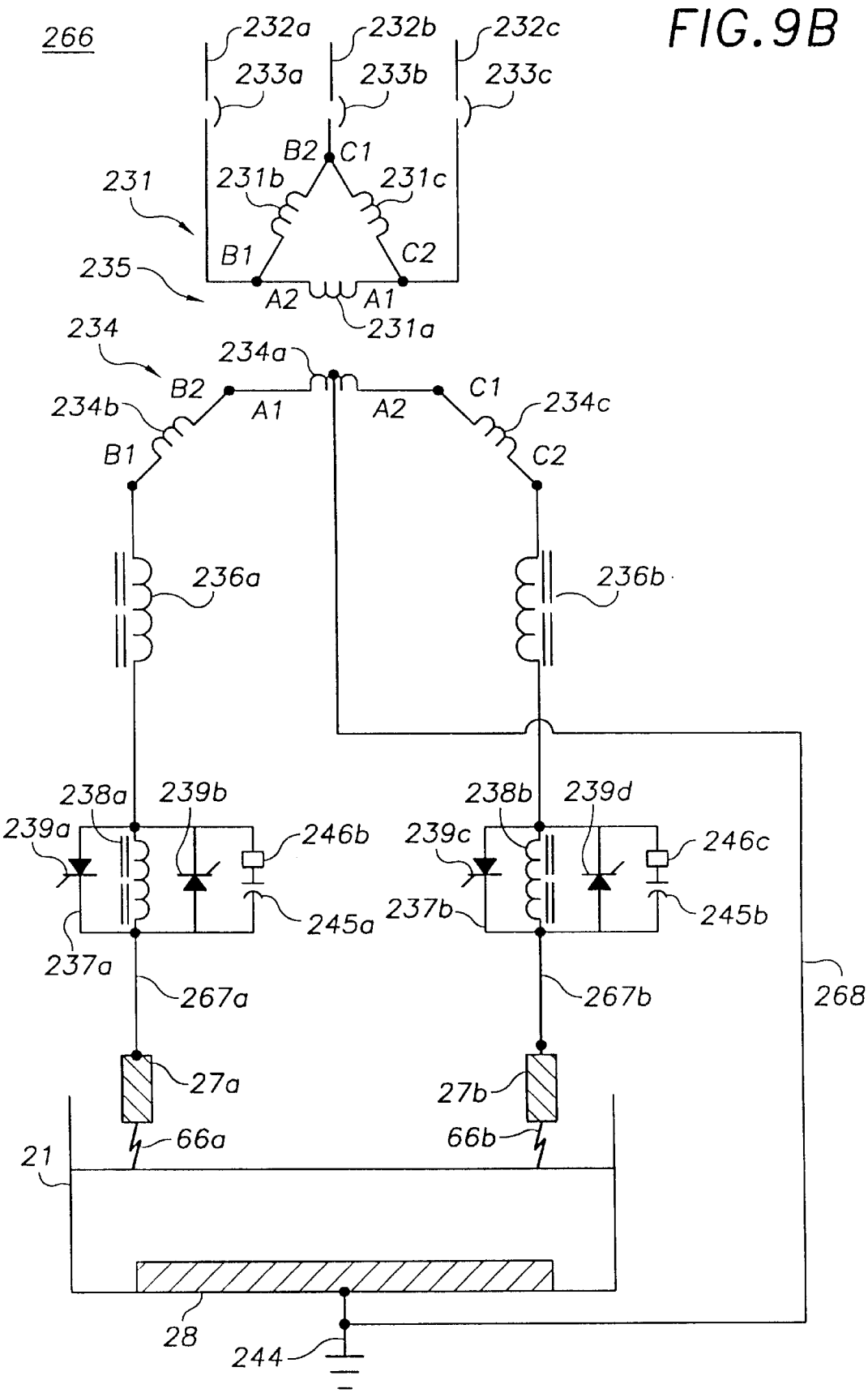
FIGS. 9B–9C illustrate AC arc circuits with independent arc voltage and arc current control for use in systems of the present invention in which there are two arc electrodes.

FIG. 9B illustrates an AC arc circuit 266 that provides independent arc voltage and arc current control. Circuit 266 includes two arcing electrodes 27a and 27b.

The power source for the AC arc uses power from "U" secondary windings 234a, 234b and 234c of transformer 235. Primary windings 231a, 231b and 231c of transformer 235 are provided for phases 233a, 233b and 233c, respectively. Circuit breakers 232a, 232b and 232c, such as air circuit breakers, can also be provided.

As shown in FIG. 9B, secondary winding 234a is center tapped such that neutral 268 is connected to counter electrode 28. This can improve AC stability in both arcs while at the same time permitting independent current control of each arc.

Current limiting reactors (CLR) 236a and 236b are connected to two of the secondary windings as shown. SCR switches 237a and 237b are respectively connected in series to current limiting reactors 236a and 236b and to electrodes 27a and 27b, respectively. Switches 237a and 237b respectively include thyristors 239a and 239b, and thyristors 239c and 239d. As discussed above, snubber circuits can also be included. Load limiting reactors (LLR) 238a and 238b are respectively connected in parallel with thyristors 239a and 239b of switch 237a and in parallel with thyristors 239c and 239d of switch 237b. Electrodes 27a and 27b are connected in series to switches 237a and 237b, respectively. Power output 267a from switch 237a provides alternating current to electrode 27a for arc 66a while power output 267b from switch 237b provides alternating current to electrode 27b for arc 66b.

Switches 237a and 237b, reactors 238a and 238b, and reactors 236a and 236b are similar in design to those shown in FIG. 8A, but the ratings of each may differ. The embodiment shown in FIG. 9B does not use a diode rectifier or a direct current inductor (DCI) since the electrodes are being powered by alternating current (AC).

When the current in the two arcing electrodes is identical, then there is no current in the counter electrode 28 and in line 268. The counter electrode 28 and line 268 conducts only the current difference between the two electrodes; this permits independent current control since thyristors 239a and 239b can provide only AC power to electrode 27a with no current in electrode 27b. In this case, all the current from electrode 27a must go through the counter electrode. If the current through electrodes 27a and 27b are equal, the current flows through the bath between electrodes 27a and 27b and there is no current to counter electrode 28.

Figure 9C:
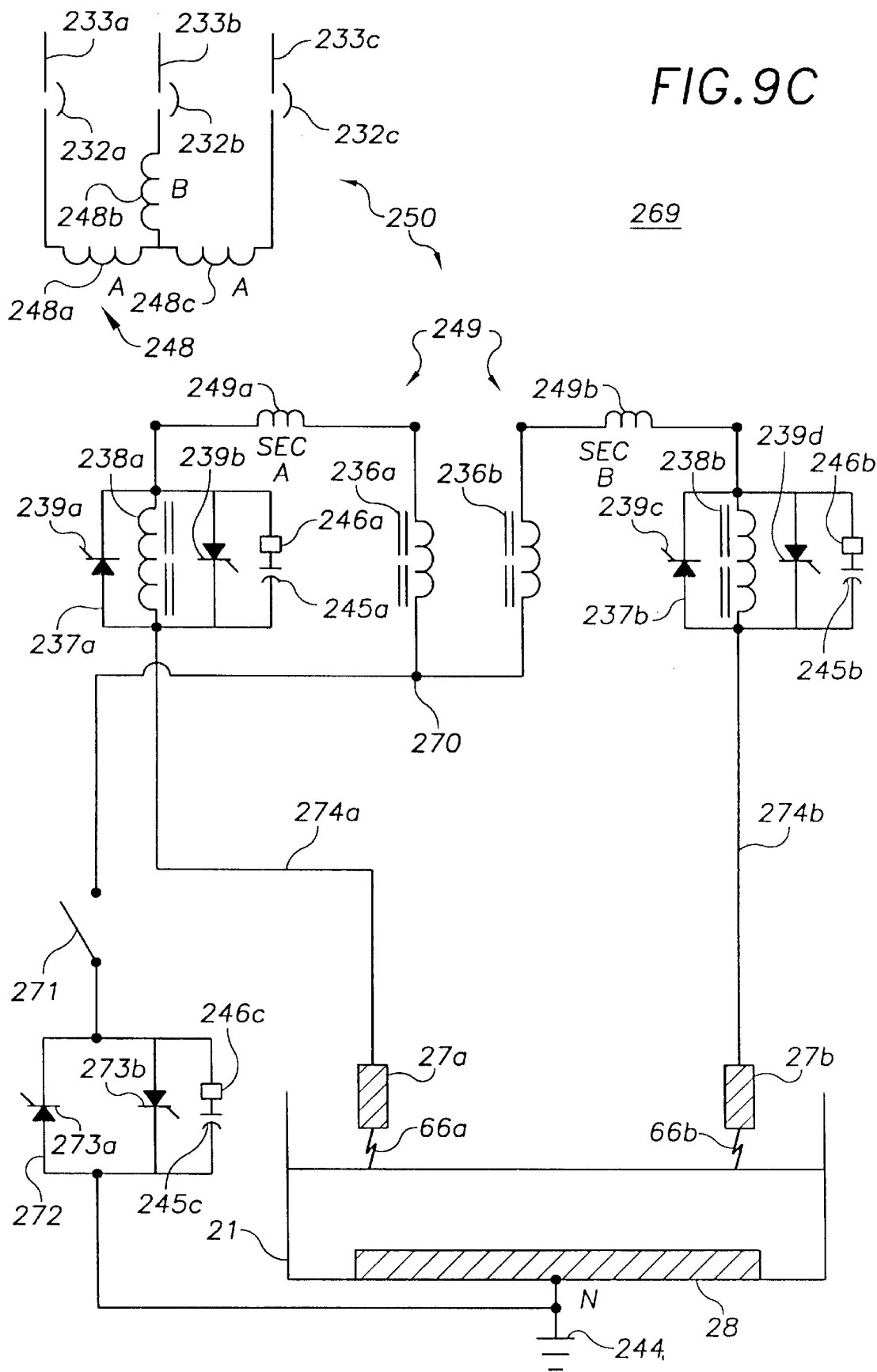

The circuit shown in FIG. 9C is also designed to provide AC arc power to two arcing electrodes. Circuit 269 allows independent arc voltage and arc current control. In this case, the power source is derived from a Scott-T transformer 250 (similar to the transformer shown in FIG. 8B). Transformer 250 includes primary windings 248a, 248b and 248c respectively connected to phases 233a, 233b and 233c. Circuit breakers 232a, 232b and 232c, such as air circuit breakers, may also be provided. Transformer 250 also includes secondary windings 249a and 249b.

As shown, SCR switch 237a is connected to one end of secondary winding 249a and current limiting reactor 236a is connected to the other terminal of secondary winding 249a. SCR switch 237b is connected to secondary winding 249b and current limiting reactor 236b is connected to the other terminal of secondary winding 249b. SCR switch 237a includes thyristors 239a and 239b. Load limiting reactor 238a is connected in parallel with thyristors 239a and 239b. Similarly, SCR switch 237b includes thyristors 239c and 239d. Load limiting reactor 238b is connected in parallel with thyristors 239c and 239d. SCR switch 237a is also connected to arcing electrode 27a such that AC power 274a is provided to arcing electrode 27a while SCR switch 237b is connected to arcing electrode 27b such that AC power 274b is provided to arcing electrode 27b. Snubber circuits may also be included as shown and as discussed therein above.

As further illustrated in FIG. 9C, the common connection to the furnace counter electrode N 28 originates at the point 270 where the two current limiting reactors (CLR) 236a and 236b are joined. The common connection may be connected only to counter electrode N 28 (which is connected to ground 244) in furnace 21 when switch 271 is closed and SCR switch-neutral 272 is firing. SCR switch-neutral 272 includes thyristors 273a and 273b. A snubber circuit including resistor 246c and capacitor 245c may also be included.

While switch 271 will normally be closed, it may be desirable to have switch 271 open if the waste stream being destroyed produces relatively little AC arc instability or transient perturbations. When the furnace 21 is operating with switch 271 closed, SCR switch-neutral 272 may be used to control the amount of current that flows from each arcing electrode 27a, 27b to the counter electrode N 28. This may be particularly important when tapping the furnace. If there is no switch system 272 and switch 271 is closed, then any current difference between electrodes 27a and 27b will flow to the counter electrode, thereby heating the bath in the vicinity of the counter electrode which can change the viscosity of the melt when tapping.

Another embodiment of the invention includes an AC arc circuit that provides independent arc voltage and arc current for use with three arcing electrodes. Such a circuit is shown in FIG. 8D.

Figure 9D:
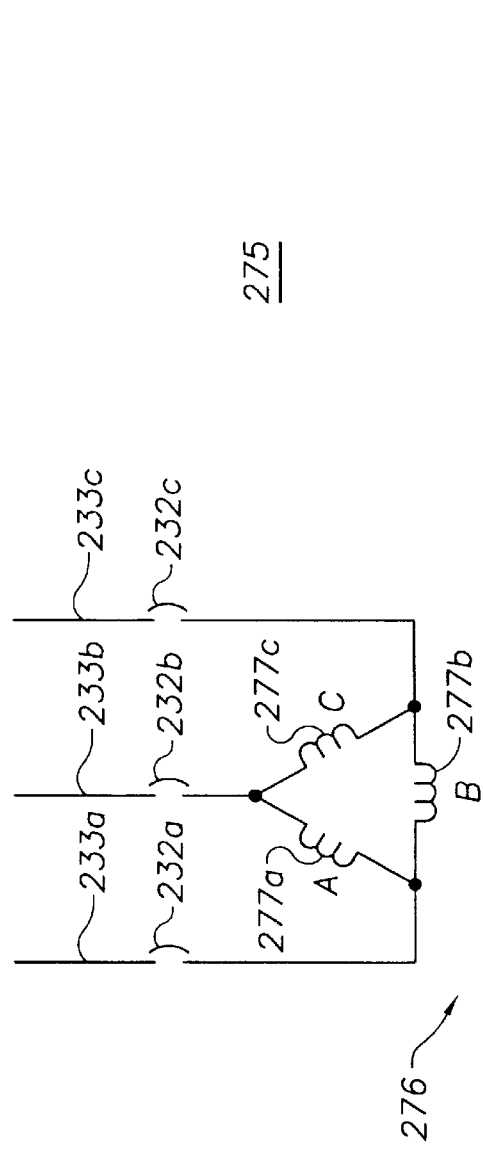
FIG. 9D illustrates an AC arc circuit with independent arc voltage and arc current control for use in systems of the present invention in which there are three arc electrodes.
Figure 1:
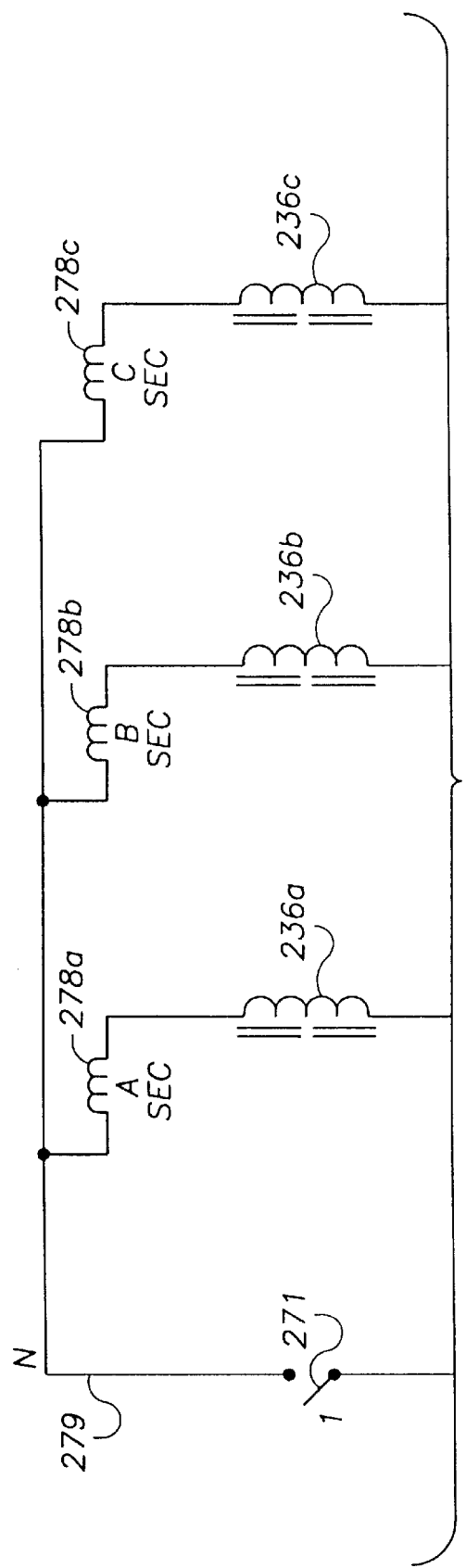
FIG. 1C shows the fully integrated system of FIG. 1B with magnetic coils for inductive heating and mixing in accordance with the present invention.

Circuit 275 shown in FIG. 9D is designed to provide AC arc power to three arc electrodes 27a–27c. The power source includes transformer 276 having primary windings 277 and secondary windings 278. Primary windings 277a, 277b and 277c receive AC power from a utility source and are respectively connected to phases 233a, 233b and 233c. Circuit breakers 232a, 232b and 232c, such as air circuit breakers, can also be included.

A wye connected secondary 278 includes secondary windings 275a, 275b and 275c in addition to neutral N 279. Switch 271 and SCR switch-neutral 272 (which includes thyristors 273a and 273b) may also be used to control the amount of AC current that will flow from the three AC arc electrodes 27a–27c to the counter electrode N 28 (which is connected to ground 244) in furnace 21. A snubber circuit including resistor 246d and capacitor 245d may also be included. When the current on the three phases is balanced, no current will flow to the counter electrode. When the current is unbalanced current and SCR switch 272 is turned "full on", the unbalanced current will flow to the counter electrode (as well as possible harmonic current). When switch 272 is phase controlled, this counter electrode current can be reduced as described above in connection with FIG. 12C.

As also shown in FIG. 9D, current limiting reactor 236a is connected in series to secondary winding 278a. SCR switch 237a is also connected in series to current limiting reactor 236a. SCR switch 237a includes thyristors 239a and 239b. In addition, load limiting reactor 238a is connected in parallel with thyristors 239a and 239b. Current limiting reactor 236b is connected in series to secondary winding 278b. SCR switch 237b is also connected in series to current limiting reactor 236b. SCR switch 237b includes thyristors 239c and 239d. In addition, load limiting reactor 238b is connected in parallel with thyristors 239c and 239d. Similarly, current limiting reactor 236c is connected in series to secondary winding 278c. SCR switch 239c is also connected in series to current limiting reactor 236c. SCR switch 239c includes thyristors 239e and 239f. In addition, load limiting reactor 238c is connected in parallel with thyristors 239e and 239h. Snubber circuits can also be included.

SCR switch 237a is also connected to arcing electrode 27a such that AC power 274a is provided for arc 66a while SCR switch 237b is connected to arcing electrode 27b such that AC power 274b is provided to arc 66b. Likewise, SCR switch 237c is connected to arcing electrode 27c such that AC power 274c is provided to arc 66c.

Figures 1, 9E:
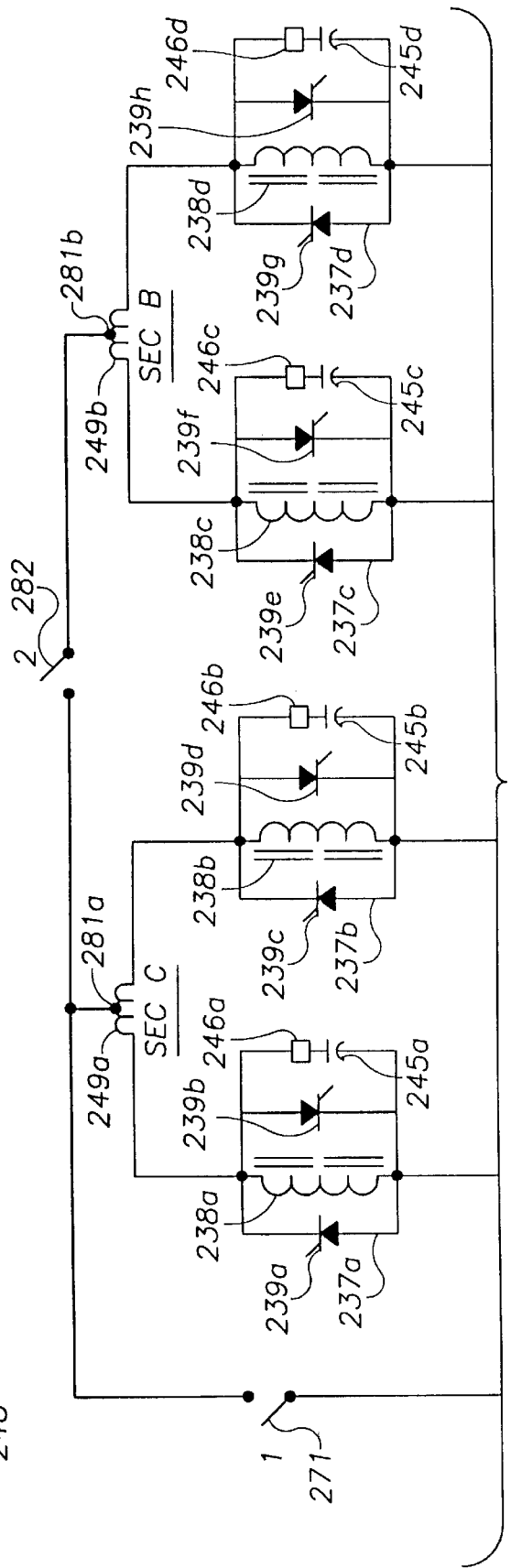
FIG. 9E illustrates an AC arc circuit with independent arc voltage and arc current control for use in systems of the present invention in which there are four arc electrodes.
Figures 2, 9E:
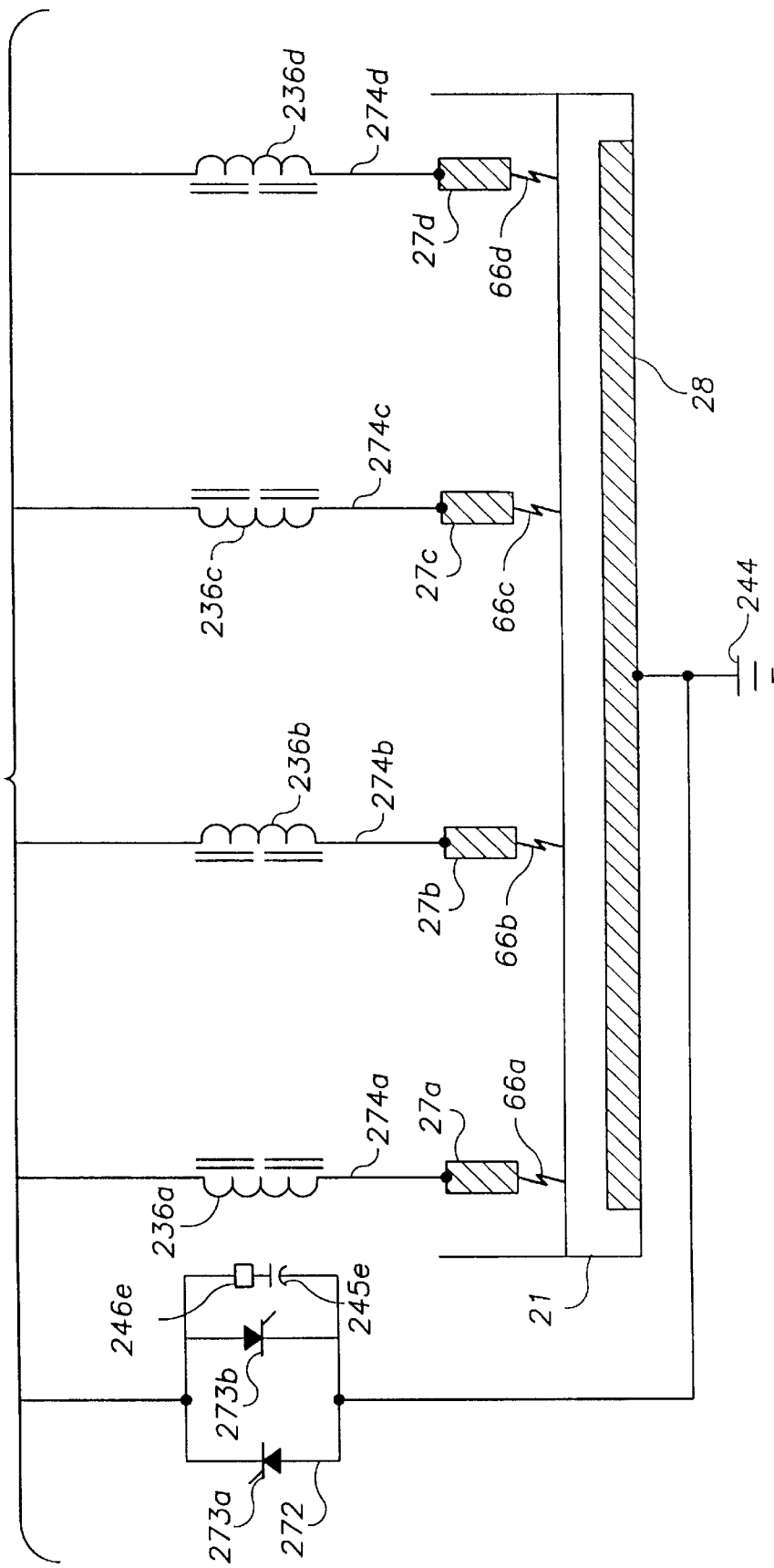

Another alternative embodiment of the invention for supplying AC power to arcing electrodes is illustrated in FIG. 9E. The circuit 280 shown in FIG. 9E is designed to provide AC arc power with independent arc voltage and arc current control to four arcing electrodes.

The power source includes a Scott-T transformer 250 for converting three phase power to two phase power via secondary windings 249a and 249b. Transformer 250 includes primary windings 248a, 248b and 248c respectively connected to phases 233a, 233b and 233c. Circuit breakers 232a, 232b and 232c, such as air circuit breakers, can also be provided.

Two SCR switches 237a and 237b are connected in parallel to the terminals of secondary windings 249a. Switches 237a and 237b include respective thyristors 239a, 239b and 239c, 239d. Load limiting reactors 238a and 238b are respectively connected in parallel to thyristors 239a–239d. The power from switches 237a and 237b are respectively used to provide AC power to arcing electrodes 27a and 27b. In addition, two SCR switches 237c and 237d are connected in parallel to the terminals of secondary windings 249b. Switches 237c and 237d include respective thyristors 239e, 239f and 239g, 239h. Load limiting reactors 238c and 238d are respectively connected in parallel to thyristors 239e–239h. The power from switches 237c and 237d are respectively used to provide AC power to arcing electrodes 27c and 27d.

The circuit shown in FIG. 9E is similar to two of the circuits shown in FIG. 9B and which may or may not have return current paths from the midpoints of secondary windings 249a and 249b to counter electrode neutral N 28, via switches 271, 282 and SCR switch-neutral 272. In particular, midpoint 281a of secondary winding 249a and midpoint 281b of secondary winding 249b can be connected to counter electrode neutral N 28 in furnace 21 using switches 271, 282 and SCR switch-neutral 272 (which includes thyristors 273a and 273b). Counter electrode 28 is also connected to ground 244. When switch 282 is open and switch 271 is open, then currents in electrodes 27a and 27b are equal as are the currents in electrodes 27c and 27d. When switch 282 is closed (and switch 271 is open), the currents in electrodes 27a and 27b are independently controlled as are the currents in electrodes 27c and 27d. Under these circumstances, there can be some interaction between each of the four electrodes. If switches 282 and 271 are closed, and SCR switch 272 is turned "full on", then each of the four electrodes may be independently controlled relative to counter electrode 28 and between them. When the current flow is balanced between all four electrodes, then the counter electrode current is zero.

A six AC arcing electrode system may be produced for use in the invention by using two identical three electrode circuits as shown on FIG. 9D. This will permit individual control of each electrode by using two, three electrode AC arc systems and interposing the electrodes of the two three electrode systems.

The systems of the present invention can also be constructed such that the arcing electrode power supplies can be varied or altered for use with AC power supply or DC power supply. FIGS. 10A–10F illustrate circuits which include the installation of switches such that by opening or closing the various switches and as discussed herein, one may convert each of the circuits so that the arc furnace may operate using either AC or DC power.

Referring now to FIG. 10A, circuit 283 provides AC or DC power to one arcing electrode. The circuit also provides independent arc voltage and current control. The circuit shown in FIG. 10A is similar to DC arc circuit FIG. 8A, but with the addition of five switches for switching between AC and DC power.

By placing the switches in either the open or closed position as provided in Table 1, the furnace arc circuit may be configured so that it may operate with either AC power or DC power or switched between such power as desired.

TABLE 1

| Switch Number | Position of Switch for DC Arc Operation | Position of Switch for AC Arc Operation |
|---|---|---|
| 284 | Open | Closed |
| 285 | Closed | Open |
| 286 | Closed | Open |
| 287 | Closed | Open |
| 288 | Open | Closed |

For example, to operate the arc portion of the furnace with DC power, switches 284 and 288 must be open and switches 285, 286 and 287 must be closed. To operate the furnace with AC power, switches 285, 286 and 287 must be open and switches 284 and 288 must be closed. One can thus provide either AC or DC power to the arcing electrode by opening and/or closing the switches as indicated.

FIG. 10B is similar to DC arc circuit FIG. 8B, but with the addition of switches for providing AC or DC power to the two arcing electrodes. In this embodiment, ten switches are used to operate the furnace with either two AC or two DC arcs. Circuit 289 shown in FIG. 10B also provides independent arc voltage and current control for AC or DC arcs.

By placing the switches in either the open or closed position as provided in Table 2, the furnace arc circuit may be configured so that it may operate with either AC power or DC power or switched between such power as desired.

TABLE 2

| Switch Number | Position of Switch for DC Arc Operation | Position of Switch for AC Arc Operation |
|---|---|---|
| 290 | Open | Closed |
| 291 | Closed | Open |
| 292 | Open | Closed |
| 293 | Open | Closed |
| 294 | Closed | Open |
| 295 | Open | Closed |

TABLE 2-continued

| Switch Number | Position of Switch for DC Arc Operation | Position of Switch for AC Arc Operation |
|---|---|---|
| 296 | Closed | Open |
| 297 | Closed | Open |
| 298 | Closed | Open |
| 299 | Closed | Open |

For example, to operate the arc portion of the furnace with DC power, switches 290, 292, 293 and 295 must be open and switches 291, 294, 296, 297, 298 and 299 must be closed. To operate the furnace with AC power, switches 291, 294, 296, 297, 298 and 299 must be open and switches 290, 292, 293 and 295 must be closed. One can thus provide either AC or DC power to the arcing electrodes by opening and/or closing the switches as indicated.

The circuit 300 illustrated in FIG. 10C is similar to the two arcing electrode AC arc circuit 266 shown in FIG. 9B, but FIG. 10C includes two diode bridge rectifiers 240*a* and 240*b* and two DC inductors 243*a* and 243*b*. Circuit 300 also includes ten switches such that the arc portion of the furnace may be operated with two DC or two AC arcs. Circuit 300 shown in FIG. 10C also provides independent arc voltage and current control.

As also shown in FIG. 10C, secondary winding 234*a* is center tapped 311. When switch 301 is closed (and switches 303 and 304 are open), the center tap 311*a* is connected to counter electrode neutral 28. In addition, when switches 303 and 304 are closed and switch 301 is open, center tap 311*b* is connected to diode rectifiers 240*a* and 240*b* as input therefor.

As further shown in FIG. 10C, when switch 302 is closed and switch 308 is open, power from switch 237*a* is the input 312*a* to diode rectifier 240*a* (during DC operation). When switch 305 is closed and switch 309 is open, power from switch 237*b* is the input 312*b* to diode rectifier 240*b* (during DC operation).

For DC operation, output 313*a* is connected to DC inductor 243*a* and arc electrode 27*a* when switch 306 is closed. Output 313*c* is connected to DC inductor 243*b* and arc electrode 27*b* when switch 307 is closed. Output 313*b* and output 313*d* from respective diode rectifiers 240*a* and 240*b* are connected to counter electrode 28 (which is connected to ground 244) when switch 310 is closed.

By placing the switches in either the open or closed position as provided in Table 3, the furnace arc circuit may be configured so that it may operate with either AC power or DC power or switched between such power as desired.

TABLE 3

| Switch Number | Position of Switch for DC Arc Operation | Position of Switch for AC Arc Operation |
|---|---|---|
| 301 | Open | Closed |
| 302 | Closed | Open |
| 303 | Closed | Open |
| 304 | Closed | Open |
| 305 | Closed | Open |
| 306 | Closed | Open |
| 307 | Closed | Open |
| 308 | Open | Closed |
| 309 | Open | Closed |
| 310 | Closed | Open |

For example, to operate the arc portion of the furnace with DC power, switches 301, 308 and 309 must be open and switches 302, 303, 304, 305, 306, 307 and 310 must be closed. To operate the furnace with AC power, switches 302, 303, 304, 305, 306, 307 and 310 must be open and switches 301, 308 and 309 must be closed. One can thus provide either AC or DC power to the arcing electrodes by opening and/or closing the switches as indicated.

The circuit 314 illustrated in FIG. 10D is similar to the three electrode DC arc circuit shown in FIG. 8C, but FIG. 10D includes twelve switches such that the arc portion of the furnace may be operated with three DC or three AC arcs. Circuit 314 shown in FIG. 10D also provides independent arc voltage and current control.

As shown in FIG. 10D, when the furnace is operated with DC, switches 324, 325 and 326 are open such that the respective outputs from SCR switches 237a, 237b and 237c are the respective inputs 241a, 241c and 241e to diode rectifiers 240a, 240b and 240c. The diode rectifiers 240a, 240b and 240c outputs 242a, 242c and 242e are connected to DC inductors 243a, 243b and 243c, which are connected to arc electrodes 27a, 27b and 27c, respectively (switches 316, 318 and 320 are closed during such operation). In addition, diode rectifier 240a, 240b and 240c outputs 242b, 242d and 242f are connected to counter electrode 28 by bus 242.

When the furnace is operated with AC, switches 324, 325 and 326 are closed and the respective outputs from SCR switches 237a, 237b and 237c are connected to counter electrode 28 by bus 328.

When the furnace is operated with DC power, switches 321, 322 and 323 are closed and switches 315, 317 and 319 are open such that the outputs from current limiting reactors 236a, 236b and 236c are the respective inputs 241b, 241d and 241f to diode rectifiers 240a, 240b and 240c. When the furnace is operated with AC power, switches 321, 322 and 323 are open and switches 315, 317 and 319 are closed such that the outputs from current limiting reactors 236a, 236b and 236c are respectively connected to arc electrodes 27a, 27b and 27c via 327a, 327b and 327c.

By placing the switches in either the open or closed position as provided in Table 4, the furnace arc circuit may be configured so that it may operate with either AC power or DC power or switched between such power as desired.

TABLE 4

| Switch Number | Position of Switch for DC Arc Operation | Position of Switch for AC Arc Operation |
| --- | --- | --- |
| 315 | Open | Closed |
| 316 | Closed | Open |
| 317 | Open | Closed |
| 318 | Closed | Open |
| 319 | Open | Closed |
| 320 | Closed | Open |
| 321 | Closed | Open |
| 322 | Closed | Open |
| 323 | Closed | Open |
| 324 | Open | Closed |
| 325 | Open | Closed |
| 326 | Open | Closed |

For example, to operate the arc portion of the furnace with DC power, switches 315, 317, 319, 324, 325 and 326 must be open and switches 316, 318, 320, 321, 322 and 323 must be closed. To operate the furnace with AC power, switches 316, 318, 320, 321, 322, and 323 must be open and switches 315, 317, 319, 324, 325 and 326 must be closed. One can thus provide either AC or DC power to the arcing electrodes by opening and/or closing the switches as indicated.

FIG. 10E shows another three electrode circuit 329 which may be switched from AC to DC or from DC to AC. This circuit is similar to the DC arc circuit shown in FIG. 8D, but the circuit shown in FIG. 10E includes thirteen switches to make the AC-DC Arc conversion. Circuit 329 shown in FIG. 10E also provides independent arc voltage and current control.

By placing the switches in either the open or closed position as provided in Table 5, the furnace arc circuit may be configured so that it may operate with either AC power or DC power or switched between such power as desired.

TABLE 5

| Switch Number | Position of Switch for DC Arc Operation | Position of Switch for AC Arc Operation |
| --- | --- | --- |
| 330 | Open | Closed |
| 331 | Closed | Open |
| 332 | Open | Closed |
| 333 | Closed | Open |
| 334 | Open | Closed |
| 335 | Closed | Open |
| 336 | Closed | Open |
| 337 | Closed | Open |
| 338 | Closed | Open |
| 339 | Closed | Open |
| 340 | Closed | Open |
| 341 | Closed | Open |
| 342 | Open | Closed |

For example, to operate the arc portion of the furnace with DC power, switches 330, 332, 334 and 342 must be open and switches 331, 333, 335, 336, 337, 338, 339, 340 and 341 must be closed. To operate the furnace with AC power, switches 331, 333, 335, 336, 337, 338, 339, 340 and 341 must be open and switches 330, 332, 334 and 342 must be closed. One can thus provide either AC or DC power to the arcing electrodes by opening and/or closing the switches as indicated.

FIG. 10F illustrates another alternative embodiment for providing power to three arcing electrodes. When the circuit shown in FIG. 10F is operated with DC power, a three phase rectifier for each electrode is utilized and when the circuit is operated with AC power, the rectifier is converted to a single phase static switch. Circuit 343 shown in FIG. 10F may be more expensive to construct than the previously described circuits.

Circuit 343 includes a three phase SCR rectifier for each electrode. When it is desirable to use AC power, each three phase rectifier is converted to a single phase static switch.

Circuit 343 includes secondary windings 344a, 344b, 344c (connected respectively to phases 232a, 232b and 232c) connected in wye and neutral 345 connected from the midpoint of the secondary windings to counter electrode 28 (which is connected to ground 244) in furnace 21.

During DC operation, the outputs of the secondary windings are connected to the current limiting reactors (CLR) 346a–346i as shown in FIG. 10F. Current limiting reactors 346a–346c are connected to thyristor phase controlled rectifier 347a, which includes thyristors 348a–348f. Current limiting reactors 346d–346f are connected to thyristor phase controlled rectifier 347b, which includes thyristors 348g–348l. Current limiting reactors 346g –346i are connected to thyristor phase controlled rectifier 347c, which includes thyristors 348m–348r. When the furnace is operated with AC power, components 347a–347c are phase controlled AC static switches.

As also shown in FIG. 10F, one side of each of the outputs of components 347a–347c is connected to the counter electrode 28 via 345 during DC operation (when switches 368, 369 and 362 are closed and switch 363 is open). The other side of each of the outputs of components 347a–347c is connected to DC inductors 371a, 371b and 371c, as shown. DC inductors 371a, 371b and 371c are connected to arc electrodes 27a, 27b and 27c. During AC operation switches 364, 365 and 366 are closed such that DC inductors 371a–371c are short circuited.

By placing the switches in either the open or closed position as provided in Table 6, the furnace arc circuit may be configured so that it may operate with either AC power or DC power or switched between such power as desired.

TABLE 6

| Switch Number | Position of Switch for DC Arc Operation | Position of Switch for AC Arc Operation |
|---|---|---|
| 349 | Open | Closed |
| 350 | Closed | Open |
| 351 | Open | Closed |
| 352 | Closed | Open |
| 353 | Closed | Open |
| 354 | Open | Closed |
| 355 | Open | Closed |
| 356 | Closed | Open |
| 357 | Open | Closed |
| 358 | Closed | Open |
| 359 | Open | Closed |
| 360 | Closed | Open |
| 361 | Open | Closed |
| 362 | Closed | Open |
| 363 | Open | Closed |
| 364 | Open | Closed |
| 365 | Open | Closed |
| 366 | Open | Closed |
| 367 | Open | Closed |
| 368 | Closed | Open |
| 369 | Closed | Open |
| 370 | Open | Closed |

For example, to operate the arc portion of the furnace with DC power, switches 349, 351, 354, 355, 357, 359, 361, 363, 364, 365, 366, 367 and 370 must be open and switches 350, 352, 353, 356, 358, 360, 362, 368 and 369 must be closed. To operate the furnace with AC power, switches 350, 352, 353, 356, 358, 360, 362, 368 and 369 must be open and switches 349, 351, 354, 355, 357, 359, 361, 363, 364, 365, 366, 367 and 370 must be closed. One can thus provide either AC or DC power to the arcing electrodes by opening and/or closing the switches as indicated.

Several alternative embodiments for the operation of the joule heating electrodes are illustrated in FIGS. 11A–11I. The joule heating electrodes are powered by AC power rather than DC power. The joule heating electrodes are not powered by DC since DC causes undesirable polarization. Load limiting reactors are not necessary in FIGS. 11A–11H because there is no arc which will be extinguished at the joule heating electrodes regardless of wave form.

Figure 11A:
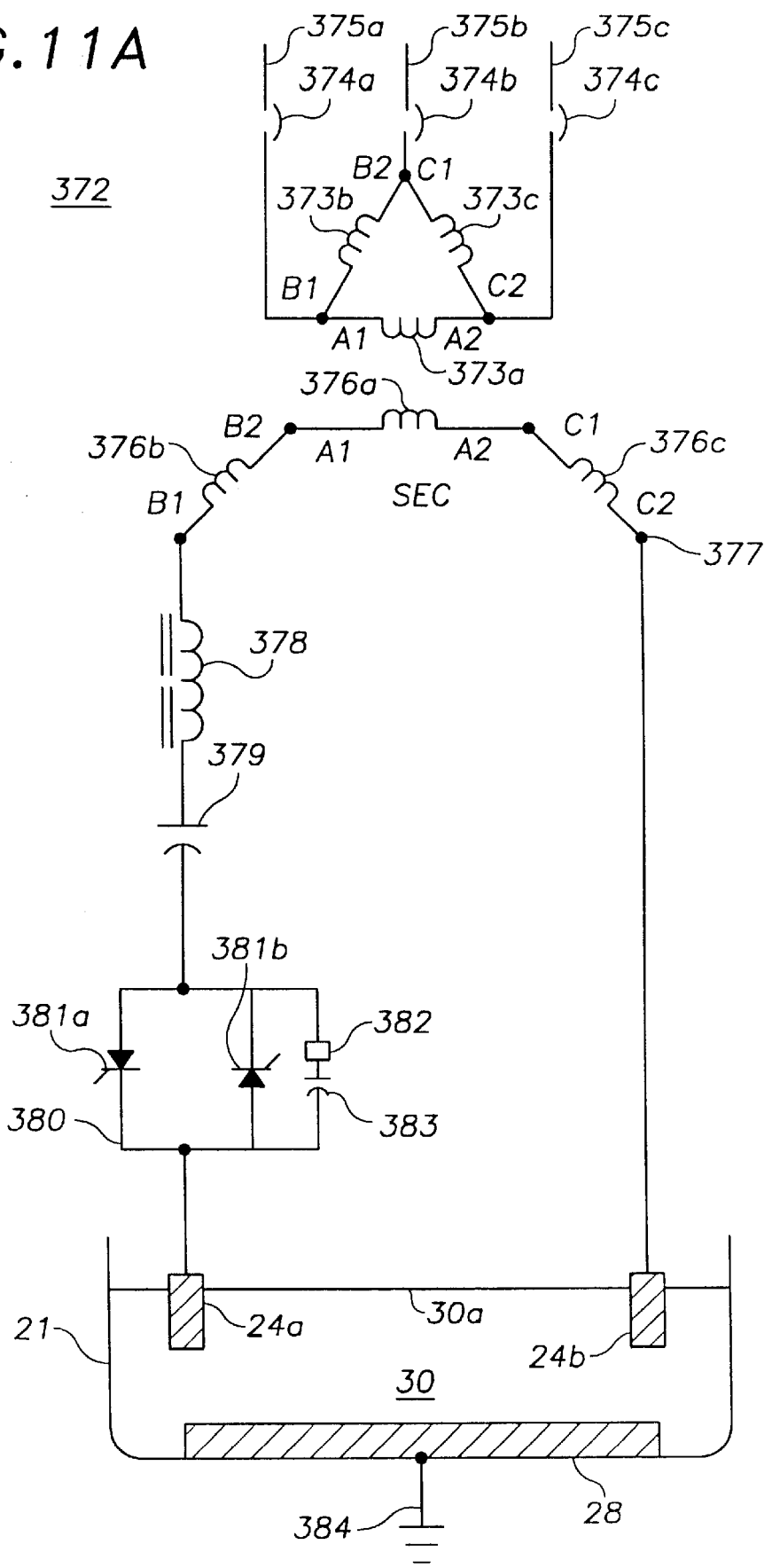

Referring now to FIG. 11A, an AC circuit 372 is shown that provides joule heat to two electrodes. As shown in FIG. 11A, electrodes 24a and 24b are partially submerged below slag level 30a in furnace 21. Counter electrode 28 is connected to ground 384 and can be used with the arcing electrode circuits described above.

Circuit 372 includes primary windings 373a, 373b and 373c connected respectively to phases 375a, 375b and 375c. Circuit breakers 374a, 374b and 374c, such as air circuit breakers, can also be provided as shown. As shown in FIG. 11A, primary windings 373 are connected in delta.

Circuit 372 also includes a "U" type secondary circuit 376 having secondary windings 376a, 376b and 376c. This arrangement may be desirable for operation with a small furnace since it only uses two joule heating electrodes. One terminal 377 is connected directly to electrode 24b. Because, terminal ($C_2$) 377 is connected directly to electrode 24b, this electrode can adequately ground the "U" secondary winding 376.

As also shown in FIG. 11A, one terminal of secondary winding 376b is connected to current limiting reactor 378. Current limiting reactor (CLR) is connected in series to capacitor 379 and SCR switch 380 (which includes thyristors 381a and 381b). Switch 380 is connected to electrode 24a and electrode 24b is connected to terminal ($C_2$) 377, as shown. As discussed above, a snubber circuit (including resistor 382 connected in series with capacitor 383) connected in parallel with thyristors 381a and 381b can also be included.

One difference between the circuit shown in FIG. 11A and that shown in FIG. 9A is that the DC blocking capacitor (C) 379 is connected in series with electrode 24a. Capacitor 379 blocks DC (from the arcing electrode circuits when such circuits are operated with AC or DC) from interfering with the joule heating circuits. It is noted that it takes very little DC current to cause saturation of the core of the transformer which feeds the joule heating circuit and therefore, a small amount of DC current entering the joule heating power system can cause significant damage. With AC interacting with AC (i.e. AC arc electrodes and AC joule heating electrodes), much more interacting AC current from the arcing electrodes (as compared with the DC-AC arrangement) is required before the interaction is even noticeable and much more AC current is required to appreciably heat (to the point of damaging) a transformer. It will be appreciated that the relative magnitude of current which will heat or damage a transformer is dependent on a number of transformer design parameters.

Figure 11B:
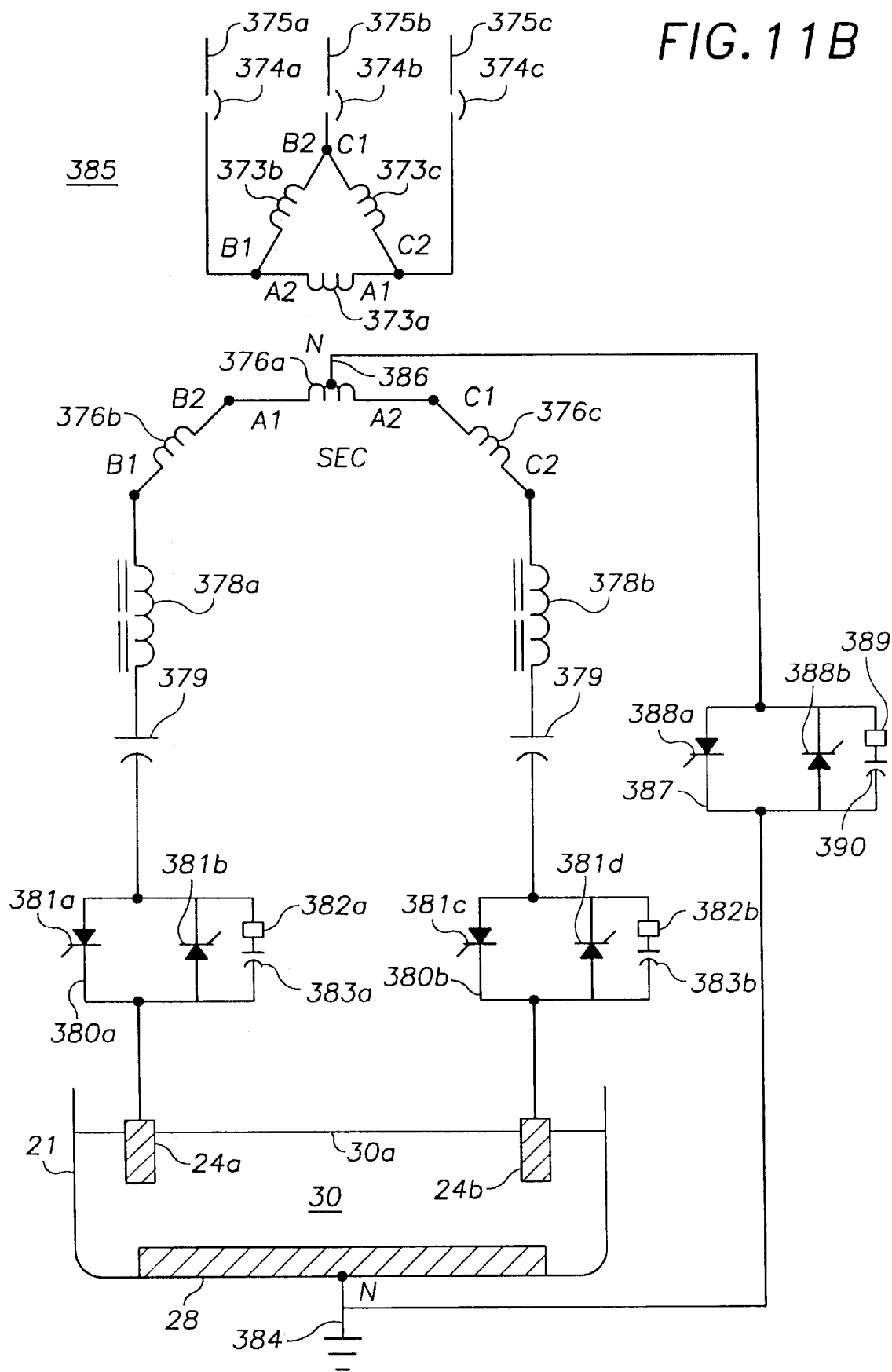

FIG. 11B illustrates another circuit for providing joule heat to two joule heating electrodes. The circuit 385 shown in FIG. 11B is designed such that both electrodes 24a and 24b have SCR static switches 380a and 380b to independently control the current in electrode 24a and electrode 24b. In addition SCR switch-neutral 387 (which includes thyristors 388a and 388b) can be used to control the amount of AC current which may flow between electrode 24a and counter electrode N 28 as well as between counter electrode N 28 and electrode 24b. In addition, because the secondary transformer winding 376a is center tapped with neutral 386, then it is necessary to have capacitors 379a and 379b in series with electrode 24a and electrode 24b, respectively, to prevent interaction of AC or DC arc current from interfering with the joule heating circuit. Snubber circuits may also be included in parallel with the SCR switches.

Figure 11C:
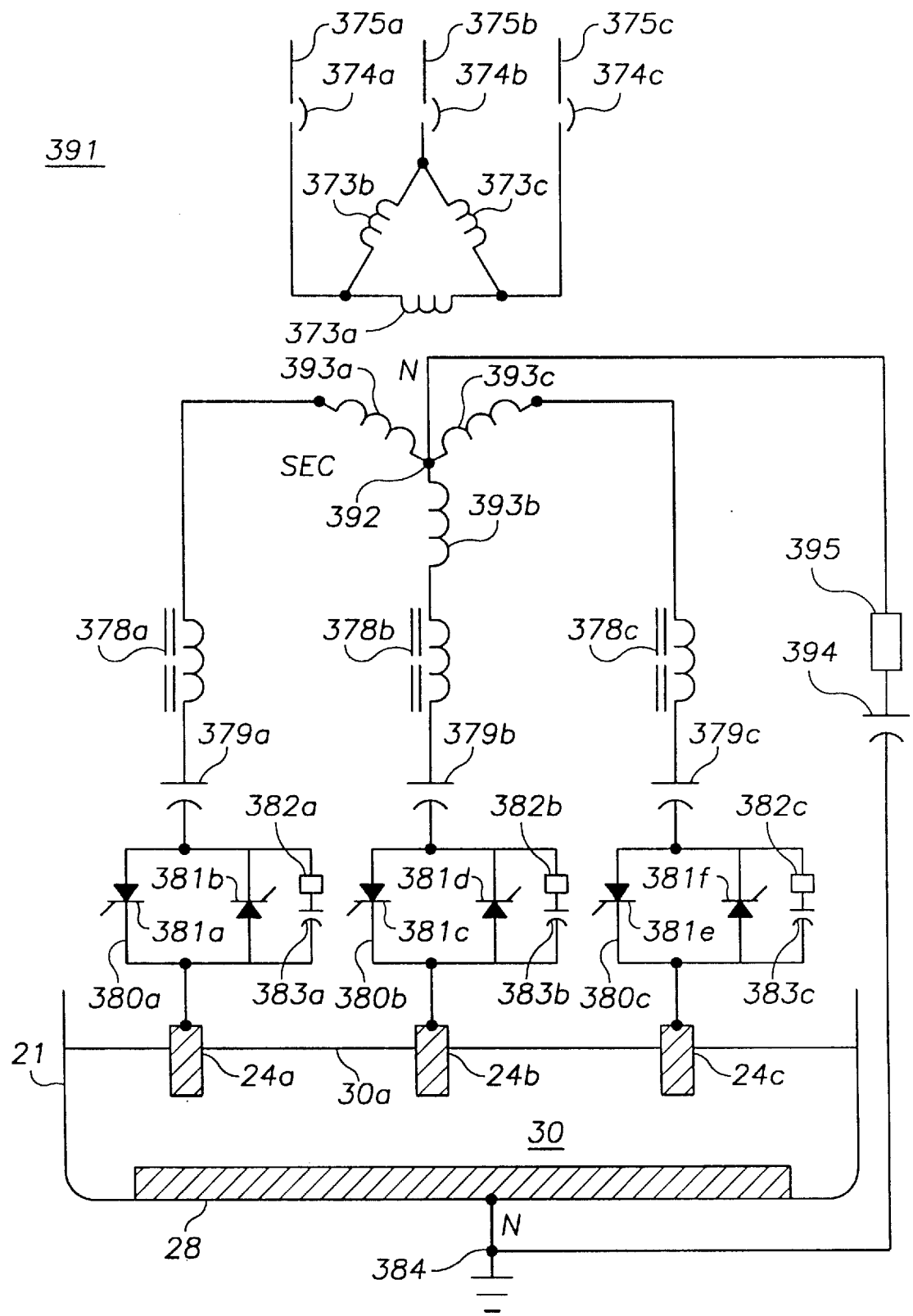

FIG. 11C is similar to the AC arc circuit shown in FIG. 9D with the addition of three capacitors, one in series with each joule heated electrode circuit. In addition, a capacitor 394 ($C_N$) and resistor 395 are connected (in place of switch 272 in FIG. 9D) between the neutral point N 392 on the wye secondary transformer windings 393a–393c and counter electrode 28 to minimize electrical noise.

As shown in FIG. 11C, circuit 391 includes primary windings 373a, 373b and 373c and secondary windings 393a, 393b and 393c. Secondary windings 393a, 393b and 393c are connected in wye with the neutral point 392 connected to capacitor 394, resistor 395 and counter electrode neutral 28. This is done to ground the neutral, but since the counter electrode is also connected to the neutral, both the neutral and counter electrode are grounded.

Figure 11D:
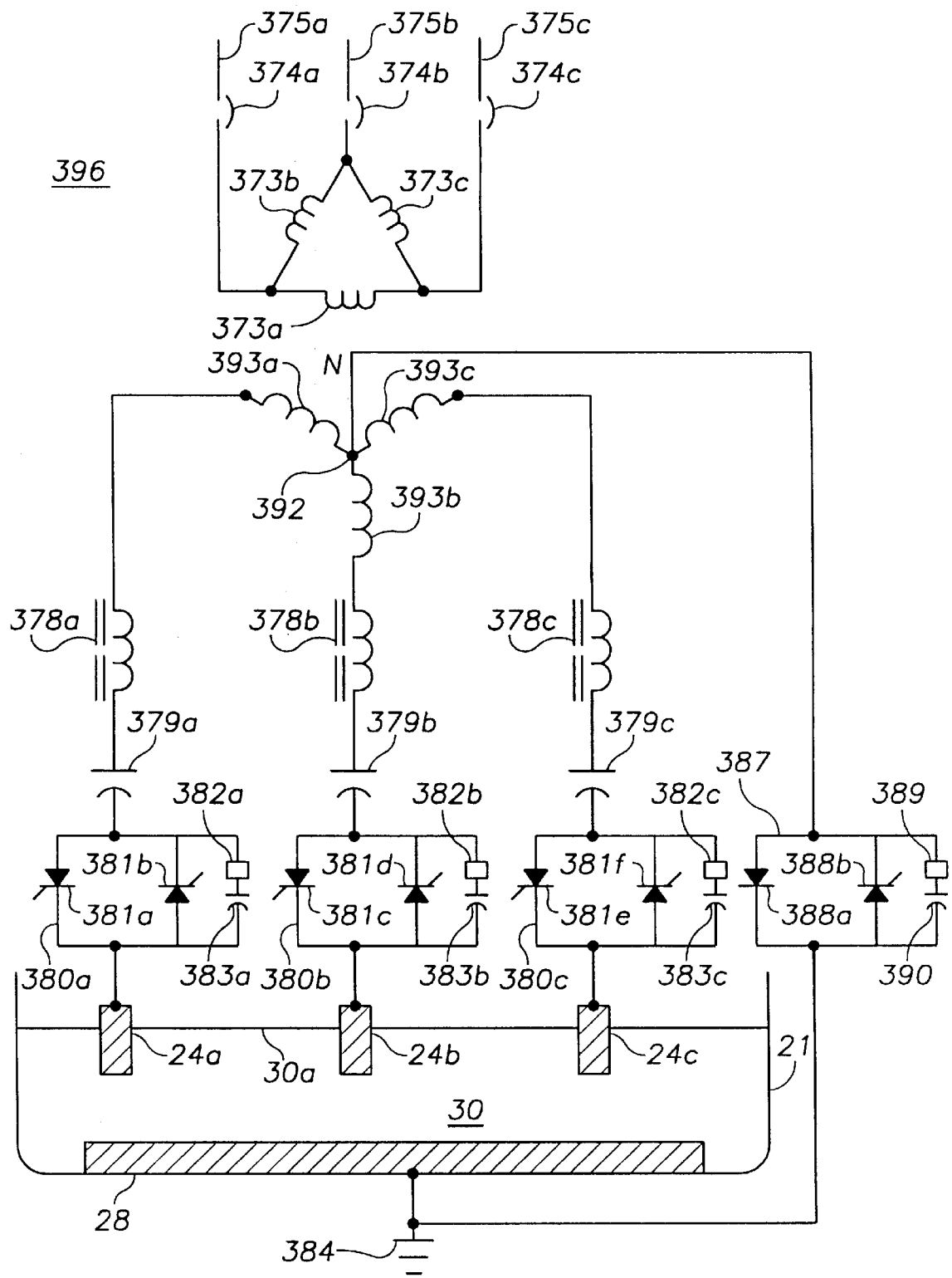

Circuit 396 illustrated in FIG. 11D is similar to circuit 391 shown in FIG. 11C, except that the surge grounding capacitor 394 in FIG. 11C is replaced by SCR switch-neutral 387

(which includes thyristors 388a and 388b). SCR switch-neutral 387 permits control of AC current by phase control of the SCR's from the three electrodes 24a, 24b and 24c to the counter electrode N 28. The SCR switch controls the amount of current which can flow to the neutral if the three electrode currents are not balanced.

Figure 11E:
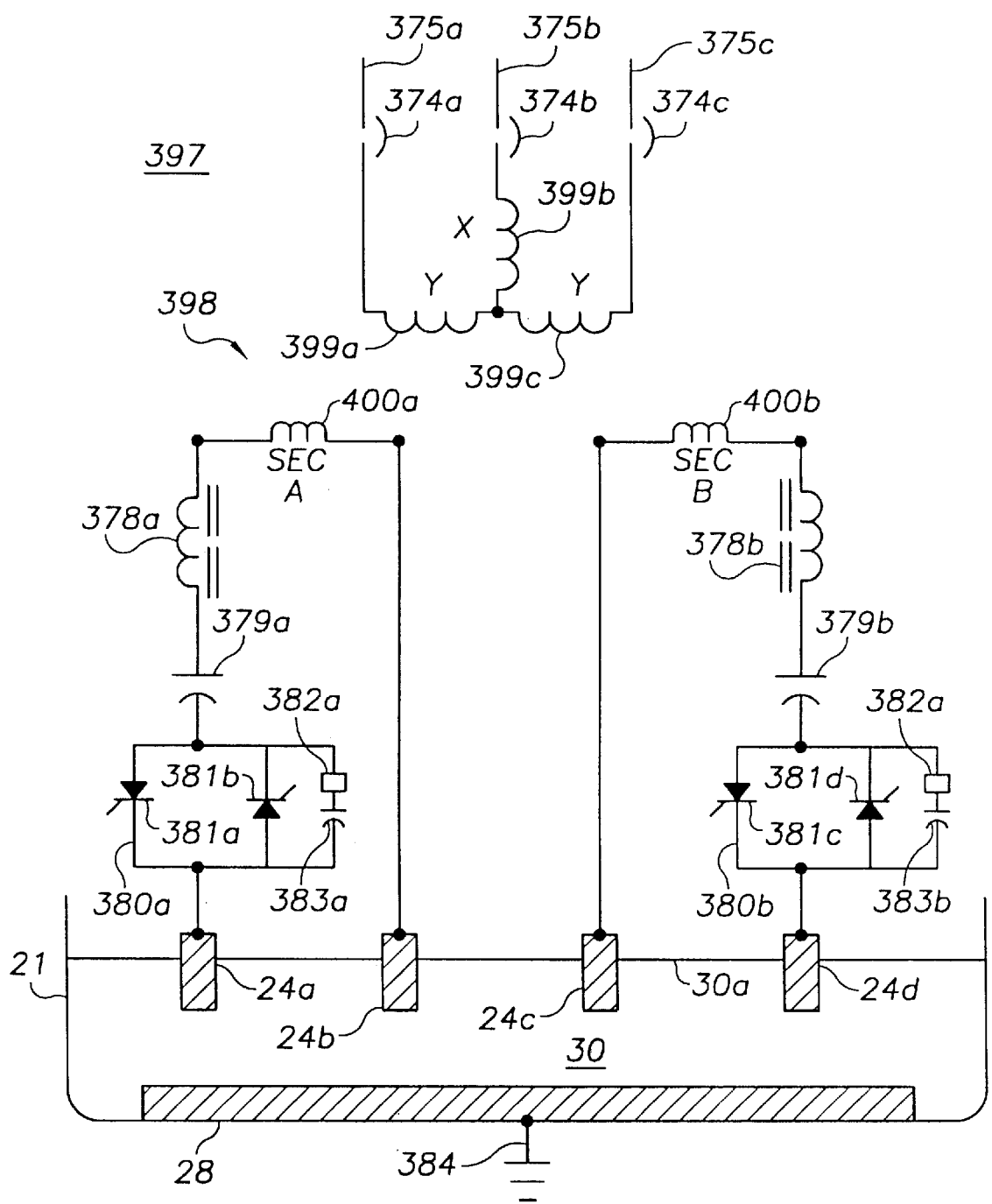

Referring now to FIG. 11E, another circuit 397 is shown for providing joule heat to a four electrode arrangement. In this embodiment, Scott-T transformer 398 includes primary windings 399a, 399b and 399c (connected to respective phases 375a, 375b and 375c) and two isolated transformer secondary windings 400a and 400b, thereby making each circuit connected to secondary winding 400a and secondary winding 400b similar to that shown in FIG. 11A. This allows joule heat to be provided to four joule heating electrodes 24a, 24b, 24c and 24d. Circuit breakers 374a, 374b and 374c, such as air circuit breakers, may also be provided.

Figure 11F:
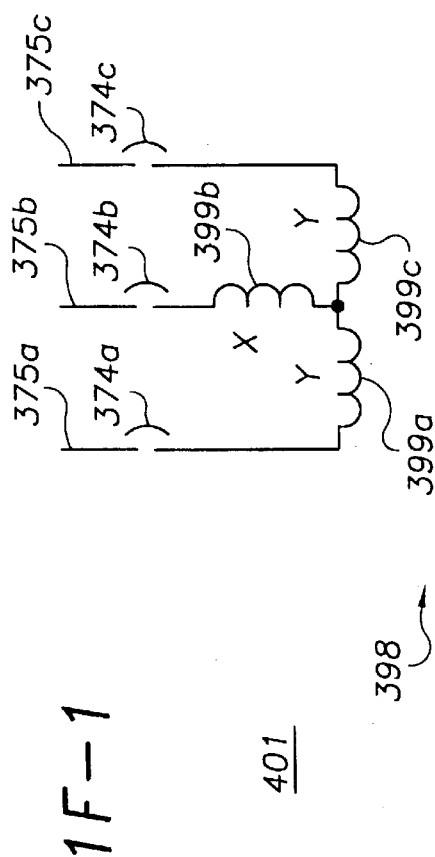
Figure 1:
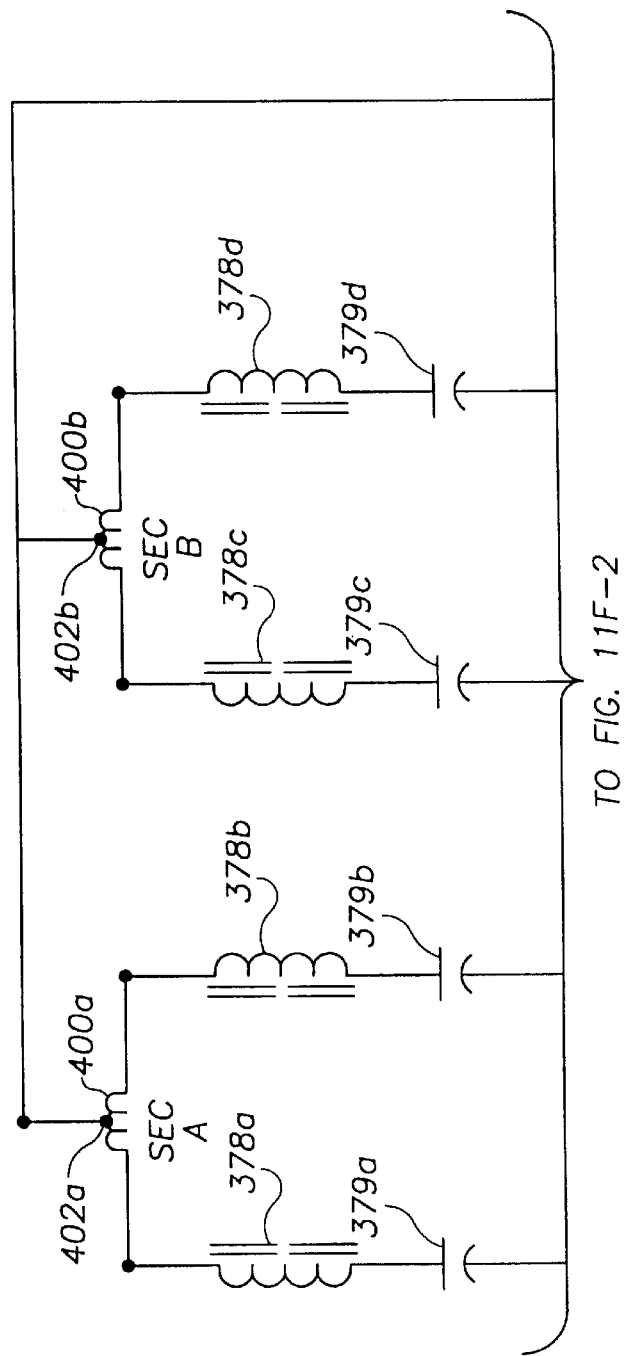

FIG. 11F illustrates another four electrode Scott-T transformer circuit for providing joule heat in accordance with the present invention. Circuit 401 shown in FIG. 11F shows secondary winding 400a and secondary winding 400b center tapped, 402a and 402b, respectively. The center taps 402a and 402b are electrically connected to the counter electrode N 28 by way of SCR switch-neutral 387 (which includes thyristors 388a and 388b, and which may also include a snubber circuit connected in parallel, as shown). With each of the four joule heating electrodes 24a, 24b, 24c and 24d isolated by their capacitors 379a–379d from DC, this circuit also provides excellent control of the counter electrode current due to the phase control provided by the five SCR switches, 380a, 380b, 380c, 380d and 387 if the four currents from switches 380a–380d are not equal. Current can only flow between the secondary neutral and the counter electrode if the current through any or all of the electrodes are not equal. The static switch in the neutral can be used to control the magnitude of the unbalanced AC current which may flow through this static switch.

Figure 11G:
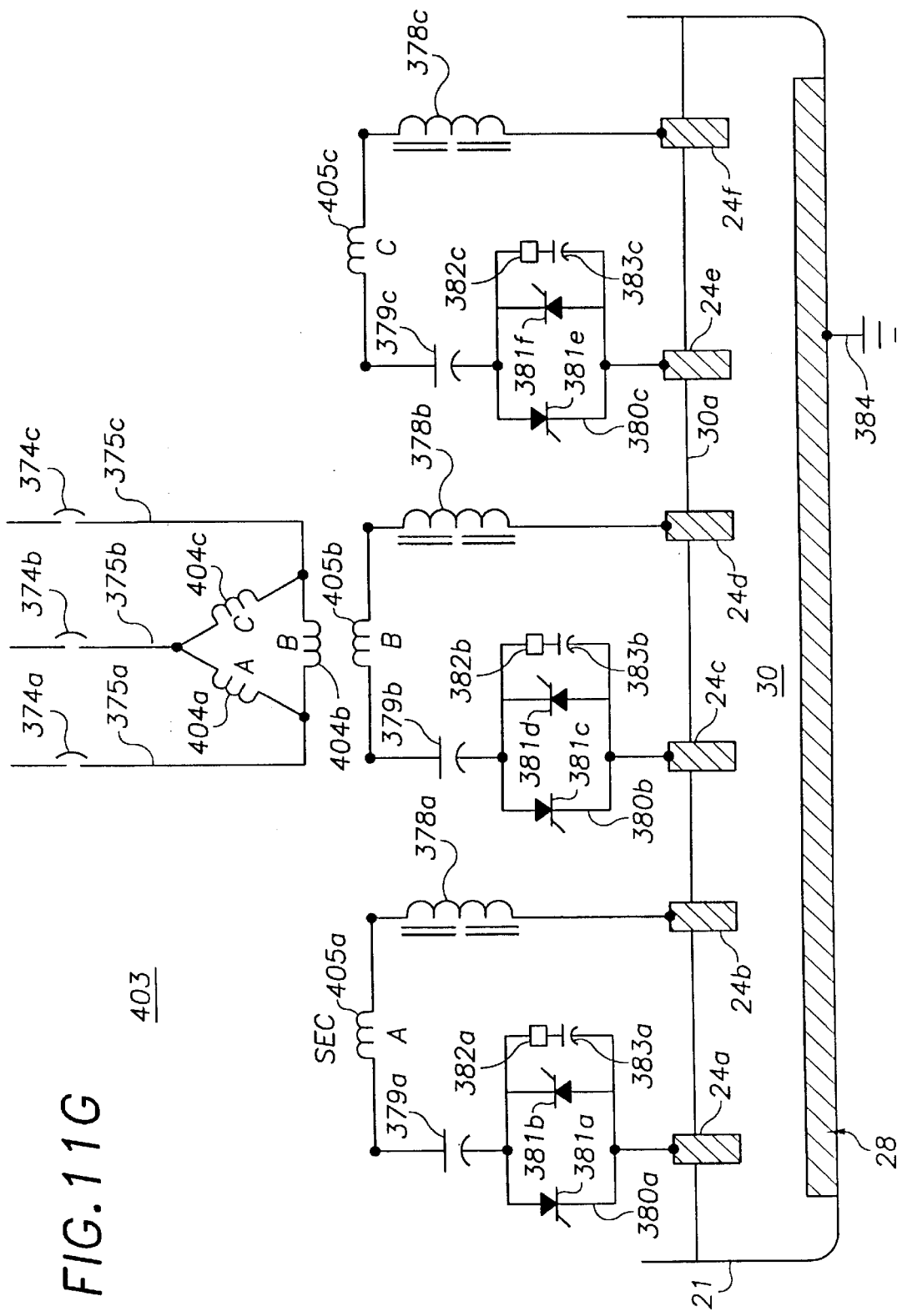

Another embodiment for providing joule heat to six joule heating electrodes is shown in FIG. 11G. Circuit 403 is a six electrode AC joule heating circuit similar to the four electrode circuit in FIG. 11E, but with a different transformer arrangement.

The transformer includes primary windings 404a, 404b and 404c (for phases 375a, 375b and 375c). Circuit breakers 374a–374c, such as air circuit breakers, may also be included. Secondary windings 405a, 405b and 405c are respectively connected to current limiting reactors 378a, 378b and 378c, which are respectively connected to joule heating electrodes 24b, 24d and 24f. Secondary windings 405a, 405b and 405c are also respectively connected to capacitors 379a, 379b and 379c, which are connected in series to SCR switches 380a, 380b and 380c, respectively.

Switches 380a, 380b and 380c are respectively connected to joule heating electrodes 24a, 24c and 24e. The secondary windings in the embodiment shown in FIG. 11G are not center tapped as in FIG. 11E. Only one CLR is needed per circuit and because there is no winding center tap or neutral in the circuit shown in FIG. 11G, only one AC static switch per phase is used or required per secondary transformer winding.

As shown in FIG. 11G, current limiting reactors 378a–378c are connected to electrodes 24b, 24d and 24f. Alternatively, the current limiting reactors can be connected in series with SCR switches 380a, 380b and 380c (which are connected to electrodes 24a, 24b and 24e). Capacitors 379a–379c can be connected to either electrode, irrespective of the position of the SCR switches and/or current limiting reactors. These alternatives apply to the other joule heating electrode circuits described hereinabove.

It should be noted that where circuits have a neutral or center tap (or if two or three secondary windings are connected to one another or where two electrodes are fed from the same winding), it is preferred to provide a means of controlling current to each electrode. This is accomplished in FIGS. 11F and 11H by the current limiting reactors, SCR switches (or saturable reactors if used in place of the SCR switches since saturable reactors perform the same function as static switches) and capacitors.

Figures 1, 11H:
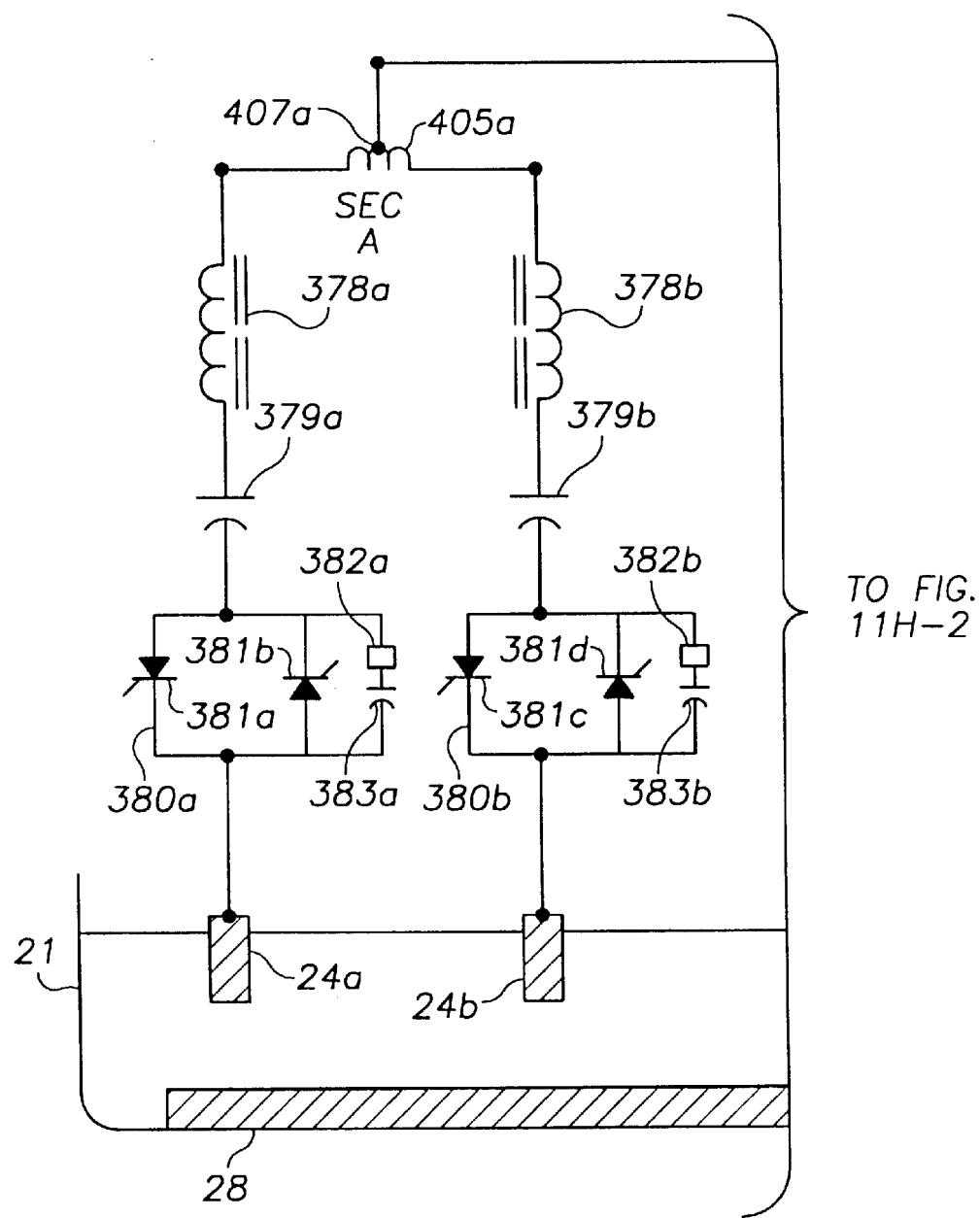
Figures 2, 11H:
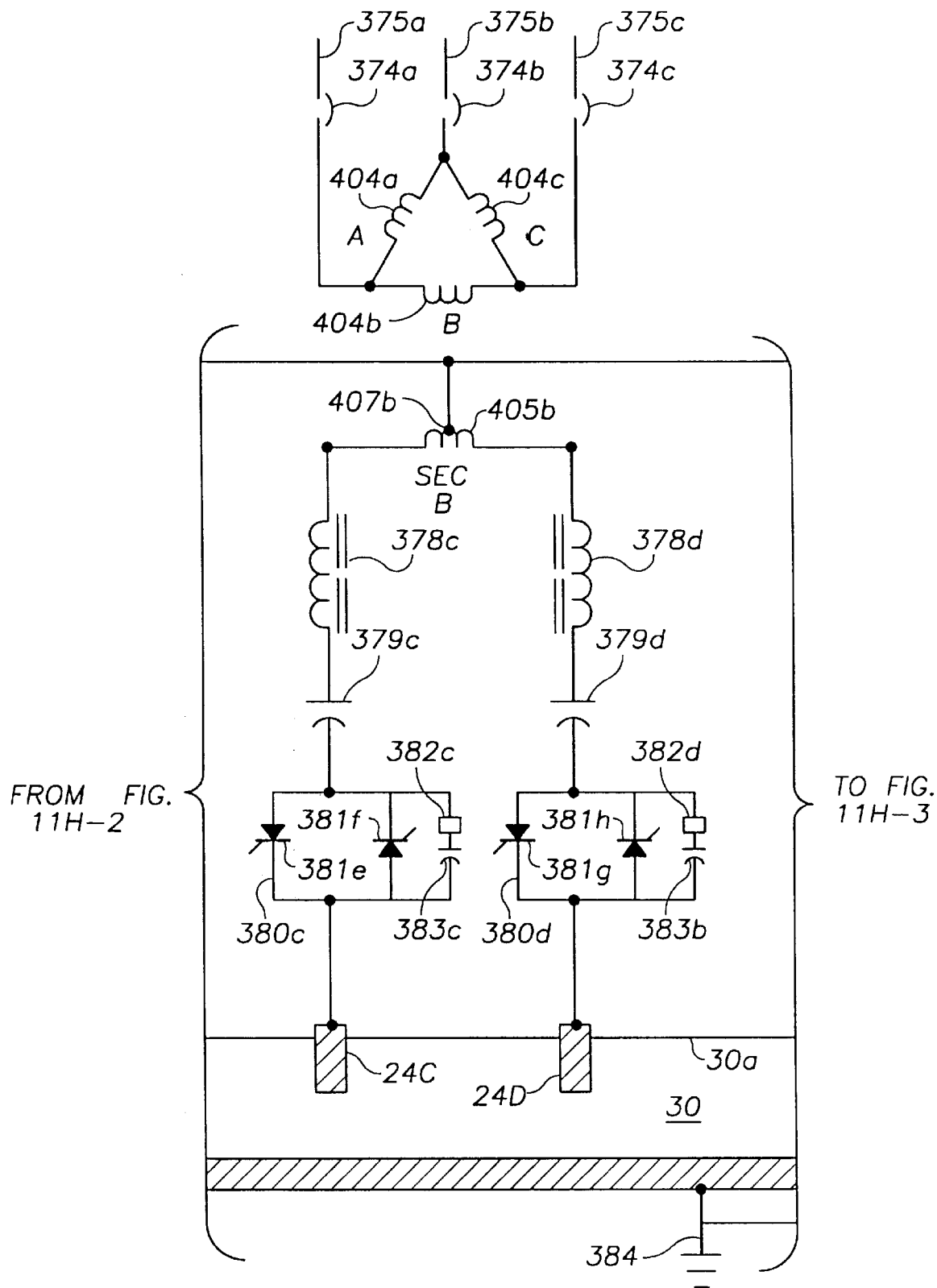
Figures 3, 11H:
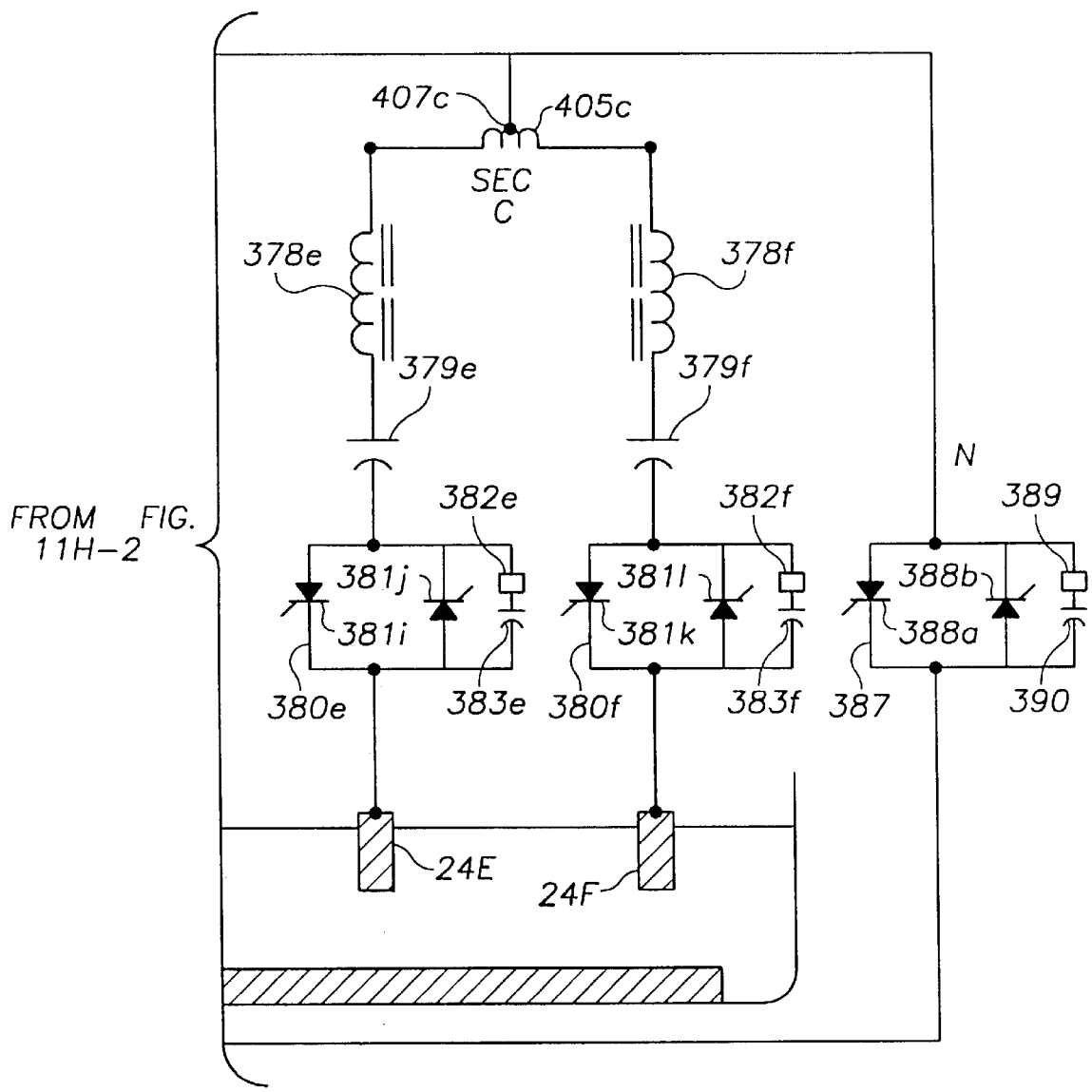
Figure 111:
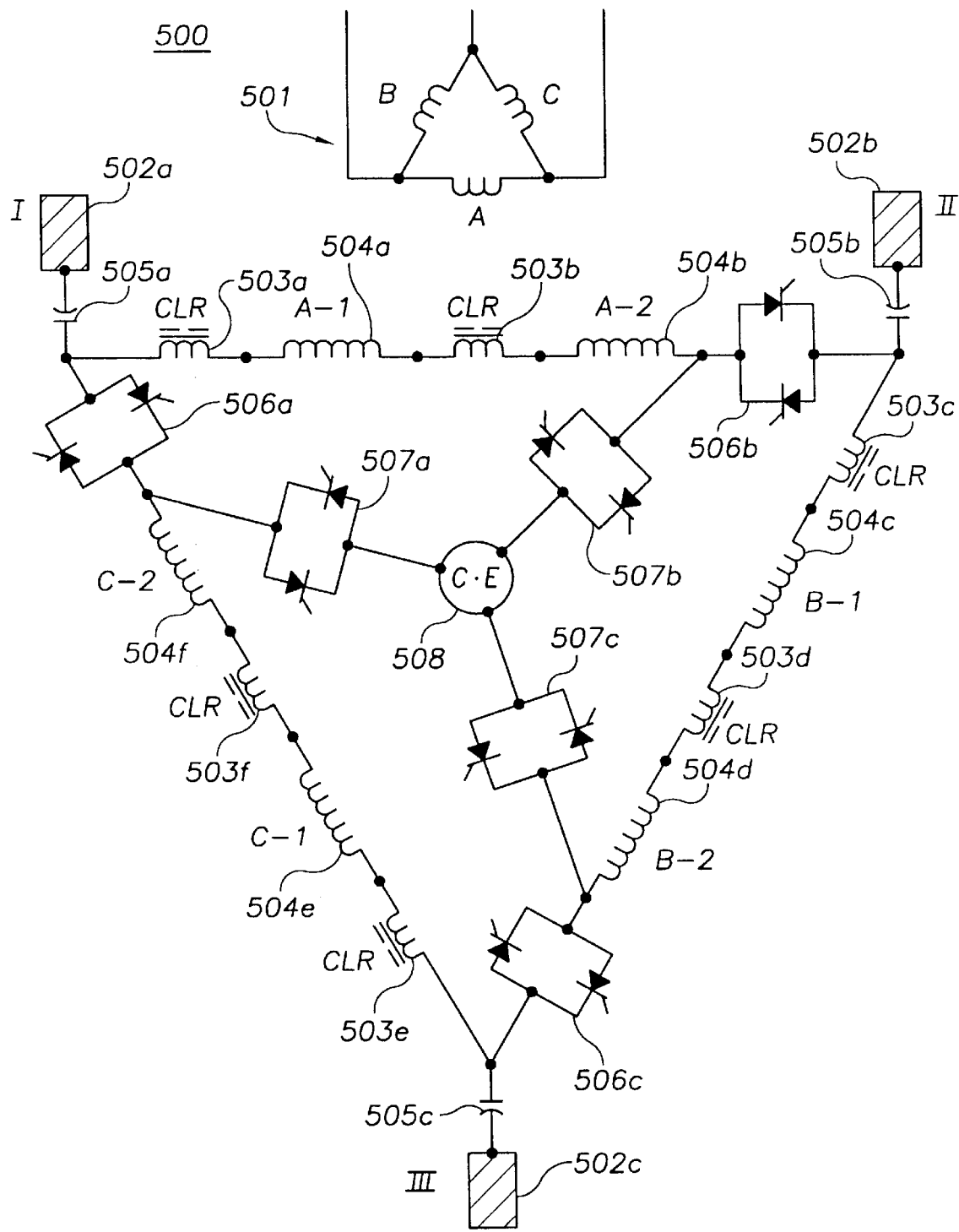

FIG. 11H illustrates another embodiment for providing joule heat to six electrodes. The six electrode circuit 406 shown in FIG. 11H is similar to the four electrode circuit shown in FIG. 11F, but the circuit in FIG. 11H does not include a Scott-T transformer. In FIG. 11H, all six electrodes can have their current controlled independently. In FIG. 11H, electrodes 24a and 24b have the same current, electrodes 24c and 24d have the same current and electrodes 24e and 24f have the same current (although the currents in electrodes 24a and 24b can be different from the current in electrodes 24c and 24d and from the current in electrodes 24e and 24f).

Secondary windings 405a, 405b and 405c are respectively center tapped 407a, 407b and 407c and connected counter electrode neutral 28 by SCR switch-neutral 387 (which includes thyristors 388a and 388b).

FIG. 11I illustrates another embodiment for providing joule heat in accordance with the present invention. As shown in FIG. 11I, joule heating circuit 500 includes primary windings 501 and secondary windings 504a–504c. Circuit 500 also includes current limiting reactors 503a–503f, capacitors 505a–505c, static switches 506a–506c, static switches 507a–507c and counter electrode 508. Each of the phases in the secondary windings can be connected in series (as shown) or in parallel. For example, the B phase secondary windings may each be 120 volts and connected in series as illustrated for a total of 240 volts or in parallel for 120 volts. (Reactor 503c is always connected in series with B-1 (504c) and reactor 503d is always connected ins series with B-2 ( 504d). Phases A and C can be similarly connected.

Circuit 500 is expected to provide an independently controlled delta circuit current (i.e. the current through the three joule heating electrodes 502a–502c when static switches 506a–506c are conducting current) to each of the electrodes without providing an external electrical circuit connection to the counter electrode. This means that the controlled delta current will flow between each of the joule heating electrodes if no other path or paths are available to divert a portion of the electrode current to a conductive path having a lower resistance than other portions of the molten slag in which the joule heating electrodes are immersed.

This delta current is controlled by static switches 506a, 506b and 506c. If the delta static switches are in the open circuit or non conducting state, and if static switches 507a, 507b and 507c are placed in a conducting state, these solid state switches (switches 507a, 507b and 507c) will then permit the same secondary windings to assume a wye configuration. Further, if both the delta static switches and the wye static switches are both delivering current to the bath in the same overall time frame, not only will the overall volume of the slag heating be more effectively controlled, but the J×B electromagnetic fields will also provide stirring action that can be controlled by either manual or automatic control circuitry. Consequently, enhanced beneficial bath mixing may be achieved.

The embodiments described hereinabove allow for simultaneous operation of the arcing electrodes and the joule heating electrodes without detrimental interaction with each other. The capacitors in the joule heating circuits will block the flow of direct current from the arcing electrode circuits when DC operation is in use. In addition, when the furnace is operated with AC arcing electrodes and AC joule heating electrodes, there will not be detrimental interaction. As described above, it takes very little DC current to cause saturation of the core of the transformer which feeds the joule heating circuit and therefore, a small amount of DC entering the joule heating power system can cause significant damage. With AC interacting with AC (i.e. AC arc electrodes and AC joule heating electrodes), much more interacting AC current from the arcing electrodes (as compared with the DC-AC arrangement) is required before the interaction is even noticeable and much more AC current is required to appreciably heat a transformer.

If the arc technology was used alone, the electrode hearth diameter ratio would have to be large to ensure that the contents in the hearth are melted sufficiently not only at the center of the hearth, but also at the walls of the hearth. The size of the hearth therefore would be limited due to practical limitations on electrode diameter. When the hearth or glass tank is joule heated, however, this limitation no longer exists and the tank can be sized to ensure the residence time is adequate for complete mixing and dissolution of all glass components.

If the melter technology were employed without the arc, the feed rates would be much lower due to limitations in heat transfer from the melt pool to the unmelted feed above the molten glass. To accommodate large throughput requirements, the standard approach is to increase the melt surface area. Accordingly, the joule heated melter would need to be much larger for a given processing rate than the combined arc-melter system of the present invention. The present invention utilizes the benefits of both the arc and AC joule heated melter technologies, and does so in a single optimized system.

Joule heating alone may be used to maintain the molten bath during long idling periods, thereby reducing electrical power requirements. Moreover, because the molten bath is electrically conducting the arc plasmas may be readily restarted in the transfer arc mode.

The combination of the arc plasma furnace and joule heated melters in accordance with the present invention provide a method of quickly heating feed waste material resulting in higher processing rates for a given sized furnace system. The controlled heating rate also can result in the production of a higher quality of pyrolysis gas. More energy is recovered and there are less pollutants in the gas emissions. Additionally, the joule heated melters of the present invention provide a larger reservoir with demonstrated mixing to produce a homogeneous glass product with very high stability. This is beneficial since vitrified glass product is stable over geologic time frames. See e.g., Buelt et al., *In Situ Vitrification of Transuranic Wastes: Systems Evaluation and Applications Assessment,* PNL-4800 Supplement 1, Pacific Northwest Laboratory, Richland, Wash. (1987). Additionally, the present invention provides further volume reduction through the vitrification of the ash as compared with that ash that would be generated from incineration alone. See, Chapman, C., *Evaluation of Vitrifying Municipal Incinerator Ash, Ceramic Nuclear Waste Management IV,* Ceramic Transactions, G. G. Wicks, Ed., Vol. 23, pp. 223–231, American Ceramic Society (1991).

The products produced in accordance with the present invention can be vitreous, glass-like materials. Alternatively, the structure of the materials can be devitrified and crystalline in nature. In addition, the products can be ceramic materials having properties ranging from pure crystalline materials to amorphous vitreous products, or any combination thereof. The crystallinity or non-crystallinity of the products can be altered by the composition of the feed material (including, but not limited to, the addition of additives during processing in the unit) and/or by alteration of the slag after the slag has been poured or removed from the waste conversion unit. Because crystallinity can have beneficial or detrimental affects on the stability and/or non-leachability of the final products formed, treatment of the slag after removal from the waste conversion unit can be modified according to the desired characteristics of the final product.

As discussed above, the present invention provides methods and apparatus that facilitate rapid pyrolysis. Rapid pyrolysis results in a pyrolysis gas having higher purity than other means of pyrolysis. The high purity gas facilitates use with high efficiency small gas turbine technology, thereby significantly increasing efficiency as compared with conventional steam turbines and decreasing the unit size of the turbine required. The DC or AC arc(s) provides a high temperature heat source to accomplish the fast pyrolysis effectively. Graef, et al., *Product Distribution in the Rapid Pyrolysis of Biomass/Lignin for Production of Acetylene,* Biomass as a Nonfossil Fuel Source, American Chemical Society (1981) have shown that under conditions such as those found in a plasma furnace, municipal solid waste can be pyrolyzed into a gaseous product as shown in Table 7.

TABLE 7

Gas Composition from Pyrolysis of MSW in Plasma Furnace.

| Gas Species | Percent Conversion to useful gas for combustion | |
|---|---|---|
| | >65% Fast Pyrolysis | 45%–50% Normal Pyrolysis |
| $CO_2$ | 2% | 10% |
| CO | 44% | 50% |
| $H_2$ | 43% | trace |
| $CH_4$ | 2% | 38% |
| Light HC's | bal | bal |
| HHV (BTU/SCF) | 350–400 | 300–350 |

It is important to note that in comparing normal pyrolysis to that of rapid pyrolysis, a greater fraction of the incoming waste is converted to gas. Thermal or normal pyrolysis promotes liquefaction giving only 45–50% conversion to pyrolysis gases, while rapid pyrolysis has gas yields of greater than 65%. Rapid pyrolysis of municipal waste has been demonstrated using a water cooled, metal plasma torch. See, Carter, et al., *Municipal Solid Waste Feasibility of Gasification with Plasma Arc, Industrial and Environmental Applications of Plasma,* Proceedings of the First International EPRI Plasma Symposium (May 1990). In the partial oxidation mode of operation, the residue from both techniques is oxidized to offset the pyrolysis energy requirements.

The pyrolysis gases produced in accordance with the present invention are expected to be well suited for combustion in a state of the art, high efficiency gas turbine generator. With the efficiency of new gas turbine-combined cycle systems approaching 50%, the present method of waste-to-energy conversion provides an effective alternative to standard waste incinerators. Under favorable conditions, the incinerator-steam generator systems achieve 15–20% efficiency in the conversion of the potential energy contained in the waste to usable electric energy.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibit substantial volume reduction over prior art vitrification products. The solidified form is suitable for disposal without health risks or risks to the environment.

In another embodiment of the invention, tunable arc plasma-melter systems are employed utilizing a molten oxide pool. The composition of the molten oxide pool can be modified to have electrical, thermal and physical characteristics capable of processing metals, non-glass forming wastes and low-ash producing wastes in a manner capable of generating a low to medium BTU gas. The conductivity of the molten pool is controlled by adding melt modifier materials so that the joule heated portion of the system can effectively maintain the temperature of the melt even under conditions such as 100% joule heating operation. It is desirable to maintain the electrical resistivity of the molten pool in a certain range. For example, for some configurations of the tunable arc plasma melter, it is desirable that the molten pool composition be maintained with an electrical resistivity above 1 Ohm-cm for effective joule heating of the molten oxide pool. Depending on the waste being treated and the bath temperature, the electrical resistivity is preferably in the range of 1–200 Ohm-cm, and more preferably, in the range of 5–15 Ohm-cm.

This embodiment of the invention provides tunable arc plasma-melter systems exhibiting a high degree of controllability and efficiency for a wide variety of waste streams that have been particularly difficult to treat in the past. Exemplary non-glass forming wastes include tires and metals such as iron. Illustrative low-ash producing organics include plastics, oils, solvents and the like. Waste streams such as hazardous organic liquids, mixtures of low-ash producing organics and metals, or organic matter with limited ash content and high metal content can all be processed utilizing the controlled composition molten oxide pool variation of the tunable plasma arc melter system. Wastes such as sludges containing primarily reduced metals are not well suited for processing in joule heated glass tanks due to the high electrical conductivity of the resultant melt. However, using the controlled composition oxide pool mode of operation, the tunable arc plasma process can even process melts that result in molten metal baths which are gravimetrically separated from the slag.

Figure 12:
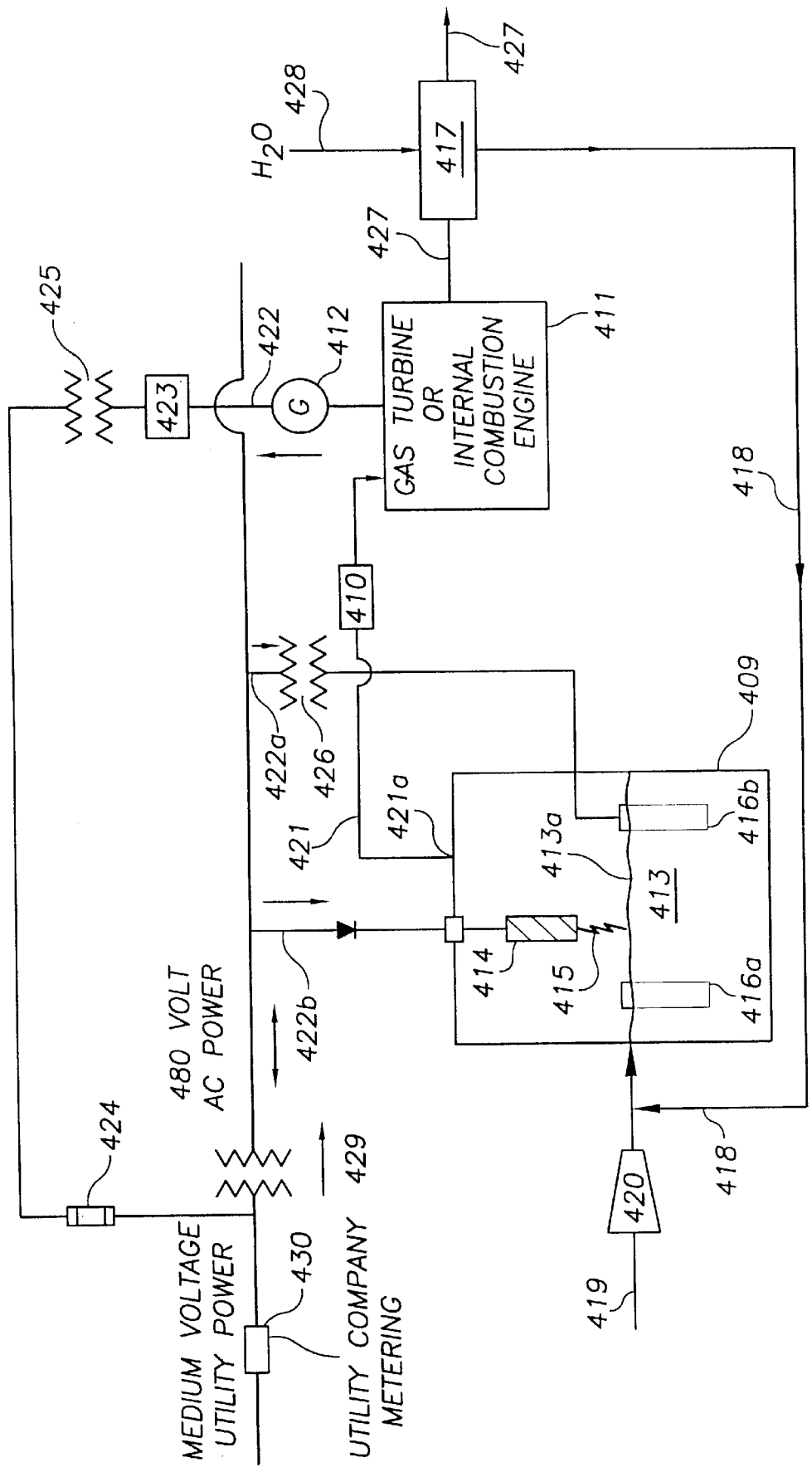
FIG. 12 illustrates an alternative embodiment of the invention which is suitable for processing metals, non-glass forming waste, and low-ash producing organics.

A system suitable for processing metals, non-glass forming wastes and low-ash producing inorganics according to the present invention is illustrated in FIG. 12. The system 408 includes furnace 409, clean-up unit 410, a gas turbine or internal combustion engine 411 and generator 412. System 408 may also include heat exchanger 417 and compressor 420.

As discussed in greater detail herein, a waste stream such as sludge containing metals, non-glass forming wastes and low-ash producing inorganics is introduced into furnace 409. The waste stream is combined with a molten oxide pool 413 having a composition with desired electrical, thermal and physical characteristics. Depending on the furnace conditions, the molten pool or waste feed is contacted with DC or AC arc(s) 415 to produce molten pool 413. DC or AC arc(s) 415 can be operated using DC or AC arc electrode(s) 414 in combination with joule heating electrodes 416a and 416b as described hereinabove. It will be appreciated by those skilled in the art that various furnace configurations may be suitable for use in the system shown in FIG. 12. For example and as shown above, the number of joule heating electrodes may include more than two electrodes and additional DC or AC arc electrodes may be employed.

During the processing of some waste streams, it may be desirable to contact the surface 413a of molten oxide pool 413 with a predetermined amount of steam 418. Steam 418, for example, can be employed to facilitate the use of a water-gas reaction as follows:

$$C + H_2O \rightarrow CO + H_2 \qquad (1).$$

Steam 418 is introduced into furnace 409 directly above or at the surface 413a of molten pool 413. In this manner, carbonaceous waste materials may be processed and transformed to form a hydrogen-rich gas 421. The hydrogen-rich gas 421 produced by the system exits through port 421a and is cleaned in clean up unit 410. For example, hydrogen sulfide ($H_2S$), sulfur oxides ($SO_x$) and hydrogen chloride (HCl) can be removed from hydrogen-rich gas 421 in clean up unit 410. Clean up unit 410 may include scrubber(s) or the like. The hydrogen-rich gas is then combusted in an internal combustion engine 411. Internal combustion engine 411 is connected to generator 412 to produce electricity 422. In an alternative embodiment, internal combustion engine 411 may be substituted with a high efficiency gas turbine or fuel cell (if the gas is sufficiently clean and will not damage the fuel cell).

Figure 14A:
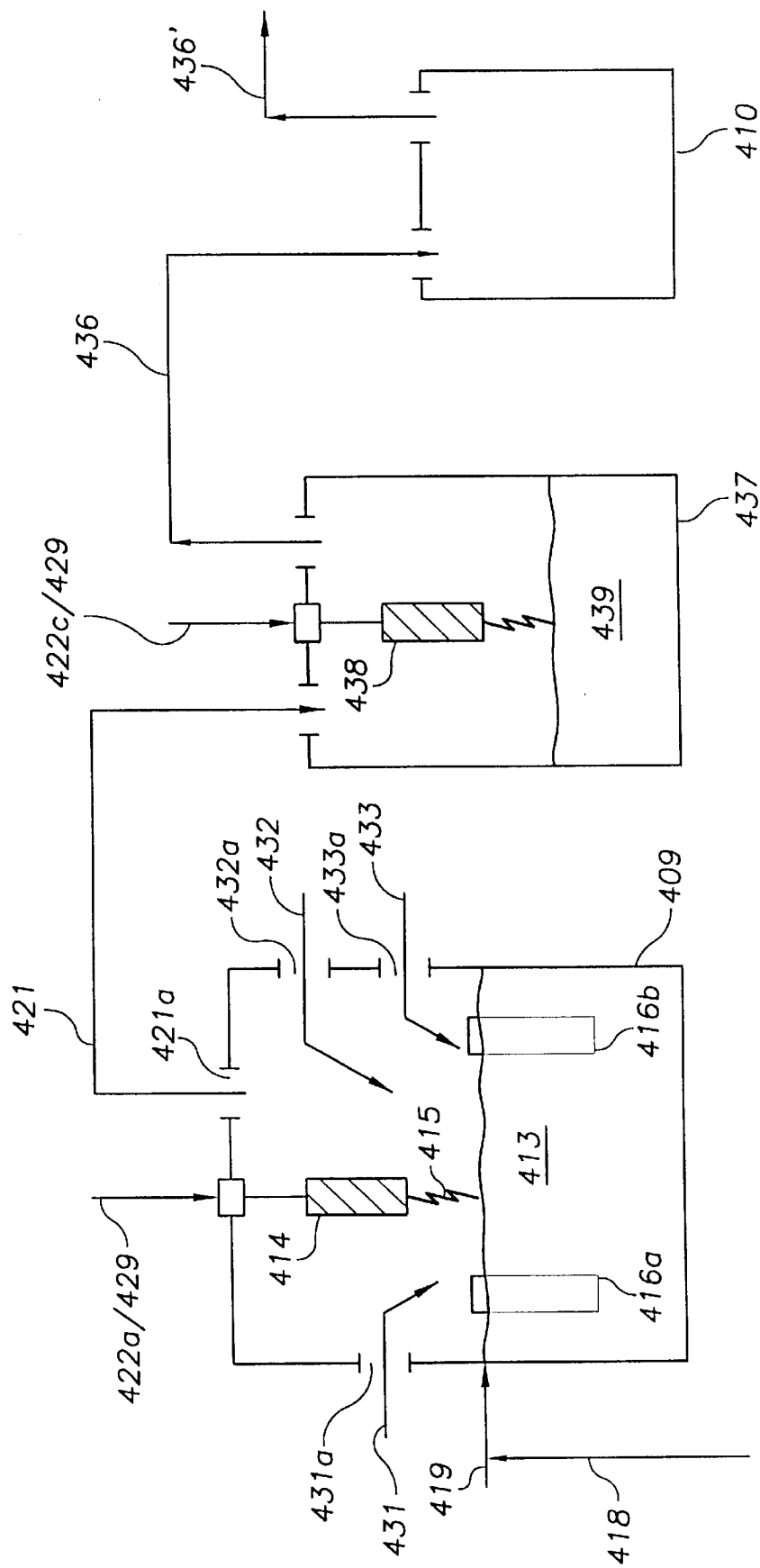
FIGS. 14A and 14B show furnaces and molten oxide pools for processing non-glass forming waste and low-ash producing organics in accordance with the invention.
Figure 14B:
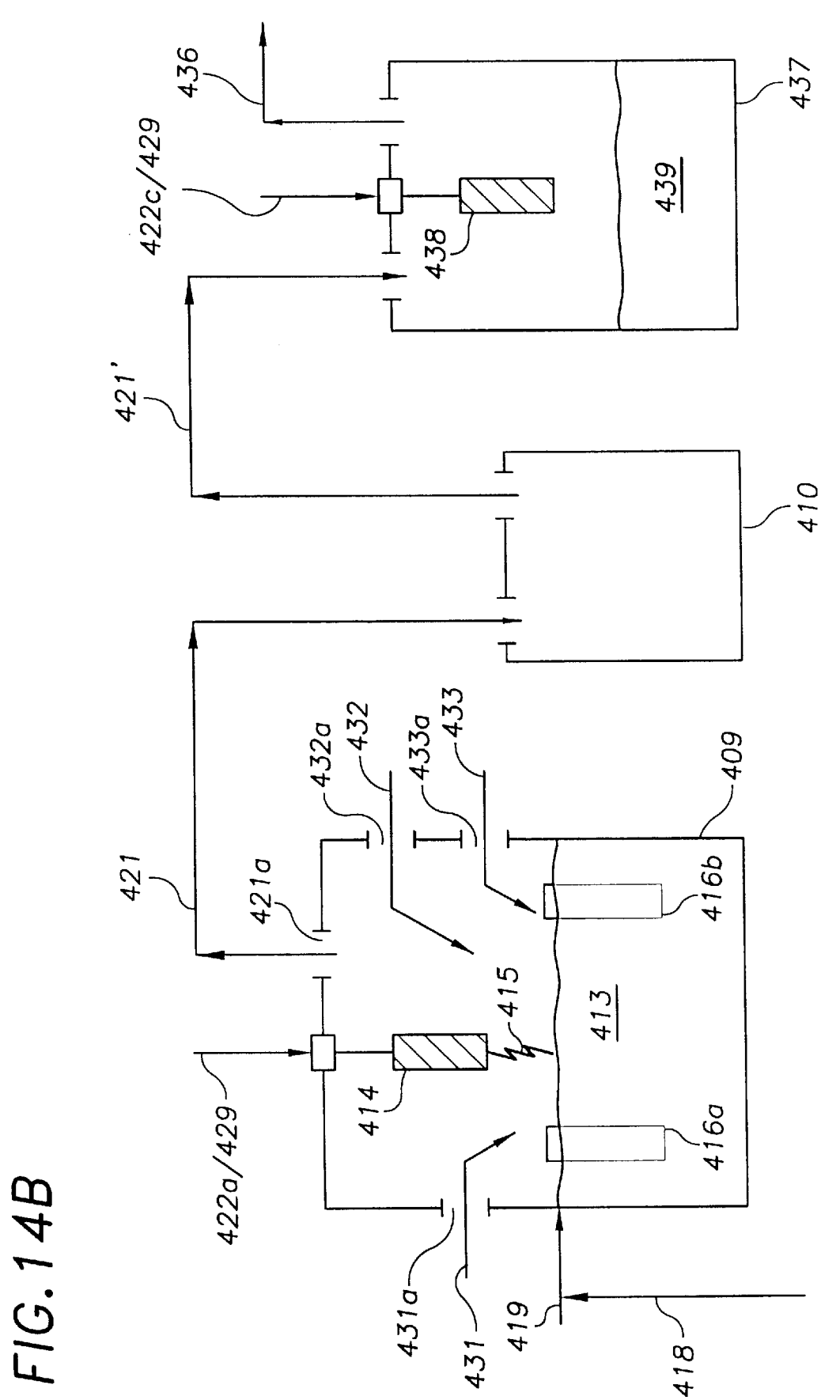

Electricity 429 may be supplied accordingly from an external source such as a utility company to provide power for the arc and joule heating functions of furnace 409. Such electricity is subjected to monitoring 430 or the like. Additionally, a portion 422b of electricity 422 can be used to assist in powering arc electrode(s) 414 while a portion 422a of electricity 422 can be used to assist in powering the joule heating electrodes (transformer 426 can be provided in this situation). A portion of electricity 422c may also be utilized in a secondary plasma reaction chamber (as shown in FIGS. 14A and 14B). Additional electricity 422 can be sold or utilized in a commercial manner. Such electricity exits generator 412 and can be controlled by circuit breaker (s) 423, transformer 425 and circuit breaker 424.

Waste heat in exhaust gas 427 from the gas turbine or internal combustion engine 411 can be used to produce steam 418 for the water-gas and water shift reactions by employing heat exchanger 417 as shown in FIG. 12. Heat exchanger 417 is connected to a source of water 428 or other heat exchanging medium.

Controlled quantities of air 419, may under certain circumstances, be introduced into system 408 using compressor 420. Such circumstances may occur where energy recovery is not desired or practical, e.g. if it determined that the waste form redox state must be higher to ensure a stable waste form. Under these conditions, the furnace system has the capability to operate under oxidizing conditions. Furnace 409 is constructed such that the amount of air or gas entering the system can be controlled. For example, ports such as 431a, 432a and 433a discussed herein in connection with FIGS. 13–14 are designed to allow controlled introduction and/or removal of various streams into furnace 409. The constituents of the molten pool are chosen to be optimum for a given waste stream without allowing undesirable ingress or egress of air therethrough.

Figure 13A:
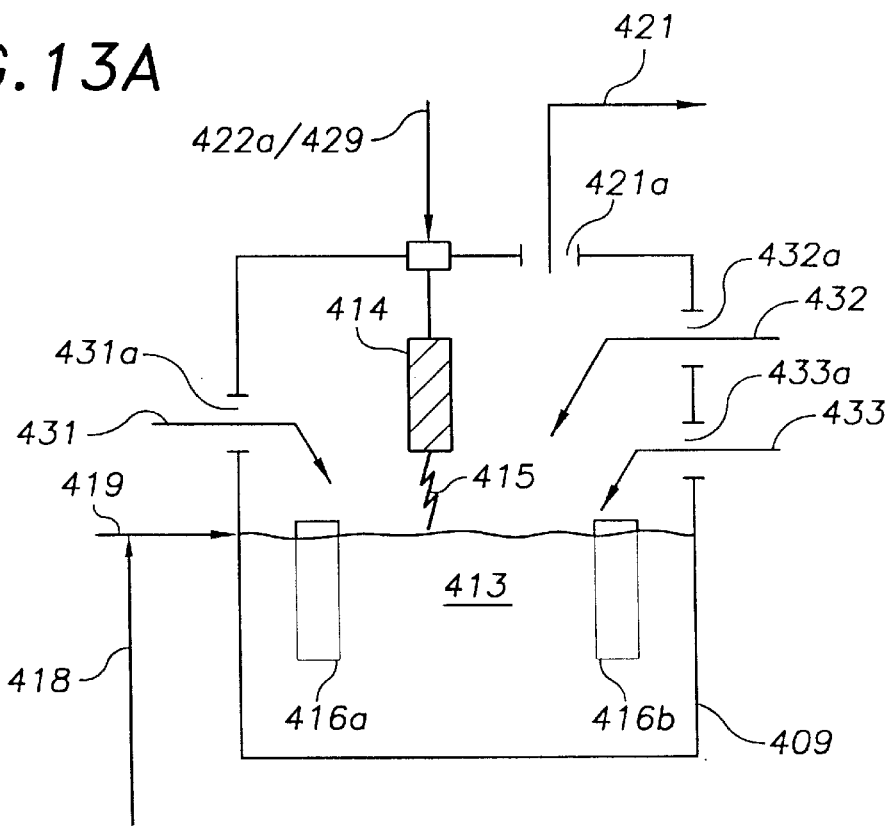
FIG. 13A shows a furnace and molten oxide pool for processing metals, non-glass forming waste, and low-ash producing organics in accordance with the invention.

The present invention allows the use of a molten oxide pool from material other than the primary waste material being processed to provide the desired medium for effective use of the tunable arc plasma-melter portions of the system. Referring to FIG. 13A, a furnace suitable for processing metals, non-glass forming wastes and low-ash producing inorganics is illustrated.

As discussed above in connection with FIG. 12, furnace 409 includes one or more DC or AC arc electrodes 414 capable of generating DC or AC arc(s) 415. Furnace 409 also includes joule heating capabilities, including joule heating electrodes 416a and 416b.

Primary waste stream 431 to be processed is introduced into furnace 409 through port 431a. Melt modifier(s) 432 is introduced into furnace 409 through port 432a. Alternatively, or in addition to melt modifier 732, a secondary waste stream 433 having desired glass forming characteristics is introduced into furnace 409 through port 433a.

The constituents of the molten pool are chosen to be optimum for a given waste stream. While not to be construed as limiting, melt modifiers 432 may for example include dolomite ($CaCO_3 \cdot MgCO_3$), limestone (e.g. calcium carbonate, $CaCO_3$), sand (e.g. glass maker's sand), glass frit, anhydrous sodium carbonate (soda ash), other glass forming constituents and/or sand combined with metals. It will be appreciated by those skilled in the art that other glass melt modifiers may be used in accordance with the present invention. The molten oxide pool may also be formed utilizing melt modifier combinations of secondary wastes and material(s) other than the primary waste being treated. For example, the secondary waste with the proper glass forming composition may be simultaneously fed to the furnace with the primary waste and/or other melt modifier(s) to maintain the molten oxide pool within the proper compositional range. The constituents of the molten pool are selected based upon a given waste stream. This mode of operation provides a high degree of flexibility in the operation of the tunable arc plasma-joule heated melter system, thereby broadening the waste types for which the system can treat.

It should be appreciated by those skilled in the art that the molten oxide pool provides flexibility beyond that of either the joule-heated melter or standard plasma arc processes relative to melt modifier addition. With highly conductive oxide mixtures, a joule heated system may be ineffective or unable to maintain melt bath temperature without the added energy provided by the arc. Conversely, with highly resistive oxide melts, the potential across the joule heated electrodes can become unacceptably high and adequate current cannot be maintained to provide joule heating. The supplemental energy can be provided by the arc. The arc energy, however, can be limited in both of these situations to provide only enough energy to process incoming waste and supplement joule heating energy to maintain melt bath temperature. The molten oxide pool embodiment of the present invention provides a much greater degree of flexibility in melt adjustment using melt modifiers than either that of a joule-heated melter system or a standard arc plasma process.

The melt modifiers 432 and/or secondary waste stream 433 are selected to provide a molten pool having desired electrical, thermal and physical characteristics. The type and amount of melt modifiers are determined for the specific vitrification unit configuration and waste stream. For example, the molten pool in the case of processing tires in a waste stream 431 provides sufficient conductivity to use the joule heated melter subsystem in the more optimum mode of operation. As discussed above, steam is added in the desired amounts directly above or to the molten pool to facilitate the use of a water-gas reaction or to remove excess carbonaceous material.

Figure 13B:
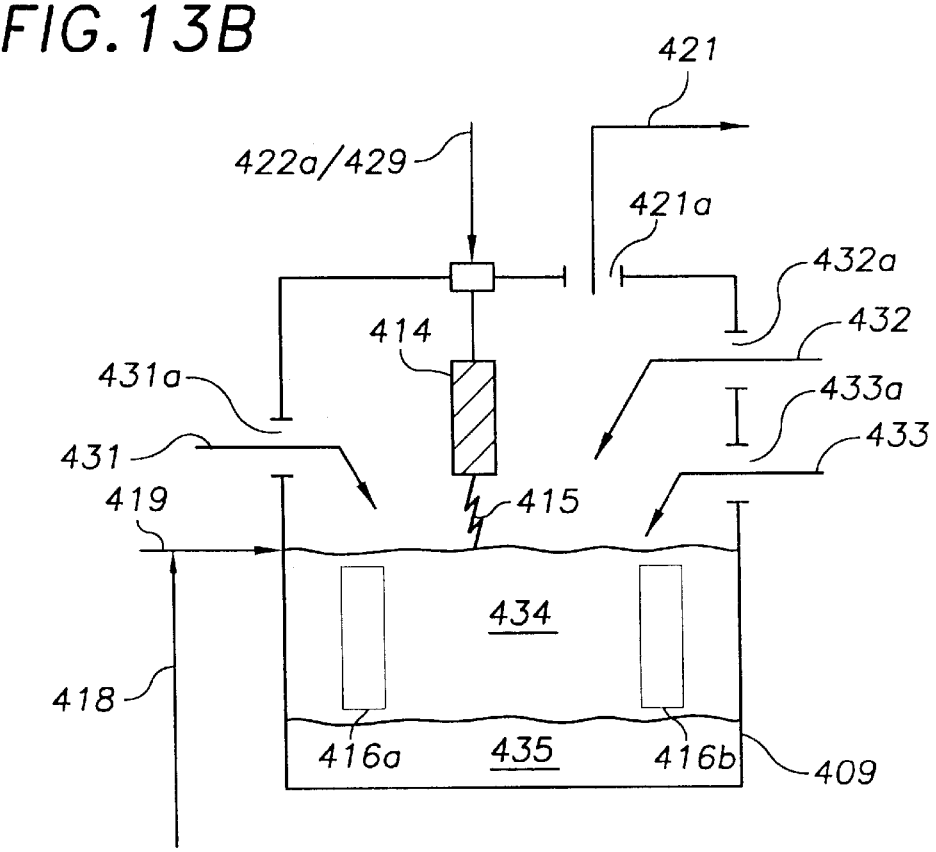
FIG. 13B shows a furnace and molten oxide pool for processing metals in accordance with the invention.

FIG. 13B illustrates a furnace suitable for reclaiming some metals utilizing a molten oxide pool in accordance with the invention. When metals are being processed, the controlled composition of the molten pool may be altered such that a molten metal oxide layer is disposed above a dense metal layer in the furnace hearth. Preferably, the positioning and number of the joule heating electrodes can be varied according to the type and volume of waste being processed. When the waste feed material has a high metals content for example, the joule heating electrodes may be raised or lowered to adjust or "tune" the effective resistive path between electrodes. This may be required if the metal layer is allowed to increase to a point where the electrical path between the joule heated electrodes is effectively "shorted'" due to contact or near contact with the highly conductive metal layer. In addition, the number of joule heating electrodes can be designed into the furnace depending on the type and amount of waste material being processed.

As further shown in FIG. 13B, molten metal oxide layer 434 is disposed above a dense metal layer 435 in the furnace 409. The conductivity of the joule heated molten pool 434/435 is controlled by adding melt modifier materials 432 and/or secondary waste stream materials 433 such that the joule heated portion of the system can effectively maintain the temperature of the melt even when under conditions such as 100% joule heating operation.

It is desirable to maintain the electrical resistivity of the molten pool in a certain range. For example, for some configurations of the tunable arc plasma melter, it is desirable that the molten pool composition be maintained with an electrical resistivity above 1 Ohm-cm for effective joule heating of the molten oxide pool. In some embodiments, the electrical resistivity is preferably in the range of 1–200 Ohm-cm, and more preferably, between 5–15 Ohm-cm. It will be appreciated, however, that the waste stream, the melt, the furnace size and configuration can have a significant effect on these ranges.

FIGS. 14A and 14B illustrate exemplary primary and secondary furnace configurations in the accordance with the present invention. In the case of automobile and truck tires or other non-glass forming waste streams, the tunable molten oxide pool plasma arc melter process allows for the efficient conversion of whole tires into a low to medium BTU gas and any metal present is separated in a metal phase below the oxide melt layer. In this manner, tires can be removed from vehicles without dissection and are amenable to processing in the tunable arc plasma melter system. Steel belting and rim materials can be reclaimed from the molten metal phase.

To accomplish the conversion of tire rubber to primarily synthesized gas (i.e. containing hydrogen and carbon monoxide), steam and possibly controlled quantities of air may be added to the melt chamber in a controlled manner to facilitate a series of reactions as shown below. The steam and air mixture can be added through a port, using tuyeres or the like positioned such that the steam/air mixture will be introduced into the furnace at the melt surface. This will ensure that carbonaceous material is converted to gaseous products and not trapped in the glass/slag matrix.

Chemical equations (1)–(5) present possible reactions that will occur upon introduction of oxygen and/or steam into the melt chamber of furnace 409.

$$C + H_2O \rightarrow CO + H_2 \qquad (1)$$

$$C + CO_2 \rightarrow 2CO \qquad (2)$$

$$CO + H_2O \rightarrow CO_2 + H_2 \qquad (3)$$

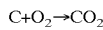

$$C + O_2 \rightarrow CO_2 \quad (4)$$

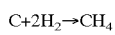

$$C + 2H_2 \rightarrow CH_4 \quad (5)$$

Reactions (1) and (2) are highly endothermic reactions, requiring about 131.4 kJ/mole and 172.6 kJ/mole, respectively. With the controlled introduction of primarily steam at near atmospheric pressure, reaction (1), i.e. the water-gas reaction, will predominate, requiring energy (i.e. 131.4 kJ/mole) to produce a hydrogen-rich gas. As discussed above, this gas is cleaned using particulate removal technology and scrubbing solutions to remove the majority of particulates and other contaminants such as sulfur and chlorine in the form of $H_2S$, $SO_x$ and $HCl$ prior to combustion either in a gas turbine or internal combustion engine electrical generator system or for use in a fuel cell, as discussed herein. Waste heat can be utilized to produce steam for the furnace chamber steam feed stream. High temperature air may be extracted from an intermediate stage in a gas turbine if additional thermal energy is required.

The processing of materials containing a high carbon to hydrogen ratio may result in the production of excess carbon (i.e. unreacted char) in the primary furnace exhaust. For example, tires typically contain a high carbon to hydrogen ratio. This excess carbon or unreacted char may be converted to useful gaseous fuel 436 or to heat in a secondary plasma reaction chamber 437 as shown in FIGS. 14A and 14B. This chamber will provide thermal energy from a transferred plasma arc and/or plasma torch 438 to drive the desired reactions, i.e. reaction (1) set forth above. Electricity 422c and/or 429 can be supplied to secondary reaction chamber 437 as also shown in FIGS. 14A and 14B. As in the primary furnace chamber, steam and possibly air or oxygen (not shown in FIGS. 14A and 14B) can be added directly above or to slag 439, resulting in the complete or substantially complete conversion of carbon and carbon containing compounds to carbon monoxide and hydrogen gas.

The char produced from high carbon content wastes (e.g. tires) may also accumulate on the surface of the oxide melt. To ensure a more complete carbon conversion, both steam and controlled quantities of air may be introduced at or above the melt line as described above. Reaction (4) described above will predominate in the presence of air, thereby resulting in a net thermal energy production of about 393.8 kJ/mole of reacted carbon. This thermal energy will drive reaction (1) in this surface zone due to the simultaneous introduction of steam and air. The air-steam mixture can be accurately controlled to provide the desired gaseous product from the furnace system. For example, the water gas reaction can be used to convert coke deposits or accumulations in the furnace hearth to carbon monoxide and hydrogen-rich gas. In some situations, it may desirable to allow a portion of the coke to remain in the furnace hearth to reduce electrode erosion.

The hydrogen-rich gas produced by the system can be cleaned and then combusted in a gas turbine or internal combustion engine and subsequently used to produce electricity in a generator (or utilized in a fuel cell). In preferred embodiments, the waste heat from the gas turbine or internal combustion engine can be used to produce steam for the water-gas reaction in the melter unit. In circumstances where an internal combustion engine or gas turbine are not employed, steam may also be obtained by partially cooling furnace off-gas 421 and using this steam for the water-shift reaction.

When carbonaceous materials such as tires are processed in a pyrolytic mode with steam and controlled quantities of air, the processed materials can produce a low to medium BTU gas suitable for combustion in a high efficiency (e.g. 35–50%) gas turbine or internal combustion engine (or for use in a fuel cell). The tunable plasma arc melter system may also produce excess electrical power when processing the carbonaceous material in the pyrolytic mode described hereinabove. The electrical power from the gas turbine or internal combustion engine generator may be supplied to assist the furnace power supply. This system may also provide additional AC power to the joule heating portion of the melter and/or a utility company, thereby providing the opportunity to reduce operating expenses and/or generate additional revenue.

As discussed above, the present invention also provides environmentally attractive methods and apparatus for reduced emissions of oxides of nitrogen ($NO_x$) when the gases produced in the waste conversion unit are combusted. This can be accomplished by combusting hydrogen-rich gas and operating an internal combustion engine or a turbine in a very lean ratio of air to fuel with hydrogen-carbon monoxide gas from the waste conversion unit as fuel, so that electricity may be produced from the hydrogen-rich gas.

"Ultra lean", as that term is used herein, refers to an equivalence ratio, $\Phi$, of 0.4–0.7 relative to stoichiometric operation. $\Phi$ is the fuel to air ratio relative to the fuel to air ratio at stoichiometric conditions where the amount of air is exactly equal to that needed to completely combust the fuel gas. Typical spark ignition engines operate at stoichiometric conditions where $\Phi = 1$. See, MacDonald, *Evaluation of Hydrogen-Supplemental Fuel Concept With An Experimental Multi-Cylinder Engine*, Soc. of Automotive Engineers, Paper 930737, p. 574 (1976), which is incorporated herein by reference. Use of hydrogen-rich gas in spark ignition engine allows operation at ultra lean ratios of fuel to air. It is possible to operate at fuel to air ratios, $\Phi$, of 0.4 and possibly lower. These values of $\Phi$ are substantially lower than those allowed for other fuels. The lower allowed values of $\Phi$ result from the faster flame speed of hydrogen. The use of hydrogen-rich gas and the use of ultra lean operation also allow the use of much higher compression ratios. The combination of ultra lean operation and the use of a high compression ratio can greatly reduce pollution and increase engine efficiency. By operating in a very lean mode, e.g. with low equivalence ratios in a range of about 0.4–0.7, production of $NO_x$ may be greatly reduced, i.e. by more than a factor of 10 relative to stoichiometric operation. Hydrocarbon and carbon monoxide emissions should also be very low.

Figure 15:
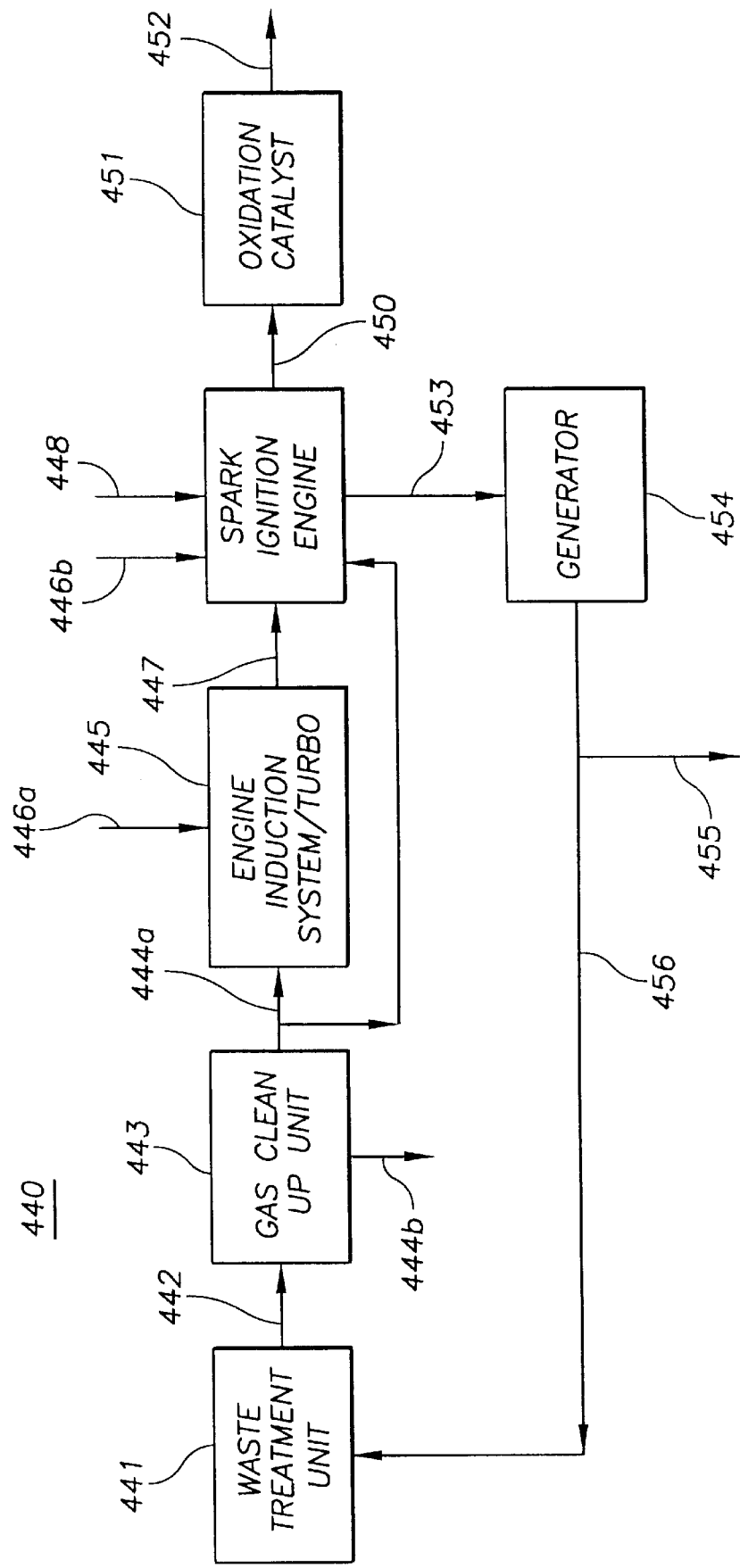
FIG. 15 illustrates an energy conversion system which reduces $NO_x$ emissions during the generation of electricity from waste conversion units in accordance with the present invention.
Figure 16:
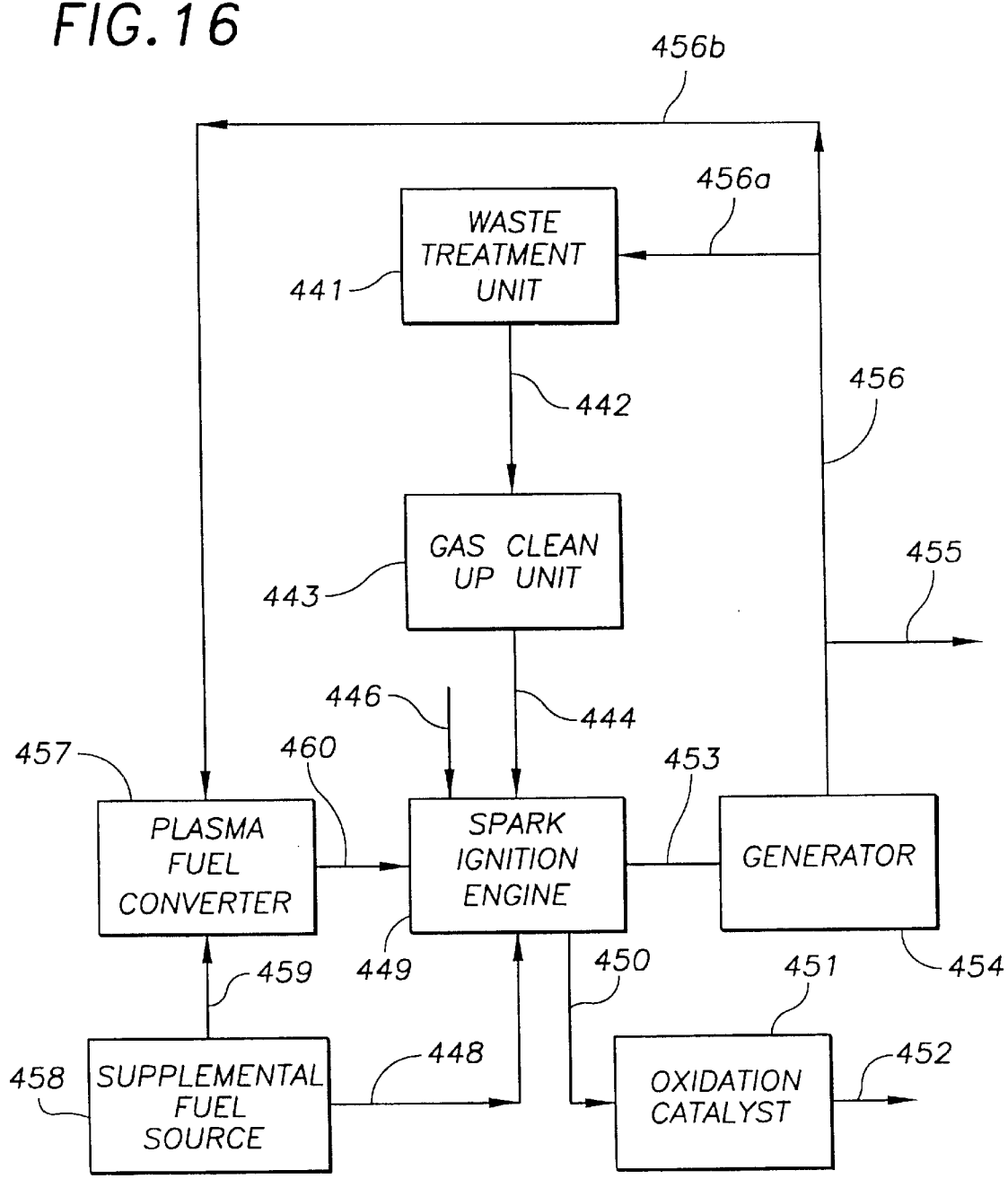
FIG. 16 illustrates an energy conversion system which reduces $NO_x$ emissions during the generation of electricity from waste conversion units in accordance with an alternative embodiment of the present invention.

Systems for reduced $NO_x$ emissions during the production of electricity from combustible gases generated by a waste conversion unit are illustrated in FIGS. 15 and 16. System 440 includes waste conversion unit 441, gas clean-up unit 443, spark ignition engine 449 or a gas turbine (not shown in FIGS. 15 or 16) and generator 459 (or fuel cell as discussed herein). Plasma fuel converter 457 (see FIG. 16) and/or engine induction system/turbocharger 445 (see FIG. 15) can also be utilized in system 440. Supplemental fuel 448 from a fuel source (e.g. fuel source 458 as shown in FIG. 16) and oxidation catalyst 451 can also be used in accordance with the invention.

As discussed above, combustible gases can be produced from waste conversion unit 441. Waste conversion units suitable for use in the invention include those shown and described hereinabove. Additional waste conversion units suitable for use in accordance with the invention include those shown in copending U.S. application Ser. Nos. 08/621, 424 and 08/622,762, both filed Mar. 25, 1996 and both of which are incorporated herein by reference. These waste treatment units can produce a hydrogen-rich gas containing primarily hydrogen and carbon monoxide which can be combusted to produce electricity. The electricity can be utilized to satisfy some or all of the electricity requirements for the waste treatment systems. It will be appreciated by those skilled in the art that other waste conversion units capable of producing combustible gases can be used in conjunction with system 440. See e.g., U.S. Pat. No. 5,280,757 to Carter et al; Chapman, *Evaluation of Vitrifying Municipal Incinerator Ash,* Ceramic Nuclear Waste Management IV, Ceramic Transactions, American Chemical Society, Vol. 23, pp. 223–231 (1991); and U.S. Pat. Nos. 5,177,304 and 5,298,233, both to Nagel, all of which are incorporated herein by reference.

Gases 442 exit waste conversion unit 441 and are introduced into gas clean-up unit 443 for gas-solid separation, e.g. for removal and separation of ash or other particulates 444b from hydrogen-rich fuel gas 444a that may be entrained in gases 442. In some circumstances, it may also be desirable to incorporate an off-gas scrubbing process for gases exiting clean-up unit 443 or internal combustion engine 449 (or gas fired turbine) to remove any acid gases therefrom.

Hydrogen-rich gas 444a is then introduced into engine induction system/turbocharger 445 and combined with predetermined amounts of air 446a so that there is an ultra lean mixture. A turbocharger 445 could be used to increase the amount of fuel in the cylinder to compensate for the reduced power density in ultra lean operation. Turbocharger 445 could be driven from the exhaust gas from the glassification unit or steam which is produced by a heat exchanger at various points in the system. Engine induction system/turbocharger 445 allows hydrogen-rich gas 444a to be cooled prior to being introduced into the internal combustion engine 449. Cooling can increase the amount of fuel 447 that can be used per explosion. It should be noted that operation of engine induction system/turbocharger 445 may not always be necessary or desirable. Under these circumstances, hydrogen-rich gas 444a and air 446b in an ultra lean mixture may be introduced directly into spark ignition engine 449 as also shown in FIGS. 15 or 16.

Hydrogen-rich gas 447 is combusted in engine 449, thereby producing exhaust 450 and mechanical power 453. Mechanical power 453 is used to drive generator 454 to generate electricity 456 and/or electricity 455. As further shown in FIG. 15, electricity 456 can be used to supply some or all of the electricity requirements for waste conversion unit 441. Electricity 456 can be used for other electricity requirements in the system (see e.g. to supply electricity 456b to plasma fuel converter 457 as illustrated in FIG. 16). Electricity 455 can be used for sale.

The operation of spark ignition engine 449 is preferably at lean ratios of fuel to air, $\Phi$, and at high compression ratios. For example, illustrative values of $\Phi$ are 0.4–0.7 and preferably about 0.5. Illustrative values of compression ratio, r, are 12 to 15. In contrast, typical spark ignition engines that operate on gasoline operate with $\Phi$ equal to 1 and r at about 10. In addition, gas turbines may be capable of being operated at $\Phi$ ratios of 0.4 or less.

While not to be construed as limiting, it is expected that the efficiency of the spark ignition engine can be increased by a relative amount of approximately 20% by using ultra lean operation (i.e. the efficiency can be increased for example from approximately 30% to 36%). In addition, utilizing compression ratios of about 15 is expected to provide an additional relative increase in efficiency of about 15%. By increasing the compression ratio from the standard spark ignition value of 10 to a value of around 15, the thermal efficiency can therefore be further increased from 36% to 42%. See Ganesan, *Internal Combustion Engines,* McGraw-Hill, Inc. (1995), which is incorporated herein by reference. A thermal efficiency of 42% is substantially higher than that of present gas turbine technology for powers that are less than 1 MW (a 100 kW level gas turbine, for example, has an efficiency of about 30%). Moreover, the spark ignition engine is typically less expensive and is generally easier to stop and start. It should be noted, however, that a gas turbine using lean operation can be employed in the present invention (see e.g. turbine 52 in FIG. 1A).

Ultra lean operation can dramatically reduce $NO_x$ emission. It is expected that $NO_x$ levels can be more than 10 times lower than $NO_x$ levels produced using standard stoichiometric operation. $NO_x$ emissions will decrease with decreasing equivalence ratios as the equivalence ratio is reduced below the upper end of the ultra lean mode of operation ($\Phi$=0.7). In addition, hydrocarbon emissions should be very small because the hydrogen-rich gas typically will contain only a small fraction of hydrocarbons and it is expected that there will be very complete combustion of these small levels of hydrocarbons. Moreover, carbon monoxide (CO) emissions are expected to be low due to a high degree of combustion of CO. Additional CO reduction can be obtained by use of a simple oxidation catalyst. Referring again to FIG. 15 for example, exhaust 450 can be combined with an oxidation catalysts 451 to produce low pollution exhaust 452. Oxidation catalysts suitable for use in the invention include, but are not limited to, platinum and iridium. The exhaust heat from the engine 449 could be used to provide steam for heating and/or other applications in a cogeneration mode.

It is also expected that levels of $NO_x$, CO hydrocarbons, hydrocarbons and particulates produced in accordance with the invention can be significantly lower than emission levels from small diesel generator power stations. Emission levels according to the present invention are also expected to be no greater than those from natural gas fired turbine electricity generating plants with relatively large power generation capacity which have extensive pollution control equipment.

When hydrogen-rich gas 442 production from the waste treatment unit 441 is not sufficient to power internal combustion engine 449, it may be desirable to directly add a certain amount of supplemental fuel 448 (such as natural gas) to engine 449 in order to continue ultra lean spark ignition engine operation as shown in FIGS. 15 and 16. FIG. 16 illustrates the integration of a supplemental fuel system with the spark ignition engine suitable for use in the invention.

Figure 17:
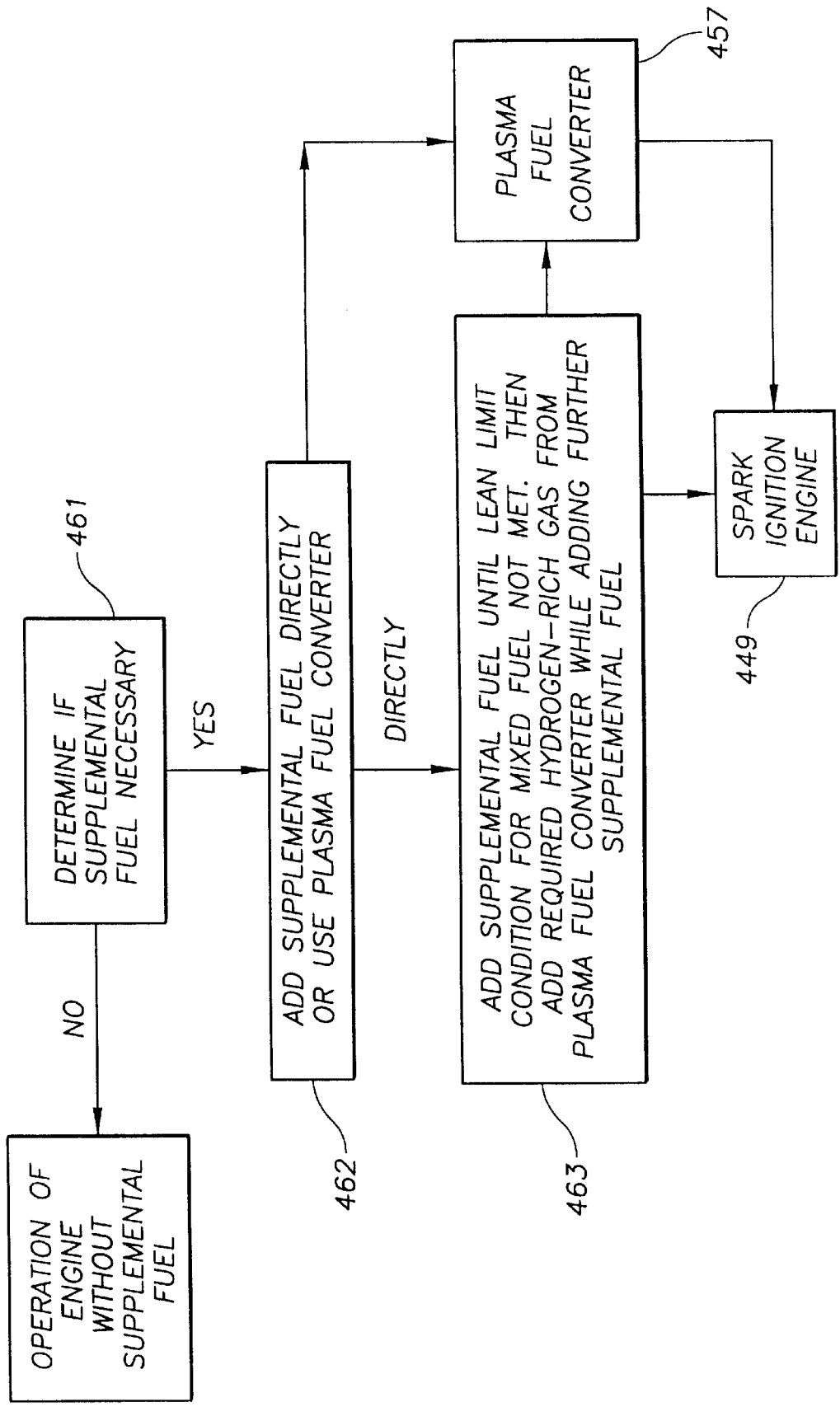
FIG. 17 illustrates automatic control logic for use in conjunction with the production of low $NO_x$ emissions during the generation of electricity from waste conversion units in accordance with the present invention.

System 440 shown in FIG. 16 is similar to system 440 shown in FIG. 15, but includes plasma fuel converter 457 (the use of which may be automatically controlled as shown for example in FIG. 17). While not shown in FIG. 16, it will be appreciated that system 440 can be employed using engine induction system/turbocharger 445 (as shown in FIG. 15) and plasma fuel converter 457.

As further shown in FIG. 16, plasma fuel converter 457 can supply additional hydrogen-rich gas 460 to spark ignition engine 449. This may be desirable or necessary where the amount of hydrogen-rich gas 444 (and/or supplemental fuel 448) is insufficient to power engine 449 in the desired lean operation mode or using high compression ratios.

Plasma fuel converter 457 receives supplemental fuel 459 from supplemental fuels source 458 and reforms the fuel 459 into hydrogen-rich gas 460. Plasma fuel converters suitable for use in the present invention include, but are not limited to those disclosed in U.S. Pat. Nos. 5,425,332 and 5,437,250, both to Rabinovich et al. U.S. Pat. Nos. 5,425,332 and 5,437,250 are both incorporated herein by reference. Hydrogen-rich gas 444 and 460 can therefore be used to ensure operation of engine 449 in a lean mode.

The present invention thus allows various combinations of supplying fuel to engine 449 to ensure operation in a lean mode and/or using high compression ratios, thereby providing highly efficient, cost effective and environmentally attractive systems. For example, hydrogen-rich gas 444 from waste conversion unit 441 can be used alone to supply fuel to engine 449. Alternatively, hydrogen-rich gas 444 can be combined with supplemental fuel 448 (such as natural gas) in engine 449 in proportions such that lean operation of engine 449 is maintained. Plasma fuel converter 457 can also be utilized to supply additional hydrogen-rich gas 460 to engine 449 with hydrogen-rich gas 444 or with hydrogen-rich gas 444 and supplemental fuel 448.

An exemplary automatic control system for determining when supplemental fuel and/or operation of the plasma fuel converter is desirable or necessary is shown in FIG. 17. If supplemental fuel is determined to be necessary in step 461, it is then determined in step 462 if supplemental fuel is to be added directly into engine 449 or if supplemental fuel is to be added to plasma fuel converter 457 for production of hydrogen-rich gas 760.

If supplementary fuel is added directly to engine 449 (step 463), supplemental fuel is added until a lean limit condition for mixed fuel operation is not met. Additional hydrogen-rich gas 444 and/or hydrogen-rich gas 460 can then be added as appropriate.

The addition of hydrogen-rich gas into engine 449 can be controlled by step 493. For example, supplemental fuel can be automatically controlled to be introduced directly to engine 449 and/or plasma fuel converter 457 based on predetermined conditions.

As discussed above, electricity generated in generator 454 can be can be used to supply some or all of the electricity requirements 456a for waste conversion unit 441. Electricity can also be used for other electricity requirements in the system (see e.g. to supply electricity 456b to plasma fuel converter 457 as illustrated in FIG. 16). Electricity 458 can be used for sale.

In an alternative embodiment of the present invention, the off-gas from the waste conversion unit can be used in a non-combustion process. This can be accomplished by an integrated controlled plasma glassification-fuel cell (CPG-FC) non-combustion system (see FIGS. 18 and 19). The controlled plasma glassification (CPG) system can be integrated with fuel cell systems for the efficient and environmentally favorable production of electrical energy from waste processed in the controlled plasma glassification system.

As used herein, a "controlled plasma glassification unit" includes the waste conversion units of the present invention. In addition, "controlled plasma glassification" and/or a "plasma enhanced melter" (PEM) refers to the process of treating waste in the waste conversion units of the present invention.

For example, a molten carbonate fuel cell (MCFC) can be used in conjunction with the waste conversion units of the present invention to produce electricity from the waste conversion unit off-gases in a non-combustion process. The controlled plasma glassification will produce a product gas or off-gas composed primarily of hydrogen, carbon monoxide, methane, carbon dioxide and traces of other gases when processing carbonaceous materials. The gases produced from the controlled plasma glassification system may be ideally suited for the fuel of a molten carbonate fuel cell. (with contaminants from the waste stream being removed).

The controlled plasma glassification-fuel cell (CPG-FC) system provides a completely non-combustion process for the conversion of waste materials into useful electrical energy. Contrary to combustion systems such as incinerators coupled to steam turbine generator systems, or other combustion techniques such as gas turbine or internal combustion generator sets, the controlled plasma glassification system-fuel cell systems in accordance with the present invention convert the chemical energy of the fuel gas into electrical energy through electrochemical reactions.

The molten carbonate fuel cell involves the use of a mixture of alkali carbonates supported in a matrix which acts as the electrolyte of the electrochemical cell. While not to be construed as limiting, a lithiated aluminate matrix may be utilized in the present invention. At the cathode of the cell, oxygen reacts with carbon dioxide and electrons on a lithiated nickel oxide electrode surface to form carbonate ions as follows:

$$1/2O_2+CO_2+2e^-\rightarrow CO_3^{2-} \qquad (6).$$

At the anode of the cell, oxidation of primarily hydrogen occurs when it reacts with the carbonate to form vapor and carbon dioxide as follows:

$$H_2+CO_3^{2-}\rightarrow H_2O+CO_2+2e^- \qquad (7).$$

The $CO_2$ produced in the anode compartment of the cell is in practice recycled to the cathode using simple gas separation techniques such as pressure swing adsorption (PSA). As can be appreciated from reactions (6) and (7), electrons are taken from the circuit at the cathode of the cell, and electrons are released into the circuit at the anode. Using these primary reactions, the non-combustion conversion of hydrogen fuel to electrical energy can be accomplished.

Figure 18:
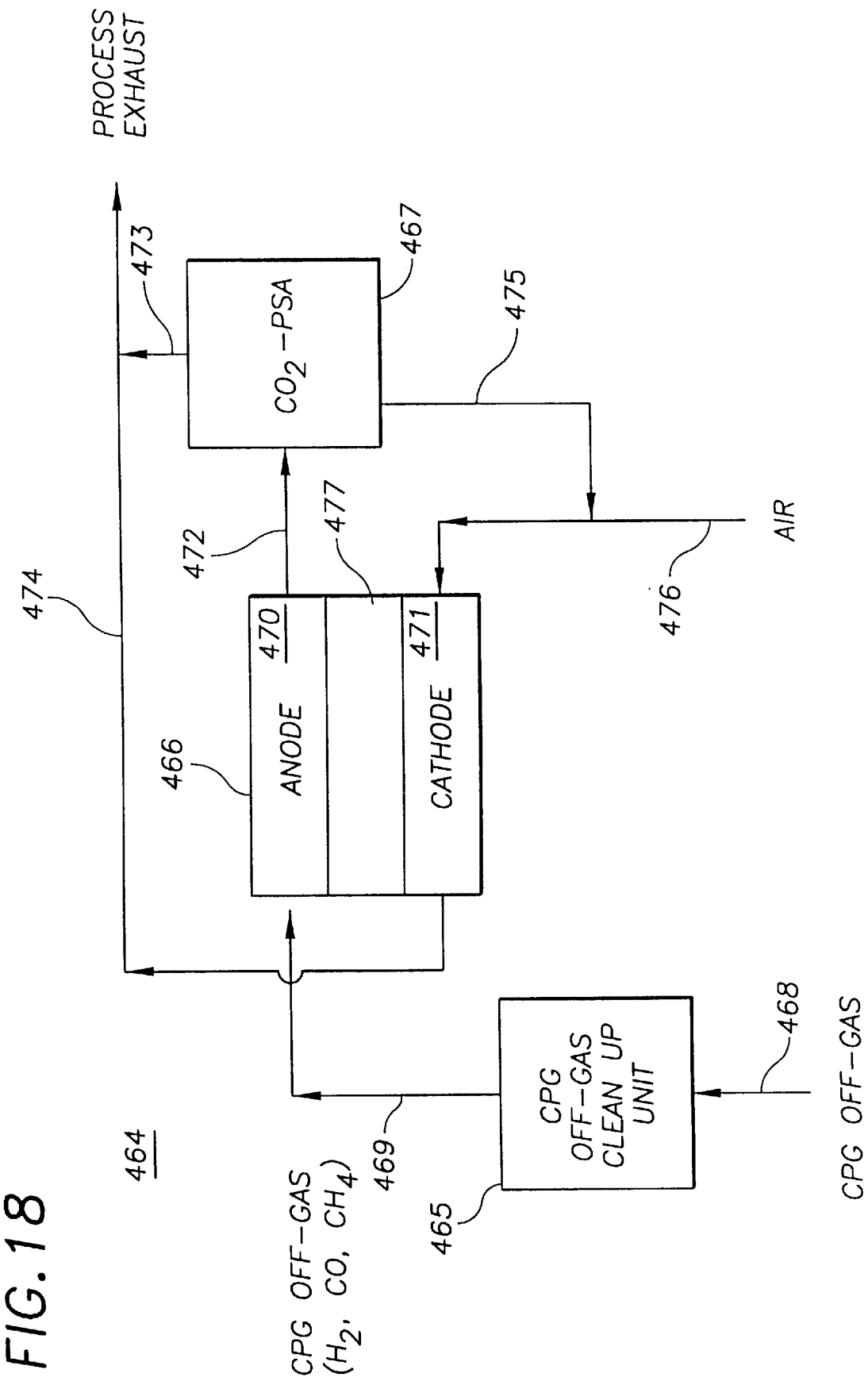
FIGS. 18–19 show systems for using a fuel cell in conjunction with a waste conversion unit of the present invention.

Referring now to FIG. 18, a flow diagram for utilizing the controlled plasma glassification-fuel cell system in accordance with the present invention is illustrated. System 464 includes an off-gas clean up unit 465 for gases 468 exiting a waste conversion unit. A fuel cell 466, such as a MCFC, is connected to the clean up unit 465 such that gases 469 from the clean up unit 465 can be used therein. Gases 469 are expected to primarily include hydrogen, carbon monoxide and methane. Additional gases, however, may also be included.

The molten carbonate fuel cell involves the use of a mixture of alkali carbonates supported in a matrix (e.g., a lithiated aluminate matrix) which acts as the electrolyte 477 of the electrochemical cell 466. Oxygen from air 476 reacts with carbon dioxide and electrons on a lithiated nickel oxide electrode surface at the cathode 471 of the fuel cell 466 as shown above in reaction (6). Carbonate ions are thus formed and electrons are consumed at the cathode 407. Oxidation of primarily hydrogen occurs at the anode 470 of the fuel cell 466 when it reacts with the carbonate formed in the cathode 471. Water vapor and carbon dioxide are thus formed and electrons are released into the circuit in accordance with reaction (7) set forth above.

The $CO_2$ produced in the anode 470 compartment of the fuel cell 466 is in practice recycled to the cathode 471. This can be accomplished using simple gas separation techniques such as pressure swing adsorption (PSA). Thus, carbon dioxide and other gases 472 can be separated in unit 467 by pressure swing adsorption. Carbon dioxide 475 can then be recycled to cathode 471. Carbon dioxide 475 can also be combined with predetermined amounts of air 476 prior to and/or during introduction to cathode 471.

Gases 474 removed from the cathode 471 of the fuel cell 466 primarily contain $O_2$ and $CO_2$. Gases 473 from unit 467, which may contain $O_2$ and $CO_2$, can be combined with gases 474 as the process exhaust. These gases can be treated as appropriate.

The gaseous emissions to the environment from a controlled plasma glassification-fuel cell system according to the present invention are expected to be extremely low. It is also expected that the controlled plasma glassification will have very low emissions of heavy metals, hazardous organics species such as dioxins and furans and particulates. There are no hazardous emissions from a fuel cell, such as for example a molten carbonate fuel cell (MCFC), operating on hydrogen and carbon monoxide. It is expected that the off-gas from the controlled plasma glassification process will have extremely low hazardous emissions and when this gas passes through a fuel cell, the gas actually will be further cleaned, thereby resulting in an extremely low emissions system.

The molten carbonate fuel cell (MCFC) has been demonstrated to have the capability to further process organic compounds in the anode region through steam reforming reactions. Any light hydrocarbon emissions from the controlled plasma glassification therefore are expected to be utilized as a fuel in the molten carbonate fuel cell. In some circumstances, it is anticipated that the carbon monoxide emissions from the controlled plasma glassification may be in the range of about 10–50%.

Uncontrolled release of carbon monoxide is undesirable. The present invention, however, employs a molten carbonate fuel cell to utilize a large fraction of the CO as a fuel either directly or indirectly as indicated in reactions (8) or (9) below:

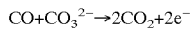

$$CO+CO_3^{2-} \rightarrow 2CO_2+2e^- \quad (8),$$

or

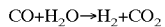

$$CO+H_2O \rightarrow H_2+CO_2 \quad (9).$$

Reaction (8) involves the direct electrochemical oxidation of the CO whereas reaction (9) involves a water-gas shift reaction to produce $H_2$, which is then efficiently used as fuel in the molten carbonate fuel cell as set forth above in reaction (7).

It is also anticipated that the controlled plasma glassification system of the present invention (i.e. the waste conversion units of the present invention) will have very low emissions of volatile metals due to the controlled operation of the arc plasma. The arc plasma of the controlled plasma glassification process is only operated at the power levels necessary to convert the incoming feed material into a useful gas (i.e. $H_2$, CO and $CH_4$) and to preheat the inorganic substances for dissolution into the glass melt. Other plasma systems and partial oxidation pyrolysis processes suffer high particulate emissions of volatile metals. Volatile heavy metals are a major concern in the operation of the molten carbonate fuel cell. Metals such as lead, mercury, arsenic, and selenium are all known to cause significant degradation in performance of the molten carbonate fuel cell. Other heavy metals will also cause performance degradation, but to a lessor degree as these. The coupling of a pyrolytic process such as the controlled plasma glassification according to the present invention (i.e. the waste conversion units of the present invention) with the molten carbonate fuel call therefore is expected to have major advantages over that of other waste processing technologies.

The molten carbonate fuel cell and solid oxide fuel cells are the only fuel cells which can tolerate low levels of contaminates in the fuel and oxidant gas streams. Therefore, even though the controlled plasma glassification is expected to have very low emissions, there may still be levels of contaminates present that may render a fuel cell such as the alkaline fuel cell (AFC), phosphoric acid fuel cell (PAFC), or proton transfer membrane (PEM) fuel cell inoperative (although such contaminates could be removed prior to being introduced into the fuel cell in order that such fuel cell could be used). It is also possible to convert the mixture of hydrogen and carbon monoxide into a purified stream of hydrogen using the water gas shift reaction (i.e. $CO+H_2O \rightarrow H_2+CO_2$) and pressure swing adsorption to remove the $CO_2$ and produce a purified hydrogen stream. This allows other types of fuel cells such as the AFC, PAFC and PEM systems to be integrated with the controlled plasma glassification technology.

A high temperature gas cleaning system can be used with the controlled plasma glassification process to provide relatively clean fuel gas to a fuel cell. For example, the dry $Ca(OH)_2$ scrubbing technologies commercially available may be used in accordance with the present invention. The major advantage in this embodiment of the invention is that the incoming gas to the fuel cell may not require preheating as would be the case in most wet scrubber systems. Because the controlled plasma glassification process is expected to have low volatile metal emissions, a hot dry scrubbing technique is possible. Other plasma systems would require additional gas cleaning to ensure that the volatile metals would not reach and contaminate the fuel cell.

The efficiency of the molten carbonate fuel cell has been demonstrated in the range of 50–65% (i.e. chemical to AC power). This compares very favorably to that of state of the art gas turbine generator sets which are approaching 45% efficiency with a bottoming cycle. In an illustrative prophetic example, the controlled plasma glassification system can produce at least two times the net electrical energy when compared to using a 40% efficient gas turbine generator system. Table 8 provides a summary of the expected efficiency improvement that can be realized using the controlled plasma glassification-fuel cell system in accordance with the present invention.

TABLE 8

| Waste Type | Energy in Waste (kWh/ton) | CPG Energy Requirements (kWh/ton) | Net Energy Produced Using Gas Turbine ($\epsilon = 0.4$) (kWh/ton) | Net Energy Produced Using MCPC ($\epsilon = 0.65$) (kWh/ton) |
|---|---|---|---|---|
| MSW | 2520 | 600 | 400 | 1020 |
| Tires | 8790 | 1600 | 1916 | 4114 |
| Medical | 5860 | 1000 | 1344 | 2809 |

The controlled plasma glassification-fuel cell (CPG-FC) system could also work synergistically with respect to electrolyte management. The molten carbonate fuel cell, although less susceptible to contamination issues than other types of fuel cells, may show degradation in performance when contaminated with sulfur and chlorine. An alternative approach to the standard operation of the molten carbonate fuel cell is to allow the continuous replenishing of the electrolyte and incorporation of spent electrolyte into the glass product in the controlled plasma glassification melt chamber.

Other unique aspects of the controlled plasma glassification-fuel cell (CPG-FC) system include the possible utilization of waste heat from the controlled plasma glassification chamber to idle the molten carbonate fuel cell and eliminate or minimize thermal cycling of the fuel cell. Thermal cycling is known to introduce failures in the molten carbonate fuel cells in the form of leaks and cracking of ceramic components. The controlled plasma glassification will in most cases be idled and waste heat from the controlled plasma glassification chamber could easily be routed to the fuel cell in the form of a controlled plasma glassification cooling gas (air) stream and through the anode and cathode gas distributors. The hot gas will transfer enough energy to the fuel cell to avoid thermal cycling.

Figure 19:
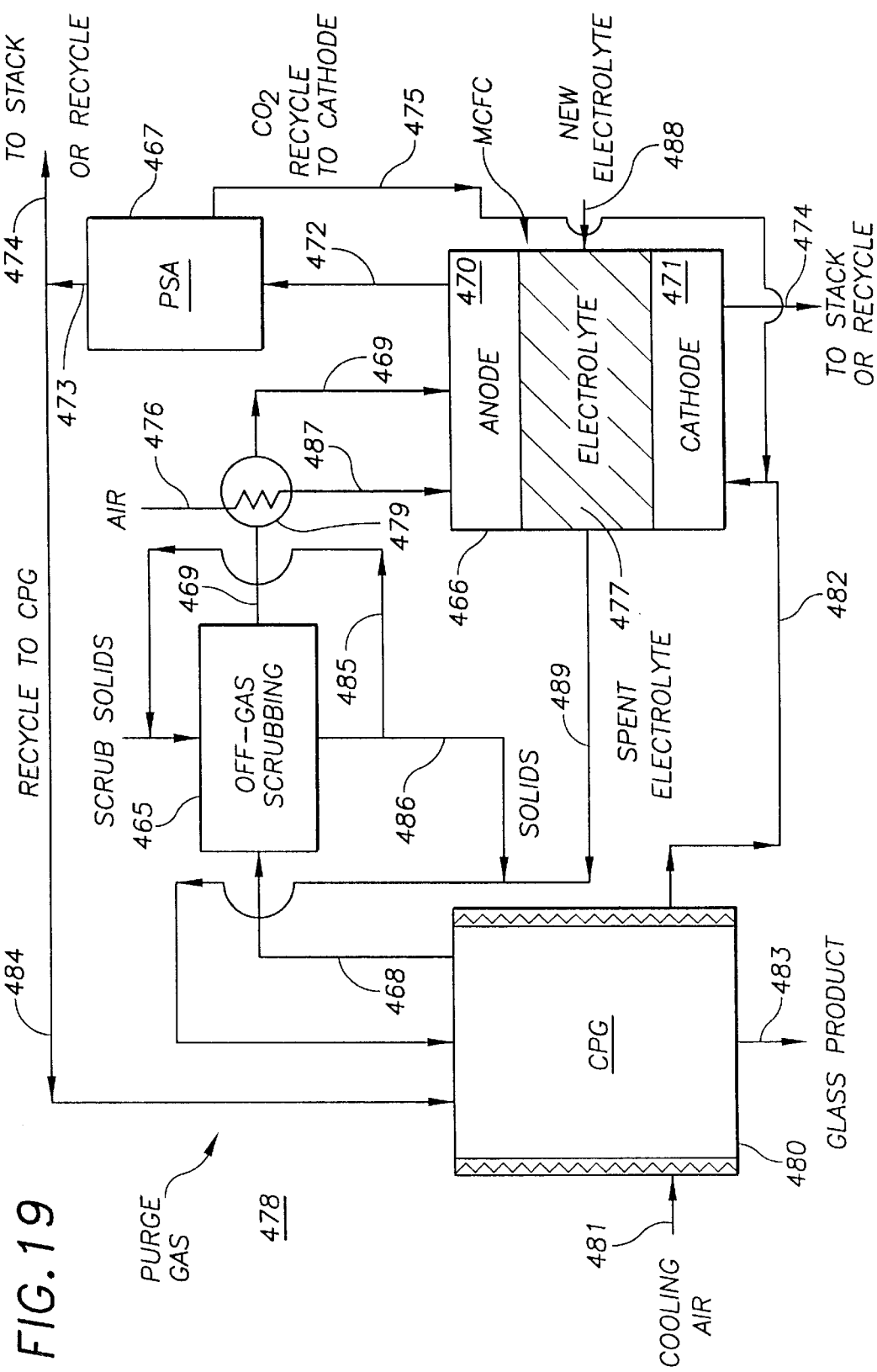

The integration of the controlled plasma glassification and the molten carbonate fuel cell is illustrated in FIG. 19. It can be seen from FIG. 19 how the controlled plasma glassification system can be integrated into a molten carbonate fuel cell system in a synergistic manner such that the total system has major advantages over either operating independently of one another.

System 478 includes a waste conversion unit 480 in accordance with the present invention, an off gas scrubbing unit 465, a fuel cell 466 and a separation unit 467 (such as a pressure swing adsorption unit).

Cooling air 481 can be used (with or without water) to cool the furnace or waste conversion unit 480 (also referred to herein as the controlled plasma glassification unit). In some instances, unit 480 may also be cooled using only water. Vitrified or vitrifiable products 483 formed in unit 480 can be removed therefrom as discussed above. Gases 482 can be introduced directly from unit 480 to fuel cell 466. Gases 482 primarily include air and are preheated in a cooling jacket to eliminate thermal shock to the cathode, and to maintain idling temperature of the fuel cell. Preferably, gases 482 are introduced into the cathode 471 of the fuel cell 466. Gases 482 can also be combined with carbon dioxide recycle 475 prior to or during introduction into the cathode of the fuel cell.

Gases 468, which primarily contain hydrogen, carbon monoxide and methane, exit unit 480 and are scrubbed in unit 465. Solids and/or particulates from scrubber or unit 465 can be further treated. For example, solids 486 (which may include spent electrolyte 489 from fuel cell 466) can be recycled to unit 480 for treatment therein, while scrubber solids 485 can be recycled and retreated in clean up unit 465.

Gases 469 are introduced into fuel cell 466 at the anode. Idle heating air 479, as discussed herein, may be heated by heat from unit 480. Air 487 may be introduced directly into fuel cell 466 from heat exchanger 479.

The gases are treated in fuel cell 466 as discussed above. New electrolyte 488 is added to fuel cell 466 as needed or desired. Gases 474 are transported to the stack or are recycled to unit 467. Gases 472 are transported to unit 467 (e.g. pressure swing adsorption unit). Carbon dioxide 475 is recycled to cathode 471 and gases 473 are transported to the stack or are recycled to unit 480.

Depending on the feed rate to unit 480, a portion of gas 474 can be recycled to unit 480 as purge gas 484.

A normal approach to providing fuel to a molten carbonate fuel cell is through the use of partial oxidation reforming or through steam reforming using methane as the fuel both in the reforming feed and in the flame that provides the heat energy to the reformer. The controlled plasma glassification-fuel cell system is expected to provide enhanced non-combustion waste to energy conversion. The ultra low emissions from the controlled plasma glassification-fuel cell system are expected to enable the siting of these systems over that of combustion processes such as incineration or pyrolysis systems which fuel combustion electrical generation systems. The high efficiency of the molten carbonate fuel cell for converting the useful chemical energy of the waste material into electrical energy makes the controlled plasma glassification-fuel cell system an improved process in maximizing the recovery of resources from waste. This benefits society from many standpoints. The recovery of the most useful recyclable in most wastes is energy. To maximize the recovery of energy will be a major benefit. In addition to maximizing the energy recovery, the controlled plasma glassification can convert a portion of the waste into stable nonleachable glass and will minimize the emissions of hazardous effluents. The coupling of the molten carbonate fuel cell with the waste conversion units of the present invention will act to further minimize the effluents to an ultra low level providing the optimum process for clean conversion of waste to energy and recyclable products.

It should be appreciated by those skilled in the art that the specific embodiments disclosed above may readily be utilized as a basis for modifying or designing other structures for carrying out the same purpose of the present invention. It should also be realized by those skilled in the art that such equivalent constructions do not depart from the spirit and scope of the invention as set forth in the appended claims.

What is claimed is:

1. A power supply source for supplying direct current to first, second and third arc plasma electrodes in a waste conversion unit, the power supply source comprising:

a transformer having first, second and third primary windings and first, second and third secondary windings, the first, second and third primary windings connected to an AC power source that provides an AC current and an AC voltage;

first, second and third current limiting reactors respectively connected to the first, second and third secondary windings;

first, second and third switches respectively connected in series to the first, second and third current limiting reactors;

first, second and third rectifiers for converting the AC power to DC power having a DC current and a DC voltage, the rectifiers each having first and second outputs; and first, second and third DC inductors, each inductor having first and second ends, the first ends of the first, second and third inductors respectively connected to the first outputs of the first, second and third rectifiers, and the second ends of the first, second and third inductors respectively connected to the first, second and third arc plasma electrodes.

2. The power supply source of claim 1, wherein the second outputs of the first, second and third rectifiers are connected to a counter electrode in the unit.

3. The power supply source of claim 1, wherein the first, second and third rectifiers are diode bridge rectifiers.

4. The power supply source of claim 1, wherein the first, second and third switches are silicon controlled rectifier switches.

5. The power supply source of claim 4, wherein the silicon controlled rectifier switches each include first and second thyristors.

6. The power supply source of claim 5, wherein the silicon controlled rectifier switches each further include a load limiting reactor connected in parallel with the first and second thyristors of each switch.

7. The waste conversion unit of claim 6, further including a snubber circuit connected in parallel with the first and second thyristors of each switch.

8. The waste conversion unit of claim 7, wherein the snubber circuit comprises a capacitor connected in series with a resistor.

9. The power supply source of claim 1, wherein the first, second and third secondary windings are connected in wye.

10. The power supply source of claim 9, wherein the first, second and third primary windings are connected in delta.

11. The power supply source of claim 9, wherein a neutral of the wye connected secondary windings is connected to a counter electrode in the unit.

12. The waste conversion unit of claim 11, further including at least one capacitor connected to the neutral.

13. The waste conversion unit of claim 12, further including at least one resistor connected to the neutral and to the capacitor.

14. A power supply source for supplying alternating current to first, second and third arc plasma electrodes, the power supply source comprising:
  a transformer having first, second and third primary windings and first, second and third secondary windings, the first, second and third primary windings connected to an AC power source that provides an AC current and an AC voltage;
  first, second and third current limiting reactors each having first and second ends, the first ends of the first, second and third current limiting reactors respectively connected to the first, second and third secondary windings;
  first, second and third capacitors reactors respectively connected to the second ends of the first, second and third current limiting reactors; and
  first, second and third switches respectively connected in series to the first, second and third capacitors and respectively connected to the first, second and third joule heating electrodes.

15. The power supply source of claim 14, wherein the first, second and third switches are silicon controlled rectifier switches.

16. The power supply source of claim 15, wherein the silicon controlled rectifier switches each include first and second thyristors.

17. The waste conversion unit of claim 16, further including a snubber circuit connected in parallel with the first and second thyristors of each switch.

18. The waste conversion unit of claim 17, wherein the snubber circuit comprises a capacitor connected in series with a resistor.

19. The power supply source of claim 14, wherein the first, second and third secondary windings are connected in wye.

20. The power supply source of claim 19, wherein the first, second and third primary windings are connected in delta.

21. The power supply source of claim 19, wherein a neutral of the wye connected secondary windings is connected to a counter electrode in the unit.

22. The power supply source of claim 21, further including at least one capacitor connected to the neutral.

23. The waste conversion unit of claim 22, further including at least one resistor connected to the neutral and to the capacitor.

24. The power supply source of claim 21, further including at least one switch connected to the neutral.

25. The power supply source of claim 24, wherein the switch is a silicon controlled rectifier switch.

26. The waste conversion unit of claim 25, wherein the silicon controlled rectifier switch includes first and second thyristors.

27. The waste conversion unit of claim 26, further including a snubber circuit connected in parallel with the first and second thyristors.

28. The waste conversion unit of claim 27, wherein the snubber circuit comprises a capacitor connected in series with a resistor.

29. A power supply source for supplying direct current to first and second arc plasma electrodes in a waste conversion unit, the power supply source comprising:
  a transformer having first, second and third primary windings and first, second and third secondary windings, the first, second and third primary windings connected to an AC power source that provides an AC current and an AC voltage;
  first, second and third current limiting reactors respectively connected to the first, second and third secondary windings;
  first, second and third switches respectively connected in series to the first, second and third current limiting reactors;
  a diode bridge rectifier for converting the AC current and the AC voltage to DC power having a DC current and a DC voltage, the rectifier having first, second and third inputs and first and second outputs, the first, second and third inputs respectively connected to the first, second and third switches;
  first and second inductors, each inductor having first and second ends, the first ends of the first and second inductors respectively connected to the first and second outputs of the rectifier, and the second ends of the first and second inductors respectively connected to the first and second arc plasma electrodes.

30. The power supply source of claim 29, wherein the first, second and third secondary windings are connected in wye.

31. The power supply source of claim 30, wherein a neutral of the wye connected secondary windings is connected to a counter electrode.

32. The power supply source of claim 29, wherein the first, second and third switches each include first and second thyristors.

33. The power supply source of claim 32, further including first, second and third metal oxide varistors connected in parallel with the first and second thyristors of each switch.

34. The power supply source of claim 33, further including first, second and third load limiting reactors respectively connected in parallel with the first and second thyristors of each switch and respectively connected in parallel with the first, second and third metal oxide varistors.

35. The power supply source of claim 34, wherein the load limiting reactors are air gap reactors.

36. The power supply source of claim 34, further including first, second and third current transformers respectively connected to the load limiting reactors.

37. The power supply source of claim 29, further including a clamping diode connected between the first and second outputs of the diode bridge rectifier and the first and second DC inductors.

38. The power supply source of claim 37, wherein the first, second and third secondary windings are connected in wye.

39. The power supply source of claim 38, wherein a neutral of the wye connected secondary windings is connected to a counter electrode.

40. The power supply source of claim 37, wherein the first, second and third switches each include first and second thyristors.

41. The power supply source of claim 40, further including first, second and third metal oxide varistors connected in parallel with the first and second thyristors of each switch.

42. The power supply source of claim 41, further including first, second and third load limiting reactors respectively connected in parallel with the first and second thyristors of each switch and respectively connected in parallel with the first, second and third metal oxide varistors.

43. The power supply source of claim 42, wherein the load limiting reactors are air gap reactors.

44. The power supply source of claim 42, further including first, second and third current transformers respectively connected to the load limiting reactors.

45. A power supply source for supplying direct current to first and second arc plasma electrodes in a waste conversion unit, the power supply source comprising:

a first transformer having first, second and third primary windings and first, second and third secondary windings, the first, second and third primary windings connected to an AC power source that provides an AC current and an AC voltage;

first, second and third current limiting reactors respectively connected to the first, second and third secondary windings;

a thyristor rectifier having first, second and third inputs and first and second outputs, the first, second and third thyristor rectifier inputs respectively connected to the first, second and third current limiting reactors;

first and second DC inductors, each inductor having first and second ends, the first ends of the first and second inductors respectively connected to the first and second outputs of the thyristor rectifier, and the second ends of the first and second inductors respectively connected to the first and second arc plasma electrodes;

a second transformer having first, second and third primary windings and first, second and third secondary windings, the first, second and third primary windings respectively connected to the first, second and third secondary windings of the first transformer;

first, second and third linear inductors respectively connected to the first, second and third secondary windings of the second transformer; and a diode bridge rectifier having first, second and third inputs and first and second outputs, the first, second and third inputs respectively connected to the first, second and third linear inductors, the first output connected to the first DC inductor and the second output connected to the second DC inductor.

46. The power supply source of claim 45, further including a neutral connected to the first, second and third secondary windings of the first transformer and connected to a counter electrode.

47. The power supply source of claim 45, further including a neutral connected to the first, second and third secondary windings of the second transformer and connected to a counter electrode.

48. The power supply source of claim 45, further including a neutral connected to the first, second and third secondary windings of the first transformer is connected to a counter electrode and further including a neutral connected to the first, second and third secondary windings of the second transformer and connected to the counter electrode.

49. The power supply source of claim 45, further including a plurality of current transformers.

50. A power supply source for supplying direct current to first and second arc plasma electrodes in a waste conversion unit, the power supply source comprising:

a transformer having first, second and third primary windings and first, second and third secondary windings, the first, second and third primary windings connected to an AC power source that provides an AC current and an AC voltage;

first, second and third current limiting reactors respectively connected to the first, second and third secondary windings;

a thyristor rectifier having first, second and third inputs and first and second outputs, the first, second and third thyristor rectifier inputs respectively connected to the first, second and third current limiting reactors;

first, second, third and fourth DC inductors, each inductor having first and second ends, the first ends of the first and second inductors respectively connected to the first and second outputs of the thyristor rectifier, the second ends of the first and second inductors respectively connected to the first and second ends of the third and fourth inductors and the second ends of the third and fourth inductors respectively connected to the first and second arc plasma electrodes;

first, second and third linear inductors respectively connected to the first, second and third secondary windings of the transformer; and a diode bridge rectifier having first, second and third inputs and first and second outputs, the first, second and third inputs respectively connected to the first, second and third linear inductors, the first output connected to the first DC inductor and the second output connected to the second DC inductor.

51. The power supply source of claim 50, further including a neutral connected to the first, second and third secondary windings of the transformer and connected to a counter electrode.

52. The power supply source of claim 50, wherein the first, second and third secondary windings are connected in delta.

53. The power supply source of claim 52, further including a neutral connected to the first, second and third secondary windings of the transformer and connected to a counter electrode.

54. The power supply source of claim 50, further including a plurality of current transformers.

* * * * *